(12) United States Patent
Sands et al.

(10) Patent No.: US 12,460,262 B2
(45) Date of Patent: Nov. 4, 2025

(54) METHODS OF DETECTING, PREVENTING, REVERSING, AND TREATING NEUROLOGICAL DISEASES

(71) Applicant: Washington University, St. Louis, MO (US)

(72) Inventors: Mark S. Sands, St. Louis, MO (US); Bruno Benitez Viloria, St. Louis, MO (US)

(73) Assignee: Washington University, St. Louis, MO (US)

( * ) Notice: Subject to any disclaimer, the term of this patent is extended or adjusted under 35 U.S.C. 154(b) by 1074 days.

(21) Appl. No.: 17/311,970

(22) PCT Filed: Dec. 5, 2019

(86) PCT No.: PCT/US2019/064683
§ 371 (c)(1),
(2) Date: Jun. 8, 2021

(87) PCT Pub. No.: WO2020/118056
PCT Pub. Date: Jun. 11, 2020

(65) Prior Publication Data
US 2022/0025461 A1 Jan. 27, 2022

Related U.S. Application Data

(60) Provisional application No. 62/775,626, filed on Dec. 5, 2018.

(51) Int. Cl.
*A61P 25/28* (2006.01)
*A61K 48/00* (2006.01)
*A61P 25/16* (2006.01)
*C12Q 1/6883* (2018.01)

(52) U.S. Cl.
CPC ............ *C12Q 1/6883* (2013.01); *A61K 48/00* (2013.01); *A61P 25/16* (2018.01); *A61P 25/28* (2018.01); *C12Q 2600/106* (2013.01); *C12Q 2600/156* (2013.01); *G01N 2800/28* (2013.01)

(58) Field of Classification Search
None
See application file for complete search history.

(56) References Cited

U.S. PATENT DOCUMENTS

| | | |
|---|---|---|
| 2016/0213632 A1 | 7/2016 | Yasuda et al. |
| 2017/0253930 A1 | 9/2017 | Hatchwell et al. |
| 2017/0304339 A1 | 10/2017 | Sardiello |
| 2018/0051337 A1 | 2/2018 | Clark |
| 2018/0133206 A1 | 5/2018 | Wustman |

FOREIGN PATENT DOCUMENTS

| | | |
|---|---|---|
| CN | 101541172 A | 9/2009 |
| CN | 103764166 A | 4/2014 |
| CN | 104131094 A | 11/2014 |
| CN | 104771402 A | 7/2015 |
| JP | 2009509913 A | 3/2009 |
| JP | 2014523881 A | 9/2014 |
| WO | 2006133446 A2 | 12/2006 |
| WO | 2012177997 A1 | 12/2012 |

OTHER PUBLICATIONS

Boyd Robert E et al, "Correction of lysosomal dysfunction as a therapeutic strategy for neurodegenerative diseases", Bioorganic Medicinal Chemistry Letters, Elsevier, Amsterdam, NL, (May 14, 2014), vol. 24, No. 14, doi: 10.1016/J.BMCL.2014.04.108, ISSN 0960-894X, 5 pages, XP029033851.
Extended European Search Report for European Application No. 19894217.9, mailed Jul. 28, 2022, 33 Pages.
Ibanez, L et al., "Pleiotropic Effects of Variants in Dementia Genes in Parkinson Disease", Frontiers in Neuroscience, (Apr. 10, 2018), vol. 12, 10 pages, XP055715002.
International Preliminary Report on Patentability for International Application No. PCT/US2019/064683, mailed Jun. 17, 2021, 19 pages.
International Search Report and Written Opinion for International Application No. PCT/US2019/064683, mailed Apr. 24, 2020, 23 pages.
Macauley, SL, "Combination Therapies for Lysosomal Storage Diseases: A Complex Answer to a Simple Problem", Pediatr Endocrinol Rev, (Jun. 2016), vol. 13, No. 1 1, 16 pages, XP055421382.
Sumayao, R, Jr. et al., "The Role of Cystinosin in the Intermediary Thiol Metabolism and Redox Homeostasis in Kidney Proximal Tubular Cells", Antioxidants, (Dec. 3, 2018), vol. 7, No. 179, 17 pages, XP055714997.
Twohig, D et al., "The relevance of cerebrospinal fluid a-synuclein levels to sporadic and familial Alzheimer's disease", Acta Neuropathologica Communications, vol. 6, No. 130, (Nov. 26, 2018), 19 pages, URL: https://doi.org/10.1186/s40478-018-0624-z, XP021263018.
Wauters Eline et al., "Modifiers ofGRN-Associated Frontotemporal Lobar Degeneration", Trends in Molecular Medicine, (Oct. 2017), vol. 23, No. 10, doi:10.1016/J.MOLMED.2017.08.004, ISSN 1471-4914, 18 pages, XP085210518.
Communication Pursuant to Article 94(3) EPC for European Patent Application No. 19894217.9, mailed on Oct. 27, 2023, 8 pages.
De Carvalho T.G., et al., "Genome Editing: Potential Treatment for Lysosomal Storage Diseases," Current Stem Cell Reports, 2015, vol. 1, pp. 9-15.
First Office Action and Search Report for Chinese Patent Application No. 201980091183.3, dated Apr. 27, 2023, 19 pages.
Jegga A.G., et al., "Systems Biology of the Autophagy-Lysosomal Pathway," Autophagy, May 1, 2011, vol. 7, No. 5, pp. 477-489.
Kosuga M., et al., "Cell Therapy for Inherited Metabolic Diseases," Journal of Clinical and Experimental Medicine, 2009, vol. 229, No. 9, pp. 858-862.
Marshall M.S., et al., "Analysis of Age-Related Changes in Psychosine Metabolism in the Human Brain," PloS one, Feb. 26, 2018, vol. 13, No. 2, pp. 1-20.

(Continued)

*Primary Examiner* — Sean McGarry
(74) *Attorney, Agent, or Firm* — Polsinelli PC

(57) ABSTRACT

Among the various aspects of the present disclosure is the provision of a method of detecting, preventing, reversing, treating, or delaying the onset of a neurological disease (e.g., adult-onset neurological diseases, Alzheimers disease, Parkinsons disease, Frontotemporal dementia).

8 Claims, 33 Drawing Sheets

(56) References Cited

OTHER PUBLICATIONS

Napolitano G., et al., "Impairment of Chaperone-Mediated Autophagy Leads to Selective Lysosomal Degradation Defects in the Lysosomal Storage Disease Cystinosis," EMBO Molecular Medicine, 2015, vol. 7, No. 2, pp. 158-174.
Office Action for Japanese Application No. 2021-531353, mailed on Nov. 28, 2023, 9 Pages.
Search Report and Written Opinion for Singapore Patent Application No. SG11202105606X, mailed on Mar. 1, 2023, 13 pages.
Tsuji D., et al., "Physiological Regulation of Lysosomal Functions and Pathogenesis in Lysosomal Storage Diseases," Biochemistry, Feb. 2018, vol. 90, No. 1, pp. 60-68, doi: 10.14952/SEIKAGAKU.2018.900060.
Written Opinion for Singapore Patent Application No. SG11202105606X, mailed on Jan. 12, 2024, 10 pages.

FIG. 12A
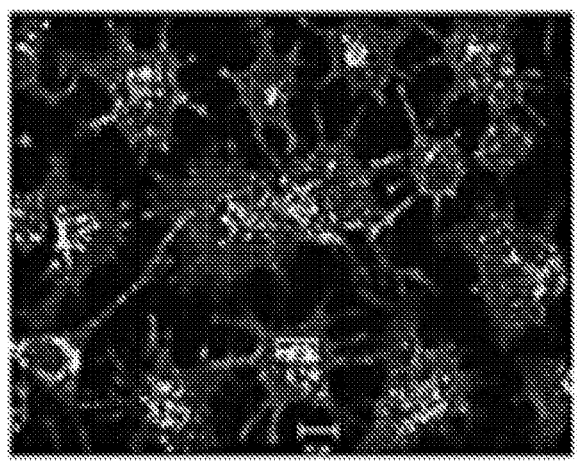
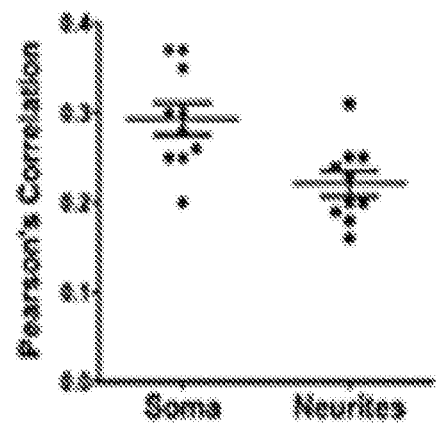
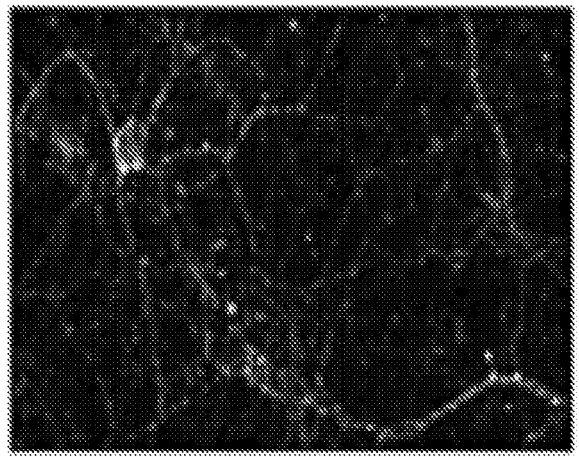
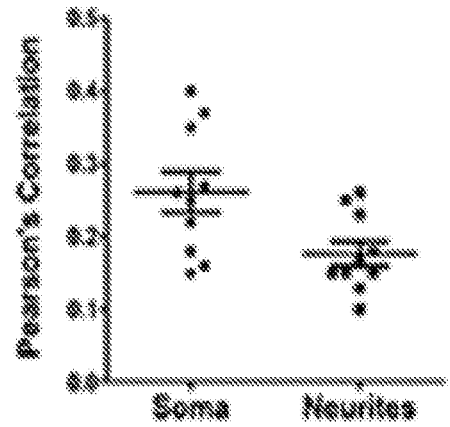

FIG. 13A
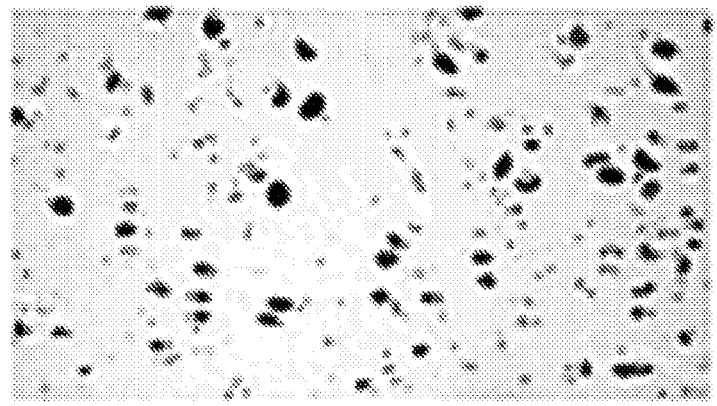
ANCL
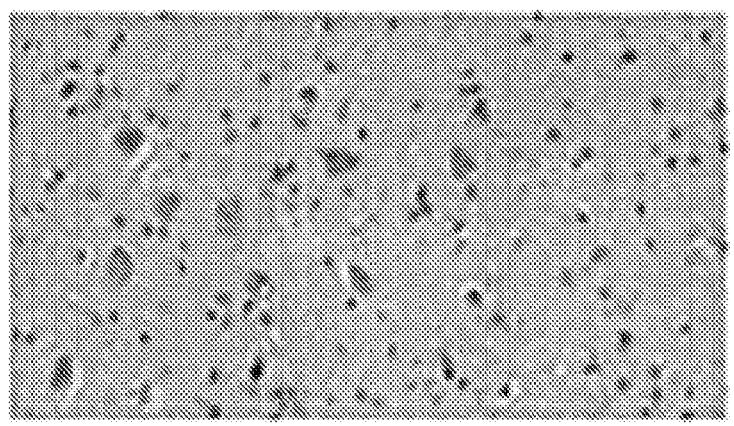
Control
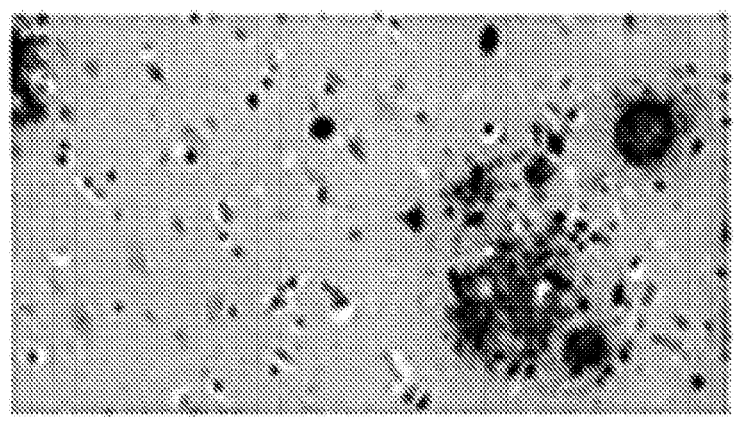
Alzheimer's

FIG. 13B
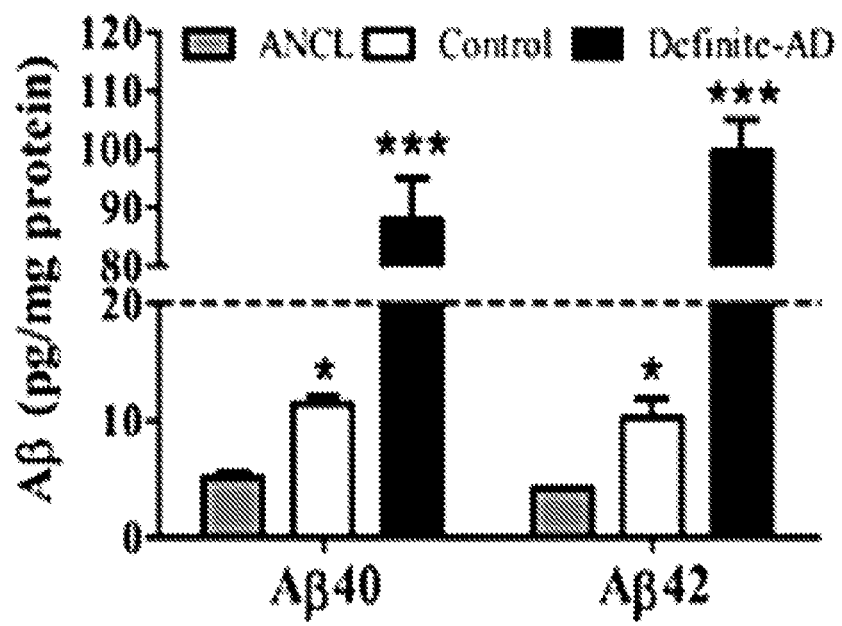
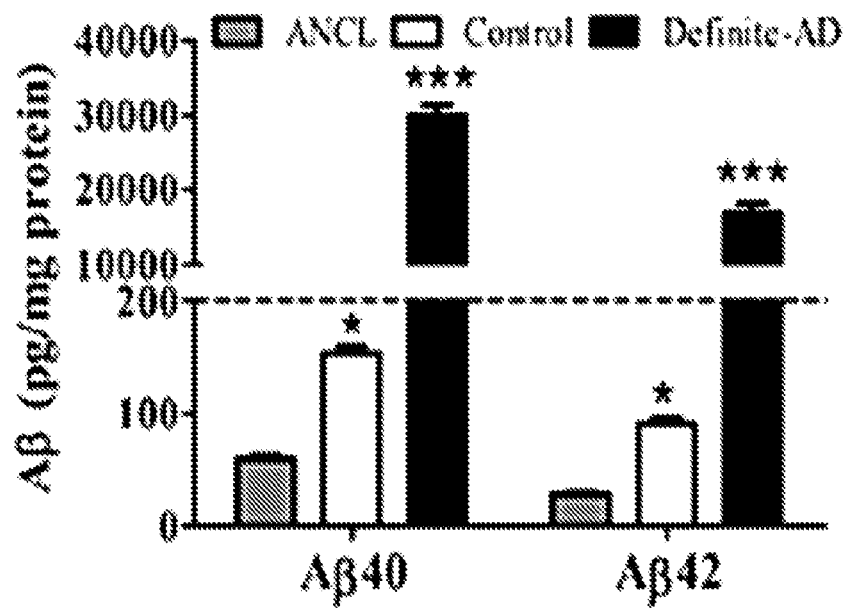

NAGLU

Amyloid plaque load in NAGLU mice

METHODS OF DETECTING, PREVENTING, REVERSING, AND TREATING NEUROLOGICAL DISEASES

CROSS-REFERENCE TO RELATED APPLICATIONS

This application claims priority from PCT International Application No. PCT/US19/64683 filed 5 Dec. 2019, which claims the benefit of U.S. Provisional Application Ser. No. 62/775,626 filed on 5 Dec. 2018, each of which is incorporated herein by reference in its entirety.

STATEMENT REGARDING FEDERALLY SPONSORED RESEARCH OR DEVELOPMENT

Not applicable.

MATERIAL INCORPORATED-BY-REFERENCE

Not applicable.

FIELD OF THE INVENTION

The present disclosure generally relates to treatment and detection of neurological diseases (e.g., adult-onset neurological diseases, Alzheimer's disease (AD), Parkinson's disease (PD), frontotemporal dementia (FTD), etc.).

SUMMARY OF THE INVENTION

Among the various aspects of the present disclosure is the provision of a method of detecting, preventing, treating, reversing, or delaying the onset of a neurological disease (e.g., adult-onset neurological diseases, AD, PD, or FTD).

An aspect of the present invention provides for a method of modulating an autophagy-lysosomal pathway in a subject heterozygous for a lysosomal gene comprising a loss-of-function variant comprising: administering a therapeutically effective amount of an autophagy-lysosomal pathway modulating agent to a subject in need thereof.

An aspect of the present invention provides for a method of preventing, treating, reversing, or delaying onset of a neurological disease, disorder, or condition associated with lysosomal dysfunction in a subject comprising: detecting, or having been detected, at least one lysosomal gene comprising a loss-of-function variant in a biological sample of a subject; and administering a therapeutically effective amount of an autophagy-lysosomal pathway modulating agent, wherein the subject is heterozygous for the lysosomal gene comprising a loss-of-function variant or the subject is a carrier for a lysosomal storage disease (LSD).

An aspect of the present invention provides for a method of detecting at least one lysosomal gene loss-of-function variant in a subject comprising: providing a biological sample from a subject; and detecting the presence of a lysosomal gene comprising a loss-of-function variant, wherein if at least one lysosomal gene comprising a loss-of-function variant is detected, the subject is determined to have or be at risk for a neurological or neurodegenerative disease, disorder, or condition associated with APP processing dysfunction. In some embodiments, the method comprises administering a therapeutically effective amount of an autophagy-lysosomal pathway modulating agent, wherein the autophagy-lysosomal pathway modulating agent is a treatment associated with the lysosomal gene comprising a loss-of-function variant detected.

In some embodiments, the lysosomal gene comprising a loss-of-function variant is associated with a lysosomal storage disease (LSD).

In some embodiments, the subject is suspected of having or being at risk for a neurological or neurodegenerative disease, disorder, or condition associated with lysosomal dysfunction.

In some embodiments, the subject is or is suspected of being heterozygous for a lysosomal gene loss-of-function variant or a carrier for a lysosomal storage disease (LSD).

In some embodiments, the lysosomal gene comprising a loss-of-function variant is selected from the group consisting of: CTNS, MAN2B1, MFSD8, GLB1, GALNS, NAGLU, CLN3, GNPTAB, SGSH, CLN8, NPC1, TPP1, DNAJC5, MANBA, PPT1, SMPD1, GAA, HGSNAT, GNS, CTSA, HEXB, and combinations thereof.

In some embodiments, the lysosomal gene comprising a loss-of-function variant is associated with a lysosomal storage disease (LSD) is selected from the group consisting of: AGA, ARSA, ARSB, ASAH1, CLN2 (TPP1), CLN3, CLN5, CLN6, CLN8, CTNS, CTSA, CTSD, CTSK, FUCA1, GAA, GALC, GALNS, GLA, GLB1, GM2A, GNPTAB, GNPTG, GNS, GUSB, HEXA, HEXB, HGSNAT, HYAL1, IDS, IDUA, KCTD7, LAMP2, LIPA, MAN2B1, MANBA, MCOLN1, MFSD8, NAGA, NAGLU, NEU1, NPC1, NPC2, PPT1, PSAP, SGSH, SLC17A5, SMPD1, SUMF1, CHIT1, ATP13A2, CTSF, DNAJC5, GRN, and combinations thereof.

In some embodiments, the lysosomal gene comprising a loss-of-function variant is selected from the group consisting of: NEU1, NAGLU, GBA, GLB1, MANBA, MAN2B1, HGSNAT, IDS, PPT1, GNS, and combinations thereof.

In some embodiments, the lysosomal gene comprising a loss-of-function variant is selected from the group consisting of: GALC, ACD, and combinations thereof.

In some embodiments, the autophagy-lysosomal pathway modulating agent comprises gene therapy (GT), wherein the GT increases or enhances enzyme activity associated with the lysosomal gene comprising a loss-of-function variant selected from the group consisting of: AGA, ARSA, ARSB, ASAH1, CLN2 (TPP1), CLN3, CLN5, CLN6, CLN8, CTNS, CTSA, CTSD, CTSK, FUCA1, GAA, GALC, GALNS, GLA, GLB1, GM2A, GNPTAB, GNPTG, GNS, GUSB, HEXA, HEXB, HGSNAT, HYAL1, IDS, IDUA, KCTD7, LAMP2, LIPA, MAN2B1, MANBA, MCOLN1, MFSD8, NAGA, NAGLU, NEU1, NPC1, NPC2, PPT1, PSAP, SGSH, SLC17A5, SMPD1, SUMF1, CHIT1, ATP13A2, CTSF, DNAJC5, GRN, and combinations thereof.

In some embodiments, the subject is treated with a autophagy-lysosomal pathway modulation agent that modulates expression of: AGA, ARSA, ARSB, ASAH1, CLN2 (TPP1), CLN3, CLN5, CLN6, CLN8, CTNS, CTSA, CTSD, CTSK, FUCA1, GAA, GALC, GALNS, GLA, GLB1, GM2A, GNPTAB, GNPTG, GNS, GUSB, HEXA, HEXB, HGSNAT, HYAL1, IDS, IDUA, KCTD7, LAMP2, LIPA, MAN2B1, MANBA, MCOLN1, MFSD8, NAGA, NAGLU, NEU1, NPC1, NPC2, PPT1, PSAP, SGSH, SLC17A5, SMPD1, SUMF1, CHIT1, ATP13A2, CTSF, DNAJC5, GRN, and combinations thereof.

In some embodiments, the subject is haploinsufficient for or has a heterozygous variant in a lysosomal gene comprising a loss-of-function variant selected from the group consisting of: AGA, ARSA, ARSB, ASAH1, CLN2 (TPP1), CLN3, CLN5, CLN6, CLN8, CTNS, CTSA, CTSD, CTSK, FUCA1, GAA, GALC, GALNS, GLA, GLB1, GM2A, GNPTAB, GNPTG, GNS, GUSB, HEXA, HEXB, HGSNAT, HYAL1, IDS, IDUA, KCTD7, LAMP2, LIPA, MAN2B1, MANBA, MCOLN1, MFSD8, NAGA, NAGLU, NEU1, NPC1, NPC2, PPT1, PSAP, SGSH, SLC17A5, SMPD1, SUMF1, CHIT1, ATP13A2, CTSF, DNAJC5, GRN, and combinations thereof.

In some embodiments, the lysosomal gene comprising a loss-of-function variant is selected from a rare functional variant in a gene responsible for heparan sulfate (HS) metabolism of the group consisting of: SGSH, NAGLU, HGSNAT, GNS, and combinations thereof.

In some embodiments, the loss-of-function variant is one or more variants selected from the group consisting of a deletion, a substitution, or a deletion of the lysosomal gene.

In some embodiments, the neurological or neurodegenerative disease, disorder, or condition is associated with lysosomal dysfunction.

In some embodiments, the neurological or neurodegenerative disease, disorder, or condition is associated with altered APP processing (e.g., altered levels of brain interstitial Aβ and increased Aβ plaque burden) or α-Syn aggregation.

In some embodiments, the neurological or neurodegenerative disease, disorder, or condition is associated with Aβ accumulation.

In some embodiments, the neurological or neurodegenerative disease, disorder, or condition is Alzheimer's disease (AD).

In some embodiments, the autophagy-lysosomal pathway modulating agent is an agent associated with the lysosomal gene comprising a loss-of-function variant comprises selected from the group consisting of: chemical chaperone therapy (CCT), enzyme replacement therapy (ERT), gene therapy (GT), gene editing, haematopoietic stem cell transplantation (HSCT), chemical chaperone therapy (CCT), stop codon read through drugs, substrate reduction therapy (SRT), and combinations thereof.

In some embodiments, the method comprises supplementation by exogenous lysosomal protein by enzyme replacement therapy (ERT), gene therapy (GT), or stem cell therapy.

In some embodiments, the autophagy-lysosomal pathway modulating agent is a treatment associated with the lysosomal gene comprising a loss-of-function variant comprising Cysteamine, cyclodextrin, or Miglustat.

In some embodiments, Aβ, apoE, tau, or α-Syn aggregation is reduced in the subject or Aβ, apoE, tau, or α-Syn clearance is enhanced compared to a subject not treated.

In some embodiments, the subject has or is suspected of having dementia, Alzheimer's disease (AD), Parkinson's disease (PD), frontotemporal dementia (FTD), Creutzfeldt-Jakob disease, motor neuron disease, a polyglutamine disorder, Huntington's disease, familial amyloid polyneuropathy (FAP), Lewy body dementia, or multiple system atrophy.

Other objects and features will be in part apparent and in part pointed out hereinafter.

DESCRIPTION OF THE DRAWINGS

Those of skill in the art will understand that the drawings, described below, are for illustrative purposes only. The drawings are not intended to limit the scope of the present teachings in any way.

FIG. 1A-FIG. 10 is a series of plots depicting changes in NAGLU transcript levels with (A) age, with (B) Alzheimer's disease (AD) status, and (C) in AD mouse models.

FIG. 2 is a dot plot showing NAGLU transcript levels in neurons from the substantia nigra of Parkinson's disease (PD) cases compared to healthy controls.

FIG. 5 is a schematic of age-dependent decline of degradative capacity of the autophagy-lysosome pathway (ALP) and its role in neurodegeneration. Black line represents the age-dependent decline of the ALP function. Blue line represents the neurodegenerative changes in Alzheimer's disease (AD). Dashed lines represent a 95% confidence interval (CI).

FIG. 6 is a scatter plot comparing cumulative allele frequencies (cMAF) for predicted functional rare variants in lysosomal storage disease (LSD)-causing genes in AD cohort versus Exome Aggregation Consortium (ExAC). The cumulative allele frequencies per LSD-causing gene obtained from AD cohorts of European ancestry are on the x axis, and the cumulative allele frequencies of the ExAC data set are on the y axis.

FIG. 12A-FIG. 12D is a series of images, dot plots, and a bar chart showing endogenous CSPα is at the lysosome and mutant CSPα affects ALP function. (A) Representative images and quantification of endogenous CSPα co-localizing with lysosome markers in the soma and neurites of primary cortical neurons and in a neuron-like cell type (N2A). (B) Western blot showing co-precipitation of CSPα with the lysosomal marker LAMP1. (C) Western blot for lysosomal markers in neurons expressing the adult onset ceroid lipofuscinosis (ANCL)-causing mutation p.L115R. (D) Quantification of Lysotracker signal in wild-type and p.L115R cells.

FIG. 13A-FIG. 13B is a series of images and bar charts showing CSPα affects Aβ generation in vivo. (A) Images of brain sections from ANCL, control, and AD patients. (B) Quantification of Aβ in detergent-soluble and insoluble (guanidine) fractions of brain samples from ANCL, AD, and healthy control samples.

FIG. 14A Hemizygous naive NAGLU mice exhibit lower Aβ levels in brain interstitial fluid (ISF). Microdialysis quantification of ISF levels of Aβ in littermates WT and hemizygous mice revealed a significant reduction of baseline ISF levels of Aβ. *p<0.05 by unpaired t test. 10-months-old Wild-type (n=8) and NAGLU hemizygous (n=5). FIG. 14B Hemizygous naive PPT1 mice exhibit lower Aβ levels in brain interstitial fluid (ISF). Microdialysis quantification of ISF levels of Aβ in littermates WT and hemizygous mice revealed a significant reduction of baseline ISF levels of Aβ. **p<0.01 by unpaired t test. 7-months-old Wild-type (n=5) and NAGLU hemizygous (n=6).

FIG. 21E is a dot plot showing hemizygosity in the PPT1 gene exacerbates β-amyloid accumulation. Surface area covered by plaques was increased in PPT1 Hemizygous/5XFAD mice compared to 5XFAD mice. Quantification of plaque load in the hippocampus was performed blinded. **p<0.01 by unpaired t test. 7-months-old 5XFAD (n=4) and PPT1 Hemizygous/5XFAD (n=8). FIG. 21F is a dot plot showing hemizygosity in the NAGLU gene exacerbates β-amyloid accumulation. Surface area covered by plaques was increased in NAGLU Hemizygous/5XFAD mice compared to 5XFAD mice. Quantification of plaque load in the hippocampus was performed blinded. *p<0.05 by unpaired t test. 7-months-old 5XFAD (n=4) and NAGLU Hemizygous/5XFAD (n=4).

DETAILED DESCRIPTION OF THE INVENTION

Figure 1A:
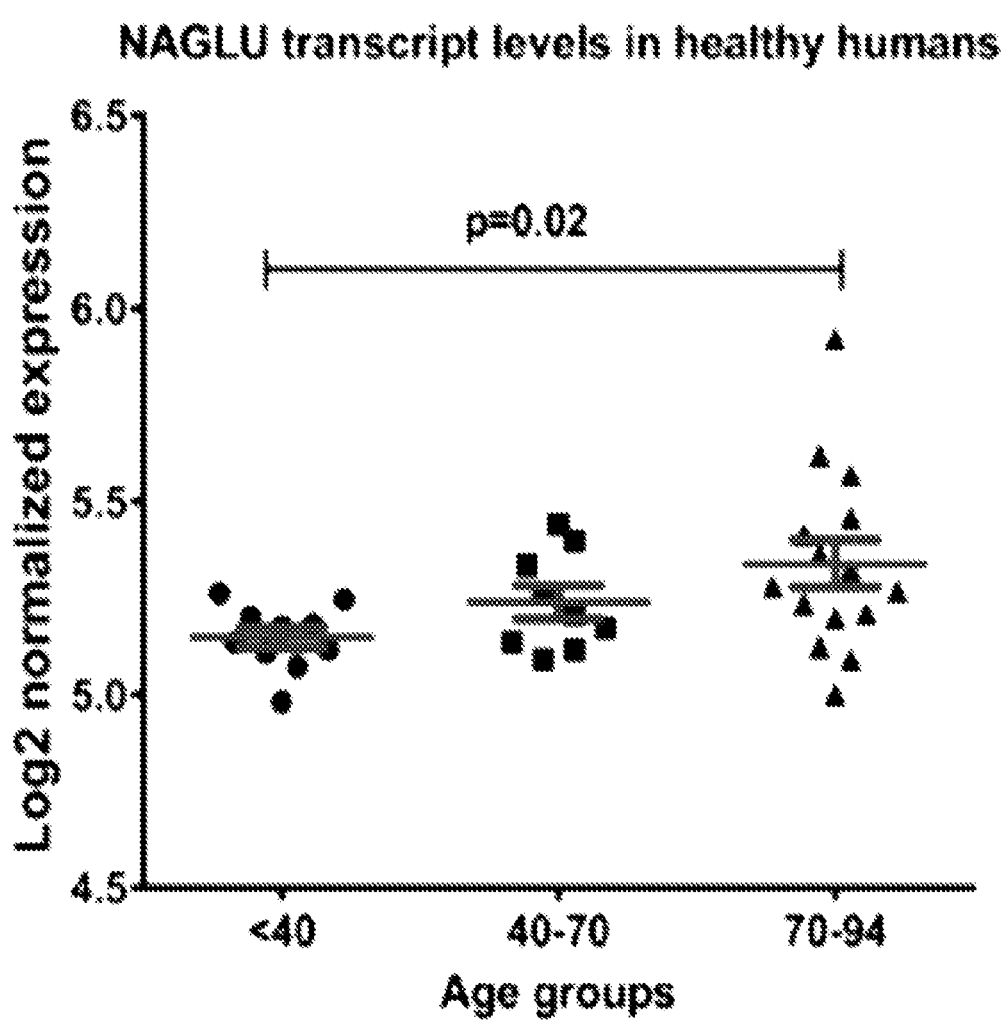

The present disclosure is based, at least in part, on the discovery that subjects heterozygous (carriers) for deleterious mutations in lysosomal protein genes that cause lysosomal storage diseases (LSDs) (carriers for LSD, having no LSD symptoms) have an increased risk of developing Alzheimer's disease (AD). The current dogma is that heterozygous carriers for LOF variants in LSD-causing genes, and many other hereditary diseases, are considered to be normal and not predisposed to any diseases.

Patients with LSDs are homozygous (two alleles with complete or nearly complete loss-of-function lysosomal gene variants) for gene defects causing LSD and live anywhere between infanthood to 20 years old, depending on the LSD. These LSD patients would not live long enough to develop AD.

As described herein, the inventors discovered that in subjects with AD, one or more variants (deleterious mutations) in LSD-causing genes were detected and enriched and were only detected in one allele (heterozygous). The inventors discovered these variants to be loss-of-function variants in heterozygous subjects.

Multiple therapeutic strategies are currently in place for the treatment of lysosomal storage diseases (LSDs) (e.g., enzyme replacement therapy (ERT), gene therapy (GT), stem cell therapy (SCT) (e.g., Hematopoietic stem cell transplantation), oral small-molecule substrate reduction therapy, small-molecule chaperones, or pharmacological remediation of autophagy-lysosome pathway) and can be used for the treatment of AD patients with deleterious heterozygous mutations in lysosomal proteins.

Heterozygous Loss-of-Function Variants in Lysosomal Genes

It is well-known that subjects homozygous for loss-of-function variants (e.g., aka deleterious variants or mutations) in genes associated with LSD result in profound lysosomal dysfunction. However, it was surprisingly discovered herein that the genomes of human AD patients are enriched in heterozygous complete or nearly complete loss-of-function variants in lysosomal genes (e.g., LSD carriers). Furthermore, it is shown herein that heterozygosity of deleterious mutations in lysosomal genes of completely normal appearing mice causes subtle lysosomal dysfunction and directly affects normal APP processing.

A loss-of-function variant, as described herein, can be a complete loss-of-function variant, a nearly complete loss-of-function variant, or a partial loss-of-function variant. As such, a loss-of-function variant is a variant in a lysosomal gene or LSD-associated gene disrupting the production or normal function of a lysosomal enzyme or other integral lysosomal protein. The variants can be deletions, substitutions, insertions, splice mutations, promoter mutations, mutations resulting in altered stability, frameshifting or stop variants, nonsense mutations, and/or any other mutation that negatively affects the normal function of a lysosomal gene or its resulting protein. For example, a complete, nearly complete, or partial loss-of-function variant can result in a disruption or reduction in the production or activity of an enzyme.

A complete loss of function (LOF) variant can be defined as a variant or variants expected to correlate with complete LOF of affected transcripts, such as variants that result in downstream premature stop codons or larger deletions removing either the first exon or more than 50% of the protein-coding sequence of the affected transcript (haploinsufficiency) (MacArthur et al., 2012 Science 335, 823-828). Nearly complete or partial LOF variants reduce gene activity but do not ablate it completely.

As shown herein, it was discovered that a number of genes comprising variants associated with lysosomal storage diseases (LSDs) are strongly associated with Alzheimer's disease (AD) and Parkinson's disease (PD). This is a novel discovery because a subject would need to be homozygous for these mutations in order to develop LSD, but a subject only needs to be heterozygous in order to develop an APP processing- or subtle lysosome dysfunction-associated disease, such as AD or PD.

This discovery is also important because it was not previously appreciated that being haploinsufficient for these genes and having reduced expression of these LSD proteins would be associated with any other disease states. As stated above, the long-held belief was that people harboring heterozygous mutations (carriers) that can cause an LSD are not predisposed to any disease.

As shown herein, heterozygous deleterious mutations in lysosomal genes (e.g., genes associated with LSD or normal ALP function) are associated with AD. These genes can provide greater insight into the mechanism of lysosomal dysfunction in AD pathogenesis, knowledge that is currently lacking and that can yield novel therapeutic targets. The disclosed results can establish the basis for repurposing treatment strategies that are currently in place for LSDs for the potential treatment of AD. Surprisingly, models of NAGU and PPT1, which were not even the most significantly enriched of genes with deleterious variants identified in AD (see e.g., TABLE 13), were shown to respond to LSD therapy. As such, LSD treatment provided to a subject having deleterious heterozygous variants (or complete or nearly complete loss-of-function variants) for the other identified LSD-causing genes that are significantly enriched in AD would be expected to respond at least as well or better.

It was discovered herein, that 45 lysosomal enzyme genes having complete or nearly complete loss-of-function heterozygous variants are enriched in AD and PD patients. The following are known LSD-associated genes: AGA, ARSA, ARSB, ASAH1, CLN2 (TPP1), CLN3, CLN5, CLN6, CLN8, CTNS, CTSA, CTSD, CTSK, FUCA1, GAA, GALC, GALNS, GLA, GLB1, GM2A, GNPTAB, GNPTG, GNS, GUSB, HEXA, HEXB, HGSNAT, HYAL1, IDS, IDUA, KCTD7, LAMP2, LIPA, MAN2B1, MANBA, MCOLN1, MFSD8, NAGA, NAGLU, NEU1, NPC1, NPC2, PPT1, PSAP, SGSH, SLC17A5, SMPD1, SUMF1, CHIT1, ATP13A2, CTSF, DNAJC5, or GRN. Assays for measuring enzyme deficiencies associated with these genes and genotyping for variants of these genes are well known in the art.

A population of subjects having a deficiency in an ALP-associated gene can also have lysosomal dysfunction. There are currently 453 known lysosomal genes. As such, the LOF variants in the following genes could cause lysosomal dysfunction and be treatable with therapies as described herein: ABCA2, ABCA3, ABCA5, ABCB9, ABCC10, ACP2, ACP5, ACPP, ADA, ADAM8, ADRB2, AGA, AHNAK, ALDOB, ANKFY1, ANKRD27, ANPEP, ANXA11, AP1B1, AP1G1, AP1M1, AP1M2, AP1S1, AP1S2, AP1S3, AP3B1, AP3B2, AP3D1, AP3M1, AP3M2, AP3S1, AP3S2, AP4B1, AP4E1, AP4M1, AP4S1, AQP2, ARF1, ARL8A, ARL8B, ARRB1, ARSA, ARSB, ARSD, ARSG, ASAH1, ASS1, ATP11A, ATP110, ATP13A2, ATP6AP1, ATP6V0A1, ATP6V0A2, ATP6V0A4, ATP6V0B, ATP6V0C, ATP6V0D1, ATP6V0D2, ATP6V1A, ATP6V1B1, ATP6V1B2, ATP6V1C1, ATP6V1C2, ATP6V1 D, ATP6V1E1, ATP6V1F, ATP6V1G1, ATP6V1H, AZU1, BCL10, BLOC1S1, BTD, C18orf8, C19orf28, C1orf85, C2orf18, C7orf28B, CAT, CCDC115, CCKAR, CCZ1, CD164, CD1B, CD1D, CD1E, CD63, CD68, CD74, CECR1, CHID1, CHIT1, CLCN5, CLCN6, CLCN7, CLN3, CLN5, CLTA, CLTB, CLTC, CLTCL1, CLU, COL6A1, CP, CPVL, CREG1, CST3, CST7, CTBS, CTNS, CTSA, CTSB, CTSC, CTSD, CTSE, CTSF, CTSG, CTSH, CTSK, CTSL1, CTSL2, CTSO, CTSS, CTSW, CTSZ, CUBN, CXCR2, CYBASC3, DAGLB, DEPDC5, DKFZp761E198, DNAJC13, DNAJC5, DNAJC6, DNASE1, DNASE2, DNASE2B, DNM2, DOC2A, DPP4, DPP7, DRAM1, DRAM2, ECE1, EGF, ELANE, ENPEP, ENPP1, ENTPD4, EPDR1, FAM176A, FGFR3, FLOT1, FLOT2, FNBP1, FUCA1, FUCA2, GAA, GABARAP, GALC, GALNS, GBA, GC, GDAP2, GGA1, GGA2, GGA3, GGH, GJA1, GLA, GLB1, GM2A, GNA11, GNAI1, GNAI2, GNAI3, GNAQ, GNB1, GNB2, GNB4, GNPTAB, GNPTG, GNS, GOT1, GPC3, GPLD1, GPR137, GPR137B, GPR143, GRN, GUSB, HEXA, HEXB, HGSNAT, HLA-DMA, HLA-DMB, HLA-DOA, HLA-DOB, HLA-DPA1, HLA-DPB1, HLA-DQA1, HLA-DQA2, HLA-DQB1, HLA-DQB2, HLA-DRA, HLA-DRB1, HLA-DRB3, HLA-DRB4, HLA-DRB5, HPS1, HPS4, HPSE, HSPA8, HYAL1, HYAL2, HYAL3, IDS, IDUA, IFI30, IGF2R, IL411, ITM2C, KCNE1, KCNE2, KIAA0226, KIAA0415, KIAA1609, LAMP1, LAMP2, LAMP3, LAMTOR1, LAMTOR2, LAPTM4A, LAPTM4B, LAPTM5, LDLR, LGMN, LHCGR, LIPA, LITAF, LMBRD1, LNPEP, LOC653653, LRBA, LRP1, LRP2, M6PR, MAN2B1, MAN2B2, MANBA, 1-Mar, 2-Mar, 3-Mar, 8-Mar, 9-Mar, MCOLN1, MCOLN2, MCOLN3, MFSD1, MFSD8, MIOS, MMD, MON1B, MPO, MTOR, MYLPF, MYO7A, NAAA, NAGA, NAGLU, NAGPA, NAPA, NAPG, NAPSA, NBR1, NCSTN, NEU1, NEU4, NPC1, NPC2, NPPA, NSF, OCA2, OSTM1, P2RX4, P2RY2, PCSK9, PCYOX1, PEBP4, PGCP, PI4K2A, PLA2G15, PLA2G4E, PLA2G4F, PLBD1, PLBD2, PLD1, PLD3, PLEKHF1, PLOD1, PNPLA7, PON2, PPT1, PPT2, PROP, PRDX6, PRF1, PRTN3, PSAP, PSAPL1, PSEN1, PSEN2, PTGDS, RAB14, RAB27A, RAB2A, RAB5C, RAB7A, RAB7B, RAB9A, RAMP2, RAMP3, RDH14, RILP, RNASE1, RNASE2, RNASE6, RNASET2, RNF13, RNF152, RPTOR, RRAGA, RRAGB, RRAGC, RRAGD, SCARB1, SCARB2, SCPEP1, SELRC1, SERINC2, SFTPB, SFTPD, SGSH, SH3GL2, SIAE, SIDT2, SLC11A1, SLC11A2, SLC12A4, SLC15A3, SLC15A4, SLC17A5, SLC26A11, SLC29A3, SLC2A13, SLC2A8, SLC30A2, SLC36A1, SLC37A3, SLC44A2, SLC48A1, SMCR8, SMPD1, SMPD4, SMPDL3A, SNAP23, SNX16, SORT1, SPACA3, SPG11, SPHK2, SPNS1, SPPL2A, SRGN, STARD3, STARD3NL, STS, STX3, STX7, STXBP2, SUMF1, TCIRG1, TIAL1, TLR3, TLR7, TLR9, TM9SF1, TMBIM1, TMEM127, TMEM175, TMEM192, TMEM55A, TMEM55B, TMEM63A, TMEM74, TMEM8A, TMEM9, TMEM92, TMEM97, TOM1L1, TPCN1, TPCN2, TPP1, TRIM23, TRIP10, TSPAN1, TSPAN8, TXNDC5, TYR, UBA52, UNC13D, UNC93B1, USP4, USP5, USP6, UVRAG, VAMP4, VAMP7, VASN, VMA21, VPS11, VPS16, VPS18, VPS33A, VPS33B, VPS35, VPS36, VPS39, VPS41, VPS4B, WDR11, WDR41, WDR48, ZFYVE26, ZNRF1, or ZNRF2.

Neurological Diseases, Disorders, and Conditions Associated with Autophagy-Lysosomal Pathway (ALP) Dysfunction It was discovered herein that subjects heterozygous (carriers) for complete or nearly complete loss-of-function variants, typically associated with lysosomal storage diseases (LSDs) (when the subject is homozygous for these gene variants) can cause ALP dysfunction or APP processing defects. The deleterious variants in lysosomal genes can cause subclinical lysosomal dysfunction, which can result in altered APP processing (e.g., altered levels of brain interstitial Aβ and increased Aβ plaque burden) or α-Syn aggregation, in particular in subjects with Alzheimer's disease (AD) and Parkinson's disease (PD). This is strikingly evident when heterozygous complete or nearly complete loss-of-function mutations in lysosomal genes (NAGLU, PPT1, or Csp-α) are bred onto a mouse model of AD or PD. In this case, heterozygous complete or nearly complete loss-of-function mutations greatly exacerbate the Aβ plaque formation or the aggregation of α-synuclein. As such, it was discovered here, that subclinical lysosomal dysfunction can result in a neurological disease, disorder, or condition. Other neurological diseases, disorders, and conditions associated with lysosome dysfunction can be hereditary cerebral amyloid angiopathy, a condition characterized by stroke and a decline in intellectual function (dementia), Creutzfeldt-Jakob disease, a motor neuron diseases, a polyglutamine disorder, such as Huntington's disease, as well as diseases of peripheral tissue like familial amyloid polyneuropathy (FAP), Lewy body dementia, multiple system atrophy, or Frontotemporal dementia.

The present disclosure provides for methods for treating subjects heterozygous for gene variants associated with lysosomal storage diseases (LSDs) (e.g., carriers) and treating or preventing autophagy-lysosomal pathway (ALP)-associated neurological or neurodegenerative diseases, disorders, or conditions.

For example, TABLE 13 describes genes with variants found in LSD-causing genes in subjects with AD. If the subject was homozygous for these genes, they would have developed LSD. But as surprisingly discovered herein, heterozygosity is associated herein as being predictive of future risk of being diagnosed with an autophagy-lysosomal pathway-associated neurological or neurodegenerative disease, disorder, or condition, such as AD or PD.

As such, the disclosed methods of diagnosing and treating subjects having these heterozygous complete or nearly complete loss-of-function gene variants can be used to detect or treat autophagy-lysosomal pathway-associated neurological disease states. For example, the methods can be used in subjects having or suspected of having a neurological disease, disorder, or condition such as any neurological or neurodegenerative disease associated with lysosome or autophagy dysfunction (e.g., AD, PD, FTD, etc.).

Other neurological or neurodegenerative diseases, disorders, or conditions in subjects heterozygous for lysosomal storage disease-associated or deleterious lysosomal genes with complete or nearly complete loss-of-function variants can be treated by the methods described herein.

Lysosomal Storage Diseases (LSDs)

Lysosomal storage diseases (LSDs) or disorders are characterized by homozygous complete or nearly complete loss-of-function gene variants in autophagy-lysosomal pathway genes, resulting in a reduction or total loss of the lysosomal protein or the lysosomal protein function essential for the degradation pathways of macromolecules in the lysosome. As described herein, it was discovered that subjects heterozygous a complete or nearly complete loss-of-function lysosomal gene variant are at risk for developing a neurological disease associated with APP processing dysfunction (AD) or α-synuclein aggregation (PD). As such, treatments for diseases caused by heterozygous loss-of-function variants in the newly discovered neurological lysosomal-associated diseases can be implemented.

LSDs are a group of at least 50 inherited diseases, characterized by total or partial deficiency of one specific lysosomal protein involved in the degradation pathways of macromolecules in the lysosome. They are monogenic and for most of them, a large number of mutations have been described. Some mutations cause complete loss of protein function, while others only reduce the normal function. Storage of undegraded or partially degraded material, usually the substrate of a defective lysosomal enzyme, occurs in the lysosome. Conventionally, LSDs are grouped based on the chemical nature of the non-degraded substrates that accumulate, including mucopolysaccharidoses, lipidoses, glycogenoses, and oligosaccharidoses, etc.

Despite the great heterogeneity of symptoms, most of these diseases are characterized by its progressive course with high morbidity and increased mortality, although there are significant variations between different diseases and among patients with the same disease. Generally, these diseases are multisystemic, and clinical features include organomegaly, central nervous system dysfunction, and coarse hair and faces. Most patients are asymptomatic at birth and present the onset during childhood. Their frequency varies in different regions and populations, but although individually rare, the combined estimated prevalence ranges from 1:4000 to 1:9000 live births. Interestingly, most of the pediatric LSDs have a significant neurological component.

Although several of these diseases have no specific therapy so far, for some LSDs, hematopoietic stem cell transplantation (HSCT), enzyme replacement therapy (ERT), gene therapy (GT), and small molecule drugs are available or in clinical trials.

Autophagy-Lysosomal Pathway Function Enhancing Agents: Lysosomal Storage Disease Treatments and Therapies The present disclosure provides for identification and treatment of subjects being heterozygous for complete or nearly complete loss-of-function lysosomal genes associated with LSD diseases, disorders, or conditions. These heterozygous subjects are at a higher risk for having or developing autophagy-lysosomal pathway (ALP)-associated neurological or neurodegenerative diseases, disorders, or conditions. The present LSD therapies and treatments have been shown herein to treat or prevent an ALP-associated neurological or neurodegenerative disease, disorder, or condition in animal models by rescuing or enhancing the autophagy-lysosomal pathway (ALP) function.

LSD treatments, such as gene therapies and enzyme replacement therapies, have been shown to treat LSD in homozygous animal models of disease and human patients. As such, it would be expected that these therapies would be even more effective and the diseases easier to treat in heterozygous populations compared to homozygous populations. In other words, because the dysfunction associated with heterozygous populations (e.g., AD and PD) is milder compared to LSD patients, the threshold for therapeutic efficacy would be lower in heterozygous populations compared to homozygous populations.

Treatments (LSD therapeutic agents) and treatment methods for LSDs are well known; see e.g., Ohashi 2018 Gene therapy for lysosomal storage diseases and peroxisomal diseases Journal of Human Genetics (2019) 64:139-143; Beck 2017 Treatment strategies for lysosomal storage disorders, Dev Med & Child Neuro, 13-18; Ferreira and Gahl 2017 Lysosomal storage diseases, Translational Science of Rare Diseases 2(1-2) 1-71; Platt 2017 Emptying the stores: lysosomal diseases and therapeutic strategies, Nature Reviews Drug Discovery 17 133-150; Marques and Saftig 2019 Lysosomal storage disorders—challenges, concepts and avenues for therapy: beyond rare diseases J Cell Sci 132 jcs221739. Except as otherwise noted herein, therefore, the treatments and treatment methods of the present disclosure can be carried out in accordance with such processes.

TABLE 1

Therapeutic strategies for lysosomal storage diseases (LSDs) that can be used as ALP function enhancing agents.

| Therapeutic Strategy | Rationale | Significant clinical/experimental experience |
|---|---|---|
| Bone Marrow Transplantation (BMT)/ Haematopoietic stem cell transplantation (HSCT) | Replacement of the deficient enzyme activity by intravenous infusion of hematopoietic progenitor cells | Mucopolysaccharidosis type 1 (Hurler Syndrome) Mucopolysaccharidosis type 2 (Hunter Syndrome) Mucopolysaccharidosis type 3 (Sanfilippo Syndrome) Mucopolysaccharidosis type 4 (Morquio Syndrome) Mucopolysaccharidosis type 6 (Maroteaux-Lamy Syndrome) Gaucher disease Metachromatic Leukodystrophy |
| Enzyme Replacement Therapy (ERT) | Replacement of the deficient enzyme by intravenous infusion of exogenous enzyme able to reach the intracellular target | Gaucher disease type 1 and 3 Fabry disease Mucopolysaccharidosis type 1 (Hurler, Hurler/Scheie Syndrome) Mucopolysaccharidosis type 2 (Hunter Syndrome) Mucopolysaccharidosis Type 6 (Maroteaux-Lamy Syndrome) Pompe disease |
| Substrate Reduction Therapy (SRT) | Reduction of the formation of the lysosomal substance down to a rate at which the residual enzyme activity can catabolize stored and incoming lysosomal substance | Gaucher disease type 1 Tay-Sachs disease Sandhoff disease GM1 gangliosidosis Niemann-Pick disease type C |
| Chemical Chaperone Therapy (CCT) | Binding and stabilizing the misfolded enzymes, thus increasing their folding and trafficking and improving their residual activity | Gaucher disease Fabry disease GM1-gangliosidosis Pompe disease |
| Gene Therapy or Gene Editing | Direct transfer of the normal gene into the defective cells to supply therapeutic levels of the defective enzyme | Fabry disease Fucosidosis Galactosialidosis Gaucher disease Globoid-cell leukodystrophy GM1 and GM2 Gangliosidosis α-Mannosidosis Metachromatic leukodystrophy Mucopolysaccharidosis I, IIIB, VI, VII Niemann-Pick AB Pompe disease |

TABLE 2

Lysosomal storage diseases (LSDs) and associated enzyme deficiencies, treatments and genes.

| LSD | Enzyme Deficiency | Examples of Treatments | Genes with Deleterious or Loss-of-Function Variants Associated with LSD |
|---|---|---|---|
| Type 1 Gaucher Disease | Glucocerebrosidase | Imiglucerase (Cerezyme, enzyme preparation, produced in CHO cells) Velaglucerase (Vpriv, enzyme preparation, produced in human cells) Taliglucerase (Elelyso, enzyme preparation, produced in plant cells) Miglustat (Zavesca, substrate reduction) Eliglustat (Cerdelga, substrate reduction) | |
| Fabry Disease | α-galactosidase A | Agalsidase beta (Fabrazyme, enzyme preparation, produced in CHO cells) Agalsidase alfa (Replagal, enzyme preparation, produced in human cells) Migalastat (Galafold, Chaperone) | |
| MPS IH-S MPS IS | α-L-iduronidase | Laronidase (Aldulrazyme, enzyme preparation, produced in CHO cells) HIRMAb fusion protein | |
| MPS II | α-L-iduronate sulphatase | Idursulfase (Elaprase, enzyme preparation, produced in human cells, for intravenous application) Idursulfase for intrathecal application) HIRMAb fusion protein | |
| MPS IIIA | | Sulfamidase for intrathecal application Gene therapy | |
| MPS IIIB | N-acetylglucosaminidase (NAGLU) | Insulin growth factor II fusion protein for intravenous application Gene Therapy | |
| MPS IVA | | Elosulfase (Vimizim, enzyme preparation, produced in CHO cells) | |
| MPS VI | N-acetylgalactosamine-4-sulphatase | Galsulfase (Naglazyme, enzyme preparation, produced in CHO cells) | |
| MPS VII | | Recombinant enzyme preparation | |
| Pompe Disease | acid α-glucosidase | Alglucosidas alfa (Myozyme, enzyme preparation, produced in CHO cells) Alglucosidas alfa (Lumizyme, enzyme preparation, produced in CHO cells) Enzyme plus chaperone | |
| Metachromatic leukodystrophy | | Enzyme preparation, intrathecal application Gene therapy | |
| Lysosomal acid lipase deficiency (Wolman disease/cholesteryl ester storage disease) | | Sebelipase (Kanuma, enzyme preparation, produced in egg white from genetically modified chicken) | |
| Neuronal ceroid lipofuscinosis type 2 | | Cerliponase (Brineura, enzyme preparation for intrathecal application) | |
| Niemann-Pick disease type B | | Recombinant enzyme | |
| Niemann-Pick disease type C | | Miglustat (Zavesca, substrate reduction) Heat shock protein 70 | |
| α-Mannosidosis | | Recombinant enzyme | |
| Farber disease | | Recombinant enzyme | |

Because these and other therapies for LSD have already been found to be effective in homozygous subjects, it would be expected that they would also be effective in heterozygous subjects.

Substrate Reduction Therapy (SRT)

In a metabolic or genetic pathway, enzymes catalyze a series of reactions. Each enzyme is regulated or mediated by a gene through its RNA and protein products. At each phase in the pathway, enzyme activity catalyzes a reaction in which a precursor molecule (the substrate) is transformed into its next intermediate state. Failure of the metabolic pathway leads to accumulation of the substrate, with possible harmful effects. Substrate reduction therapy addresses this failure by reducing the level of the substrate to a point where residual degradative activity is sufficient to prevent substrate accumulation.

The rationale behind substrate reduction therapy is the reduction of the formation of the lysosomal substance down to a rate at which the residual enzyme activity can catabolize stored and incoming lysosomal substance. Examples of SRT can include Miglustat (Zavesca) or Eliglustat (Cerdelga).

Haematopoietic Stem Cell Transplantation (HSCT)

In HSCT, stem cells from bone marrow or umbilical cord blood from healthy donors are transplanted. Evidence shows that its efficacy relies not only on the migration of donor cells into bone marrow and reconstitution of the blood lineage, but to the subsequent migration of engrafted cells into many disease target organs, including the brain, where they replace the resident enzyme-deficient population; thus becoming a local and steady source of the functional enzyme. This is further enhanced by a process commonly referred to as 'cross-correction'. Cross-correction is a process whereby lysosomal enzymes can be secreted from one cell (in this case the donor hematopoietic cells) and taken up by adjacent cells (of hematopoietic or non-hematopoietc origin) through a receptor-mediated process. In many cases, sufficient enzyme is shared as to completely correct the biochemical defects associated with homozygous complete or nearly complete loss-of-function mutations. When successful, HSCT may prolong the patient's life, preserve neurocognition and enhance somatic changes. Drawbacks of the HSCT include the significant risks associated with this procedure, such as the possibility of developing graft-versus-host disease, the difficulty of finding HLA-compatible donors and development of chimerism. As such, its use in many countries has been deferred in favor of ERT whenever it is available.

Enzyme Replacement Therapy (ERT)

In ERT, the deficient recombinant enzyme is administered to the patient by means of repeated intravenous injections. In this case the recombinant enzyme is taken by cells through the same receptor-mediated process involved in 'cross-correction'. Despite being an effective and safe treatment option for various LSDs, ERT also has important limitations. Among them are the adverse reactions presented by some patients, the high cost of treatment, the life-long dependence on weekly 4-5-h-long infusions and the limited ability to correct neurological and skeletal pathology.

Gene Therapy and Genome Editing

Gene therapies can include inserting a functional gene with a viral vector. Gene therapies for lysosomal storage diseases (LSD) are rapidly advancing. Most LSDs are characterized by brain involvement, prompting the development of therapies targeting the brain. There are two types of gene therapy for brain involvement in LSD, i.e., the direct transfer of a therapeutic gene into brain cells and ex vivo hematopoietic stem cell-targeted gene therapy. The rationale for the latter approach is that brain microglia are derived from hematopoietic cells. Thus, gene-corrected hematopoietic cells migrate into the brain and differentiate into microglial cells. These gene-corrected microglial cells cross-correct the metabolic defects associated with LSD and reduce inflammation in LSD, leading to a clinical benefit. Gene editing technology has also been applied in this area and trials focused on LSDs are currently ongoing (see e.g., de Carvalho et al. 2015 Genome Editing: Potential Treatment for Lysosomal Storage Diseases Current Stem Cell Reports 1(1) 9-15). Although these approaches are still under investigation, very encouraging results have been obtained. Currently, there are several approved gene therapies on the market including those for LPL deficiency: AAV/LPL (Glyvera); ADA deficiency: Retrovirus/ADA (Strimvelis); and Leber's congenital amaurosis: AAV/RPE65 (Luxturna).

There has recently been an improved landscape for gene therapies. For example, in the first quarter of 2019, there were 372 ongoing gene therapy clinical trials (*Alliance for Regenerative Medicine*, 5/9/19).

Any vector known in the art can be used. For example, the vector can be a viral vector selected from retrovirus, lentivirus, herpes, adenovirus, adeno-associated virus (AAV), rabies, Ebola, lentivirus, or hybrids thereof.

TABLE 3

Gene therapy strategies.

| Strategy | | Associated experimental models |
|---|---|---|
| Viral Vectors | | |
| Retroviruses | Retroviruses are RNA viruses transcribing their single-stranded genome into a double-stranded DNA copy, which can integrate into host chromosome | Murine model of MPS VII Canine model of MPS VII |
| Adenoviruses (Ad) | Ad can transfect a variety of quiescent and proliferating cell types from various species and can mediate robust gene expression | Murine model of Pompe, Fabry, Walman diseases, aspartylglucosaminuria and MPS VII |
| Adeno-associated Viruses (AAV) | Recombinant AAV vectors contain no viral DNA and can carry ~4.7 kb of foreign | Murine models of Pompe, Fabry diseases, Aspartylglucosaminuria, Krabbe |

TABLE 3-continued

Gene therapy strategies.

| | Strategy | Associated experimental models |
|---|---|---|
| | transgenic material. They are replication defective and can replicate only while coinfecting with a helper virus | disease, Metachromatic leukodystrophy, MPS I, MPSII, MPSIIIA, MPSIIIB, MPSIV, MPSVI, MPS VII, CLN1, CLN2, CLN3, CLN5, CLN6 |
| | Non-viral vectors | |
| plasmid DNA (pDNA) | pDNA has many desired characteristics as a gene therapy vector; there are no limits on the size or genetic constitution of DNA, it is relatively inexpensive to supply, and unlike viruses, antibodies are not generated against DNA in normal individuals | Mouse model of Fabry disease |
| RNAi | RNAi is a powerful tool for gene specific silencing that could be useful as an enzyme reduction therapy or means to promote read-through of a premature stop codon | Transgenic mouse strain Mouse models of acute liver failure Mice with hepatitis B virus Fabry mouse |

Gene therapy can allow for the constant delivery of the enzyme directly to target organs and eliminates the need for weekly infusions. Also, correction of a few cells could lead to the enzyme being secreted into the circulation and taken up by their neighboring cells (cross-correction), resulting in widespread correction of the biochemical defects. As such, the number of cells that must be modified with a gene transfer vector is relatively low. Moreover, precise transcriptional regulation is probably not necessary as over-expression of lysosomal enzymes does not appear to be detrimental and as little as 5-10% normal levels of enzyme can be therapeutic for several LSD.

Genetic modification can be performed either ex vivo or in vivo. The ex vivo strategy is based on modification of cells in culture and transplantation of the modified cell into patient. Cells that are most commonly considered therapeutic targets for monogenic diseases are stem cells. Advances in collection and isolation of these cells from a variety of sources have promoted autologous gene therapy as a viable option for LSD. In mouse models of LSDs, genetically modified neural stem cells encoding for enzyme genes effectively decreased lysosomal storage, reduced pathology, and extended life span of animals. Mesenchymal stem cells and inducible pluripotent stem cells (iPSC) are also being used with this purpose. However, conventional gene therapy protocols can have limitations; among them are safety issues related to immune response and the possibility of insertional mutagenesis in the case of viral vectors, and low efficiency with non-viral vectors.

The use of endonucleases for targeted genome editing can solve the limitations presented by the usual gene therapy protocols. These enzymes are custom molecular scissors, allowing cutting DNA into well-defined, perfectly specified pieces, in virtually all cell types. Moreover, they can be delivered to the cells by plasmids that transiently express the nucleases, or by transcribed RNA, avoiding the use of viruses.

Combination Therapy

Combinations of therapeutic approaches have shown to be effective in LSDs. For example, the inventors have previously showed that a combination of gene therapy, HST transplantation, and small molecule substrate reduction was the most effective at treating Krabbe disease. As such, similar combination approaches would also be expected to be most effective for subjects having lysosomal dysfunction-associated neurological diseases, such as AD or PD. But, as previously disclosed herein, it is expected that heterozygous populations will be easier to treat and have a lower threshold for therapeutic efficacy because the dysfunction associated with the heterozygous population is expected to be much less than heterozygous LSD populations.

As another example, gene therapy can be combined with HSCT. Hematopoietic stem cells extracted from a patient can be transfected with vectors encoding endonucleases designed to cleave at sites near the specific mutation and with a donor vector. The donor vector contains a region homologous to the mutated region, however, with the correct nucleotide sequence, and would serve as a template for repair of DNA damage after the double-strand break. Then, the cells which internalize the two vectors, in which the cleavage and homologous recombination occur, would have the correct gene sequence, and can be selected and implanted back into the patient. Combining autologous HSCT with nuclease-mediated genome editing would have the advantages of lower risk of infection during the patient's treatment, since the recovery of the immune function is rapid. Also, it would avoid the development of rejection (graft-versus-host disease), because the donor and the recipient are the same individual. Corrected hematopoietic stem cells (HSC) treatment can include the steps of hematopoietic stem cells extracted from a patient can be transfected with vectors encoding the tailored endonuclease and with a donor vector to guide the homologous recombination. Then, the corrected cells may be selected ex vivo and implanted back into the patient.

Personalized/Precision Medicine

The discovery that heterozygosity for lysosomal gene defects leads to altered APP processing and increased Aβ plaque deposition allows for a personalized therapeutic approach. Methods to detect the complete or nearly complete loss-of-function variants in lysosomal-associated genes can be used as a basis to treat them based on that information (see e.g., TABLE 1, TABLE 2, and TABLE 3).

It is now possible for subjects at risk for neurological diseases associated with lysosome dysfunction to be identified and treated based on the detected lysosomal gene variant. The treatments for the lysosomal gene defects and LSDs are well known and have been shown to be effective in rescuing the effects of the neurological diseases associated with lysosomal dysfunction (e.g., AD).

Along with the evidence provided herein, treatments for LSDs currently used in homozygous children with LSDs are expected to work in the carriers (heterozygous) at risk because both involve the autophagy-lysosome pathway and the threshold for efficacy can be much lower for heterozygous subjects.

Autophagy-Lysosomal Pathway (ALP)

Described herein are methods for modulating the autophagy-lysosomal pathway (ALP) for the treatment of neurological or neurodegenerative diseases, disorders, and conditions.

The autophagy-lysosomal pathway (ALP) is a major pathway for the degradation of intracellular organelles and aggregate-prone proteins. Autophagy ('self-eating'), is an intracellular degradation pathway responsible for the digestion and recycling of nutrients via the lysosome. There is growing evidence that lysosome dysfunction can play a role in several neurodegenerative diseases, most notably Alzheimer's disease (AD) and Parkinson's disease (PD). Lysosomal gene loss-of-function variants may also be associated with the cases of dementia of unknown etiology.

As described herein, in the human genome there are at least 430 genes associated with the ALP (38 autophagy genes, 161 autophagy regulator genes, 64 lysosomal genes and 167 lysosome regulator genes). Individuals carrying heterozygous deleterious variants in autophagy-lysosomal pathway-associated genes are at risk of developing common adult-onset neurological diseases (e.g., Alzheimer's disease, Parkinson's disease, Frontotemporal dementia, etc.). Further, supplementation of exogenous lysosomal protein by enzyme replacement therapy (ERT), gene therapy (GT), stem cell therapy, etc. can slow the progression of these diseases.

As described herein, by identifying specific defects in ALP genes in PD and AD, multiple therapeutic strategies can be taken advantage of, including gene therapy, enzyme replacement, oral small molecule substrate reduction therapy, small molecule chaperones and pharmacological remediation of autophagy pathways for the potential treatment of PD and AD, as well as other neurological and neurodegenerative diseases and disorders. As described herein, the expression of genes associated with the ALP can be modulated for the treatment of neurological or neurodegenerative diseases or disorders. The protein product from genes associated with ALP can also be supplemented with enzyme replacement therapy (ERT).

LSD-associated genes can include, but are not limited to: AGA, ARSA, ARSB, ASAH1, CLN2 (TPP1), CLN3, CLN5, CLN6, CLN8, CTNS, CTSA, CTSD, CTSK, FUCA1, GAA, GALC, GALNS, GLA, GLB1, GM2A, GNPTAB, GNPTG, GNS, GUSB, HEXA, HEXB, HGSNAT, HYAL1, IDS, IDUA, KCTD7, LAMP2, LIPA, MAN2B1, MANBA, MCOLN1, MFSD8, NAGA, NAGLU, NEU1, NPC1, NPC2, PPT1, PSAP, SGSH, SLC17A5, SMPD1, SUMF1, CHIT1, ATP13A2, CTSF, DNAJC5, or GRN. For example, LSD-associated genes correlated with adult-onset neurodegenerative diseases can be, but are not limited to: ASAH1, CLN3, CLN8, CSTD, CTNS, CTSA CTSF, DNAJC5, GAA, GALC, GALNS, GBA, GLA, GLB1, GNPTAB, GNS, GRN, HEXB, HGSNAT, IDS, IDUA, MAN2B1, MANBA, MFSD8, NAGLU, NEU1, NPC1, NPC2, PLD3, PPT1, SGSH, SMPD1, SORL1, and TPP1.

Genes associated with the ALP can include, but are not limited to: ABCA2, ABCA3, ABCA5, ABCB9, ABCC10, ACP2, ACP5, ACPP, ADA, ADAMS, ADRB2, AGA, AHNAK, ALDOB, ANKFY1, ANKRD27, ANPEP, ANXA11, AP1B1, AP1G1, AP1M1, AP1M2, AP1S1, AP1S2, AP1S3, AP3B1, AP3B2, AP3D1, AP3M1, AP3M2, AP3S1, AP3S2, AP4B1, AP4E1, AP4M1, AP4S1, AQP2, ARF1, ARL8A, ARL8B, ARRB1, ARSA, ARSB, ARSD, ARSG, ASAH1, ASS1, ATP11A, ATP11C, ATP13A2, ATP6AP1, ATP6V0A1, ATP6V0A2, ATP6V0A4, ATP6V0B, ATP6V0C, ATP6V0D1, ATP6V0D2, ATP6V1A, ATP6V1B1, ATP6V1B2, ATP6V1C1, ATP6V1C2, ATP6V1D, ATP6V1E1, ATP6V1F, ATP6V1G1, ATP6V1H, AZU1, BCL10, BLOC1S1, BTD, C18orf8, C19orf28, C1orf85, C2orf18, C7orf28B, CAT, CCDC115, CCKAR, CCZ1, CD164, CD1B, CD1D, CD1E, CD63, CD68, CD74, CECR1, CHID1, CHIT1, CLCN5, CLCN6, CLCN7, CLN3, CLN5, CLTA, CLTB, CLTC, CLTCL1, CLU, COL6A1, CP, CPVL, CREG1, CST3, CST7, CTBS, CTNS, CTSA, CTSB, CTSC, CTSD, CTSE, CTSF, CTSG, CTSH, CTSK, CTSL1, CTSL2, CTSO, CTSS, CTSW, CTSZ, CUBN, CXCR2, CYBASC3, DAGLB, DEPDC5, DKFZp761E198, DNAJC13, DNAJC5, DNAJC6, DNASE1, DNASE2, DNASE2B, DNM2, DOC2A, DPP4, DPP7, DRAM1, DRAM2, ECE1, EGF, ELANE, ENPEP, ENPP1, ENTPD4, EPDR1, FAM176A, FGFR3, FLOT1, FLOT2, FNBP1, FUCA1, FUCA2, GAA, GABARAP, GALC, GALNS, GBA, GC, GDAP2, GGA1, GGA2, GGA3, GGH, GJA1, GLA, GLB1, GM2A, GNA11, GNAI1, GNAI2, GNAI3, GNAQ, GNB1, GNB2, GNB4, GNPTAB, GNPTG, GNS, GOT1, GPC3, GPLD1, GPR137, GPR137B, GPR143, GRN, GUSB, HEXA, HEXB, HGSNAT, HLA-DMA, HLA-DMB, HLA-DOA, HLA-DOB, HLA-DPA1, HLA-DPB1, HLA-DQA1, HLA-DQA2, HLA-DQB1, HLA-DQB2, HLA-DRA, HLA-DRB1, HLA-DRB3, HLA-DRB4, HLA-DRB5, HPS1, HPS4, HPSE, HSPA8, HYAL1, HYAL2, HYAL3, IDS, IDUA, IFI30, IGF2R, IL411, ITM2C, KCNE1, KCNE2, K1AA0226, K1AA0415, KIAA1609, LAMP1, LAMP2, LAMP3, LAMTOR1, LAMTOR2, LAPTM4A, LAPTM4B, LAPTM5, LDLR, LGMN, LHCGR, LIPA, LITAF, LMBRD1, LNPEP, LOC653653, LRBA, LRP1, LRP2, M6PR, MAN2B1, MAN2B2, MANBA, 1-Mar, 2-Mar, 3-Mar, 8-Mar, 9-Mar, MCOLN1, MCOLN2, MCOLN3, MFSD1, MFSD8, MIOS, MMD, MON1B, MPO, MTOR, MYLPF, MYO7A, NAAA, NAGA, NAGLU, NAGPA, NAPA, NAPG, NAPSA, NBR1, NCSTN, NEU1, NEU4, NPC1, NPC2, NPPA, NSF, OCA2, OSTM1, P2RX4, P2RY2, PCSK9, PCYOX1, PEBP4, PGCP, P14K2A, PLA2G15, PLA2G4E, PLA2G4F, PLBD1, PLBD2, PLD1, PLD3, PLEKHF1, PLOD1, PNPLA7, PON2, PPT1, PPT2, PRCP, PRDX6, PRF1, PRTN3, PSAP, PSAPL1, PSEN1, PSEN2, PTGDS, RAB14, RAB27A, RAB2A, RAB5C, RAB7A, RAB7B, RAB9A, RAMP2, RAMP3, RDH14, RILP, RNASE1, RNASE2, RNASE6, RNASET2, RNF13, RNF152, RPTOR, RRAGA, RRAGB, RRAGC, RRAGD, SCARB1, SCARB2, SCPEP1, SELRC1, SERINC2, SFTPB, SFTPD, SGSH, SH3GL2, SIAE, SIDT2, SLC11A1, SLC11A2, SLC12A4, SLC15A3, SLC15A4, SLC17A5, SLC26A11, SLC29A3, SLC2A13, SLC2A8, SLC30A2, SLC36A1, SLC37A3, SLC44A2, SLC48A1, SMCR8, SMPD1, SMPD4, SMPDL3A, SNAP23, SNX16, SORT1, SPACA3, SPG11, SPHK2, SPNS1, SPPL2A, SRGN, STARD3, STARD3NL, STS, STX3, STX7, STXBP2, SUMF1, TCIRG1, TIAL1, TLR3, TLR7, TLR9, TM9SF1, TMBIM1, TMEM127, TMEM175, TMEM192, TMEM55A, TMEM55B, TMEM63A, TMEM74, TMEM8A, TMEM9, TMEM92, TMEM97, TOM1L1, TPCN1, TPCN2, TPP1, TRIM23, TRIP10, TSPAN1, TSPAN8, TXNDC5, TYR, UBA52, UNC13D, UNC93B1, USP4, USP5, USP6, UVRAG, VAMP4, VAMP7, VASN, VMA21, VPS11, VPS16, VPS18, VPS33A, VPS33B, VPS35, VPS36, VPS39, VPS41, VPS4B, WDR11, WDR41, WDR48, ZFYVE26, ZNRF1, or ZNRF2.

Molecular Engineering

The following definitions and methods are provided to better define the present invention and to guide those of ordinary skill in the art in the practice of the present invention. Unless otherwise noted, terms are to be understood according to conventional usage by those of ordinary skill in the relevant art.

The terms "heterologous DNA sequence", "exogenous DNA segment" or "heterologous nucleic acid," as used herein, each refer to a sequence that originates from a source foreign to the particular host cell or, if from the same source, is modified from its original form. Thus, a heterologous gene in a host cell includes a gene that is endogenous to the particular host cell but has been modified through, for example, the use of DNA shuffling. The terms also include non-naturally occurring multiple copies of a naturally occurring DNA sequence. Thus, the terms refer to a DNA segment that is foreign or heterologous to the cell, or homologous to the cell but in a position within the host cell nucleic acid in which the element is not ordinarily found. Exogenous DNA segments are expressed to yield exogenous polypeptides. A "homologous" DNA sequence is a DNA sequence that is naturally associated with a host cell into which it is introduced.

Expression vector, expression construct, plasmid, or recombinant DNA construct is generally understood to refer to a nucleic acid that has been generated via human intervention, including by recombinant means or direct chemical synthesis, with a series of specified nucleic acid elements that permit transcription or translation of a particular nucleic acid in, for example, a host cell. The expression vector can be part of a plasmid, virus, or nucleic acid fragment. Typically, the expression vector can include a nucleic acid to be transcribed operably linked to a promoter.

A "promoter" is generally understood as a nucleic acid control sequence that directs transcription of a nucleic acid. An inducible promoter is generally understood as a promoter that mediates transcription of an operably linked gene in response to a particular stimulus. A promoter can include necessary nucleic acid sequences near the start site of transcription, such as, in the case of a polymerase II type promoter, a TATA element. A promoter can optionally include distal enhancer or repressor elements, which can be located as much as several thousand base pairs from the start site of transcription.

A "transcribable nucleic acid molecule" as used herein refers to any nucleic acid molecule capable of being transcribed into a RNA molecule. Methods are known for introducing constructs into a cell in such a manner that the transcribable nucleic acid molecule is transcribed into a functional mRNA molecule that is translated and therefore expressed as a protein product. Constructs may also be constructed to be capable of expressing antisense RNA molecules, in order to inhibit translation of a specific RNA molecule of interest. For the practice of the present disclosure, conventional compositions and methods for preparing and using constructs and host cells are well known to one skilled in the art (see e.g., Sambrook and Russel (2006) Condensed Protocols from Molecular Cloning: A Laboratory Manual, Cold Spring Harbor Laboratory Press, ISBN-10: 0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754).

The "transcription start site" or "initiation site" is the position surrounding the first nucleotide that is part of the transcribed sequence, which is also defined as position +1. With respect to this site all other sequences of the gene and its controlling regions can be numbered. Downstream sequences (i.e., further protein encoding sequences in the 3' direction) can be denominated positive, while upstream sequences (mostly of the controlling regions in the 5' direction) are denominated negative.

"Operably-linked" or "functionally linked" refers preferably to the association of nucleic acid sequences on a single nucleic acid fragment so that the function of one is affected by the other. For example, a regulatory DNA sequence is said to be "operably linked to" or "associated with" a DNA sequence that codes for an RNA or a polypeptide if the two sequences are situated such that the regulatory DNA sequence affects expression of the coding DNA sequence (i.e., that the coding sequence or functional RNA is under the transcriptional control of the promoter). Coding sequences can be operably-linked to regulatory sequences in sense or antisense orientation. The two nucleic acid molecules may be part of a single contiguous nucleic acid molecule and may be adjacent. For example, a promoter is operably linked to a gene of interest if the promoter regulates or mediates transcription of the gene of interest in a cell.

A "construct" is generally understood as any recombinant nucleic acid molecule such as a plasmid, cosmid, virus, autonomously replicating nucleic acid molecule, phage, or linear or circular single-stranded or double-stranded DNA or RNA nucleic acid molecule, derived from any source, capable of genomic integration or autonomous replication, comprising a nucleic acid molecule where one or more nucleic acid molecule has been operably linked.

A construct of the present disclosure can contain a promoter operably linked to a transcribable nucleic acid molecule operably linked to a 3' transcription termination nucleic acid molecule. In addition, constructs can include but are not limited to additional regulatory nucleic acid molecules from, e.g., the 3'-untranslated region (3' UTR). Constructs can include but are not limited to the 5' untranslated regions (5' UTR) of an mRNA nucleic acid molecule which can play an important role in translation initiation and can also be a genetic component in an expression construct. These additional upstream and downstream regulatory nucleic acid molecules may be derived from a source that is native or heterologous with respect to the other elements present on the promoter construct.

The term "transformation" refers to the transfer of a nucleic acid fragment into the genome of a host cell, resulting in genetically stable inheritance. Host cells containing the transformed nucleic acid fragments are referred to as "transgenic" cells, and organisms comprising transgenic cells are referred to as "transgenic organisms".

"Transformed," "transgenic," and "recombinant" refer to a host cell or organism such as a bacterium, cyanobacterium, animal or a plant into which a heterologous nucleic acid molecule has been introduced. The nucleic acid molecule can be stably integrated into the genome as generally known in the art and disclosed (Sambrook 1989; Innis 1995; Gelfand 1995; Innis & Gelfand 1999). Known methods of PCR include, but are not limited to, methods using paired primers, nested primers, single specific primers, degenerate primers, gene-specific primers, vector-specific primers, partially mismatched primers, and the like. The term "untransformed" refers to normal cells that have not been through the transformation process.

"Wild-type" refers to a virus or organism found in nature without any known mutation.

Design, generation, and testing of the variant nucleotides, and their encoded polypeptides, having the above required percent identities and retaining a required activity of the expressed protein is within the skill of the art. For example, directed evolution and rapid isolation of mutants can be according to methods described in references including, but not limited to, Link et al. (2007) Nature Reviews 5(9), 680-688; Sanger et al. (1991) Gene 97(1), 119-123; Ghadessy et al. (2001) Proc Natl Acad Sci USA 98(8) 4552-4557. Thus, one skilled in the art could generate a large number of nucleotide and/or polypeptide variants having, for example, at least 95-99% identity to the reference sequence described herein and screen such for desired phenotypes according to methods routine in the art.

Nucleotide and/or amino acid sequence identity percent (%) is understood as the percentage of nucleotide or amino acid residues that are identical with nucleotide or amino acid residues in a candidate sequence in comparison to a reference sequence when the two sequences are aligned. To determine percent identity, sequences are aligned and if necessary, gaps are introduced to achieve the maximum percent sequence identity. Sequence alignment procedures to determine percent identity are well known to those of skill in the art. Often publicly available computer software such as BLAST, BLAST2, ALIGN2 or Megalign (DNASTAR) software is used to align sequences. Those skilled in the art can determine appropriate parameters for measuring alignment, including any algorithms needed to achieve maximal alignment over the full-length of the sequences being compared. When sequences are aligned, the percent sequence identity of a given sequence A to, with, or against a given sequence B (which can alternatively be phrased as a given sequence A that has or comprises a certain percent sequence identity to, with, or against a given sequence B) can be calculated as: percent sequence identity=X/Y100, where X is the number of residues scored as identical matches by the sequence alignment program's or algorithm's alignment of A and B and Y is the total number of residues in B. If the length of sequence A is not equal to the length of sequence B, the percent sequence identity of A to B will not equal the percent sequence identity of B to A.

Generally, conservative substitutions can be made at any position so long as the required activity is retained. So-called conservative exchanges can be carried out in which the amino acid which is replaced has a similar property as the original amino acid, for example the exchange of Glu by Asp, Gln by Asn, Val by Ile, Leu by Ile, and Ser by Thr. For example, amino acids with similar properties can be Aliphatic amino acids (e.g., Glycine, Alanine, Valine, Leucine, Isoleucine), Hydroxyl or sulfur/selenium-containing amino acids (e.g., Serine, Cysteine, Selenocysteine, Threonine, Methionine); Cyclic amino acids (e.g., Proline); Aromatic amino acids (e.g., Phenylalanine, Tyrosine, Tryptophan); Basic amino acids (e.g., Histidine, Lysine, Arginine); or Acidic and their Amide (e.g., Aspartate, Glutamate, Asparagine, Glutamine). Deletion is the replacement of an amino acid by a direct bond. Positions for deletions include the termini of a polypeptide and linkages between individual protein domains. Insertions are introductions of amino acids into the polypeptide chain, a direct bond formally being replaced by one or more amino acids. Amino acid sequence can be modulated with the help of art-known computer simulation programs that can produce a polypeptide with, for example, improved activity or altered regulation. On the basis of this artificially generated polypeptide sequences, a corresponding nucleic acid molecule coding for such a modulated polypeptide can be synthesized in-vitro using the specific codon-usage of the desired host cell.

"Highly stringent hybridization conditions" are defined as hybridization at 65° C. in a 6×SSC buffer (i.e., 0.9 M sodium chloride and 0.09 M sodium citrate). Given these conditions, a determination can be made as to whether a given set of sequences will hybridize by calculating the melting temperature ($T_m$) of a DNA duplex between the two sequences. If a particular duplex has a melting temperature lower than 65° C. in the salt conditions of a 6×SSC, then the two sequences will not hybridize. On the other hand, if the melting temperature is above 65° C. in the same salt conditions, then the sequences will hybridize. In general, the melting temperature for any hybridized DNA:DNA sequence can be determined using the following formula: $T_m$=81.5° C.+16.6($\log_{10}$[Na$^+$])+0.41(fraction G/C content)−0.63(% formamide)−(600/l). Furthermore, the $T_m$ of a DNA:DNA hybrid is decreased by 1-1.5° C. for every 1% decrease in nucleotide identity (see e.g., Sambrook and Russel, 2006).

Host cells can be transformed using a variety of standard techniques known to the art (see, e.g., Sambrook and Russel (2006) Condensed Protocols from Molecular Cloning: A Laboratory Manual, Cold Spring Harbor Laboratory Press, ISBN-10: 0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754). Such techniques include, but are not limited to, viral infection, calcium phosphate transfection, liposome-mediated transfection, microprojectile-mediated delivery, receptor-mediated uptake, cell fusion, electroporation, and the like. The transfected cells can be selected and propagated to provide recombinant host cells that comprise the expression vector stably integrated in the host cell genome.

| Conservative Substitutions I | |
|---|---|
| Side Chain Characteristic | Amino Acid |
| Aliphatic Non-polar | G A P I L V |
| Polar-uncharged | C S T M N Q |
| Polar-charged | D E K R |
| Aromatic | H F W Y |
| Other | N Q D E |

| Conservative Substitutions II | |
|---|---|
| Side Chain Characteristic | Amino Acid |
| Non-polar (hydrophobic) | |
| A. Aliphatic: | A L I V P |
| B. Aromatic: | F W |
| C. Sulfur-containing: | M |
| D. Borderline: | G |
| Uncharged-polar | |
| A. Hydroxyl: | S T Y |
| B. Amides: | N Q |
| C. Sulfhydryl: | C |
| D. Borderline: | G |
| Positively Charged (Basic): | K R H |
| Negatively Charged (Acidic): | D E |

| Conservative Substitutions III | |
|---|---|
| Original Residue | Exemplary Substitution |
| Ala (A) | Val, Leu, Ile |
| Arg (R) | Lys, Gln, Asn |
| Asn (N) | Gln, His, Lys, Arg |
| Asp (D) | Glu |
| Cys (C) | Ser |
| Gln (Q) | Asn |
| Glu (E) | Asp |
| His (H) | Asn, Gln, Lys, Arg |
| Ile (I) | Leu, Val, Met, Ala, Phe, |
| Leu (L) | Ile, Val, Met, Ala, Phe |
| Lys (K) | Arg, Gln, Asn |
| Met(M) | Leu, Phe, Ile |
| Phe (F) | Leu, Val, Ile, Ala |
| Pro (P) | Gly |
| Ser (S) | Thr |
| Thr (T) | Ser |
| Trp(W) | Tyr, Phe |
| Tyr (Y) | Trp, Phe, Tur, Ser |
| Val (V) | Ile, Leu, Met, Phe, Ala |

Exemplary nucleic acids which may be introduced to a host cell include, for example, DNA sequences or genes from another species, or even genes or sequences which originate with or are present in the same species, but are incorporated into recipient cells by genetic engineering methods. The term "exogenous" is also intended to refer to genes that are not normally present in the cell being transformed, or perhaps simply not present in the form, structure, etc., as found in the transforming DNA segment or gene, or genes which are normally present and that one desires to express in a manner that differs from the natural expression pattern, e.g., to over-express. Thus, the term "exogenous" gene or DNA is intended to refer to any gene or DNA segment that is introduced into a recipient cell, regardless of whether a similar gene may already be present in such a cell. The type of DNA included in the exogenous DNA can include DNA which is already present in the cell, DNA from another individual of the same type of organism, DNA from a different organism, or a DNA generated externally, such as a DNA sequence containing an antisense message of a gene, or a DNA sequence encoding a synthetic or modified version of a gene.

Host strains developed according to the approaches described herein can be evaluated by a number of means known in the art (see e.g., Studier (2005) Protein Expr Purif. 41(1), 207-234; Gellissen, ed. (2005) Production of Recombinant Proteins: Novel Microbial and Eukaryotic Expression Systems, Wiley-VCH, ISBN-10: 3527310363; Baneyx (2004) Protein Expression Technologies, Taylor & Francis, ISBN-10: 0954523253).

Methods of down-regulation or silencing genes are known in the art. For example, expressed protein activity can be down-regulated or eliminated using antisense oligonucleotides, protein aptamers, nucleotide aptamers, and RNA interference (RNAi) (e.g., small interfering RNAs (siRNA), short hairpin RNA (shRNA), and micro RNAs (miRNA) (see e.g., Fanning and Symonds (2006) Handb Exp Pharmacol. 173, 289-303G, describing hammerhead ribozymes and small hairpin RNA; Helene, C., et al. (1992) Ann. N.Y. Acad. Sci. 660, 27-36; Maher (1992) Bioassays 14(12): 807-15, describing targeting deoxyribonucleotide sequences; Lee et al. (2006) Curr Opin Chem Biol. 10, 1-8, describing aptamers; Reynolds et al. (2004) Nature Biotechnology 22(3), 326-330, describing RNAi; Pushparaj and Melendez (2006) Clinical and Experimental Pharmacology and Physiology 33(5-6), 504-510, describing RNAi; Dillon et al. (2005) Annual Review of Physiology 67, 147-173, describing RNAi; Dykxhoorn and Lieberman (2005) Annual Review of Medicine 56, 401-423, describing RNAi). RNAi molecules are commercially available from a variety of sources (e.g., Ambion, TX; Sigma Aldrich, MO; Invitrogen). Several siRNA molecule design programs using a variety of algorithms are known to the art (see e.g., Cenix algorithm, Ambion; BLOCK-iT™ RNAi Designer, Invitrogen; siRNA Whitehead Institute Design Tools, Bioinofrmatics & Research Computing). Traits influential in defining optimal siRNA sequences include G/C content at the termini of the siRNAs, Tm of specific internal domains of the siRNA, siRNA length, position of the target sequence within the CDS (coding region), and nucleotide content of the 3' overhangs.

Genome Editing

The recent progress in genome editing technology using the engineered zinc finger nucleases (ZFN), transcriptional activator-like effector nucleases (TALEN), and more recently, clustered regularly interspaced short palindromic repeat-CRISPR-associated protein 9 (CRISPR-Cas9) system have enabled the possibility of precisely modifying target sites in the genome. This technology brings hope of a cure for many genetic diseases. Here, targeted genome editing can be used or combined with hematopoietic stem cell transplantation and other approaches to be used for the treatment of subjects heterozygous for loss of function lysosomal gene variants.

As described herein, enzymatic activity can be enhanced or increased using genome editing. Processes for genome editing are well known; see e.g., Aldi 2018 Nature Communications 9(1911). Except as otherwise noted herein, therefore, the process of the present disclosure can be carried out in accordance with such processes.

For example, genome editing can comprise CRISPR/Cas9, CRISPR-Cpf1, TALEN, or ZNFs. Adequate enhancement of enzyme activity by genome editing can result in protection from LSDs.

As an example, clustered regularly interspaced short palindromic repeats (CRISPR)/CRISPR-associated (Cas) systems are a new class of genome-editing tools that target desired genomic sites in mammalian cells. Recently published type II CRISPR/Cas systems use Cas9 nuclease that is targeted to a genomic site by complexing with a synthetic guide RNA that hybridizes to a 20-nucleotide DNA sequence and immediately preceding an NGG motif recognized by Cas9 (thus, a $(N)_{20}$NGG target DNA sequence). This results in a double-strand break three nucleotides upstream of the NGG motif. The double strand break instigates either non-homologous end-joining, which is error-prone and conducive to frameshift mutations that knock out gene alleles, or homology-directed repair, which can be exploited with the use of an exogenously introduced double-strand or single-strand DNA repair template to knock in or correct a mutation in the genome. Thus, genomic editing, for example, using CRISPR/Cas systems could be useful tools for therapeutic applications for treating subjects heterozygous for loss of function lysosomal gene variants by the enhancement or increase in enzyme production or activity.

For example, the methods as described herein can comprise a method for altering a target polynucleotide sequence in a cell comprising contacting the polynucleotide sequence with a clustered regularly interspaced short palindromic repeats-associated (Cas) protein.

Formulation

The agents and compositions described herein can be formulated by any conventional manner using one or more pharmaceutically acceptable carriers or excipients as described in, for example, Remington's Pharmaceutical Sciences (A. R. Gennaro, Ed.), 21st edition, ISBN: 0781746736 (2005), incorporated herein by reference in its entirety. Such formulations will contain a therapeutically effective amount of a biologically active agent described herein, which can be in purified form, together with a suitable amount of carrier so as to provide the form for proper administration to the subject.

The term "formulation" refers to preparing a drug in a form suitable for administration to a subject, such as a human. Thus, a "formulation" can include pharmaceutically acceptable excipients, including diluents or carriers, such as capsid proteins.

The term "pharmaceutically acceptable" as used herein can describe substances or components that do not cause unacceptable losses of pharmacological activity or unacceptable adverse side effects. Examples of pharmaceutically acceptable ingredients can be those having monographs in United States Pharmacopeia (USP 29) and National Formulary (NF 24), United States Pharmacopeial Convention, Inc, Rockville, Maryland, 2005 ("USP/NF"), or a more recent edition, and the components listed in the continuously updated Inactive Ingredient Search online database of the FDA. Other useful components that are not described in the USP/NF, etc. may also be used.

The term "pharmaceutically acceptable excipient," as used herein, can include any and all solvents, dispersion media, coatings, antibacterial and antifungal agents, isotonic, or absorption delaying agents. The use of such media and agents for pharmaceutical active substances is well known in the art (see generally Remington's Pharmaceutical Sciences (A. R. Gennaro, Ed.), 21st edition, ISBN: 0781746736 (2005)). Except insofar as any conventional media or agent is incompatible with an active ingredient, its use in the therapeutic compositions is contemplated. Supplementary active ingredients can also be incorporated into the compositions.

A "stable" formulation or composition can refer to a composition having sufficient stability to allow storage at a convenient temperature, such as between about 0° C. and about 60° C., for a commercially reasonable period of time, such as at least about one day, at least about one week, at least about one month, at least about three months, at least about six months, at least about one year, or at least about two years.

The formulation should suit the mode of administration. The agents of use with the current disclosure can be formulated by known methods for administration to a subject using several routes which include, but are not limited to, intrathecal (e.g., gene therapy), intracranial (e.g., gene therapy), parenteral, pulmonary, oral, topical, intradermal, intratumoral, intranasal, inhalation (e.g., in an aerosol), implanted, intramuscular, intraperitoneal, intravenous (e.g., enzyme replacement therapy), intracerebroventricular, subcutaneous, intranasal, epidural, ophthalmic, transdermal, buccal, and rectal. The individual agents may also be administered in combination with one or more additional agents or together with other biologically active or biologically inert agents. Such biologically active or inert agents may be in fluid or mechanical communication with the agent(s) or attached to the agent(s) by ionic, covalent, Van der Waals, hydrophobic, hydrophilic or other physical forces.

Controlled-release (or sustained-release) preparations may be formulated to extend the activity of the agent(s) and reduce dosage frequency. Controlled-release preparations can also be used to effect the time of onset of action or other characteristics, such as blood levels of the agent, and consequently affect the occurrence of side effects. Controlled-release preparations may be designed to initially release an amount of an agent(s) that produces the desired therapeutic effect, and gradually and continually release other amounts of the agent to maintain the level of therapeutic effect over an extended period of time. In order to maintain a near-constant level of an agent in the body, the agent can be released from the dosage form at a rate that will replace the amount of agent being metabolized or excreted from the body. The controlled-release of an agent may be stimulated by various inducers, e.g., change in pH, change in temperature, enzymes, water, or other physiological conditions or molecules.

Agents or compositions described herein can also be used in combination with other therapeutic modalities, as described further below. Thus, in addition to the therapies described herein, one may also provide to the subject other therapies known to be efficacious for treatment of the disease, disorder, or condition.

Therapeutic Methods

Also provided is a process of treating, preventing, or reversing a neurological or neurodegenerative disease, disorder, or condition in a subject heterozygous for a loss of function gene variant associated with lysosome dysfunction having, suspected of having, or is at risk for developing a neurological disease, disorder, or condition associated with increased Aβ or APP processing dysfunction in a subject in need administration of a therapeutically effective amount of an ALP function enhancing agent (e.g., a LSD therapeutic agent), so as to substantially inhibit neurological disease, disorder, or condition, slow the progress of neurological disease, disorder, or condition, or limit the development of neurological disease, disorder, or condition.

Methods described herein are generally performed on a subject in need thereof. A subject in need of the therapeutic methods described herein can be a subject having, diagnosed with, suspected of having, or at risk for developing neurological disease, disorder, or condition. A determination of the need for treatment will typically be assessed by a history and physical exam consistent with the disease or condition at issue. Diagnosis of the various conditions treatable by the methods described herein is within the skill of the art. The subject can be an animal subject, including a mammal, such as horses, cows, dogs, cats, sheep, pigs, mice, rats, monkeys, hamsters, guinea pigs, and humans. For example, the subject can be a human subject.

Generally, a safe and effective amount of an ALP function enhancing agent is, for example, that amount that would cause the desired therapeutic effect in a subject while minimizing undesired side effects. In various embodiments, an effective amount of an ALP function enhancing agent described herein can substantially inhibit neurological disease, disorder, or condition, slow the progress of neurological disease, disorder, or condition, or limit the development of neurological disease, disorder, or condition.

According to the methods described herein, administration can be parenteral, pulmonary, oral, topical, intradermal, intramuscular, intraperitoneal, intravenous, intrathecal, intracranial, intracerebroventricular, subcutaneous, intranasal, epidural, ophthalmic, buccal, or rectal administration.

When used in the treatments described herein, a therapeutically effective amount of an ALP function enhancing agent can be employed in pure form or, where such forms exist, in pharmaceutically acceptable salt form and with or without a pharmaceutically acceptable excipient. For example, the compounds of the present disclosure can be administered, at a reasonable benefit/risk ratio applicable to any medical treatment, in a sufficient amount to substantially inhibit neurological disease, disorder, or condition, slow the progress of neurological disease, disorder, or condition, or limit the development of neurological disease, disorder, or condition.

The amount of a composition described herein that can be combined with a pharmaceutically acceptable carrier to produce a single dosage form will vary depending upon the host treated and the particular mode of administration. It will be appreciated by those skilled in the art that the unit content of agent contained in an individual dose of each dosage form need not in itself constitute a therapeutically effective amount, as the necessary therapeutically effective amount could be reached by administration of a number of individual doses.

Toxicity and therapeutic efficacy of compositions described herein can be determined by standard pharmaceutical procedures in cell cultures or experimental animals for determining the $LD_{50}$ (the dose lethal to 50% of the population) and the $ED_{50}$, (the dose therapeutically effective in 50% of the population). The dose ratio between toxic and therapeutic effects is the therapeutic index that can be expressed as the ratio $LD_{50}/ED_{50}$, where larger therapeutic indices are generally understood in the art to be optimal.

The specific therapeutically effective dose level for any particular subject will depend upon a variety of factors including the disorder being treated and the severity of the disorder; activity of the specific compound employed; the specific composition employed; the age, body weight, general health, sex and diet of the subject; the time of administration; the route of administration; the rate of excretion of the composition employed; the duration of the treatment; drugs used in combination or coincidental with the specific compound employed; and like factors well known in the medical arts (see e.g., Koda-Kimble et al. (2004) Applied Therapeutics: The Clinical Use of Drugs, Lippincott Williams & Wilkins, ISBN 0781748453; Winter (2003) Basic Clinical Pharmacokinetics, 4th ed., Lippincott Williams & Wilkins, ISBN 0781741475; Sharqel (2004) Applied Biopharmaceutics & Pharmacokinetics, McGraw-Hill/Appleton & Lange, ISBN 0071375503). For example, it is well within the skill of the art to start doses of the composition at levels lower than those required to achieve the desired therapeutic effect and to gradually increase the dosage until the desired effect is achieved. If desired, the effective daily dose may be divided into multiple doses for purposes of administration. Consequently, single dose compositions may contain such amounts or submultiples thereof to make up the daily dose. It will be understood, however, that the total daily usage of the compounds and compositions of the present disclosure will be decided by an attending physician within the scope of sound medical judgment.

Again, each of the states, diseases, disorders, and conditions, described herein, as well as others, can benefit from compositions and methods described herein. Generally, treating a state, disease, disorder, or condition includes preventing, reversing, or delaying the appearance of clinical symptoms in a mammal that may be afflicted with or predisposed to the state, disease, disorder, or condition but does not yet experience or display clinical or subclinical symptoms thereof. Treating can also include inhibiting the state, disease, disorder, or condition, e.g., arresting or reducing the development of the disease or at least one clinical or subclinical symptom thereof. Furthermore, treating can include relieving the disease, e.g., causing regression of the state, disease, disorder, or condition or at least one of its clinical or subclinical symptoms. A benefit to a subject to be treated can be either statistically significant or at least perceptible to the subject or to a physician.

Administration of an ALP function enhancing agent can occur as a single event or over a time course of treatment. For example, an ALP function enhancing agent can be administered daily, weekly, bi-weekly, or monthly. For genetic therapy, the time course of treatment will usually be at least a day to several days. Certain treatments, e.g., ERT, could extend treatment from several days to several weeks. For example, treatment could extend over one week, two weeks, or three weeks. For more chronic conditions and long-term treatment methods, treatment could extend from several weeks to several months or even a year or more.

Treatment in accord with the methods described herein can be performed prior to, concurrent with, or after conventional treatment modalities for neurological disease, disorder, or condition associated with loss of function variants in a lysosomal gene.

Administration

Agents and compositions described herein can be administered according to methods described herein in a variety of means known to the art. The agents and composition can be used therapeutically either as exogenous materials or as endogenous materials. Exogenous agents are those produced or manufactured outside of the body and administered to the body. Endogenous agents are those produced or manufactured inside the body by some type of device (biologic or other) for delivery within or to other organs in the body.

As discussed above, administration can be intracranial, intrathecal, parenteral, pulmonary, oral, topical, intradermal, intramuscular, intraperitoneal, intravenous, intracerebroventricular, subcutaneous, intranasal, epidural, ophthalmic, buccal, or rectal administration.

Agents and compositions described herein can be administered in a variety of methods well known in the arts. Administration can include, for example, methods involving oral ingestion, direct injection (e.g., systemic or stereotactic), implantation of cells engineered to secrete the factor of interest, drug-releasing biomaterials, polymer matrices, gels, permeable membranes, osmotic systems, multilayer coatings, microparticles, implantable matrix devices, mini-osmotic pumps, implantable pumps, injectable gels and hydrogels, liposomes, micelles (e.g., up to 30 µm), nanospheres (e.g., less than 1 µm), microspheres (e.g., 1-100 µm), reservoir devices, a combination of any of the above, or other suitable delivery vehicles to provide the desired release profile in varying proportions. Other methods of controlled-release delivery of agents or compositions will be known to the skilled artisan and are within the scope of the present disclosure.

Delivery systems may include, for example, an infusion pump which may be used to administer the agent or composition in a manner similar to that used for delivering insulin or chemotherapy to specific organs or tumors. Typically, using such a system, an agent or composition can be administered in combination with a biodegradable, biocompatible polymeric implant that releases the agent over a controlled period of time at a selected site. Examples of polymeric materials include polyanhydrides, polyorthoesters, polyglycolic acid, polylactic acid, polyethylene vinyl acetate, and copolymers and combinations thereof. In addition, a controlled release system can be placed in proximity of a therapeutic target, thus requiring only a fraction of a systemic dosage.

Agents can be encapsulated and administered in a variety of carrier delivery systems. Examples of carrier delivery systems include microspheres, hydrogels, polymeric implants, smart polymeric carriers, and liposomes (see generally, Uchegbu and Schatzlein, eds. (2006) Polymers in Drug Delivery, CRC, ISBN-10: 0849325331). Carrier-based systems for molecular or biomolecular agent delivery can: provide for intracellular delivery; tailor biomolecule/agent release rates; increase the proportion of biomolecule that reaches its site of action; improve the transport of the drug to its site of action; allow colocalized deposition with other agents or excipients; improve the stability of the agent in vivo; prolong the residence time of the agent at its site of action by reducing clearance; decrease the nonspecific delivery of the agent to nontarget tissues; decrease irritation caused by the agent; decrease toxicity due to high initial doses of the agent; alter the immunogenicity of the agent; decrease dosage frequency, improve taste of the product; or improve shelf life of the product.

Compositions and methods described herein utilizing molecular biology protocols can be according to a variety of standard techniques known to the art (see, e.g., Sambrook and Russel (2006) Condensed Protocols from Molecular Cloning: A Laboratory Manual, Cold Spring Harbor Laboratory Press, ISBN-10: 0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754; Studier (2005) Protein Expr Purif. 41(1), 207-234; Gellissen, ed. (2005) Production of Recombinant Proteins: Novel Microbial and Eukaryotic Expression Systems, Wiley-VCH, ISBN-10: 3527310363; Baneyx (2004) Protein Expression Technologies, Taylor & Francis, ISBN-10: 0954523253).

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Investigating the Role of NAGLU Variants on Alzheimer's Disease (AD) and Parkinson's Disease (PD) Pathology This example describes validating, in vitro and in vivo, the role of genetic variation in genes involved in the lysosomal degradation of heparan sulfate in Alzheimer's disease (AD) and Parkinson's disease (PD) pathogenesis.

There is compelling genetic and biochemical evidence suggesting that lysosome dysfunction is a common pathogenic mechanism for several adult-onset neurodegenerative diseases, such as Alzheimer's disease (AD), Parkinson's disease (PD) and Frontotemporal dementia (FTD). However, the genetic variation underlying the age-dependent and AD- and PD-associated decline in lysosome function is not well understood. In addition, a systematic and comprehensive evaluation of the contribution of genetic variation within the general population of each lysosomal gene to the risk of developing AD or PD and its role in disease pathogenesis has not been completed. To address this gap in the current knowledge, single-variant and gene-based analyses of 45 lysosomal genes was performed in case-controlled cohorts of AD and PD. As described herein, variants in several lysosomal enzyme genes that are associated with both AD and PD were discovered. These data confirm the association of GBA with PD. Of particular interest was an enrichment of AD and PD patients with rare functional variants in genes that are responsible for heparan sulfate (HS) metabolism (GNS, NAGLU, SGSH and HGSNAT). In addition, there are reduced transcript levels of NAGLU in dopaminergic neurons from the substantia nigra of PD patients.

Interestingly, NAGLU transcript levels are also significantly higher in AD cases compared to age-matched controls and exhibit a proportional age-dependent increase with the development of pathology in a mouse model of AD. Heparan sulfate proteoglycans (HSPGs) consisting of HS chains covalently attached to a specific protein core are abundant cell surface and extracellular molecules that interact with a spectrum of ligands. HSPGs regulate the oligomerization, clearance, endocytosis and trafficking of a variety of pathogenic proteins including amyloid (Aβ), apolipoprotein E (apoE), tau, and alpha-synuclein (α-Syn). Pharmacological inhibition of HSPG binding of pathogenic proteins and genetic reduction of HSPG synthesis facilitate the clearance of pathogenic proteins and reduce their aggregation. To date, it is not clear if the reduction in NAGLU activity and the resulting HSPG accumulation affects APP metabolism, Aβ plaque burden or α-Syn aggregation and spreading.

As described here, biochemical and cell-based assays can be used to fully characterize the functional impact of the selected genetic variants in NAGLU activity. The effect of mutant NAGLU on full-length APP levels, APP trafficking, Aβ generation in neurons and Aβ degradation by glial cells is examined. It can be determined whether haploinsufficiency of NAGLU accelerates the AD pathology present in a well-characterized mouse model of AD. It can be determined if binding, internalization and aggregation of α-Syn PFFs are affected in primary neurons from NAGLU-deficient and hemizygous mice stably expressing selected variants. Finally, intrastriatal inoculation of α-Syn PFFs is performed in hemizygous or knockout (KO) NAGLU mice and the formation of aggregates of pSyn, the connectivity-dependent spreading and their effect on disease progression and lifespan is quantified.

Project Narrative

The goals of this study are to validate in vitro and in vivo the role of genetic variation in genes involved in the lysosomal degradation of heparan sulfate in Alzheimer's disease (AD) and Parkinson's disease (PD) pathogenesis. The study described herein incorporates an innovative integrative framework that couples computational methods and experimental data to validate the functional effects of selected NAGLU variants both in vitro and in vivo. The experiments outlined here can uncover novel lysosomal genes associated with AD and PD and provide greater insight into the mechanism of lysosomal dysfunction in AD and PD pathogenesis.

There is compelling genetic and biochemical evidence suggesting that severe lysosome dysfunction caused by homozygous mutations in lysosomal genes is a common pathogenic mechanism for several adult-onset neurodegenerative diseases, such as Alzheimer's disease (AD), Parkinson's disease (PD) and Frontotemporal dementia (FTD). Single-variant and gene-based analyses of 45 lysosomal genes was performed in case-controlled cohorts of AD (5712 cases/5011 controls) and PD (821 cases/750 controls). Variants were identified in a number of lysosomal enzyme genes that are associated with both AD and PD. Importantly, this data confirm the association of GBA with PD. Of particular interest was an enrichment in AD and PD patients of rare heterozygous functional variants in genes that are responsible for heparan sulfate (HS) metabolism (SGSH, NAGLU, HGSNAT and GNS). There are reduced transcript levels of N-acetyl-alpha-glucosaminidase (NAGLU) in dopaminergic neurons from the substantia nigra (SN) of PD patients. An enrichment of predicted rare heterozygous functional variants in NAGLU and SGSH was found in AD patients.

Interestingly, NAGLU transcript levels are also significantly higher in AD cases compared to age-matched controls and exhibit a proportional age-dependent increase with the concurrent development of pathology in a mouse model of AD. Although analyses identified haploinsufficiency in a number of lysosomal enzyme genes as risk factors for AD and PD, the effects of altered lysosomal HS metabolism are studied and proof-of-principle experiments were performed in the well characterized homozygous NAGLU-deficient mouse. Therefore, up until now, there was no direct biological evidence that haploinsufficiency of NAGLU was associated with any neurological disease. Heparan sulfate proteoglycans (HSPGs) consisting of HS chains covalently attached to a specific protein core are abundant cell surface and extracellular molecules that interact with a spectrum of ligands. HSPGs regulate the oligomerization, clearance, endocytosis and trafficking of a variety of pathogenic proteins including amyloid (Aβ), apolipoprotein E (apoE), tau, and alpha-synuclein (α-Syn).

Pharmacological inhibition of HSPG binding of pathogenic proteins and genetic reduction of HSPG synthesis facilitate the clearance of pathogenic proteins and reduce their aggregation. Most HSPGs and bound ligands are degraded by lysosomal proteases, exoglycosidases and sulfatases. The SGSH, NAGLU, HGSNAT and GNS enzymes are involved in the stepwise breakdown of HS in the lysosome. Loss-of-function (LoF) mutations in these genes result in accumulation of partially degraded HS inside the lysosomes and cause Mucopolysaccharidosis (MPS) type III A, B, C and D. Although the role of altered lysosomal degradation of HSPGs in the pathogenesis of multiple adult-onset neurodegenerative diseases is less clear, homozygous NAGLU-deficient mice exhibit intracellular accumulation of hyperphosphorylated tau, Aβ and HSPGs in the medial entorhinal cortex. In addition, MPS IIIB patients exhibit severe SN neuronal loss and accumulation of phosphorylated α-Syn (pSyn) in neurons in the temporal cortex, hippocampus and SN. These and other data strongly implicate severe lysosomal dysfunction as a common pathogenic mechanism between AD and PD. However, as mentioned above there have been no direct biological data implicating haploinsufficiency of lysosomal proteins in adult-onset neurological diseases (with the one notable exception of glucocerebrosidase (GBA) and Parkinson's disease).

(I) Determine the Functional Effects of Rare Variants in the NAGLU Gene

In order to validate their functional effects, cells from NAGLU-deficient mice are transduced with lentiviral vectors carrying the 3 variants predicted to be the most deleterious. Their effect on enzyme activity and HSPG levels is measured.

(II) Determine the Effects of Variants in the NAGLU Gene on APP Metabolism, Aβ Generation and Aβ Degradation In Vitro and NAGLU Haploinsufficiency on AD Pathology In Vivo Primary neurons from NAGLU-deficient and hemizygous mice stably expressing validated variants (as described in section (I)) are tested for effects on APP trafficking, APP half-life, APP processing machinery and Aβ generation. Glial cells from NAGLU-deficient or hemizygous mice stably expressing selected variants are tested for Aβ uptake and degradation.

It can be determined whether NAGLU haploinsufficiency affects Aβ generation, Aβ clearance, plaque deposition, synaptic loss and neuroinflammation in the 5XFAD mouse at an early (4 months) and late stage (8 months of age). The most deleterious variant (from section (I)) is expressed in the brain of newborn hemizygous mice using AAV2/9-PHP.B pseudotyped vectors and a quantitative pathological survey is performed of the effect of NAGLU haploinsufficiency on AD-relevant phenotypes in 24-month old mice in the absence of FAD mutations.

(III) Determine the Effect of NAGLU on α-Syn Aggregation In Vitro and α-Syn Spreading In Vivo It is hypothesized that PD-associated functional variants in the NAGLU gene affect α-Syn aggregation and cell-to-cell transmission. It can be determined whether binding, internalization and aggregation of α-Syn PFFs are affected in primary neurons from NAGLU-deficient and hemizygous mice stably expressing selected variants. Finally, it can be determined whether recombinant enzyme replacement or gene therapy rescues the effects on the internalization and aggregation of α-Syn PFFs.

Intrastriatal injection of α-Syn PFFs recapitulates the accumulation of intracellular Lewy body (LB) pathology, selective loss of SN neurons, and impaired motor coordination in wild-type and transgenic mice expressing mutant A53T human α-Syn. Intrastriatal inoculation of α-Syn PFFs is performed in hemizygous or NAGLU-deficient mice injected with AAV2/9-PHP.B pseudotyped vectors expressing the most deleterious NAGLU variant at birth. The formation of aggregates of pSyn, the connectivity-dependent spreading and their effect on disease progression and lifespan is quantified.

Significance

ALP Dysfunction in AD

While familial forms of AD are pathogenically driven by increased amyloid-β (Aβ) production and subsequent aggregation of Aβ in the extracellular space (ISF, interstitial fluid) into soluble oligomers or insoluble Aβ plaques, recent studies in late-onset sporadic AD patients demonstrate impaired clearance of Aβ1. Thus, the balance between production and clearance determines Aβ levels and the propensity to develop Aβ plaques. The autophagy-lysosomal pathway (ALP) is a major pathway for the degradation of intracellular organelles and aggregate-prone proteins. Autophagy ('self-eating'), is an intracellular degradation pathway responsible for the digestion and recycling of nutrients via the lysosome. The ALP "core" genes are transcriptionally downregulated during normal aging in the human brain. In contrast, there is transcriptional up-regulation of the ALP in the brains of AD patients. In sporadic AD brains, there is a reduction in levels of beclin 1 (a multifunctional protein essential for autophagosome formation in the ALP), an increase in levels of rab5 and rab7 (small ras-related GTPase (rab) proteins that regulate trafficking of vesicles along endosomal-lysosomal pathways), abnormal activation of macroautophagy (high LC3-II levels) and mTOR signaling (phosphorylated p70 S6 kinase) and massive neuronal accumulation of autophagic vacuoles (AVs) and lysosomal dense bodies in dystrophic neurites.

Neuropathological studies have also found that autophagy-lysosomal pathology in the AD brain contributes to AD pathogenesis, however the underlying mechanisms are not well understood. Changes in the ALP have also been found in multiple transgenic mouse AD models. Haploinsufficiency of beclin 1 in two AD mouse models produced further disruption of their lysosomes, promoted intracellular and extracellular Aβ accumulation, and exacerbated neurodegeneration. The homozygous loss of lysosomal neuraminidase 1 (NEU1) exacerbated the Aβ pathology in the AD model. In contrast, overexpression of NEU1 reduced AD pathology. These results altogether suggest that changes in ALP "core" genes or lysosome proteins accelerate AD pathology. Cellular studies suggest that the endosomal-lysosomal system is a major site of Aβ production. However, there is no consensus about where exactly Aβ is produced. Aβ is generated after inducing macroautophagy both in vitro and in vivo. The buildup of Aβ increases mTOR signaling, whereas decreasing mTOR signaling reduces Aβ levels, which suggests a negative feedback loop between ALP activation and Aβ levels. Under autophagy activation, autophagic vacuoles become the cellular site with the highest γ-secretase activity. Presenilin 2 (PSEN2) and Nicastrin (catalytically essential γ-secretase components) are located in the lysosome. In fact, PSEN1 regulates the lysosomal pH.

Pharmacological impairment of lysosomal function in vitro results in changes in Aβ production. Changes in lysosomal pH reduces Aβ secretion. Lysosomal protease inhibitors reduce production of amyloidogenic APP fragments. All these studies suggest that global lysosome function plays an important role in normal and abnormal Aβ precursor protein (APP) processing and subsequent amyloidogenesis. All the evidence from human pathology, mouse and cellular models strongly suggest that deficits in autophagy induction occur early in disease but, lysosomal clearance deficits occur in more advanced stages of disease.

Lysosomal Dysfunction in PD

It has been well established in human post-mortem studies and model systems that severe genetic defects in endocytic trafficking, lysosomal integrity and lysosomal hydrolase activity are risk factors for synucleinopathies. Lysosomal dysfunction as a pathogenic mechanism in Parkinson's disease (PD) is supported by mutations in the ATP13A2 (a lysosomal ATPase) and VPS35 genes (endo-lysosomal trafficking) in familial PD. In addition, low-frequency variants in the GBA gene (lysosomal hydrolase glucocerebrosidase) and the SMPD1 gene (lysosomal acid sphingomyelinase) increase the risk of sporadic PD. A recent meta-analysis found that common variants in SCARB2 (lysosomal integral membrane protein type 2), TMEM175 (transmembrane protein 175), CTSB (lysosomal cysteine protease cathepsin B), ATP6V0A1 (ATPase H+ transporting V0 subunit a1), and GALC (lysosomal galactosylceramidase) genes are also associated with PD risk. Lysosomal markers (LAMP-1, LAMP-2a, cathepsin-D, GBA and ATP13A2) have been identified as components of LBs in patients with sporadic PD. Thus, it has been suggested that LBs and Lewy neurites (LNs) may seed around impaired lysosomes and grow in size by the continuous deposition of lysosomal-derived un-degraded material as the disease progresses.

Multiple cell-based models have been converging recently on the likely centrality of cell-to-cell transfer of proteopathic seeds in the progression of synucleinopathies, although mechanistic questions remain. It is still unclear whether specific α-Syn strains are internalized via distinct receptors or endocytic mechanisms. Macropinocytotic uptake of α-Syn by immortalized cells and primary neurons seems to be mediated by HSPGs. However, the role of HS in α-Syn spreading in vivo has not been evaluated. Lysosomal processing is the predominant fate of internalized α-Syn fibrils in primary neurons. Briefly, severe pharmacological perturbation of lysosomal function causes aberrations in intracellular processing of α-Syn fibrils, concomitantly with an increased rate of inclusion formation via recruitment of endogenous α-Syn. The processes governing this recruitment are still poorly understood and it suggests that pathogenic species must escape endo-lysosomal trafficking. Thus, it has been reported that exogenous α-Syn species results in endocytic vesicle and lysosomal membrane rupture, thus, escaping endocytic trafficking and lysosomal degradation. Once in the cytosol, these α-Syn fibrils or oligomers can interact with soluble species and initiate recruitment of endogenous α-Syn. These results further support the idea that defects in lysosomal activity and integrity may accelerate pathological α-Syn aggregation and transmission.

Lysosomal defects are thought to contribute to de novo aggregation of α-Syn and impaired autophagic degradation of mature cytosolic aggregates. Interestingly, neuroprotection in several in vitro and in vivo α-Syn-overexpressing models have been reported using mammalian target of rapamycin (mTOR)-dependent or mTOR-independent autophagy enhancers. Similarly, viral-vector-mediated expression of beclin-1 reduces α-Syn aggregates and synaptic pathology in α-Syn transgenic mice. Overexpression of transcription factor EB (TFEB), a master activator of the ALP, also protects against α-Syn aggregation. Overall, these studies indicate that novel therapeutics aimed at restoring lysosome function in PD may offer a much-needed disease-modifying treatment strategy.

Heparan Sulfate in AD and PD

Heparan sulfate proteoglycans (HSPGs) consisting of HS chains covalently attached to a specific protein core are abundant cell surface and extracellular molecules that interact with a spectrum of ligands. Membrane HSPGs act as endocytic receptors and undergo constitutive as well as ligand-induced endocytosis. Most HSPGs and bound ligands are degraded by lysosomal proteases, exoglycosidases and sulfatases. HSPGs regulate the oligomerization, clearance, endocytosis and trafficking of a variety of pathogenic proteins including Aβ, apoE, tau, and α-Syn. HSPGs are present in Aβ plaques and in LBs and LNs. HSPGs have been shown to bind to Aβ and accelerate its oligomerization and aggregation. HS significantly stimulates the formation of α-Syn fibrils in vitro. HS also mediates cellular Aβ uptake. HSPGs mediate macropinocytotic uptake of α-Syn. Pharmacological inhibition of HSPG binding of pathogenic proteins and genetic reduction of HSPG synthesis facilitate the clearance of pathogenic proteins and reduce their aggregation. These findings suggest that HS and HSPGs play important roles in Aβ and α-Syn metabolism and the pathogenesis of AD and PD. NAGLU encodes N-acetyl-alpha-glucosaminidase, which participates in the lysosomal degradation of heparan sulfate (HS). LoF mutations in NAGLU cause mucopolysaccharidosis type IIIB (MPS-IIIB) also known as Sanfilippo syndrome B. Qualitative increased levels of intracellular full length-APP have been reported in brains of both NAGLU-deficient and human MPS-IIIB patients in the absence of Aβ plaques. MPS-IIIB patients exhibit a significant three-fold increase in the level of soluble Aβ40 compared with normal control brains. MPS IIIB patients exhibit severe SN neuronal loss and accumulation of phosphorylated α-Syn in neurons in the temporal cortex, hippocampus and SN. To date, it is not clear if reduction in NAGLU activity and the resulting HSPG accumulation affects APP metabolism, Aβ generation or clearance or α-Syn aggregation and spreading.

Innovation

The goal the study described herein is to validate the genetic findings and provide more insight into lysosomal dysfunction in AD and PD. In addition, this study may facilitate the identification of PD and AD patients with genetically determined lysosomal dysfunction, in which the restoration of such dysfunction could provide an effective therapy. Studies outlined herein are conceptually innovative in systematically and comprehensively evaluating the functional consequences of genetic variation associated in NAGLU gene with AD and PD (section (I)). These studies will provide a better understanding of the effects of aging and NAGLU haploinsufficiency on Aβ production and clearance (section (II)) as well as α-Syn aggregation and spreading in vitro and in vivo (section (III)). Furthermore, these studies carefully examine the neuronal pathology to determine the consequences of genetically altering NAGLU and its effects on Aβ and α-Syn pathology on clinically relevant end-points. The studies described herein incorporate an innovative integrative framework that couples computational methods and experimental data to validate the functional effects of NAGLU gene both in vitro and in vivo. Cell-based assays are complemented with biochemical data, RNAseq data from specific cell types in mice brains, genome-wide gene expression data in human AD and PD cases and controls, and, genome-wide gene expression data from AD mouse models correlated with Aβ plaque. Studies described in sections (II) and (III) address the question of whether age and haploinsufficiency of NAGLU on vulnerable brain regions affects APP processing and trafficking, Aβ plaque burden and Aβ40/42 levels and α-Syn aggregation in vitro and α-Syn spreading in vivo. These studies are possible with collaborative innovation involving investigators with expertise spanning neurogenetics, lysosomal biology, LSDs animal models, AD and PD pathophysiology in cellular and mouse models.

Approach

Here, state-of-the-art genomic tools can be used to evaluate the functional consequences both in vitro and in vivo of NAGLU genetic variation associated with AD and PD risk.

Data and Results

Heterozygous Variants in Lysosomal HS Degradation Genes Affect the Risk of Developing AD Single-variant and gene-based analyses of 45 lysosomal genes were performed in two case-controlled cohorts of AD. The discovery sample consisted of whole exome sequencing (WES) data from 667 unrelated AD cases and 511 controls. As expected, the gene-specific cumulative allele frequency (cMAF) from the ExAC data set (European, non-Finnish ancestry) were highly concordant ($r^2=0.96$) with the cMAF from the in-house AD databases. The burden of rare protein-altering variants (cMAF) was compared with the burden observed in controls and in ExAC. For most genes, there was an excess of variation in cases as compared with controls but only a nominal association was found with the SGSH gene ($p=4.2\times10^{-3}$; odds ratio (OR)=3.7, 95% confidence interval (CI) 1.4-9.6). When compared with the cMAF of the ExAc sample, the SGSH gene ($p=7.9\times10^{-5}$; OR=3.0, 95% CI 1.8-4.9) and NAGLU gene ($p=4.8\times10^{-4}$; OR=3.7, 95% CI 1.4-9.6) passed a multiple test correction threshold $p<1.0\times10^{-3}$ (0.05/50). Next, the Alzheimer Disease Sequencing Project (ADSP) cohort (5045 AD cases and 4500 controls) was used to replicate these findings. NAGLU was replicated ($p=3\times10^{-3}$; OR=2.3, 95% CI 1.2-5.2) in this independent sample. Of note is the fact that the association found in the replication samples is in the same direction and of similar effect size.

NAGLU Transcript Levels with Age, AD Status and in AD Mouse Models

Figure 10A:
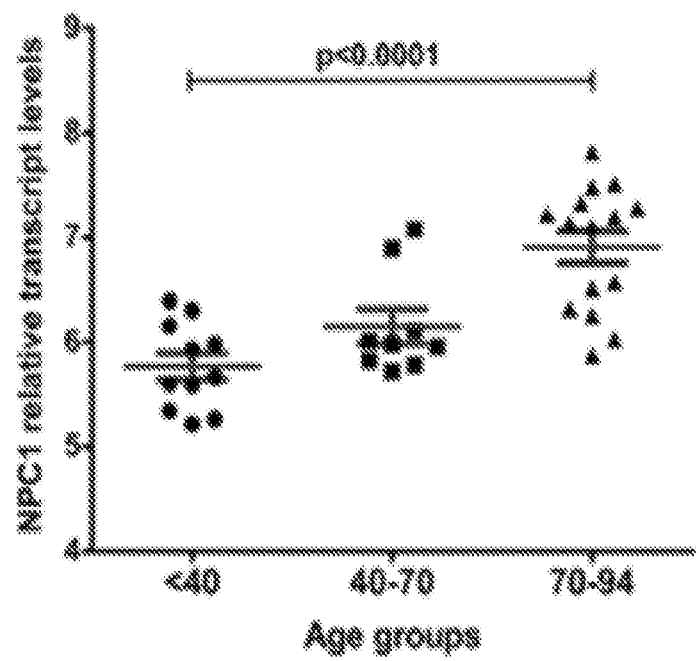
FIG. 10A-FIG. 10B is a series of dot plots showing changes in the lysosomal protein, NPC1 transcript levels with (A) age and (B) AD status.
Figure 10B:
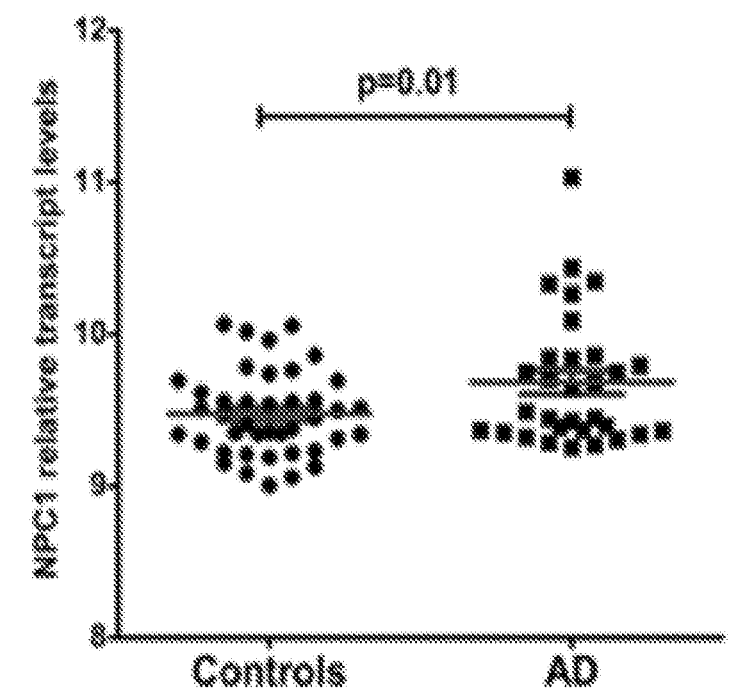

RNAseq data from brain cell types in mice show that NAGLU transcripts exhibit higher levels (~20 times) of expression in microglia than in neurons. In neuropathologically normal human brain samples, there was a significant increase in the NAGLU transcript levels with age ($p=0.02$) (see e.g., FIG. 1A). NAGLU transcript levels were significantly higher in AD cases compared to age-matched controls ($p=0.007$) (see e.g., FIG. 1B). NAGLU transcript levels also exhibited a proportional age-dependent increase with the development of AD pathology (see e.g., FIG. 10, right panel) in cortices of an AD mouse model (APP, p.K670N/p.M671L/PSEN1, p.M146V; hemizygous [HET] or homozygous [HO], see e.g., FIG. 10) compared to levels in wild-type mice (see e.g., black line in FIG. 10).

Heterozygous Variants in Lysosomal HS Degradation Genes Affect the Risk of Developing PD The discovery sample consisted of WES data from 331 unrelated PD cases from the PPMI cohort. The gene-specific cMAF from the NFE ExAC data set was highly concordant with the cMAF from the in-house PD databases (PPMI $r^2=0.92$, in-house $r^2=0.96$). The burden of rare protein-altering variants (cMAF) was compared with the burden observed in controls and in ExAC. When compared with the cMAF of the ExAc sample, seven genes passed multiple test correction threshold $p<1.0\times10^{-3}$) including GBA ($p=6.1\times10^{-6}$; OR=2.1; CI=1.3-3.3), GNS ($p=2.5\times10^{-5}$; OR=2.4; CI=1.4-4.6) and NAGLU ($p=1.0\times10^{-4}$, OR=4.7; CI=1.5-8.3). There was also a trend on HGSNAT ($p=8.1\times10^{-3}$; OR=1.8; CI=1.1-2.8). Next, an additional PD cohort (WUSTL) was used to replicate these findings, including 490 PD cases where the data were obtained using the Human-Exome chip. Notably, the association found in the replication sample is in the same direction and the effect size is similar; NAGLU ($p=3.6\times10^{-7}$; OR=3.6; CI=2.8-8.3) and HGSNAT ($p=9.7\times10^{-4}$; OR=1.9; CI=1.4-3.2).

TABLE 4

Deleterious variants for functional validation

| Gene | Chromosome | Location (bp) | Clinical significance | Annotation | Protein Consequence |
|---|---|---|---|---|---|
| NAGLU | 17 | 40689453 | — | Missense | p.Ser141Thr |
|  |  | 40690394 | — | Missense | p.Asn190Ser |
|  |  | 40695459 | Pathogenic | missense | p.Ala479Thr |

NAGLU Transcript Levels with PD Status

Figure 2:
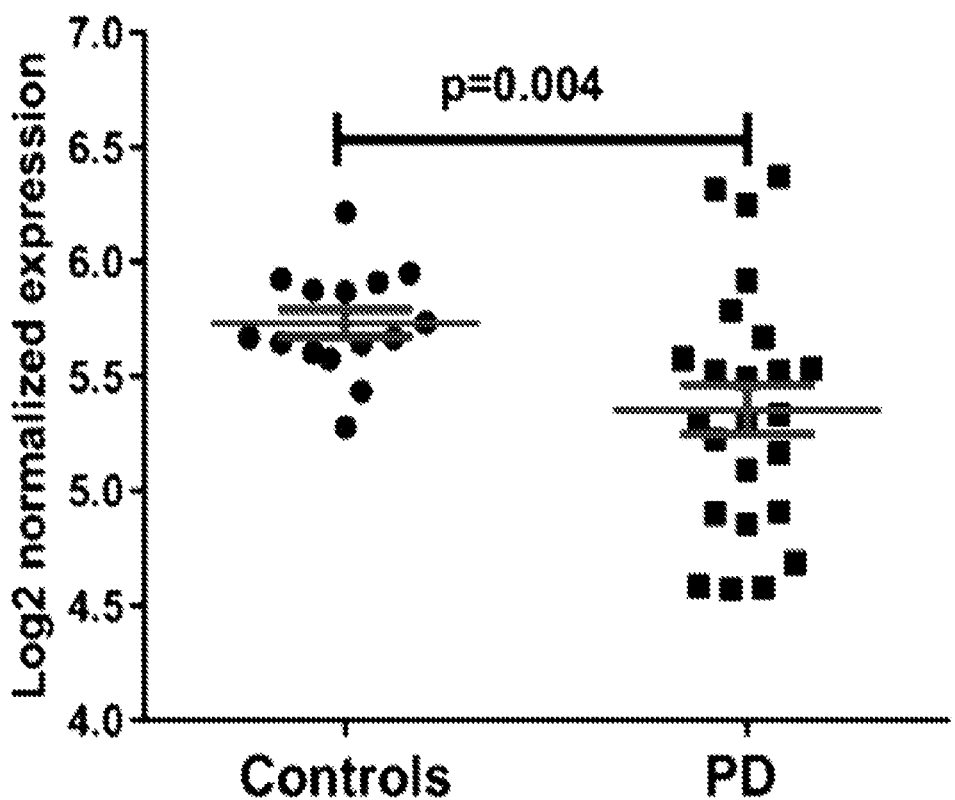
Figure 3A:
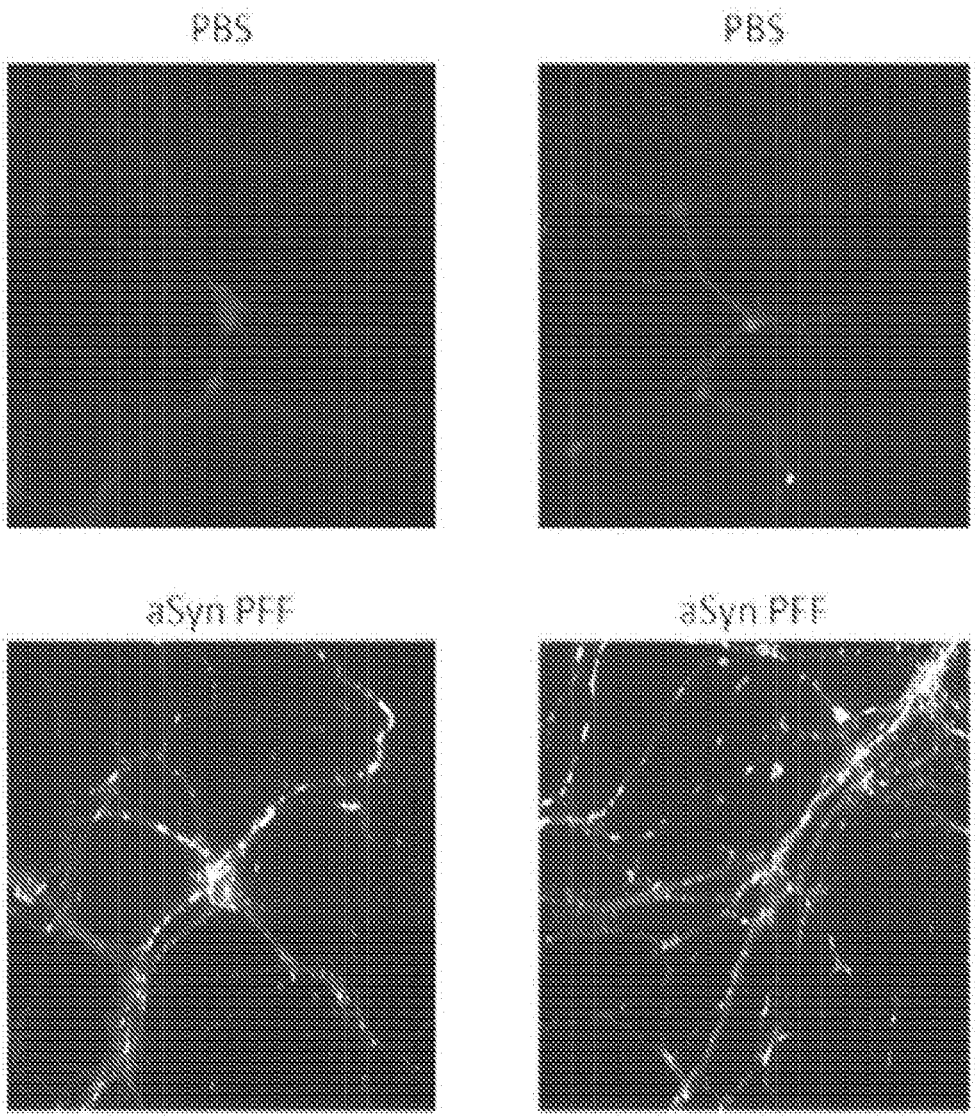
FIG. 3A-FIG. 3B is a series of images and a Western blot depicting accumulation of alpha-synuclein (α-Syn) in neurons treated with pre-formed α-Syn fibrils (PFFs). (A) immunofluorescence detection of phosphorylated α-Syn aggregates induced by α-Syn PFFs in primary neurons. Neuron cultures treated with phosphate buffered saline (PBS) are shown as a control. (B) Western blot analysis showing accumulation of α-Syn in lysates from PFF-treated primary neurons following serial extraction with 1% Triton X-100 and then 2% sodium dodecyl sulfate (SDS) (only the SDS-soluble fraction is shown).
Figure 3B:
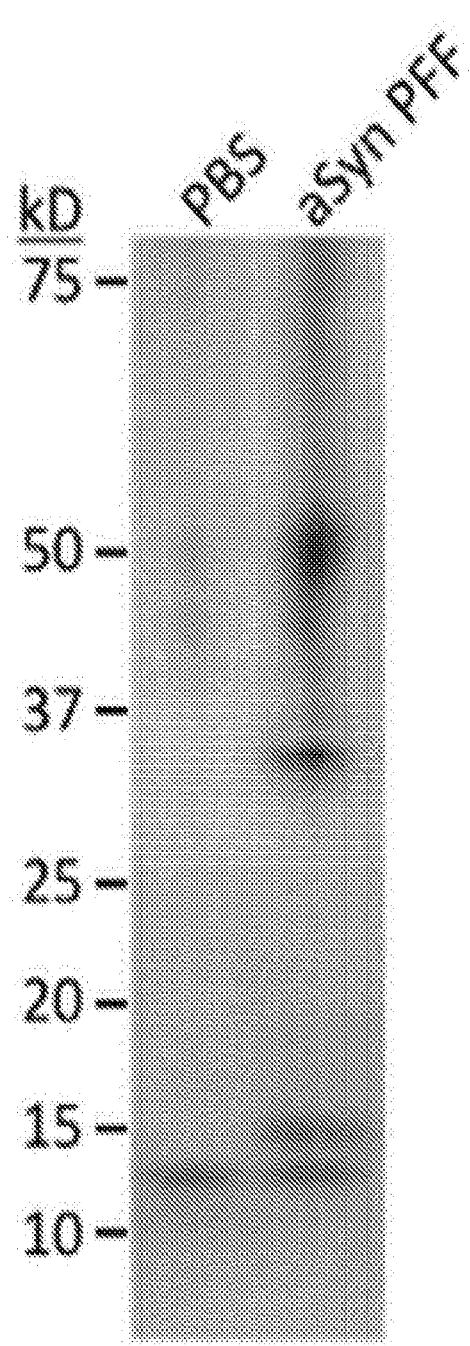

SN pathology and LB accumulation has been reported in MPS IIIB patients with mutations in the NAGLU gene. In addition, it was found that there is a reduction in transcript levels of NAGLU gene in dopaminergic (DA) neurons from the substantia nigra of PD patients compared to controls (see e.g., FIG. 2). The preparation and use of α-Syn PFFs in neuronal cultures has been optimized previously. α-Syn PFFs were added to primary cortical neurons from wild-type mice at 7 days in vitro (DIV). 7 days post treatment; neurons were fixed and stained with pSyn-specific antibody. PFFs induced recruitment of endogenously expressed α-Syn into abnormal, phosphorylated, insoluble aggregates (see e.g., FIG. 3A and FIG. 3B). α-Syn aggregates initially appeared as small, punctate inclusions in presynaptic terminals and axons (see e.g., lower right panel, FIG. 3A). The aggregates grew and became more elongated and serpentine in appearance, resembling Lewy Neurites (see e.g., lower left panel, FIG. 3A). FIG. 3B shows that PBS-treated control neurons showed a band slightly above 15 kDa corresponding to monomeric α-Syn. Several bands with higher molecular weights appeared in neurons treated with PFFs. Those additional bands likely correspond to α-Syn oligomers. This is a tractable in vitro system to study the effects of lysosome dysfunction on α-Syn aggregation.

Spreading of pSyn Pathology in NAGLU-Deficient Mice

Figures 4A, 4B, 4C:
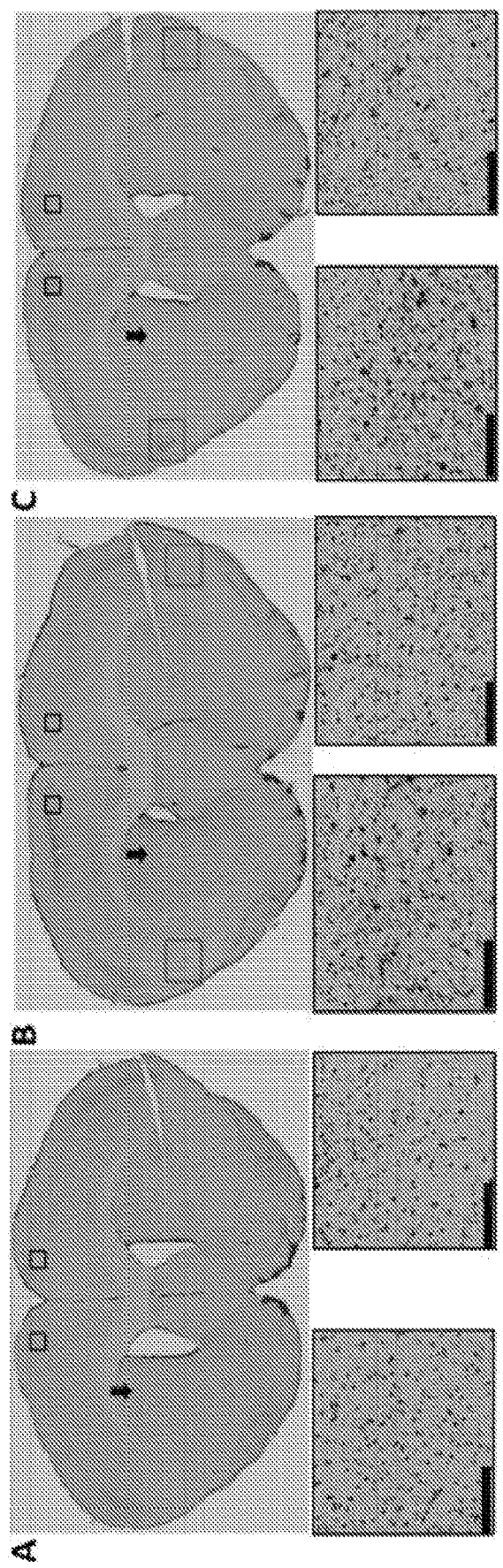
FIG. 4A-FIG. 4C is a series of images showing phosphorylated α-Syn (pSyn) staining in brain sections from mice of different genotypes. (A) Coronal brain section of pSyn staining (brown) and counterstained with cresyl violet of a young wild-type (WT) C57BL/6 mouse 30 days post inoculation (dpi) with phosphate buffered saline (PBS). (B) pSyn staining of a young WT C57BL/6 mouse 30 dpi with α-Syn PFFs. (C) pSyn staining of a young NAGLU-deficient mouse 30 dpi with α-Syn PFFs. Black arrows indicate level of injection sites. Insets show staining with anti-pSyn antibodies and Lewy body (LB)/Lewy neurite (LN)-like pathology in the cortex. Blue boxes are located in the ectorhinal cortex. Aggregates are more widespread (blue boxes) and are present in both the ipsilateral and contralateral hemispheres in the NAGLU-deficient mouse. Bars: 100 μm.

Intrastriatal inoculation of α-Syn PFFs or PBS (control) was performed in six NAGLU-deficient mice and in six wild-type littermates. All mice survived the injections and are currently aging. In agreement with published data, 30 days post-injections (dpi) PBS-treated animals exhibited no pSyn pathology (see e.g., FIG. 4A). In contrast, PFF-injected wild-type mice exhibited abundant ipsilateral pSyn pathology, and very little contralateral pSyn pathology (see e.g., FIG. 4B). At 90 dpi, there was a pSyn pathology gradient with more ispilateral than contralateral intensity in PFF-injected wild-type mice. This gradient was very pronounced in the motor cortex and SN. There was more symmetric pathology in the amygdala and somatosensory cortex. Surprisingly, NAGLU-deficient mice treated with α-Syn PFFs exhibited α-Syn pathology in the prefrontal and in the ectorhinal cortex both ipsilateral and contralateral to the injection site at 30 dpi (see e.g., FIG. 4C). NAGLU-deficient mice appeared to have more symmetric pSyn pathology, which could indicate more spreading to the contralateral side than was observed in WT mice. More α-Syn PFFs-treated mice are currently being analyzed to further characterize the impact of NAGLU deficiency on regional and temporal spread of pSyn pathology and expand these initial results that suggest an increase in spreading of pSyn pathology in NAGLU-deficient mice.

Research Design and Methods (I) Determining the Functional Effects of Variants in the NAGLU Gene Assessing the Effect on Protein Products It is beyond the scope of the studies described herein to evaluate all the variants of the NAGLU gene associated with AD or PD identified. Therefore, this study focuses on the top 3-5 variants identified in the NAGLU gene. Top variants are defined based on frequency in AD/PD patients, predicted effect on the protein by SIFT and Polyphen2, and GERP conservation score. These genes are chosen based on the strength of the data from both the discovery and replication samples. The effects of selected variants in the NAGLU gene on enzyme activity, protein levels, and lysosome function can be determined, with the 3 variants listed in TABLE 4 being the areas of focus. Very stringent criteria has been used to select the potential functional variants in NAGLU (one previously identified as pathogenic variant). However, it is important to characterize their effects on protein levels and enzyme activity. Cells have already been immortalized from NAGLU-deficient mice. The variants outlined in TABLE 4 are transduced and their effects on enzyme activity and protein levels can be determined. The effect on lysosome function and accumulation of HSPGs can also be determined. The selected variants are engineered using site-directed mutagenesis and subcloned into a lentiviral vector as previously described. Lentiviral vectors are produced, handled and disposed in BSL2 facilities in compliance with Section III-E-1 of the NIH Guidelines for Research Involving Recombinant or Synthetic Nucleic Acid Molecules. To determine the effect of the variants on enzyme activity, a fluorometric assay is used as previously described for NAGLU activity. The variants are determined to affect the lysosome function as previously described. The levels of HSPGs are quantified by ELISA. To ensure the rigor and reproducibility, quantification is performed in at least 3 independent experiments with triplicates, by double-blinded observers.

Anticipated Results

It is anticipated that NAGLU variants cause a partial loss of function, increase partially degraded HS in the lysosome and alter ALP function. It is expected that 5-20% residual NAGLU activity is detected. In case the selected variants fail to reduce the activity compared to wild-type levels, their effect on subcellular localization and misfolding is evaluated. Additional AD- or PD-associated variants could be selected to be tested for effects on enzyme activity.

(II)(a) Determine the Functional Effects of NAGLU on APP Metabolism, Aβ Generation and Aβ Degradation In Vitro Assessing the effect on APP trafficking, endocytosis and subcellular localization Multiple studies have demonstrated that endocytosis of APP is essential for its co-localization with β- and γ-secretases within endosomes and multivesicular bodies in the APP amyloidogenic pathway. Impairment in endosomal flux, secondary to lysosome dysfunction results in increased transit time within this organelle, which increases the propensity for β- and γ-cleavage and, hence, Aβ generation. Increased levels of intracellular full length-APP have been reported in brains of both NAGLU-deficient and Sanfilippo B patients in the absence of Aβ plaques. To determine whether the selected variants in the NAGLU gene affect steady-state levels of APP, APP endocytosis or enhanced flux of APP into the lysosomes for degradation, the kinetics of intracellular APP appearance and the levels of APP in the cell surface can be determined using a cell surface biotinylation assay as previously published. The effects on full-length APP half-life are measured by Western Blot at 0, 5, 10, 30 min under treatment with protein synthesis inhibitor, cycloheximide. Co-localization techniques are used to study the effect on APP and SorL1 subcellular localization. Protein and transcript levels of APP-processing machinery, including α-secretase (ADAM10 and ADAM17), β-secretase 1 (BACE1) and γ-secretase complex (PSEN1 and Nicastrin), are measured by western blot and RT-qPCR, respectively.

Assessing the Effect on Aβ Generation

A significant proportion of APP is targeted to the lysosomes and APP levels rapidly build up in cells in the presence of lysosomal acidification inhibitors, suggesting that lysosomal degradation drives APP proteolysis to preclude formation of Aβ peptides. Sanfilippo B patients exhibit a significant increase (3-fold) in the level of soluble Aβ compared to normal control brains. A significant increase in Aβ oligomer levels has been reported in brains of NAGLU-deficient mice. These findings suggest that the accumulation of HS and lysosomal dysfunction in both mice and humans with NAGLU deficiency result in a γ-secretase-dependent abnormal APP processing. Therefore, selected variants can be evaluated as to whether they affect Aβ generation in cell cultures. Primary neuron culture is performed as previously described. Lentiviral vector carrying selected variants and wild-type under neuron-specific promoter (synapsin) is used to transduce primary neurons from both NAGLU-deficient and hemizygous mice. Different volumes of concentrated Lentivirus are used to determine the proper level of expression in neurons. NAGLU levels are measured by RT-qPCR and fluorometric assay. Aβ species in cell lysates and media from cells are detected by sandwich ELISA as previously published. Briefly, Aβx-40 and Aβx-42 peptides are captured with mouse monoclonal-coating antibodies HJ2 (anti-Aβ35-40) and HJ7.4 (anti-Aβ37-42). HJ5.1 (anti-Aβ13-28), a biotinylated antibody targeting the central domain, or HJ3.5, which targets the N-terminal amino acids, are used as the detecting antibody, followed by streptavidin-poly-HRP-40. APP-derived proteolytic fragments, such as α- and β-CTFs, and sAPPα and sAPPβ are measured by Western blot. Levels of full-length APP are monitored by Western blots, as previously described.

Assessing the Effect on Aβ Degradation

Microglia proliferate around Aβ plaques and phagocytose Aβ material, but subsequent degradation is impaired, contributing to progressive Aβ accumulation in AD. It is not clear why microglia cells can take up fibrillar Aβ but cannot degrade it. However, microgial cells from AD patients exhibit a reduction in beclin-1 and subsequent ALP dysfunction. In addition, insoluble fibrillar Aβ affects the trafficking of chloride channel, ClC-7, to lysosomes in primary microglia, which impairs lysosomal degradation. However, restoring lysosome acidification enhances Aβ degradation. Together, this evidence suggests that ALP insufficiency in microglial cells may contribute to AD pathogenesis. The data mining efforts presented here revealed that NAGLU exhibits a higher level of expression in microglial cell than in neurons. Thus, primary microglial cells from NAGLU deficient and hemizygous mice transduced with selected variants can be evaluated as to whether they can uptake and degrade exogenous Aβ. Aβ uptake and degradation assessment is performed as previously published.

Assessing the Effect on ALP Function

Increased Beclin1, p62 and LC3-II levels in the heart and brain tissue from NAGLU-deficient mice suggests an abnormal activity of the lysosomal autophagy system with an accumulation of autophagosomes. Neurons from hemizygous NAGLU mice can be evaluated as to whether they exhibit ALP dysfunction and if these changes are increased by the selected variants. Western blots of LC3 and p62 are used as indirect indicators of macroautophagy activation. The autophagy flux is evaluated by the amount of LC3-II present in the cells in the absence or presence of activators of the autophagy system (Rapamycin and Torin1), autophagy inhibitors (Bafilomycin A1), lysosomotropic agents (chloroquine, ammonium chloride), and E64/Leupeptin as previously published. This is complemented by live-cell imaging using the mCherry-GFP-LC3 marker. Autophagosome-lysosome fusion can be further evaluated by co-localization of LC3 and LAMP1. Lysotracker is used to quantify the number of acidic compartments per cell. Activation of TFEB is evaluated by its nuclear localization. RT-qPCR is used to measure the changes in the transcript levels of TFEB-regulated mRNA transcripts (SQSTM1/p62, MAP1LC3B, and LAMP2). To ensure the rigor and reproducibility: Investigators are blind to the genotype during the quantification and analysis stages. For each experiment, data obtained is averaged within each of the groups described. Experiments are performed in triplicate with at least two independently generated preparations per genotype. Statistically significant differences are tested for using two-way ANOVA and appropriate post-hoc tests to determine whether each marker or functional analysis is associated with NAGLU versus control.

Generation of AAV2/9-PHP.B Vectors

NAGLU wild-type and the most deleterious variant are subcloned into the AAV2/9-PHP.B vector. AAV2/9-PHP.B transfers genes throughout the central nervous system (CNS) with an efficiency that is at least 40-fold greater than AAV9 and transduces the majority of astrocytes and neurons across multiple CNS regions. High titer AAV2/9 vector stocks have been obtained from the UNC Viral Vector Core facility. The AAV vector stocks are diluted to 1012 vg/ml in lactated Ringer's solution for all the experiments outlined in this project.

Anticipated Results

It is anticipated that there is a gene dosage effect of NAGLU on APP trafficking, APP metabolism, Aβ generation or Aβ degradation. In addition, it is expected that the experiments outlined herein allow for evaluation of the effects of selected variants in the NAGLU gene on neuron and microglia cell survival. Alternatively, primary neurons from 5XFAD transgenic mice or N2A695 cells could be used and transduced with selected variants in the NAGLU gene, and the effect on Aβ generation evaluated. The next step after identifying variants in the NAGLU gene that affect both the risk and the pathogenesis of AD in vitro is to take advantage of the progress in the generation of induced pluripotent stem cells (iPScs) directly from human fibroblasts and in genome-editing methods. The iPSc-derived neurons or glial cells from AD patients carrying variants in the NAGLU gene could be used to compare the effect of such variants on APP metabolism compared to isogenic CRISPr-corrected cells. Combining the results from this example and the availability of a fluorometric assay for NAGLU activity, one could screen cerebrospinal fluid (CSF), plasma, serum or brain tissue of AD cases and controls to detect specific defects that can be used as biomarkers for AD.

(II)(b) Determine the Functional Effects of NAGLU Haploinsufficiency on the Development of AD Pathology in Aged Mice While the neurodegenerative consequences of total loss-of-function of NAGLU in mice and humans has been characterized, very little is known about the long-term consequences of a single copy of this gene (haploinsufficiency). It has always been assumed that hemizygous mice and humans are normal. However, recently it was demonstrated that haploinsufficiency in lysosomal genes results in significant metabolic abnormalities in humans and mice. It is hypothesized here that AD pathology develops from milder forms of inherited ALP dysfunction and that their emergence may require additional age-related ALP impairments. Primary endpoints are Aβ levels measured at 4 months of age (prior to plaque deposition) and plaque load at 8 months of age in the presence of FAD-causing mutations in mice. Effects on Aβ levels are the primary endpoints in 24 old month NAGLU hemizygous mice expressing the most deleterious NAGLU variant associated with AD.

Effects on a Mouse Model of AD Pathology

Total loss of function of the NAGLU protein in human patients with Sanfilippo B disease results in a significant three-fold increase in the level of soluble Aβ40 compared with normal control brains. NAGLU transcript levels exhibited a proportional age-dependent increase with the development of AD pathology in the cortex of an AD mouse model (see e.g., FIG. 1C). As in AD transgenic mice, cognitive decline in humans is not proportional to Aβ plaque load, but does correlate with soluble Aβ species. Given the data from human Sanfilippo B patients and NAGLU-deficient mice supporting a role of these genes in intracellular Aβ generation, it can be determined whether mild lysosome impairment (hemizygosity in NAGLU) accelerates Aβ generation in a well-characterized mouse model of AD carrying familial Alzheimer's disease (FAD) mutations that favor Aβ generation. NAGLU-deficient mice exhibit highly sulphated HS brain accumulation, neuroinflammation, enlarged lysosomes in both neurons and microglia, and reduction of synaptic proteins at ~4 mo followed by altered circadian rhythm, hearing and vision deficits and, in older mice (>8 mo), a loss of Purkinje cells and impaired motor coordination. The NAGLU-deficient mice median lifespan is ~12 mo of age. The 5XFAD model is a very aggressive Aβ deposition model that develops intraneuronal Aβ42 at 1.5 months, plaques at 2 months, loss of synaptic markers and memory deficits at 4 months, and neuron loss at 9 months of age. The development of plaques is accompanied by reactive gliosis. To further ascertain whether NAGLU haploinsufficiency exacerbates an existing amyloidogenic process, NAGLU mice are crossed with 5XFAD transgenic mice. NAGLU and 5XFAD mice are congenic on the C57Bl/6 background. The effect of the most deleterious NAGLU variant (described in section (I)) and gene-dosage of NAGLU on Aβ plaque load is determined by histology and Aβ40/Aβ42 levels by sandwich ELISA at 4 and 8 months, as previously described. APP metabolism is assessed by measuring APP-CTFs by Western blot. Four months is an early time point for deposition of Aβ plaques in 5XFAD mice in order to detect if Aβ accumulation begins earlier, whereas eight months represents late stage when Aβ plaques are abundant.

Randomization, Biological Variables, and Sample Size

Sample size calculations indicate that at least n=10 mice/group are needed to detect a 40% increase in plaque load (SD=20%, α=5%) and detergent-soluble and insoluble Aβ40 and Aβ42 with 80% power. Twenty (20) NAGLU-deficient mice and 20 NAGLU hemizygous mice crossed with 5XFAD are injected with the most deleterious NAGLU variant using AAV2/9-PHP.B at birth. In addition, 20 NAGLU-deficient mice, 20 NAGLU hemizygous mice crossed with 5XFAD and 20 additional 5XFAD mice (to control for genetic background) at 4 and 8 months of age are collected for histological and biochemical studies. Because females generally have greater Aβ accumulation than males, each group consists of 10 males and 10 littermate females (n=20). Once the experimental animals are generated for each experiment, an independent member of the laboratory randomly assigns a number to each animal. Therefore, the researcher most closely associated with the study is blinded to the genotype and treatment regimen ensuring an unbiased experiment. Samples for biochemical and histological analyses retain the same randomly assigned numbers. Biological variables are kept to a minimum by using congenic animals and the same batch of reagents within one experiment.

Effects of NAGLU Haploinsufficiency on Aged Mice

AD pathology (e.g., Aβ plaque) is typically age-dependent. However, published studies have not addressed the interaction between age and ALP dysfunction. Most of the studies evaluating the role of ALP in AD in vivo have used a pharmacological approach or total absence of ALP genes and short-term endpoints. An increase of Aβ oligomers has been reported in brains of 10 months old NAGLU-deficient mice. As described herein, a genetic approach can be employed for reduction of the endogenous levels of NAGLU and a quantitative pathological survey of the effect of inherited chronic lysosome impairment on AD-relevant phenotypes involving Aβ can be performed. The results have shown that there is a highly significant increase in NAGLU transcript levels with age in normal human brain samples (see e.g., FIG. 1A). In addition, NAGLU transcript levels were significantly higher in AD cases compared to age-matched controls (see e.g., FIG. 1B). These results suggest that a compensatory response to aggregated proteins from NAGLU may be part of the normal aging process. The abnormal elevation found in AD models suggests that they are trying to control the abnormal levels of Aβ. Therefore, haploinsufficiency in NAGLU could exacerbate the AD-related phenotypes in aged mice.

Sample Size

Sample size calculations indicate that at least n=15 mice/group are needed to detect a 20% increase in detergent-soluble and insoluble Aβ40 and Aβ42 with 80% power. Fifteen (15) NAGLU-deficient mice, 15 NAGLU hemizygous mice and 15 wild-type mice are injected with the most deleterious NAGLU variant using AAV2/9-PHP.B at postnatal day 1-2. Mice are allowed to recover and live to at least 12 months of age. Moribund mice are anesthetized and sacrificed to collect the brain biochemical studies such as detergent-soluble and insoluble Aβ40 and Aβ42 levels.

Aβ Plaque Quantification and Aβ Generation

Fixed frozen brain sections (50 μm) are stained in a sub-cohort of mice with X-34 and immunostained with HJ3.4 (anti-Aβ) antibodies to quantify plaque load (expressed as % area). Aβ levels in brain tissue homogenates from the contralateral hemisphere are fractionated into soluble (PBS) and insoluble (5M guanidine) fractions and quantified using ELISAs. Effects on APP processing machinery are assessed.

Synaptic Markers

Synaptic loss is a common finding in humans and AD mouse models. It can be assessed whether NAGLU haploinsufficiency accelerates the synaptic loss in 5XFAD mice by Western Blot using antibodies against presynaptic markers: SNAP-25, vesicle-associated membrane protein 2, Syntaxin 1, and Synaptophysin, as previously published.

In Vivo Aβ Microdialysis

Aβ has a relatively short half-life in the brain, with ~1-2 hours in mouse interstitial fluid (ISF) and ~8 hours in human cerebrospinal fluid (CSF). To investigate the effect of NAGLU on Aβ generation and clearance, in vivo microdialysis is used to dynamically assess ISF Aβ metabolism in the hippocampus of 5XFAD/NAGLU (+14 5XFAD/NAGLU (−/−) mice and 5XFAD littermates injected with AVV2/9 or PBS at 3-4 months of age. To assess ISF Aβ levels over time in the hippocampus of awake, freely moving mice in vivo microdialysis is performed as previously described. Briefly, under isoflurane anesthesia, a guide cannula is stereotaxically implanted above the hippocampus (3.1 mm behind bregma, 2.5 mm lateral to midline, and 1.2 mm below dura at a 12° angle). A microdialysis probe is inserted through the guide cannula into the brain. Artificial CSF is used as microdialysis perfusion buffer. Microdialysis samples are collected every 60-90 min and are assessed for Aβ40 or Aβ42 by ELISAs. The mean concentration of Aβ over 6 hr is defined as basal concentration of ISF Aβ. For each animal, all Aβ concentrations are normalized to the basal Aβ concentration for that mouse. After basal concentration is determined mice are administered a blood-brain permeable γ-secretase inhibitor (LY411575, 3 mg/kg subcutaneously) to rapidly block the production of Aβ. Microdialysis samples are collected every 60 min for 6 hr and then assayed for Aβ40 by ELISA. The half-life of ISF Aβ is calculated on the basis of the slope of the semi-log plot of % change in Aβ versus time. Only Aβ values that are continually decreasing are included in half-life analysis. Based on power analysis, n=10 mice/group detect a 30% reduction in ISF Aβ levels and clearance rate. (5 groups× 10=50 mice; equal number of males and females)

ALP Dysfunction

Brain sections from NAGLU-deficient, NAGLU hemizygous, and NAGLU hemizygous crossed with 5XFAD mice are immunostained with anti-LAMP1, LC3 and p62 antibodies, as described above.

Effect on Neuritic Dystrophy and Reactive Gliosis

Inventor's previous studies have demonstrated that NAGLU deficient mice exhibit increased astrogliosis. Therefore, in parallel studies, brain sections are stained with anti-CD11b and anti-GFAP antibodies to examine the impact of one single copy of the selected genes on reactive gliosis. Fixed frozen brain sections are immunostained with reticulon-3 (RTN-3) antibodies (RTN-3 selectively accumulates in dystrophic neurites) to quantify dystrophic neurites as has been done previously.

Anticipated Results

It is anticipated that mice hemizygous for the NAGLU gene accelerate and worsen the Aβ plaque burden in 5XFAD mice. It is expected that NAGLU haploinsufficiency affects APP metabolism and Aβ generation in aged mice, subsequently increasing synaptic loss and reactive gliosis without the generation of Aβ plaque. If changes in APP metabolism and Aβ generation are not found in the brains of hemizygous mice, the transcript of NAGLU could be knocked down in newborn 5XFAD transgenic mice by injecting AAV2/9 vectors carrying validated shRNA/RNAi against them. CRISPr technology could be used to generate knock-in mice of the variants in selected genes with the strongest effect on in vitro assays. To extend the findings in the NAGLU mice, the same approach could be applied to the other lysosomal enzymes that degrade HS for which there are mouse models available (e.g., N-sulfoglucosamine sulfohydrolase [SGSH (Jax 003780)]).

(III) Determine the Effect of NAGLU on α-Syn Aggregation In Vitro and α-Syn Spreading In Vivo Determine the functional effect of NAGLU on uptake, trafficking, aggregation and clearance of α-Synuclein in vitro Macropinocytotic uptake of α-Syn by immortalized cells and primary neurons seems to be mediated by HSPGs. In addition, HS significantly stimulates the formation of α-Syn fibrils in vitro. A well-characterized model of α-Syn aggregation has been developed in cultured neurons. In this model, PFFs generated from recombinant α-Syn are added directly to primary neurons and are endocytosed by the neuron. These PFFs induce recruitment of endogenously expressed α-Syn into abnormal, phosphorylated, insoluble and ubiquitinated aggregates. The formation of these aggregates from endogenous α-Syn in primary neurons derived from wild-type, non-transgenic mice in vitro follows a lag phase of 2-3 days, followed by formation in axons by days 4-7, spread to somatodendritic compartments by days 7-10 and neuron death ~14 d after PFF addition. The effects of NAGLU on uptake, trafficking, aggregation and clearance of α-Syn fibrils can be determined using this well-characterized model. Whether there are any changes in the clearance of endogenous α-Syn in primary hippocampal neurons from NAGLU-deficient and hemizygous mice transduced with the most deleterious NAGLU variant can also be determined. The rate and level of α-Syn aggregates (inclusions) in primary neurons from the NAGLU-deficient mice following the treatment with α-Syn PFFs (see e.g., FIG. 2) can be determined. Finally, it can be determined whether recombinant enzyme replacement can rescue α-Syn PFFs in neurons from NAGLU-deficient mice.

Generation of α-Syn PFFs

Recombinant monomeric α-Syn is prepared from bacteria and sequentially purified by size exclusion and ion exchange chromatography according to previously established protocols. Fibrillar forms of α-Syn are prepared by agitating the recombinant monomer at 37° C. for ~72-120 hours followed by size selection using centrifugal filter devices with specified molecular weight cutoff parameters. The conditions for the generation of PFFs have already been optimized. PFFs are diluted in Tris-buffered NaCl and added to cultured primary neurons after 5-10 DIV. PFF transductions and seeding are confirmed by immunofluorescence or sequential extraction and immunoblotting 4-7 days after exposure. Abnormal α-Syn aggregates derived from endogenous α-Syn are detected via immunofluorescence with anti pSyn (Ser129) antibody, clone 81A (Biolegend, MMS-5091) and by western blot. α-Syn PFFs are produced, handled and disposed in BSL2 facilities.

α-Syn PFFs Trafficking, Endocytosis and Subcellular Localization

Lysosomal processing is the predominant fate of endocytosed α-Syn fibrils in primary neurons. PFF-treated neurons are co-stained with presynaptic (CSPα), endocytic (EEA1), autophagosome (Rab7) and lysosome (LAMP1) markers to determine if there are changes in the trafficking of α-Syn aggregates in the endo-lysosomal pathway.

Assessing the Effect on ALP Function

α-Syn aggregates impair overall macroautophagy by reducing autophagosome clearance. Therefore, it can be determined whether pharmacological modulation of the autophagy pathway improves α-Syn clearance.

Assessing the Effect on Chaperone-Mediated Autophagy (CMA)

α-Syn is degraded by the chaperone-mediated autophagy (CMA) and aggregation-prone α-Syn mutants block CMA. Therefore, LAMP2A and HSP70 protein levels are checked to see if they are affected in PFF-treated cells. PFF-treated neurons are treated with a CMA activator; AR7 (retinoic acid receptor alpha specific antagonist) and α-Syn levels are determined in cell lysates and conditioned medium.

Effect on Endocytic and Lysosomal Membrane Integrity

α-Syn PFFs induce vesicle and lysosomal rupture following endocytosis. These ruptured vesicles are positive for the EEA1, LC3 and galactin-3. It can be determined whether α-Syn PFFs affect lysosomal membrane integrity by Gal-3 and LC3 staining.

Rescue Experiments with Enzyme Replacement

Recombinant NAGLU is added before, during and after exposure to αSyn PFFs in the presence or absence of an uptake/binding inhibitor (Mannose-6-phosphate: M3655, Sigma) and the effect on α-Syn PFFs aggregation is tested. There is already sufficient recombinant NAGLU for adding to the deficient neurons in vitro.

Anticipated Results

It is anticipated that a gene dosage effect of NAGLU on uptake, trafficking and aggregation of α-Syn PFFs in vitro and, recombinant enzyme can rescue those effects. NAGLU-deficient cells accumulate HS and HSPG in the cell membrane and in the endolysosomal system. Thus, an increase in the uptake of α-Syn PFFs is anticipated followed by disruption of the endocytic vesicles and lysosome membranes, which will increase the cytosolic levels and recruitment of endogenous α-Syn. Lentiviral vectors could be generated and aggregation-prone α-Syn mutants could be overexpressed in primary neurons from NAGLU-deficient and hemizygous mice and the rate of aggregation and degradation evaluated. Alternatively, primary neurons from overexpressing human A53T α-Syn transgenic mice could be used, and they could be transduced with selected variants in the NAGLU gene and the effect on α-Syn subsequently tested. iPSc-derived neurons from PD patients carrying variants in the NAGLU gene could also be used to compare the effect of such variants on α-Syn processing compared with isogenic CRISPr-corrected cells.

Determine the Effects of NAGLU on α-Syn Spreading In Vivo

Accumulating experimental data indicate that cell-to-cell transmission of α-Syn follows a seeding principle similar to that observed for the prion protein. Intracerebral injection of brain extracts (autopsy-derived brain extracts from cases of Lewy body disease) containing aggregated α-Syn into young mice (~3-4 months of age) overexpressing human A53T α-Syn stimulates the formation of pSyn lesions in the host, observed as early as 30 days post injections (dpi); by ~90 dpi pSyn is widespread and abundant in anatomically linked regions of the brain, suggesting a parallel with the apparent spread of α-Syn deposits observed in human PD cases. Around 100 dpi, the mice develop motor dysfunction, and premature death (~126 dpi) compared to uninjected mice. Intracerebral injections of synthetic (human or mouse) α-Syn PFFs also induced LB-like pathology and neuronal degeneration in nontransgenic (wild-type) host mice (see e.g., FIG. 4B). Approximately, 50% of wild-type mice injected with insoluble pSyn of dementia with LB brains developed pSyn pathology. In contrast, the efficiency of the induction of pSyn pathology by human and mouse α-Syn PFFs is 90% and 100%, respectively. At 30 dpi, pSyn-positive LB-like accumulations were exclusively ipsilateral to the injection site (see e.g., FIG. 4B and FIG. 4C). LB/LN pathology within affected ipsilateral regions, but also in contralateral neocortex, showed markedly increased pSyn immunoreactivity in mice examined 90 and 180 dpi. SN pars compacta (SNpc) α-Syn pathology developed progressively after PFFs injection, evolving from pale cytoplasmic accumulations at 30 dpi to dense perinuclear LB-like inclusions by 90 and 180 dpi, particularly among ventromedial SNpc populations. There is a concomitant decrease of SNpc dopaminergic (DA) neurons by 15 and 35% at 90 and 180 dpi, respectively, suggesting that LBs/LNs form before SNpc DA neuron loss. Thus, propagation of LBs/LNs is connectivity-dependent and accumulation of pathologic α-Syn appears to be upstream of and directly linked to SNpc DA neuron loss. This in vivo model of intrastriatal injections of α-Syn PFFs recapitulates the accumulation of intracellular LB/LN pathology, selective loss of SNpc DA neurons, and impaired motor coordination. LBs and LNs both contain HSPGs. However, the role of HS in α-Syn spreading in vivo has not been evaluated. To date, it is not clear if reduction in NAGLU activity and the resulting HSPG accumulation affects α-Syn aggregation and spreading. As described herein, NAGLU-deficient and hemizygous mice expressing the most deleterious NAGLU variant associated with PD can be used to test if HS and HSPG accumulation affects α-Syn aggregation, spreading and accelerates disease in vivo.

Intrastriatal Inoculation of α-Syn PFFs

α-Syn PFFs are prepared as described above. Intrastriatal inoculation of α-Syn PFFs is performed in NAGLU-deficient and hemizygous mice injected with the most deleterious NAGLU variant using AAV2/9-PHP.B at birth and NAGLU-deficient mice, hemizygous mice and twelve wild-type mice. The spreading of aggregates of pSyn is quantified and whether α-Syn PFFs affect the lifespan of NAGLU mice is evaluated. 3-4 month old wild-type, NAGLU-deficient or hemizygous mice are injected unilaterally in the dorsal striatum (0.2 mm A/P, 2.0 mm M/L relative to Bregma, 3.2 mm below the skull surface) with a single inoculation of mouse αSyn PFFs (or PBS or αSyn monomer as control). Mice are allowed to recover and age to 30, 90, or 180 days post-injection at which times the brains are harvested and processed for immunohistochemistry with an anti-pSyn (Ser129) antibody. pSyn co-localization staining is performed using anti-ubiquitin and HSP90. Based on power analysis, n=12 mice/group detects a 30% increase in pSyn levels. (5 groups×12=60 mice)

αSyn and pSyn Quantification

Cortex, hippocampus, striatum, and brainstem are dissected from the hemibrain of each animal and insoluble αSyn is isolated by sequential detergent extraction followed by ELISA and Western Blot as previously published, using anti-Synuclein-1/Clone 42 (BD Biosciences) and anti-pSyn 81A (biolegend) as capture antibodies.

Immunoblot analysis of ipsi- and contralateral striata from PFF- and PBS-treated animals is performed using antibodies against tyrosine hydroxylase (TH) and dopamine transporter (DAT) as previously published. Brain atrophy and neuron loss in the SN is assessed, and immunohistochemistry for markers of injury and inflammation (e.g., GFAP, Iba-1) is performed as described above.

Lifespan is compared between PFF- and PBS-treated NAGLU-deficient animals. Rotarod and wire hang test are known to be the most sensitive to detect motor impairment in wild-type mice 6 months after α-Syn PFFs injections. Use of the rotarod and wire hang behavioral tests has been previously published in mouse models and the appropriate experimental designs and statistical tools (ANOVA with post-hoc analyses for multiple group comparisons, and Student's t-test for pair-wise comparisons) are known. Gait analysis is performed in PFF- and PBS-treated animals. It has been previously shown that gait analysis is very sensitive to capturing "parkinsonian-like" signs in a mouse model of LSD.

With respect to performance on the rotarod and wire-hang assays, for comparisons between five groups at a time, when normal animals perform at 60 s and NAGLU-deficient animals perform at 0 s (40 weeks), and a standard deviation of 30 s, the effect size is 0.89. With an effect size of 0.89, α=0.05, and power=0.95, 6 animals are needed to be able to detect a significant difference between groups. With respect to lifespan, for comparisons between five groups with normal animals and hemizygous having a median life span of ~730 days and NAGLU-deficient ~322 days and the standard deviation being 20 d, the effect size is 5.51. With an effect size of 5.51, α=0.05, and power=0.95, only 2-3 animals are needed to be able to detect a significant difference between the groups. The behavior and lifespan studies are sufficiently powered since 10-12 mice/group are used.

Anticipated Results

It is expected that α-Syn PFFs injections accelerate the phenotype of NAGLU-deficient mice increasing the gliosis, neurodegeneration, worsening the motor impairment and shortening the lifespan. Hemizygous NAGLU mice worsen the propagation of pSyn pathology. Alternatively, AAV2/9 vectors carrying the α-Syn mutations could be generated and injected stereotaxically in the striatum of young NAGLU-deficient mice or the overexpressing human A53T α-Syn mice could be crossed into the NAGLU-deficient mice and changes in the pSyn pathology, disease progression and lifespan evaluated. The same approach could be applied to the SGSH-deficient mice.

Example 2: Investigating the Genetic Variation Underlying the Age-Dependent and Alzheimer's Disease (AD)-Associated Decline in the Autophagy-Lysosome Pathway (ALP)

This example describes identification of the genetic variation that underlies the dysfunction of the autophagy-lysosomal pathway (ALP) involved in Alzheimer's disease (AD) pathogenesis.

Although multiple in vitro and in vivo studies suggest that autophagy lysosome pathway (ALP) dysfunction contributes to the pathogenesis of AD, the genetic variation underlying the age-dependent and AD-associated decline in ALP function is not well understood. Rare functional variants in AD-causing genes and multiple AD risk genes cause ALP dysfunction. Studies on single ALP genes in isolated populations support the genetic overlap between AD and lysosomal storage disorders (LSD). However, a systematic and comprehensive evaluation of the contribution of genetic variation within the general population of each gene in the ALP to the risk of developing AD and its role in AD pathogenesis has not been completed. To address this gap in the current knowledge, the studies described herein can identify and prioritize rare functional variants with large effect size in genes of the ALP that are associated with risk of developing AD. As described herein, an integrative framework coupling computational methods and experimental data can be used to validate the functional effect of selected ALP genes both in vitro and in vivo. First, the burden of rare functional variants in each gene of the ALP from 33,350 Non-Finnish European controls is compared with 2,000 AD cases and 3,000 controls. The results in additional independent samples including 2,000 AD cases and 2,000 controls are replicated along with 10,000 publicly available samples from the Alzheimer's disease sequencing project (ADSP). Secondly, cell-based assays are used to examine the effect of the selected variants in candidate ALP genes associated with AD risk on enzyme activity, protein stability and/or mRNA levels and its impact on lysosome function. The effect of validated functional variants on amyloidogenesis and Aβ degradation is examined. Finally, a quantitative and qualitative pathological survey of spontaneous development of AD pathology is performed in hemizygous or knockout models of the candidate ALP genes associated with AD risk. The effect of gene-dosage of the candidate ALP genes on Aβ plaque burden is also measured in a well-characterized mouse model of AD. The studies outlined herein can uncover novel ALP genes associated with AD. The experiments can provide greater insight into the mechanism of ALP dysfunction in AD pathogenesis and establish the basis for repurposing treatment strategies that are currently in place for Lysosomal Storage Disorders for the potential treatment of AD.

The goals of the studies described herein are to identify the genetic variation that underlies the dysfunction of the autophagy-lysosomal pathway (ALP) involved in Alzheimer's disease (AD) pathogenesis. These studies incorporate an innovative integrative framework that couples computational methods and experimental data to validate the functional effects of selected ALP genes both in vitro and in vivo. The experiments outlined herein can uncover novel ALP genes associated with AD. The experiments can provide greater insight into the mechanism of ALP dysfunction in AD pathogenesis and establish the basis for repurposing treatment strategies that are currently in place for Lysosomal Storage Disorders for the potential treatment of AD.

Age is the largest risk factor for the development and progression of Alzheimer's disease (AD). At the cellular level, aging decreases the degradative capacity of the autophagy-lysosome pathway (ALP). Although multiple in vitro and in vivo studies suggest that ALP dysfunction results in defective clearance of aggregated proteins contributes to the pathogenesis of AD, the genetic variation underlying the age-dependent and AD-associated decline in ALP function is not well understood. Rare functional variants in AD-causing genes and multiple AD risk genes cause ALP dysfunction. Studies on single ALP genes in isolated populations support the genetic overlap between AD and lysosomal storage disorders (LSD). However, a systematic and comprehensive evaluation of the contribution of genetic variation within the general population in each gene of the ALP to the risk of developing AD and its role in AD pathogenesis has not been completed.

To address this gap in the current knowledge, studies are described herein to identify and prioritize rare functional variants with large effect size in genes of the ALP that are associated with risk of developing AD. The integrative framework coupling computational methods and experimental data described herein can be used to validate the functional effect of selected ALP genes both in vitro and in vivo. The feasibility of the studies described herein is supported by the unbiased approaches that have previously uncovered rare variants in a limited number of ALP genes (PLD3, GRN, CTSF, and SORL1) that are overrepresented in both familial and sporadic AD. Thus, an analysis of all ALP genes is expected to reveal an enrichment of rare functional variants in AD patients compared to the variation found in the general population. The studies described herein overcome the current spurious associations resulting from stratified populations present in studies on isolated populations, and provides the complementary functional characterization at both variant and gene levels in vitro and in vivo.

(I) Identify ALP Genes Enriched with Rare Functional Variants in AD

It is hypothesized that untested rare functional variants in genes of the ALP affect the risk of developing AD. To identify these risk variants, whole exome sequencing (WES) data from 33,350 controls [Exome Aggregation Consortium (ExAC) database, Non-Finnish Europeans] is analyzed to determine baseline genetic variation in each gene of the ALP from individuals of European ancestry. Next, gene-based analyses of ALP genes in 2,000 AD cases and 3,000 controls that are in-house are performed by combining exome-chip and WES data. The results are replicated in independent samples including 2,000 AD cases and 2,000 controls along with 10,000 publicly available samples of WES data from the Alzheimer's disease sequencing project (ADSP). After collapsing rare variants, an enrichment of predicted functional variants with a large effect size (OR>2.5) in at least 12 lysosomal genes has been identified (see results).

(II) Determining the Functional Effects of Selected Candidate Genes of the ALP on AD Pathogenesis In Vitro It is hypothesized that novel ALP genes associated with AD risk play a role in AD pathogenesis in vitro. Cell-based assays are used to examine the effect of the selected variants in candidate ALP genes associated with AD risk on enzyme activity, protein stability and/or mRNA levels and its impact on lysosome function. The effect of validated functional variants on amyloidogenesis and Aβ degradation is examined. A novel role for the protein, CSPα, encoded by the DNAJC5 gene as a functional lysosomal-associated protein has been previously discovered. In addition, compelling data has been gathered showing that CSPα plays a role in APP processing and amyloidogenesis (see results).

(III) Determining the Functional Effects of Selected Candidate Genes of the ALP on AD Pathology In Vivo It is hypothesized that novel ALP genes associated with AD risk play a role in AD pathogenesis in vivo. A quantitative and qualitative pathological survey of spontaneous development of AD pathology is performed in hemizygous or knockout (KO) NAGLU, NPC1, and DNAJC5 mice at three time points defined by the time of the development of the intrinsic pathology. The effect of gene-dosage of NAGLU, NPC1, and DNAJC5 genes on Aβ plaque burden is measured in a well-characterized mouse model of AD.

The experiments described herein can uncover novel ALP genes associated with AD. They can provide greater insight into the mechanism of ALP dysfunction in AD pathogenesis, knowledge that is currently lacking and that promises to yield novel therapeutic targets. The studies described herein can establish the basis for repurposing treatment strategies that are currently in place for LSDs for the potential treatment of AD.

Significance

In the human genome there are at least 430 genes associated with the autophagy-lysosomal pathway (ALP) (38 autophagy genes, 161 autophagy regulator genes, 64 lysosomal genes and 167 lysosome regulator genes). Mutations in 38% of all ALP genes (157 genes) cause a Mendelian disease (OMIM), of which the most studied are the classic lysosomal storage disorders (LSD). There are at least 50 distinct LSDs that, as a group, occur with a frequency of ~1 in 7,700 live births. LSDs are generally considered pediatric disorders and are typically caused by complete loss-of-function (LoF) mutations. However, adult-onset forms of LSDs carrying hypomorphic variants have been reported. LSDs are monogenic disorders but can display complex clinical features. In fact, approximately 75% of LSDs have a clinically significant neurological component.

There is a significantly high rate of coexistence of complex and Mendelian diseases indicating that the genes and pathways perturbed in the Mendelian disorders also play a role in the etiology of the corresponding complex diseases. Collectively, nearly 20% of genes implicated in Mendelian phenotypes also either contain or are nearest to a variant responsible for a genome-wide association study (GWAS) signal of a complex trait. In contrast, ~15% of all genes overall underlie a Mendelian phenotype, suggesting that genes implicated in Mendelian phenotypes are enriched in GWAS signals. Nearly, 35% of the ALP genomic regions have been associated with a GWAS trait (GWAS catalogue). In fact, 18.5% of genes in the ALP pathway play a role in both Mendelian and common diseases. Approximately 22% are genes that cause LSD. Although multiple lines of evidence (in vitro and in vivo) suggest that AD shares a molecular mechanism with LSD, the genetic variation underlying the AD-associated dysfunction in ALP is not well understood.

The leading hypothesis regarding the cause of AD is derived from genetic studies of age-related and early onset disease, both of which implicate increased production and aggregation of the amyloid-beta (Aβ) peptide. A complementary hypothesis suggests that defective clearance of pathogenic proteins, including Aβ, could be responsible for AD in patients with no mutations in Mendelian AD genes. Endosomal-lysosomal and autophagic dysregulation occurs in AD patients and AD mouse models. Massive neuronal accumulation of autophagic vacuoles (AVs) has been found in brains of AD patients and in mice treated with lysosome inhibitors or in cathepsin-deficient mice. Lysosomal hydrolases are also strongly upregulated in neurons of AD patients. In addition, the lysosome also plays an important role in normal and abnormal APP processing and subsequent amyloidogenesis. Impairment of lysosomal function in vitro results in changes in Aβ production. Exposure to ammonium chloride or bafilomycin A1 reduces Aβ secretion. Treatment with lysosomal protease inhibitors reduces production of amyloidogenic APP fragments within lysosomes. Lysosomal enzymes and lysosome-associated proteins levels are altered in the cerebral spinal fluid (CSF) of AD patients. All these findings support the hypothesis that cumulative "hits" to multiple sites within the ALP in AD cause selective failures that impair clearance of pathogenic proteins.

Figure 5:
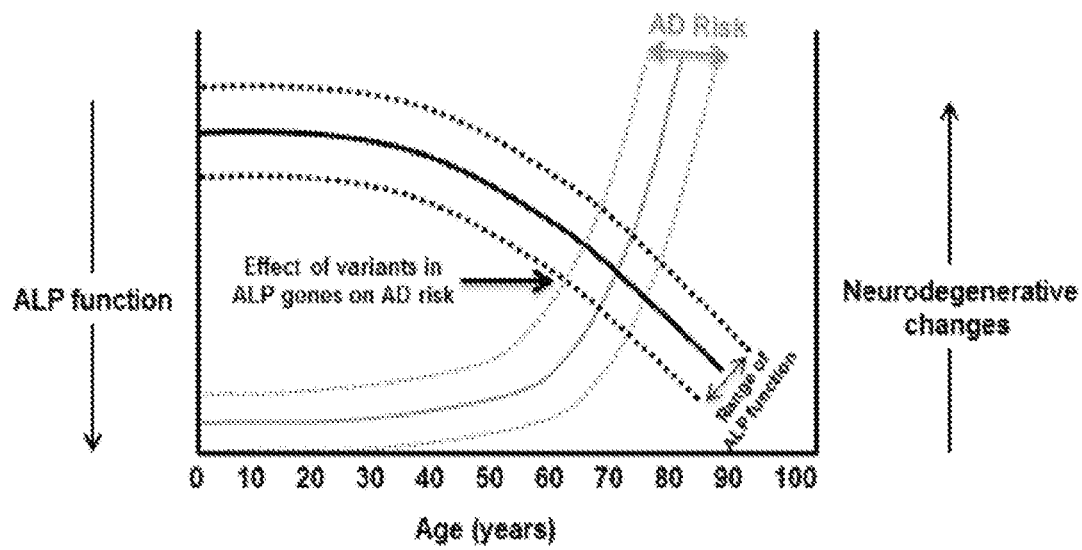

Rare variants in LSD-causing genes such as CSTD, NPC1 and NPC2 increase the risk for AD in selected populations. In addition, studies in mice deficient of LSD-causing genes revealed a distinctive role of each gene in APP processing and amyloidogenesis. Mice deficient in NPC1, CLN3 and HEXB genes increase both α-CTF/δ-CTF and Aβ40/42 levels. Mice deficient in IDUA, SGSH, GBA and TPP1 genes increase intracellular APP/Aβ levels without Aβ plaques. Mice deficient in IDUA and SGSH genes result in a three-fold increase in Aβ40 compared to controls with no detectable Aβ42 levels. Mice deficient in ASAH1 and PPT1 genes reduce intracellular APP/Aβ with no plaques. However, a systematic and comprehensive evaluation of the contribution of genetic variation within the general population in each gene of the ALP to the risk of developing AD and its role in AD pathogenesis has not been completed (see e.g., FIG. 5).

Newborn screening studies have shown that there is a ten-fold range difference in the levels of the lysosomal enzyme activities reported in healthy humans. Heterozygous carriers of disease-causing variants in GBA, NPC1, GALC, GAA, GLA and IDUA genes exhibit significantly lower levels of enzyme activity than controls. In addition, heterozygous carriers of disease-causing variants in NPC1 exhibit significant metabolic abnormalities downstream of the primary pathway affected in Niemann-Pick patients. To date, there appear to be no systematic studies focused on the long-term consequences of such metabolic alterations and ALP dysfunction. However, few studies suggest that heterozygous carrier of disease-causing variants have higher risk of neurodegenerative diseases.

The research described herein can address multiple gaps in the current knowledge. First, whole exome sequencing (WES) data from a large database is used to determine an actual baseline genetic variation in each gene of the ALP for individuals of European Ancestry (EA). Secondly, the cumulative allele frequency of rare functional variants in each gene of the ALP is analyzed in AD cases to identify candidate genes that affect the risk of developing AD. Finally, the role of these candidate genes is validated in the pathogenesis of AD in vitro and in vivo. By identifying specific defects in ALP genes in AD, multiple therapeutic strategies currently in place for the treatment of the LSDs including gene therapy, enzyme replacement, oral small-molecule substrate reduction therapy, small-molecule chaperones and pharmacological remediation of autophagy pathways can be taken advantage of for the potential treatment of AD.

Innovation

The experiments outlined herein are innovative in their design to define the genetic variation associated with the well-known dysfunction in the ALP associated with AD, as well as to understand the effects of rare functional variants in ALP genes associated with AD in vitro and in vivo.

The data provides compelling evidence that supports the feasibility of the studies described herein. An enrichment of predicted rare functional variants in several candidate genes including NAGLU, NPC1, PPT1, GLB1, and DNAJC5 genes (described below) has been identified. These results include novel ALP genes associated with AD risk and open new avenues into the mechanism of ALP dysfunction in AD pathogenesis. For instance, based on this genetic analysis, a novel role has been found for the protein encoded by the DNAJC5 gene, CSPα, as a functional lysosomal-associated protein. In addition, compelling evidence is provided to show that CSPα plays a role in APP processing and amyloidogenesis.

The current state of the knowledge about the genetic variations in ALP genes in AD is dominated by limited studies reporting spurious associations in isolated populations with a very low rate of replication. The studies described herein can overcome that limitation because the design systematically and comprehensively evaluates the contribution of genetic variation in each gene of the ALP to the risk of developing AD in a very large sample that represents the general population. Therefore, data is used from two large publicly available databases of WES data, from the Exome Aggregation Consortium (ExAC) (n≈61,000) and the Alzheimer's Disease Sequencing Project (ADSP) (n≈10,000), in addition to in-house WES and Exome-chip data, for a total of AD cases (n≈4000) and controls (n≈5000). Using these multiple datasets, a set of analyses has been designed that would resolve the genetic architecture of the well-known dysfunction in the ALP associated with AD.

There is a general assumption that dysfunction of the ALP is associated with AD. However, there is no consensus about the role of ALP genes in the AD pathogenesis. This in part is due to the fact that most of the studies have focused on a small number of genes (e.g., Cathepsin D) using classic expression systems (neuron-like cell lines) that may not be the proper cell type. In addition, these studies do not assess the proper AD pathway (APP processing vs tau aggregation). The studies described herein incorporate an innovative integrative framework that couples computational methods and experimental data to validate the functional effects of selected ALP genes both in vitro and in vivo. Cell-based assays complement biochemical data, live-cell assays, RNAseq data from specific brain cell types in mice, genome-wide gene expression data in human AD cases and controls, genome-wide gene expression data from human AD cases at different stages, genome-wide gene expression data from human at different ages, genome-wide gene expression data from AD mouse models correlated with Aβ plaque and the neurofibrillary tangles burden.

Most of the studies using knockout mice of ALP genes have tried to understand their role in AD pathogenesis by focusing on the AD pathology. However, the pathology that results from the deficient gene is rapid and associated more with a LSD. This complicates the interpretation of those results and most of time there is not a clear rationale. The studies described herein can evaluate vulnerable brain regions for AD pathology including Aβ plaque burden at different time points in hemizygous mice from selected ALP genes based on the results of the genetic analysis supported by the cell-based assays.

Experimental Approach

Project Overview

Multiple in vitro and in vivo studies suggest that ALP dysfunction contributes to the pathogenesis of AD. However, the genetic architecture underlying the AD-associated decline in ALP function is not well understood. To address this issue, an integrative approach combining the analyses of predicted rare functional variants in genes of the ALP in large datasets (both in-house databases and publicly available) is used to prioritize the candidate genes in the ALP with evidence of involvement in AD risk (see e.g., section (I)). The main expected result from the analyses in section (I) is the identification of genes rather than single variants associated with AD. Next, the functional effect of selected variants is validated in its respective encoded protein. In section (II), the effect of a partial loss-of-function of selected genes associated with AD risk can be determined in cell-based assays. This process is integrated with an extensive data mining process from both human diseases and mice models to collect biochemical, pathological and cellular functional evidence that support the role of selected candidate ALP genes in AD pathogenesis. In this interconnected process, computational data defines and refines the experimental data and vice versa (see e.g., section (II)). Finally, it can be determined whether the selected ALP genes are associated with AD pathology in vivo (see e.g., section (III)). The experiment outlined here is based on the genetic and cell-based findings as well as on the availability of the mouse models. In addition, it can be determined whether a partial loss-of-function of selected ALP genes associated with AD modify AD pathology (Aβ plaque in vulnerable brain regions). Mice with both total absence (−/−) and hemizygous (+/−) for selected genes are examined in order to distinguish if the AD pathology is a consequence of the intrinsic pathology in these mouse models. In addition, the development of AD pathology is examined in aged hemizygous (+/−) mice for selected genes. The effect of gene-dosage of selected ALP genes on Aβ plaque burden is also measured in a well-characterized mouse model of AD. The expected results from these experiments are the confirmation of the contribution of single ALP genes to the AD pathology in vivo.

Data

A list of autophagy-lysosomal gene sets (~430 genes) has been manually compiled and derived by mining existing annotations in public databases (see e.g., bioinformatics analyses) and literature. The best studied models of ALP dysfunction are the LSDs. LSDs are a genetically heterogeneous group of Mendelian diseases caused by LoF homozygous, compound heterozygous mutation or copy number variation (CNVs). The incidence of LSDs in different populations (mostly isolated populations) is very low. Therefore, the expected frequency of LSD-causing variants in the general population is extremely low. The ExAC database was used, which contains >60,000 sequenced exomes, to estimate the frequency of LSD-causing variants in a broad sampling of ethnicities. Only three X-linked LSD-causing genes (GLA, IDS and LAMP2) are loss-of-function (LoF) intolerant (pLI≥0.9). The number of LoF mutations observed in forty-three additional LSD-causing genes is lower than the expected under a neutral model. LSD-causing genes exhibit a wide range of protein-altering variants from thirty-two in the NPC2 gene to 423 in the GAA gene. Many of these variants are predicted LoF, possibly behaving as hypomorphic variants in a heterozygous state. This high number of protein-altering variants may explain the wide range in the level of the lysosomal enzyme activities reported in humans. Interestingly, the GAA gene exhibits the highest number of protein-altering variants in ExAc and the wider variability in enzyme activity.

Most of the AD samples are from European Ancestry. Therefore, the analyses focused on LSD-causing genes (n=46) in the non-Finnish sample (~33,000 individuals). There are ~2740 LSD-causing variants reported in the NCBI ClinVAr database. There are 288 LSD-causing variants annotated in the ExAc sample: 76% are missense variants, 10% affect the alternative splicing and 12% are non-sense mutations. Most of LSD-causing variants are predicted to be deleterious (87%) by SIFT and damaging (84%) by polyphen2. Most (73%) of LSD-causing variants are located in a highly conserved nucleotide (GREP score >4). This is an underestimation of the frequency of LSD-disease causing variants in the EA population because CNVs were not included. CNVs are a common cause of LSD. In addition, several LoF variants reported in ExAc were found that are not classified as LSD-causing variants in the NCBI ClinVAr database. LSD-causing variants were found in each LSD-causing gene, but the number of LSD-causing variants differs from one found in the HYAL1 gene to twenty found in ARSA gene. The cumulative allele frequency (cMAF) of these variants (number of heterozygous carriers) per gene ranges from $1.50E^{-05}$ in the CSTD gene to 0.003 in the NPC2 gene. Therefore, a cMAF threshold of $1 \times 10^{-3}$ was applied as a conservative upper bound because variants more frequent than this in the general population would not be expected to be highly penetrant LSD-causing variants.

The discovery sample consisted of WES data from 523 unrelated AD cases and 386 controls. TABLE 5 shows the top LSD-causing genes associated with AD.

Figure 6:
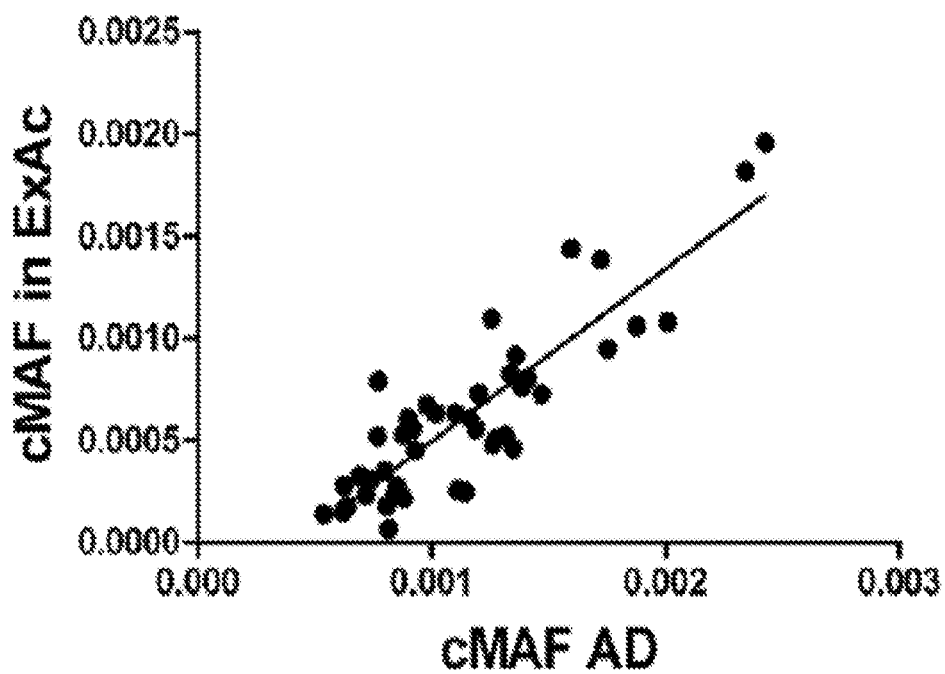

These were analyzed using the inclusion and exclusion criteria defined based on the features that define a LSD-causing variant in the ExAc sample. As expected, the gene-specific cMAF from the ExAC data set (European, non-Finnish ancestry) were highly concordant with the cMAF from the in-house AD databases (of European ancestry) (see e.g., FIG. 6). Variants in each LSD-causing gene (n=46) that met the inclusion criteria were collated by gene: 82% are missense variants, 15% affect the alternative splicing and 3% are non-sense mutations. The number of variants included in the analysis varies per gene from five in the ARSB gene to 21 in the NPC1 gene. The burden of rare protein-altering variants (cMAF) was compared with the burden observed in controls and in ExAC. For most of these genes, there is an excess of variation in cases as compared with controls but only nominal associations were found with the SGSH gene ($p=4.2 \times 10^{-3}$; OR=3.7, 95% CI 1.4-9.6) and CLN8 gene ($p=1.0 \times 10^{-2}$; OR=8.9, 95% CI 1.1-68.1) (see e.g., TABLE 5). When compared with the cMAF of the ExAc sample, fourteen genes passed a very stringent multiple test correction threshold $p<1.0 \times 10^{-4}$ (0.05/450) and thirteen LSD-causing genes passed the gene-level significant threshold $p<2.4 \times 10^{-6}$ (0.05/20,000) (see e.g., TABLE 5). Next, two additional AD cohorts were used to replicate the findings listed in TABLE 5 including 1722 AD cases where the data was obtained using the Human-Exome chip and WES data from 1394 Familial AD (FAD) cases (see e.g., TABLE 6).

TABLE 6

Replication findings in two additional samples of sporadic AD (Exome-chip) and familial AD (FAD).

| Gene | OR | 95% CI | P value In Exome chip | OR | 95% CI | P value In FAD |
| --- | --- | --- | --- | --- | --- | --- |
| MFSD8 | 4.1 | 2.0-5.7 | 1.11E−19 | 2.1 | 1.5-3.2 | 6.53E−07 |
| CTNS | 3.2 | 1.9-4.3 | 5.93E−09 | 4.6 | 3.4-6.2 | 4.03E−28 |
| GNPTAB | 2.0 | 1.3-2.3 | 1.35E−07 | 2.9 | 2.4-3.7 | 9.48E−25 |
| NPC1 | 3.9 | 2.2-6.6 | 4.95E−07 | 2.9 | 2.4-3.7 | 9.48E−25 |
| DNAJC5 | 4.2 | 2.1-8.2 | 7.33E−06 | 3.7 | 2.2-6.3 | 2.26E−07 |
| CLN3 | 3.4 | 2.0-6.7 | 1.98E−05 | 4.1 | 2.6-5.9 | 6.38E−13 |
| CLN8 | 2.6 | 2.35-4.6 | 2.49E−03 | 4.5 | 3.3-6.7 | 9.61E−20 |
| MANBA | 1.1 | 0.5-2.3 | 0.84 | 3.1 | 2.5-4.3 | 2.33E−17 |
| SGSH | 1.1 | 0.7-1.6 | 0.72 | 2.5 | 2.1-3.3 | 2.79E−17 |
| MAN2B1 | 1.4 | 1.07-1.7 | 0.01 | 1.9 | 1.5-2.1 | 3.79E−15 |

TABLE 5

Summary of the rare variants found in LSD-causing genes in AD compared with in-house controls and ExAc (non-Finnish Europeans)

| Gene | CMAF AD cases | cMAF control | OR | 95% CI | P value | cMAF ExAc | OR | 95% CI | P value |
| --- | --- | --- | --- | --- | --- | --- | --- | --- | --- |
| CTNS | 0.002549 | 0.001943 | 1.3 | 0.7-2.3 | 0.35 | 0.000744775 | 3.4 | 2.3-4.8 | 6.24E−13 |
| MAN2B1 | 0.002124 | 0.001943 | 1.1 | 0.7-1.8 | 0.72 | 0.000722655 | 2.9 | 2.1-4.0 | 2.88E−12 |
| MFSD8 | 0.000956 | 0.000486 | 2.0 | 0.5-7.4 | 0.3 | 0.000113117 | 8.5 | 4.0-17.7 | 9.97E−12 |
| GLB1 | 0.001133 | 0.000354 | 3.2 | 0.9-11.2 | 0.05 | 0.000202702 | 5.6 | 3.1-9.8 | 2.01E−11 |
| GALNS | 0.001466 | 0.000686 | 2.1 | 1.0-4.5 | 0.04 | 0.000449601 | 3.3 | 2.2-4.8 | 5.21E−10 |
| NAGLU | 0.001243 | 0.000907 | 1.4 | 0.5-3.4 | 0.49 | 0.000253135 | 4.9 | 2.8-8.6 | 1.2E−09 |
| CLN3 | 0.000662 | 0.000598 | 1.1 | 0.4-3.1 | 0.8 | 0.000120555 | 5.5 | 2.8-9.2 | 1.6E−09 |
| GNPTAB | 0.001544 | 0.001495 | 1.0 | 0.5-2.0 | 0.9 | 0.000618561 | 2.5 | 1.9-4.4 | 2.32E−08 |
| SGSH | 0.001839 | 0.000498 | 3.7 | 1.4-9.6 | 0.004 | 0.000617873 | 3.0 | 1.9-4.4 | 2.45E−08 |
| CLN8 | 0.00169 | 0.000185 | 8.9 | 1.1-68.1 | 0.01 | 0.000376975 | 4.3 | 2.4-7.8 | 7.58E−08 |
| NPC1 | 0.001205 | 0.000788 | 1.5 | 0.8-2.8 | 0.18 | 0.000473737 | 2.5 | 1.7-3.6 | 3.26E−07 |
| TPP1 | 0.001147 | 0.00095 | 1.2 | .6-2.5 | 0.62 | 0.000368295 | 3.1 | 1.9-5.0 | 7.00E−07 |
| DNAJC5 | 0.000637 | 0.000432 | 1.5 | 0.2-21.2 | 0.47 | 5.0388E−05 | 12.6 | 2.7-57.7 | 2.36E−06 |
| MANBA | 0.00869 | 0.000353 | 2.5 | 0.7-8.9 | 0.17 | 0.000242187 | 3.6 | 1.9-6.8 | 2.66E−05 |

TABLE 6-continued

Replication findings in two additional samples of sporadic AD (Exome-chip) and familial AD (FAD).

| Gene | OR | 95% CI | P value In Exome chip | OR | 95% CI | P value In FAD |
| --- | --- | --- | --- | --- | --- | --- |
| NAGLU | — | — | — | 4.1 | 2.4-5.2 | 5.4E−13 |
| TPP1 | 0.7 | 0.4-1.1 | 0.16 | 2.1 | 1.7-2.8 | 8.01E−10 |
| GLB1 | 1.1 | 0.9-1.1 | 0.5 | 2.3 | 1.7-3.3 | 2.12E−07 |
| GALNS | 1.2 | 1.1-2.0 | 0.311 | 1.5 | 1.2-2.01 | 0.00193 |

As expected, only six genes were replicated in the sample with Exome-chip data but, most of the associations were replicated in the sample of FAD (see e.g., TABLE 6). The most likely explanation for this discordance is the coverage depth of the data. The best example is the result in the NAGLU gene, from which no variant met the inclusion criteria with data from Exome-chip (see e.g., TABLE 6). Worthy of notice is the fact that the association found in the replication samples is in the same direction and the effect size is the same.

One of the ALP genes that was replicated in three samples is the DNAJC5 gene, which encodes cysteine string protein alpha (CSPα) and, its mutations cause an adult onset LSD. CSPα localized to the plasma membrane in neurites. It had diffuse cytoplasmic localization in a neuron-like cell type (N2A), but also a fraction of endogenous CSPα co-localized with LAMP2 in the soma (see e.g., FIG. 7A). Subcellular fractionation showed that a significant proportion of CSPα co-sediments with another lysosome marker (LAMP1) (see e.g., FIG. 7B). These results suggest that endogenous CSPα is a lysosome-associated protein. As expected, there was a significantly higher level of LysoTracker signal in cells expressing a LSD-causing mutation (p.L115R) compared to the empty vector. In contrast, CSPα-WT-transduced cells had significantly reduced LysoTracker signal compared to cells expressing CSPα-p.L115R or the empty vector (see e.g., FIG. 7C) suggesting that CSPα may be involved in the regulation of the lysosomal pH. Expression of a LSD-causing mutation (p.L115R) resulted in significant elevations of intracellular and secreted lysosomal enzymes compared to the empty vector (see e.g., FIG. 7D and FIG. 7E). In contrast, overexpression of CSPα-WT resulted in a significant reduction of intracellular and secreted lysosomal enzymes compared to cells transduced with the empty vector or CSPα-p.L115R (see e.g., FIG. 7D and FIG. 7E) suggesting that lysosomal trafficking and exocytosis are affected by CSPα.

Figures 8A, 8B, 8C:
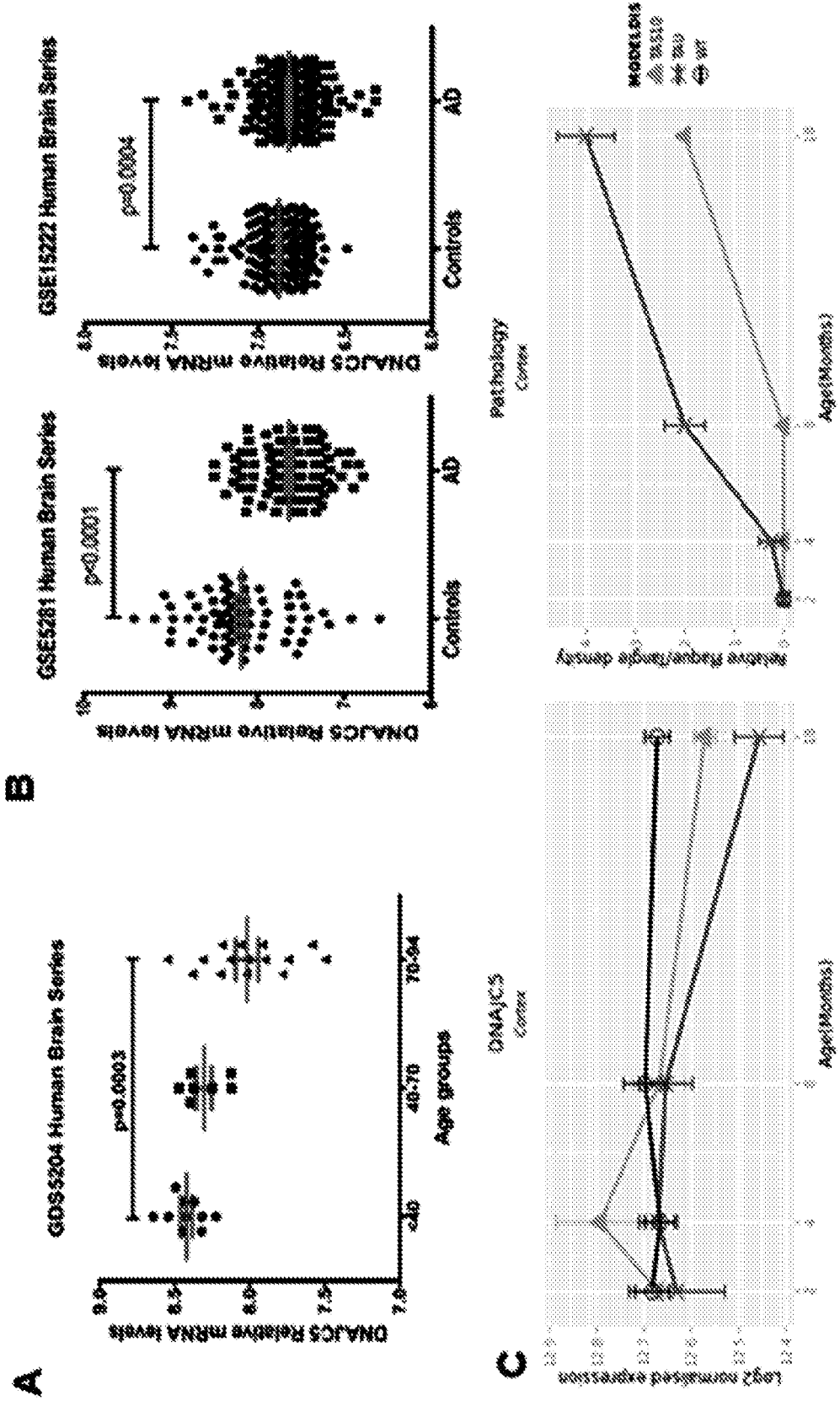
FIG. 8A-FIG. 8C is a series of dot and line plots showing changes in DNAJC5 transcript levels with age, AD status, and AD in mouse models (note: DNAJC5 is the gene designation that encodes the lysosomal protein, CSPα). (A) DNAJC5 transcript levels in neuropathologically normal human brain samples at different ages. (B) DNAJC5 transcript levels in neurons from AD cases compared to controls in two different studies. (C) DNAJC5 transcript levels in cortex of mouse models of AD (TAU, p.P301L, blue line); (APP, p.K670N/p.M671L, red line) and wild-type mouse (black line) from 2 to 18 months. Graphs on the right represent the relative plaque density (APP mice) and tangle density (Tau mice) from 2 to 18 months.

DNAJC5 transcript is highly expressed in neurons and in regions of the brain that are most susceptible to AD pathology. A reduction in the DNAJC5 transcript levels with age was found in neuropathologically normal brain samples from the frontal cortical regions of young (<40 yrs), middle aged (40-70 yrs) and normal aged adults (70-94 yrs) (p=0.0003; GEO database; Series GDS5204) (see e.g., FIG. 8A). DNAJC5 transcript levels were significantly lower in AD cases compared to age-matched controls in a laser-capture micro-dissected non tangle-bearing neurons of AD and controls (p=<0.0001, see e.g., FIG. 8B, Left graph) (GEO database; Series GSE5281). This finding was replicated in a different study (GEO database; Series GSE15222) (see e.g., FIG. 8B Right graph). It was also found that the DNAJC5 transcript levels exhibit an age-dependent reduction and are inversely proportional to the development of AD pathology (Right graph, see e.g., FIG. 8C) in cortex of two AD mouse models (TAU, p. P301L, Blue line in FIG. 8C) and (APP, p.K670N/p.M671L, Red line in FIG. 8C) compared to the levels in wild-type mice (Black line in FIG. 8C). All these results suggest that CSPα is likely involved in AD pathogenesis.

Figure 9A:
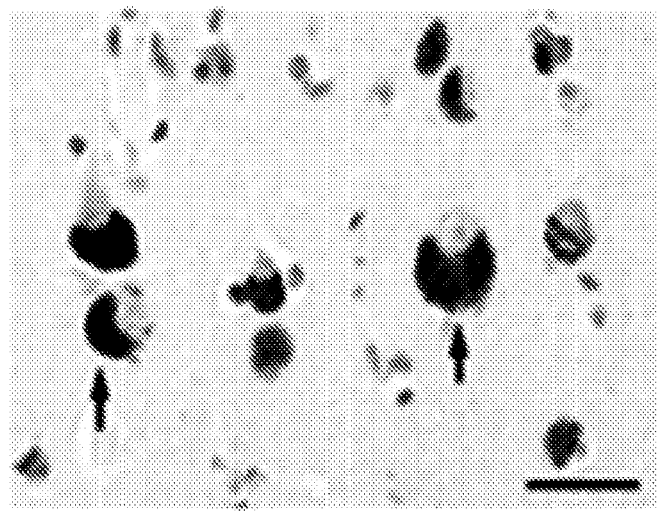
FIG. 9A-FIG. 9D is a series of images and bar charts showing that CSPα affects APP processing in vivo and in vitro. (A) Representative images of APP/Aβ (4G8) staining of the cerebral cortex of an adult onset LSD patient (ANCL). (B) Representative overlapping confocal images of APP/Aβ (4G8, in red) with LAMP1 (green) in N2A cells transduced with empty vector, specific shRNA and ANCL-causing mutation p.L115R (p.L115R). (C) Aβ40 and Aβ42 levels in conditioned media (Media) and cell homogenates (cells) from N2A cells transduced as in (B). (D) Immunoblot (left) and quantitation (right) of soluble APPα fragment in the overlying medium, full-length APP and its α- and β-CTFs and of CSPα in N2A cells transduced as in (B).
Figure 9B:
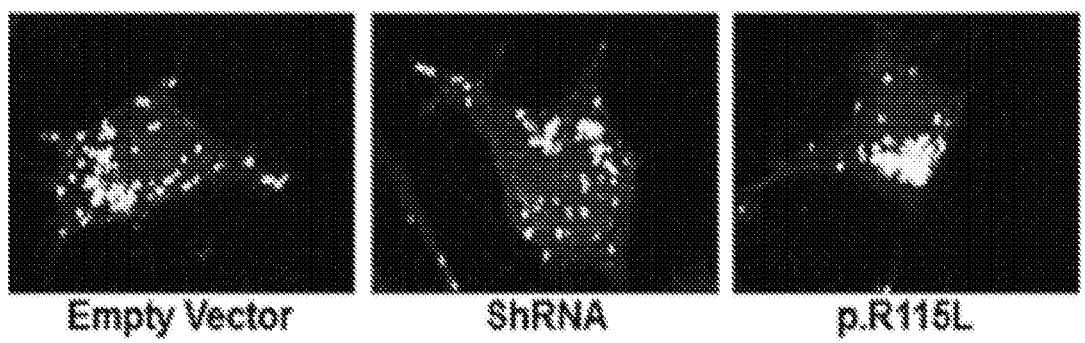

Brains of patients with LSD-causing variant (p.L115R) in CSPα exhibit no Aβ plaques or neurofibrillary tangles. However, histological analysis revealed a remarkable intracellular accumulation of APP/Aβ (antibody 4G8) in cortical neurons (Human LSD, see e.g., FIG. 9A). Therefore, the role of CSPα in amyloidogenesis was tested in vitro. APP/Aβ immunoreactivity co-localized with lysosome markers in N2A695 cells (Empty vector, see e.g., FIG. 9B). Knocking-down the expression in N2A695 cells of CSPα reduced the Aβ/APP levels and its co-localization with Lamp-1 (ShRNA, see e.g., FIG. 9B). N2A695 cells stably expressing the LSD-causing variant in CSPα exhibited intracellular accumulation of APP/Aβ (p.L115R, see e.g., FIG. 9B). N2A695 cells expressing hCSPα-p.L115R released significantly higher Aβ40 and Aβ42 levels than cells transduced with an empty vector to the media (see e.g., FIG. 9C, left graph). Conversely, N2A695 cells expressing specific shRNA-CSPα secrete significantly less extracellular Aβ40 and Aβ42 levels (see e.g., FIG. 9C, left graph). N2A695 cells expressing hCSPα-p.L115R accumulated more Aβ40 intracellularly than when transduced with the empty vector (see e.g., FIG. 9C, right graph). There were no differences in the levels of Aβ42 across the different groups (see e.g., FIG. 9C, right graph). Cells transduced with shRNA-CSPα exhibited a reduction in the levels of full-length APP, α-CTF/β-CTF, CSPα and sAPPα (see e.g., FIG. 9D, graph). In hCSPα-p.L115R exhibited an increase in full-length APP and α-CTF/β-CTF with no changes in the levels of sAPPα (see e.g., FIG. 9D, graph).

These results suggest that a novel and unexpected role of CSPα in amyloidogenesis and probably in AD pathogenesis has been uncovered.

Research Design and Methods
(I) Identify the ALP Genes Enriched with Rare Functional Variants in AD It is hypothesized that untested rare functional variants in genes of the ALP affect the risk of developing AD. As described herein, integrative approach combining the analyses of predicted rare functional variants in genes of the ALP in large datasets (both in-house databases and publicly available) can be used to prioritize the candidate genes in the ALP with evidence of involvement in AD risk.

Defining an Allele Frequency Threshold for Rare Variation

Using the information obtained from the analyses of the LSD-causing variants including highest MAF of LSD-causing variants, SIFT, Polyphen2 or GERP scores, the following inclusion criteria was defined: 1) a call rate >98% in AD cases, 2) Maf <0.01% per variant, 3) only likely protein-altering variants in designated canonical transcripts annotated by ExAc or Ensemble as missense, 4) frame-shift, 5) nonsense, 6) variants affecting the splice donor and acceptor regions, 7) if there is evidence of pathogenicity in the NCBI ClinVar database and is located in the 3' or 5' UTR region. Variants not found in ExAC, or synonymous, intronic, 3' or 5' UTR variants not present in NCBI ClinVar database or Maf >0.01%, miscalling in ExAC and ClinVar were excluded. To ensure that population-specific variants did not have a confounding effect on this analysis, individuals were selected based on the principal component results.

Study Population

WES has been obtained from 2,000 individuals. Access to exome-chip data is available from a total of 3,000 individuals from the Knight-ADRC. There is also available access to the clean and imputed GWAS data for the ADNI and Knight-ADRC samples. There is DNA available for the Alzheimer's disease Neuroimaging Initiative (ADNI; 600 cases and 200 controls), the NIA-LOAD (867 unrelated cases and 645 unrelated controls), the Knight Alzheimer's Disease Research Center (Knight-ADRC; 779 cases, 555 controls) and a Spanish dataset (167 cases and 534 controls). A description of these datasets has been published previously. Each of the cases received a diagnosis of dementia of the Alzheimer's type using criteria equivalent to the National Institute of Neurological and Communication Disorders and Stroke-Alzheimer's Disease and Related Disorders Association for probable AD. Controls received the same assessment as the cases but were cognitively normal. All individuals were of European descent, and written consent was obtained from all participants. Data were downloaded from ExAC (version 0.3.1, March 2015). Only genes with a high proportion of coding regions covered to a median sequence depth of >30× and only high-quality (PASS filter) variants were included in the analyses. Data were downloaded from ADSP. The Discovery Phase dataset contains WGS data on 584 subjects from 113 families, and pedigree data additional 853 (682 Cases [510 Non-Hispanic, 172 Hispanic]), and 171 Hispanic Control subjects from families that are multiply affected with AD.

Whole Exome Sequencing Data

There is WES from 2,000 individuals. Exome-enrichment is performed using the SureSelect 52 Mb Target Enrichment System (Agilent). DNA was sequenced by paired-end reads (Illumina HiSeq2000). The alignment and the variant calls are performed using Novoalign and SAM tools. These methods have been used before with good specificity and sensitivity to genotype calls. The GWAS data is used for quality control of the sequence calls. In the studies a concordance rate >98% was found between exome-sequencing calls and GWAS data.

Human Exome Chip Data

There is access to exome-chip data from a total of 3,000 individuals from the Knight-ADRC. Illumina and Affymetrix have developed inexpensive, off-the-shelf genotyping chips referred to as "exome chips" which contain variants within exons that have been reported at least twice in the exome variant server database. Most of the coding variants included in the exome-chip are very rare variants, MAF<0.01. These arrays provide a quick and simple method to analyze low frequency variants. However, these arrays do not include all the coding variants.

Exome-Chip Quality Control (QC)

Genotyping calls were made using the best practices for calling Illumina Exome-chip data described elsewhere. The QC for the exome-chip is similar to the QC steps used for GWAS, but variants were not removed because of low MAF. The raw data is present for the exome-chip, and the clusters are checked for any significant associations at the single variant or gene level.

Burden Tests

To accommodate the effect of rare variants with moderate effect size, validated statistical methods are used that have been developed to analyze association with rare variants. Briefly, gene-based methods collapse the rare variants within a region to a single value and then test the association between rare variants within a region and the trait of interest. The sequence kernel association test (SKAT) is used to test for association between status and rare variants within a gene-region. The advantage of SKAT over other gene-based methods is that SKAT can account for variants with effects in different directions within the same gene and adjust for confounding covariates. Odds ratios with 95% confidence intervals are calculated for the alternative allele compared to the most common allele. If an association is detected in the allelic test, further analyses determine whether the additive or dominant model present a better fit. An independent case-control sample is used to replicate the findings from the discovery data set. Analysis for each different dataset is performed separately. Joint-analysis is performed to combine p-values and OR. This method has been successfully used in previous studies to identify novel genes for AD.

GWAS Data

Genome-wide genotyping has been previously generated for most (>90%) of the samples. The genotyping was performed with a variety of arrays, including the NeuroX-chip (WU and PPMI). Prior to association analysis or imputation, all samples and genotypes undergo stringent quality control (QC). Genotype data is cleaned by applying a minimum call rate for SNPs and individuals (98%) and minimum minor allele frequencies (MAF=0.02). SNPs not in Hardy-Weinberg equilibrium ($P<1\times10^{-6}$) are excluded. Testing for unanticipated duplicates and cryptic relatedness is performed using pairwise genome-wide estimates of proportion identity-by-descent.

Imputation

The 1,000-genome project data (phase 3, released November 2014) and Impute2 software is used to impute up to 6 million SNPs. SNPs with an $R^2<0.5$, a minor allele frequency (MAF)<0.02, out of Hardy-Weinberg equilibrium ($p<1\times10^{-6}$), a call rate <95%, or a Gprobs score <0.90 are removed. In previous GWAS and imputation processes a total of 6,815,690 SNPs passed the QC process.

Population Structure

Given the availability of GWAS data, Eigenstrat is used on the samples together with HapMap samples as anchors to confirm self-reported race/ethnicity. The three first principal component factors (PCs) from the population stratification analysis are included in the analysis as covariates.

Data Storage and Management

Up to 150 GB of processed data is generated for each exome, and three days are necessary to align the sequence and to perform the SNP calling. It is therefore necessary to have large and secure data storage systems. All the data generated is saved in a Linux server with 3 terabytes (TB) of space. Once the data are processed and the sequence variants detected by exome sequencing are confirmed by genotyping, efficient and effective methods for data management, quality control, cleaning, annotation, and analysis are applied that have been developed and used for other exome-sequencing projects.

Bioinformatic Analyses

The following publicly available databases are used for complementary analyses: Online Mendelian Inheritance in Man (OMIM), Exome Variant Server ExAC, GWAS catalogue, GERP4, ClinVar database, and Human Autophagy Database.

Power Analyses

To determine the power to detect genetic variants associated with age at onset, analyses were run using Proc Power in SAS. The analysis was run using minor allele frequencies ranging from 0.05 to 0.50, OR 1.2 to 3.6 and sample size between 4,000 and 7,000. Alpha was adjusted to $5\times10^{-8}$ for single variant analyses and $5\times10^{-6}$ for gene-based analyses. Based on these results, there is approximately 80% power to detect effects for OR >1.19 (or <0.84).

Anticipated Results

The feasibility of the studies described herein are supported by the previous unbiased approaches that have uncovered rare variants in a limited number of ALP genes (PLD3, GRN, CTSF, and SORL1) that are overrepresented in both familial and sporadic AD. The objective of (I) is to identify genes associated with AD risk out of the ~430 genes in the human genome belonging to the ALP. The studies, focused on LSD-causing genes (n=46) demonstrate that at least 12 additional novel genes in the ALP associated with AD risk with large effect size can be identified (see e.g., TABLE 5) and that these can be replicated in additional samples with the proper depth in coverage (see e.g., TABLE 6). These results support the hypothesis that the variation in ALP genes is higher in AD patients than the variation found in the general population. Therefore, it is expected that novel associations of AD risk with a number of the remaining ~384 ALP genes that are included in the analyses are uncovered.

The results and power calculation suggests that there is sufficient power to detect an average odds ratio of >2.7 in gene-based analysis. If the association of ALP genes fails to replicate with a case control design, an endophenotype design could be used. Thus, the effect of variants in ALP genes on CSF biomarker levels for AD could be determined by performing a single-variant and gene-based analyses for LSD genes and each of the following CSF biomarker: t-tau, p-tau and Aβ42. In order to evaluate if regulatory genomic regions of the ALP genes could be involved in the risk of developing AD, the association of ALP genes in data from GWAS previously published by the International Genomics of Alzheimer's Project (I-GAP) consisting of a total 25,580 AD cases and 48,466 controls could be analyzed. A complementary approach would be to check if ALP genes affect the age at onset (AAO), thus, data from a previously published GWAS investigating genetic variants associated with age at onset for AD could be checked.

Using whole exome sequencing, it is predicted that most of the protein-altering variants can be identified. However, it has become evident that complementing WES data with RNAseq data could identify more potential functional variants in particular variants affecting the splice donor and acceptor regions. RNAseq data is currently being generated from 500 brain tissue samples of AD cases and control from which WES data has already been obtained, which allows for analysis of the impact of variants affecting the splice in ALP genes in AD pathogenesis. Whole genome sequencing of 100 individuals is also being generated to perform more detailed analyses of the role of the non-coding genomic regions of the genome.

(II) Determine the Functional Effects of Selected Candidate Genes of the ALP on AD Pathogenesis In Vivo It is hypothesized that novel ALP genes associated with AD risk play a role in AD pathogenesis in vitro. As described herein, cell-based assays can be used to examine the effect of the selected variants in candidate ALP genes associated with AD risk on enzyme activity, protein stability and/or mRNA levels and its impact on lysosome function. The effect of validated functional variants on amyloidogenesis, APP processing and Aβ degradation can be examined as described below.

Methodology and Analysis

It is beyond the scope of the studies described herein to evaluate all the variants of each ALP gene associated with AD identified in (I). Therefore, the top 3-5 variants identified in (I) in genes that match the following criteria are prioritized. 1) There is an available (commercially or through collaborators) mouse model that could be used for obtaining primary neurons/microglia cells and performing in vivo experiments outlined in (III). 2) There are available biochemical and/or cell-based assays for the detection of changes in its function. 3) There are collaborators at Washington University in Saint Louis with enough expertise to assist with the analyses of the data. Thus, taking into account the strength of the data from both the discovery and replication samples and all the above criteria, these three genes NAGLU, NPC1 and DNAJC5 have been selected. The expertise and appropriate collaborations are available to perform all of the experiments described herein.

Cloning Selected ALP Genes

It is important to characterize the effects of wild-type and mutant candidate genes on protein expression and normal function. The cDNA clone is purchased from the candidate genes from Origene or Invitrogen. Selected variants are engineered using a site-directed mutagenesis kit (QuikChange II (Agilent Technology, Santa Clara, CA, USA).

Lentivirus Generation

Wild-type and mutant cDNAs are subcloned into a pLenti-III-PGK Vector (Applied Biological Materials Inc, Richmond, Canada), which carries a puromycin-resistance gene. The resultant lenti vectors along with plasmids coding for VSV-G, Gag-Pol, and Rev are co-transfected into HEK-293T packaging cells as previously described. Viral supernatant is collected according to previously published protocols. N2A695 cells are cultured with unconcentrated viral supernatants for 24 hours and cells are selected with 5 μg/ml of puromycin for four weeks. A knockdown model using a lentiviral vector carrying specific shRNA for the NAGLU, NPC1 and DNAJC5 genes is also generated in N2A695 cells.

Cell-Based Assays

Figures 7A, 7B, 7C, 7D, 7E:
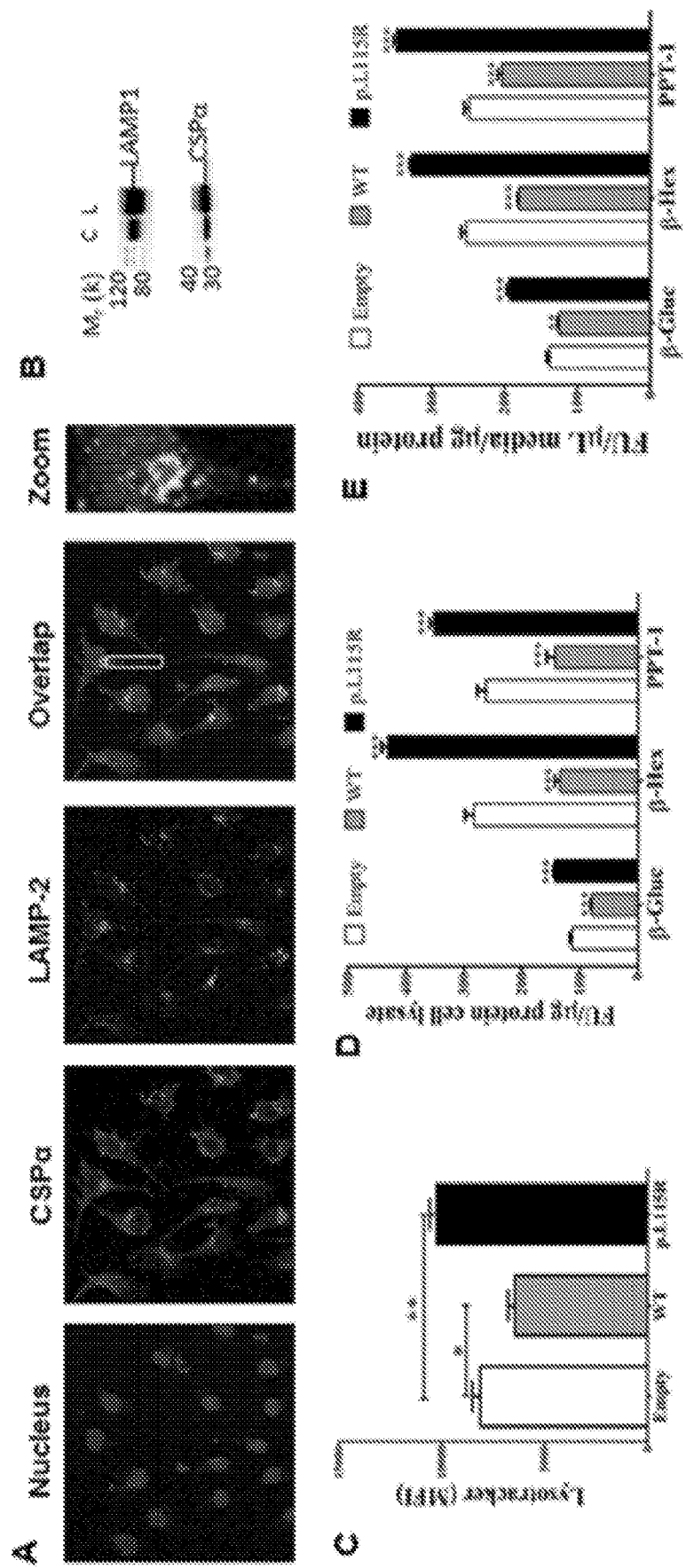
FIG. 7A-FIG. 7E is a series of images and bar charts depicting the role of the lysosomal protein, CSPα, in lysosome function. (A) Representative picture of immunostaining of N2A cells (immortalized neuronal cell line). (B) Representative Western blot of LAMP-1 and CSPα of the cytoplasmic and lysosome enriched fractions of N2A cells. (C) Lysotracker signal in N2A cells stably expressing nothing (empty), hCSPα-WT (Wild-Type), or CSPα-p.L115R (p.L115R, the disease-causing mutation in adult-onset neuronal ceroid lipofuscinosis, ANCL). (D) Graphs shows the activities of the lysosomal enzymes, PPT-1, β-gluc, and β-Hexa measured in cell homogenates of cells stably expressing nothing (empty), hCSPα-WT (WT), or hCSPα-p.L115R (p.L115R). (E) Graphs show the lysosome enzyme activities of PPT-1, β-gluc, and β-Hexa measured in the culture medium (secreted).

The following cell lines are used: human embryonic kidney (HEK293-T), N2A, and N2A695 (mouse neuroblastoma cells that stably express human APP695 WT (termed N2A695), which are routinely used to study APP processing) (see e.g., FIG. 7A). Primary neurons or microglia cells from NAGLU, NPC1 and DNAJC5 hemizygous or knock-out-mouse models are also transduced with variants identified in (I). Primary neuron culture is performed as previously described.

Effects of mRNA and Protein Levels

Quantitative real-time PCR using specific primers is used to test the effect of the selected variants on mRNA levels and splicing. Western Blot is done with the following antibodies anti-CSPα (ADI-VAP-SV003-E, ENZO Life Sciences) Anti-NAGLU (ab137685, Abcam) and anti-NPC1. A fluorometric assay is performed as previously described for the NAGLU activity (see e.g., FIG. 7D and FIG. 7E). Briefly, 4-methylumbelliferyl-N-acetyl-α-glucosaminide cleavage is measured at 448 nm emission and 365 nm excitation in a Hitachi F-2000 fluorescence spectrophotometer (Hitachi, Pleasanton, CA) using a standard curve ranging from 0.02 to 5 mM of 4-methylumbelliferone (Sigma, St. Louis, MO). NPC-1 specific assays are performed as previously published.

Lysosome Function

Lysotracker is used to quantify the number of acidic compartments per cell using flow cytometry (see e.g., FIG. 7C). Lysosomal pH is measured by LysoSensor Yellow/Blue dextran (DND-160). Lysosomal membrane integrity is monitored by Acridine orange. Subcellular fractionation is performed using the Lysosome Enrichment Kit for Tissue and Cultured Cells (Thermo Scientific), LAMP1, Rab7 and EEA1 are used as control for lysosome, late and early endosome markers (see e.g., FIG. 7B). This assay is complemented by confocal images of immunofluorescence to co-localize the selected protein within lysosomes (LAMP-1 or -2), early endosome (EEA1), late endosome (Rab7), plasma membrane (Flotillin) markers (see e.g., FIG. 7A).

Cell Lysate-Based Lysosomal Enzyme Activity

Intra- and extracellular secondary elevation in lysosomal enzyme activity is performed by fluorometric assays for PPT-1, β-gluc, and β-Hexa (see e.g., FIG. 7D and FIG. 7E).

Pharmacological Modulation of Macroautophagy

Transduced cells are treated with activators and inhibitors of the autophagy system (Rapamycin, Torin1, Torin 2, methylamine, brefeldin A and Spautin-1), and chaperone-mediated autophagy (AR7). Western blot of LC3 and p62 are used as indirect indicators of macroautophagy activation.

Lysosomotropic agents such as Chloroquine, ammonium chloride (NH$_4$Cl), and Leupeptin are used as positive controls.

Effects on APP Processing and Turnover

N2A695 cells are treated with protein synthesis inhibitor cycloheximide to quantify APP half-life. Protein and transcript levels of APP-processing machinery (PSEN1, Nicastrin, ADAM10, ADAM17 and BACE1) are measured by Western blot and RT-qPCR respectively. To measure the dynamic effects of selected ALP genes on cell surface APP, APP at the plasma membrane is labeled using a non-membrane-permeable cleavage biotin derivative (Sulfo-NHS-SS-Biotin) at 4° C. Cell surface APP is measured by streptavidin IP and APP immunoblotting as previously published.

Aβ40/Aβ42 Levels

Figure 9C:
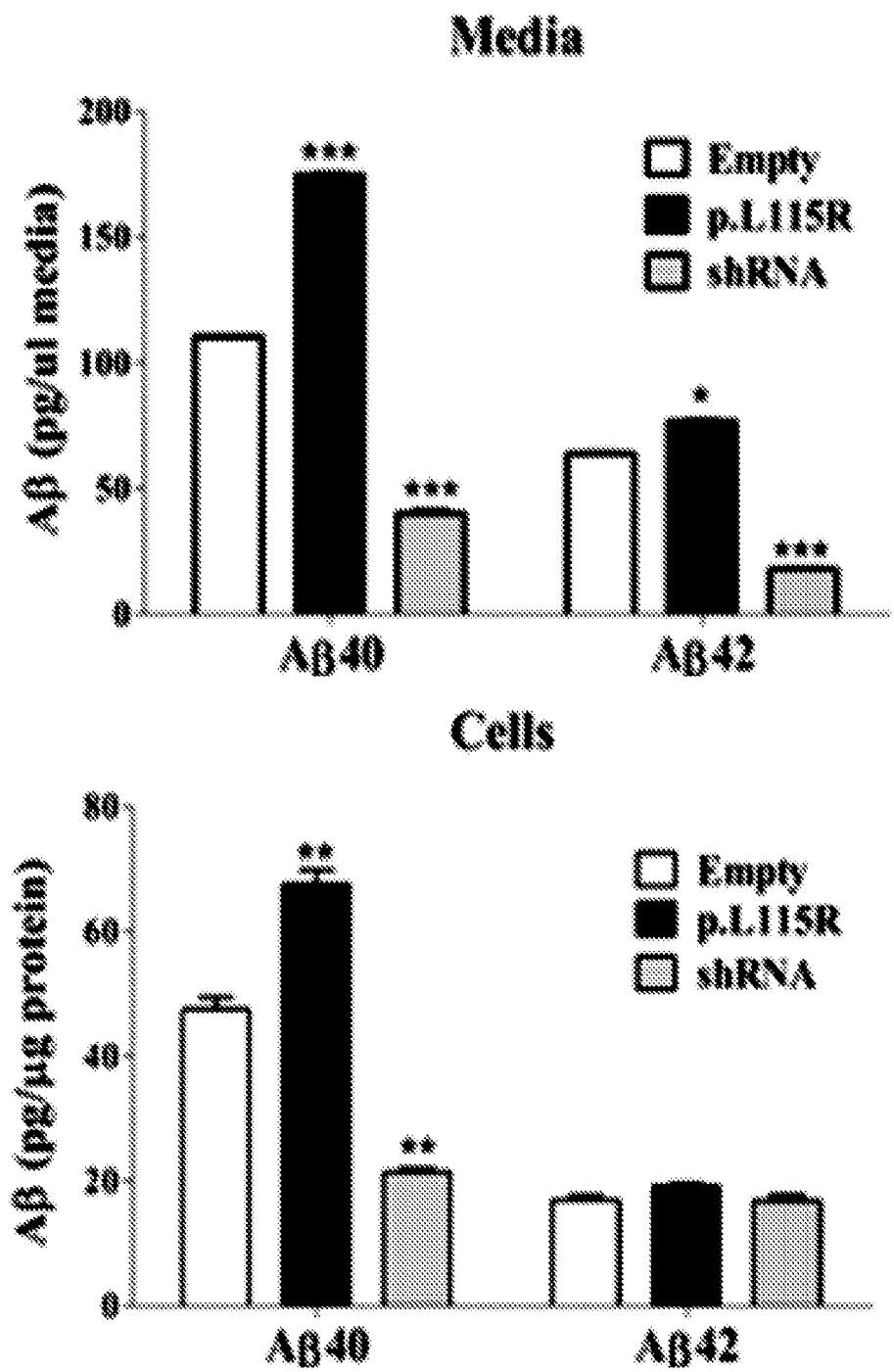
Figure 9D:
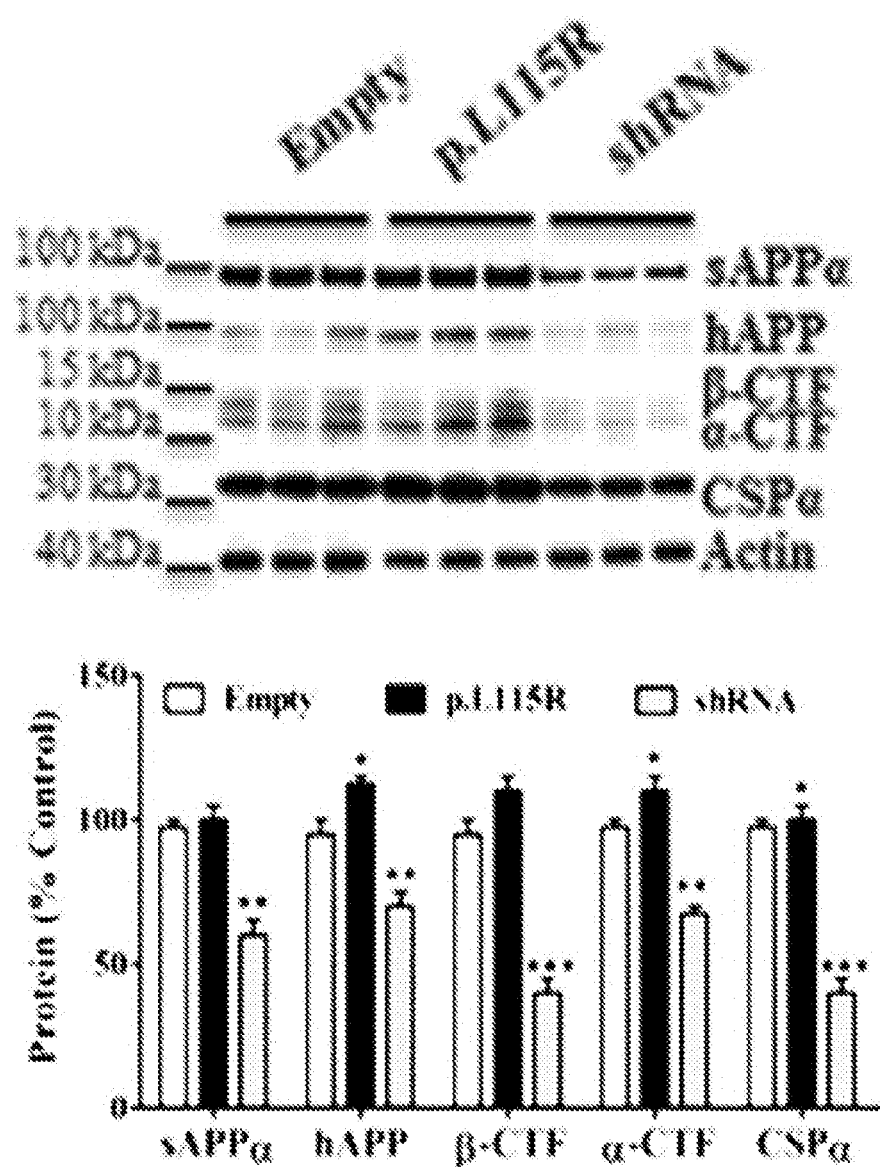

Aβ species in cell lysates and media from transduced N2A695 cells is detected by sandwich ELISA as previously published (see e.g., FIG. 9C). Aβx-40 and Aβx-42 peptides are captured with mouse monoclonal-coating antibodies HJ2 (anti-Aβ35-40) and HJ7.4 (anti-Aβ37-42). HJ5.1 (anti-Aβ13-28), a biotinylated antibody targeting the central domain, or HJ3.5 (anti-Aβ1-13), which targets the N-terminal amino acids, are used as the detecting antibody, followed by streptavidin-poly-HRP-40 (Fitzgerald Industries).

α/β-Secretase Processing of APP

The APP cleavage products (sAPPβ and sAPPα) in cell supernatant and intracellular fragments (α- and β-CTFs) are measured by Western blot. The following antibodies 22C11, and CT695 are used to characterize the full-length, and α- and β-CTF fragments (see e.g., FIG. 9D).

Aβ Uptake/Degradation

Primary microglial cells transduced with selected variants or specific shRNA are treated with 250 nM synthetic Aβ42 for 2 hours. To measure Aβ uptake, Aβ42-treated cells are washed and trypsinized to remove surface-bound Aβ, lysed, and intracellular Aβ42 are measured by sandwich ELISA (see e.g., FIG. 9C). Aβ uptake rate is measured by varying the time that cells are exposed to Aβ42: 0, 5, 10, 30 min and 1, 2, 4, 8, 12, 24 hrs. To measure Aβ degradation, cells are treated with 250 nM synthetic Aβ42 for 2 hours, thoroughly washed, and incubated in fresh media. Cells are then washed, trypsinized, lysed, and intracellular Aβ42 is measured after 0, 2, 4, 8, 12, 24 hours. Intracellular Aβ half-life is calculated assuming first-order kinetics as previously published.

Bioinformatic Analyses

The following publicly available databases are used for complementary analyses: Gene Expression Omnibus, Brain RNA-seq2, Gene expression data from the Mouse Dementia Network (Mouse DemNet), PolyPhen2, SIFT, Human Splicing Finder, and Mouse Genome Informatics.

Anticipated Results

Based on the specific design described here for detecting predicted rare functional variants and confirmatory results on DNAJC5, it is anticipated that ALP gene risk variants identified in (I) cause a partial loss of function and alter lysosome function. It is expected that 5-20% residual activity will be detected in the function of these proteins. It is also anticipated that over expression, down regulation or splicing change variants of ALP genes affect APP metabolism and amyloidogenesis. Computational resources and mining data from the literature can be used to carefully choose the cell type and functional assays including Aβ or tau metabolism assays for each ALP gene. In addition, it is expected that the experiments described herein allow for evaluation of the effects of selected variants in ALP genes on neuron and microglia cell survival.

If a robust difference between WT and risk variants in NAGLU, NPC1 and DNAJC5 genes is not observed, this may be due to over-expression masking subtle changes in function. Thus, AD risk variants that cause small changes that may manifest in disease over a lifetime but could be a challenge to see an effect in the days of a cell culture. Therefore, APP mutations could be overexpressed or the ALP function could be pharmacologically altered. Primary neurons from AD mouse models such as 5XFAD transgenic mice (34840-JAX) could be used and transduced with selected variants in NAGLU, NPC1 and DNAJC5 genes and the effect on APP processing and tau aggregation tested. iPSc-derived neurons from AD patients carrying variants in NAGLU, NPC1 and DNAJC5 genes could be used and, the effect of such variants on APP metabolism could be compared with controls. Genome-editing methods such a CRISPr technology could be used to introduce the selected variants in ALP genes and perform the functional assays described above. N2A695 cells or primary neurons or glia cells stably expressing selected variants in NAGLU, NPC1 and DNAJC5 genes could be treated with sublethal doses of lysosomotropic agents or autophagy inhibitors and the effects on APP processing measured.

The following step after identifying variants in NAGLU, NPC1 and DNAJC5 that affect both the risk and the pathogenesis of AD in vitro is to take advantage of the progress in therapies for LSD. Treatment strategies such as enzyme replacement, substrate reduction, molecular chaperones, or pharmacological modulation of the ALP are utilized and their effect on AD pathogenesis assays tested in vitro.

(III) Determine the Functional Effects of Selected Candidate Genes of the ALP on AD Pathology In Vivo It is hypothesized that novel ALP genes associated with AD risk play a role in AD pathogenesis in vivo. As described herein, a quantitative and qualitative pathological survey of spontaneous development of AD pathology can be performed in hemizygous or knockout (KO) NAGLU, NPC1, and DNAJC5 mice at three time points defined by the time of the development of the intrinsic pathology. The effect of gene-dosage of NAGLU, NPC1, and DNAJC5 genes on Aβ plaque burden can also be measured in a well-characterized model of early onset familial AD, 5XFAD transgenic mice (34840-JAX).

Methodology and Analysis

It is beyond the scope of the experiments described herein to evaluate each ALP gene associated with AD identified in (I). Therefore, inclusion criteria has been defined for the selection of the mouse model that is selected for the follow-up in vivo studies: it must be available (commercially or through collaborators), there must be a functional assay, robust brain pathology, robust behavioral changes, ideally a short lifespan and validation in vitro of the effect on amyloidogenesis.

Mice Groups 3 groups (18 mice/group) of NAGLU, NPC1, and DNAJC5 mice are generated for this experiment: 1) normal litter mates, 2) hemizygous (+/−) mice, and 3) deficient (−/−) mice at three different time points. The median lifespan of NAGLU KO mice is 12 months. However, brain pathology is evident as early as 3 months. Thus, AD pathology is surveyed at 2 months, 4 months and 8 months in the NAGLU mice. The median lifespan of DNAJC5 KO mice is 60 days and brain pathology is evident as early as 30 days. Thus, AD pathology is surveyed at 21 days, 30 and 40 days.

Median lifespan of NPC1 KO mice is 75 days, so AD pathology is surveyed in NPC1 KO mice at 30, 50 and 70 days.

The AD mouse model 5XFAD is also used. 5XFAD mice accumulate intraneuronal Aβ-42 at six weeks of age. The amyloid deposition in hippocampus appears at two months and propagates throughout the brain in older mice. To further ascertain whether NAGLU, NPC1, and DNAJC5 deficiency could exacerbate an existing amyloidogenic process, NAGLU, NPC1, and Cspα mice are crossed with 5XFAD transgenic mice. 3 groups (27 mice/group) are generated for this experiment. The effect of gene-dosage on Aβ plaques burden is determined by measuring Aβ-42 brain levels at three weeks, amyloid deposition at 1 month and two months in 5XFAD/NAGLU (+/−), 5XFAD/NPC-1 (+/−) and 5XFAD/DNAJC5 (+/−) mice. 3 groups (27 mice/group) are generated for this experiment. The effect of total absence of the selected genes in 5XFAD pathology is assessed by analyzing 5XFAD/NAGLU (−/−), 5XFAD/NPC-1 (−/−) and 5XFAD/DNAJC5 (−/−) mice at the same time points described for assessing the intrinsic pathology of each KO mouse. The experimenter is blind to genotype and age of the animals during the histological analyses. Each mouse is assigned to a random ID number.

Amyloid Plaque Quantification

Fifty micrometer thick vibratome brain sections are collected every 300 μMs from the rostral anterior commissure to caudal hippocampus. For plaque imaging, sections are stained with ThioS or immunostained with HJ3.4 anti-Aβ antibodies. High-resolution digital images of the stained brain slices are obtained with the NanoZoomer Digital Scanner (Hamamatsu Photonics). The total area of plaque coverage is measured using NIH ImageJ in the region of the hippocampus or piriform cortex and expressed as percentage total area for each slice. Results from n=4 sections are averaged to represent each animal.

Aβ40/Aβ42 Levels

To detect total Aβ in the hippocampus of young mice, dissected tissue is sequentially homogenized in PBS followed by RIPA buffer to obtain detergent-soluble Aβ at an age when plaques are not observed, and samples are pooled for analysis. In aged mice (when plaques are abundant), hippocampal tissues are sequentially homogenized in PBS followed by 5 M guanidine in TBS, pH 8.0 (to extract fibrillar and membrane-bound Aβ). Aβ40/Aβ42 levels are quantified with ELISA as described in (II).

Anticipated Results

Based on the large effect size that the genetic analyses are reporting, it is anticipated that in hemizygous and mice deficient of the candidate ALP genes that have been found to be associated with AD risk and validated in in vitro assays, more AD pathology is found than in the respective age-matched controls. It is also expected to see a gene-dose effect on AD pathology; hemizygous and KO mice NAGLU, NPC1, and DNAJC5 genes should accelerate and worsen the load of Aβ plaque burden in 5XFAD mice.

If AD pathology is not found in the brains of hemizygous and deficient mice, AAV2/9 vectors carrying the most significant variant validated in (II) are generated and injected stereotaxically in the hippocampus of the hemizygous mice and the presence of AD pathology is reevaluated. If AD pathology is found, a rescue experiment could also be tried by injecting AAV2/9 vector carrying the wild-type copy of the deficient gene and retesting for the AD pathology. Another way to test the role of NAGLU, NPC1, and DNAJC5 genes in AD pathology is injecting AAV2/9 vectors carrying validated shRNA/RNAi to knock it down in 5XFAD transgenic mice and test if there is an effect on AD pathology.

Therapies for LSD, such as enzyme replacement, substrate reduction, molecular chaperones, and pharmacological modulation of the ALP could be tested for their effect on AD pathogenesis assays in vivo. Combining the results from the studies described herein and the availability of a fluorometric assay for NAGLU activity and mass spectrometry assays for NPC1 biomarkers, one could screen CSF, plasma, serum or dry blood spots of large cohorts of AD cases and controls to detect specific defects that can be used as biomarkers for AD. To determine whether NAGLU, NPC1, and DNAJC5 deficiency could exacerbate tau pathology, NAGLU, NPC1, and DNAJC5 mice are crossed with mice expressing tau, p. P301L (015815-JAX). Tau, p. P301L mice develop tangles in the cortex by 4 months of age. Therefore, tau levels are measured at one month of age in mice crossed with NAGLU, NPC1, and DNAJC5 mice. The conditions to measure the burden of hyperphosphorylated tau in mice brains have been optimized. The quantification of tau brain levels by ELISA has also been previously optimized. Genome-editing methods such a CRISPr technology are used to generate knock-in mice of the variants in ALP genes with the strongest effect on in vitro assays. These knock-in mice are also crossed with AD mouse models including 5XFAD and mice expressing tau, p. P301L.

Example 3: Identifying Genetic Variation Underlying Dysfunction of the Autophagy-Lysosomal Pathway (ALP) in Alzheimer's Disease (AD)

This example describes the role of rare functional variants in genes of the autophagy-lysosome pathway in Alzheimer's disease.

Although multiple in vitro and in vivo studies suggest that autophagy lysosome pathway (ALP) dysfunction contributes to the pathogenesis of AD, the genetic variation underlying the age-dependent and AD-associated decline in ALP function is not well understood. Rare functional variants in AD-causing genes and multiple AD risk genes cause ALP dysfunction. However, a systematic and comprehensive evaluation of the contribution of genetic variation within the general population of each gene in the ALP to the risk of developing AD and its role in AD pathogenesis has not been completed. To address this gap in the current knowledge, described herein is a powerful approach to identify and prioritize rare functional heterozygous variants in genes of the ALP that are associated with risk of developing AD. An innovative integrative framework coupling computational methods and experimental data can be used to validate the functional effect of selected ALP genes both in vitro and in vivo. First, the burden of rare functional variants in each gene of the ALP from 33,350 Non-Finnish European controls is compared with 2,000 AD cases and 3,000 controls. The results are replicated in additional independent samples, including 2,000 AD cases and 2,000 controls along with 10,000 publicly available samples from the Alzheimer's disease sequencing project (ADSP). Secondly, biochemical and cell-based assays are used to fully characterize the functional impact of the selected genetic variants in candidate ALP proteins associated with AD. The effect of mutated proteins on ALP function and consequences on full-length APP levels, APP trafficking, Aβ generation in neurons and Aβ degradation by glial cells is examined. Finally, it can be determined whether haploinsufficiency of the NAGLU, NPC1, and DNAJC5 genes accelerates the AD pathology present in a well-characterized mouse model of AD. A quantitative pathological survey of the effect of inherited mild chronic lysosome impairment on AD-relevant phenotypes involving Aβ is performed. The experiments described herein can uncover novel ALP genes associated with AD. They can provide greater insight into the mechanism of ALP dysfunction in AD pathogenesis.

The goals of the studies described herein are to identify the genetic variation that underlies the dysfunction of the autophagy-lysosomal pathway (ALP) involved in Alzheimer's disease (AD) pathogenesis. The studies described herein incorporates an innovative integrative framework that couples computational methods and experimental data to validate the functional effects of selected ALP genes both in vitro and in vivo. The experiments outlined herein can uncover novel ALP genes associated with AD. They can provide greater insight into the mechanism of ALP dysfunction in AD pathogenesis.

Role of Rare Functional Variants in Genes of the Autophagy-Lysosome Pathway in Alzheimer's Disease Age is the largest risk factor for the development and progression of Alzheimer's disease (AD). Aging also decreases the degradative capacity of the autophagy-lysosome pathway (ALP). Although multiple in vitro and in vivo studies suggest that ALP dysfunction contributes to the pathogenesis of AD, the genetic variation underlying the age-dependent and AD-associated decline in ALP function is not well understood. The main hypothesis is that mild forms of inherited ALP dysfunction exacerbated by additional age-related ALP impairments contribute to the development of AD pathology. Accordingly, inherited ALP impairments in neurons can increase amyloid generation, whereas ALP impairments in glial cells can decrease their ability to degrade amyloid plaques. Thus, the balance between pro-duction and clearance determines Aβ levels and the propensity to develop amyloid plaques.

Small sample size studies focused on single coding variants in few ALP genes (e.g., Cathepsin D) in isolated populations and intronic "hits" from large genome-wide association studies (GWAS) (e.g., SQSTM1) support the role of genetic variants in ALP genes in the risk of AD. In addition, rare mutations in AD-causing genes (e.g., Presenilins) and functional coding variants in AD risk genes (e.g., SORL1) cause ALP dysfunction. The human genome encodes at least 430 genes associated with the ALP. However, a systematic and comprehensive evaluation of the contribution of coding variants in each gene of the ALP to the risk of developing AD has not been completed. As described herein, section (I) can address this gap.

Combining Whole-Exome sequencing (WES) data with a large database of AD cases and controls previously uncovered that rare variants in a putative ALP gene (Phospholipase D family, member 3, PLD3) are associated with AD risk. PLD3 is a transcription factor EB (TFEB)-responsive gene and seems to affect Amyloid Precursor Protein (APP) processing through a lysosome-mediated mechanism. There is data demonstrating an enrichment of predicted functional heterozygous variants in several additional lysosomal genes in late onset sporadic AD. In an effort to validate those associations, a complementary role for the synaptic chaperone, Cysteine string protein (CSPα) was discovered as a functional lysosomal-associated protein. In addition, data has been gathered showing that CSPα transcript levels are reduced in brains of AD patients and mouse models. Furthermore, mutations in CSPα affect autophagosome/lysosome fusion in vitro and affect Aβ generation in vivo. The genes encoding intracellular cholesterol transporter 1 (NPC1) and N-acetyl-alpha-glucosaminidase (NAGLU) are also associated with AD risk in these analyses. In addition, a significant increase was found in the NPC1 and NAGLU transcript levels with age in normal human brain samples. Interestingly, NPC1 and NAGLU transcript levels are also significantly higher in AD cases compared to age-matched controls. Those results support the feasibility of the studies described herein and suggest that haploinsufficiency caused by functional heterozygous variants in ALP genes affects the risk of developing AD possibly affecting APP metabolism, Aβ generation and Aβ degradation in vitro and in vivo.

(I) Identify ALP Genes Enriched with Rare Functional Variants in AD

Single-variant and gene-based analyses of all ALP genes (n=430) are performed in 4,000 AD cases and 5,000 controls in-house. The results are replicated in independent samples (5,000 AD cases and 4,500 controls) from the Alzheimer's disease sequencing project (ADSP). All ALP genes are analyzed using WES data from Non-Finnish Europeans (n=33,350) from the Exome Aggregation Consortium (ExAC) database to determine baseline genetic variation in each gene of the ALP from individuals of European ancestry.

(II) Determine the Functional Effects of Selected Candidate Genes of the ALP on APP Metabolism, Aβ Generation and Aβ Degradation In Vitro Biochemical and cell-based assays are used to validate the effect of the selected variants on protein function, protein stability and their impact on ALP function. The effect of validated functional variants on APP trafficking, APP half-life, APP processing machinery and Aβ generation is examined in primary neurons. Aβ uptake and degradation is tested in glial cells from deficient or hemizygous mice (NAGLU, NPC1, and DNAJC5 genes).

(III) Determining the Functional Effects of Haploinsufficiency in Selected Candidate ALP Genes on the Development of AD Pathology in Aged Mice It can be determined whether mild lysosome impairment accelerates the Aβ generation, plaque deposition, synaptic loss and gliosis in the 5XFAD mouse at early (4 months) and late stage (8 months of age) of the AD pathogenesis. A quantitative pathological survey of the effect of inherited chronic inherited lysosome impairment on AD-relevant phenotypes is performed in 24 months old mice in absence of FAD mutations.

These studies form the proof-of-principle basis for the genetic contribution to the ALP dysfunction associated with AD. This knowledge is currently lacking and can yield novel therapeutic targets.

Research Strategy
Significance

The autophagy-lysosomal pathway (ALP) is a major pathway for the degradation of intracellular organelles and aggregate-prone proteins. Autophagy, literally meaning 'self-eating', is an intracellular degradation pathway that is responsible for the digestion and recycling of nutrients via the lysosome. A bona fide functional autophagic response directs cytoplasmic material of endogenous or exogenous origin to degradation within lysosomes. Lysosomes play an important role in nutrient sensing and in signaling pathways that involve mammalian target of rapamycin complex 1 (mTORC1) kinase complex and transcription factor EB (TFEB), through a lysosome-to-nucleus signaling mechanism that controls cellular clearance and energy metabolism. ALP is an intracellular quality control system that plays a protective role against neurodegeneration, even in the absence of expression of any disease-associated mutant protein. The neuron-specific deletion of "core" autophagy genes (ATG5 and ATG7) causes accumulation of abnormal proteins, progressive neurodegeneration and premature mortality.

ALP Dysfunction in AD

While familial forms of AD are pathogenically driven by increased amyloid-β (Aβ) production, recent studies in late-onset sporadic AD patients demonstrate impaired clearance of Aβ. Thus, the balance between production and clearance determines Aβ levels and the propensity to develop amyloid plaques. The ALP "core" genes are transcriptionally downregulated during normal aging in the human brain. Strikingly, in contrast to normal aging, there is transcriptional upregulation of the ALP in the brains of AD patients, which may represent a compensatory attempt of the system to cope with the accumulation of abnormal proteins. There is a reduction in levels of beclin 1 (a multifunctional protein essential for autophagosome formation in the ALP), an increase in levels of rab5 and rab7 (small ras-related GTPase (rab) proteins that regulate trafficking of vesicles along endosomal-lysosomal pathways), and abnormal activation of macroautophagy (high LC3-II levels) and mTOR signaling (phosphorylated p70 S6 kinase) in sporadic AD brains as well as massive neuronal accumulation of autophagic vacuoles (AVs) and lysosomal dense bodies in dystrophic neurites. Neuropathological studies have also found that autophagy-lysosomal pathology in AD brain contributes to AD pathogenesis, however the underlying mechanisms are not well understood.

Inherited ALP Dysfunction Exacerbates AD Pathology

The changes in the ALP have been also found in multiple transgenic mouse AD models. Haploinsufficiency of beclin 1 in two AD mouse models (J20 and T41; hAPP751V171I, KM670/671NL) produced further disruption of their lysosomes, promoted intracellular and extracellular Aβ accumulation, and exacerbated neurodegeneration. The absence of the lysosomal neuraminidase 1 (NEU1) exacerbated the Aβ pathology in the AD model (5XFAD; APP KM670/671, I716V, V717I/PSEN1M146L/L286V). In contrast, overexpression of NEU1 reduced AD pathology. These results altogether suggest that changes in ALP "core" genes or lysosome proteins aggravate AD pathology.

Improving ALP Function Reduces Amyloid AD-Relevant Phenotypes

The APP/PS1 (APPK670M/N671 L/PS1 M146L) mice exhibit abnormal macroautophagy activation in vulnerable neuronal populations even before the extracellular deposition of Aβ. However, targeted expression of TFEB in both neurons and astrocystes reduced the Aβ plaques in the APP/PS1 mouse model. TFEB expression drives transcriptional upregulation of multiple lysosomal and trafficking genes and increases lysosome acidification and function. Activating lysosomal cysteine proteases (by deleting cystatin B) in an AD mouse model (TgCRND8; hAPPK670N/M671L/V717F) rescued autophagic-lysosomal pathology, reduced abnormal Aβ and ubiquitinated protein accumulations, decreased extracellular amyloid deposition and total brain Aβ40/42 levels, and prevented the development of deficits on learning and memory tests. Pharmacological activation of the lysosomal proteases reduced the Aβ42 levels, improved performance on cognitive tests and synaptic deficits in two AD mice models (J20 and APP/PS1). Pharmacological activation of the ALP (mTOR-inhibition) ameliorates cognitive deficits and alleviates the accumulation of β-amyloid in multiple AD models (J20; hAPP695, 751,770V171F, KM670/671NL), (3xTg-AD; APPSwe/TauP301L), (APP-PS1, APPswe/PSEN1dE9). These results show that global activation of the ALP or selective enhancements of lysosomal proteolysis both facilitate amyloid clearance in multiple AD mice models.

Aβ is Generated in the Endosomal-Autophagic-Lysosomal Compartments

Cellular studies suggest that the endosomal-lysosomal system is a major site of Aβ production. However, there is no consensus about where exactly Aβ is produced. Aβ is generated after inducing macroautophagy both in vitro and in vivo. The buildup of Aβ increases mTOR signaling, whereas decreasing mTOR signaling reduces Aβ levels, which suggests a negative feedback between the ALP activation and Aβ levels. Under autophagy activation, autophagic vacuoles become the cellular site with the highest γ-secretase activity. PSEN2 and Nicastrin (catalytically essential γ-secretase components) are located in the lysosome. In fact, PSEN1 regulates the lysosomal pH. Pharmacological impairment of lysosomal function in vitro results in changes in Aβ production. Changes in lysosomal pH reduces Aβ secretion. Lysosomal protease inhibitors reduce production of amyloidogenic APP fragments. All these studies suggest that the global lysosome function plays an important role in normal and abnormal APP processing and subsequent amyloidogenesis. Meanwhile, studies in mice deficient of specific lysosomal genes revealed a distinctive role of each gene in APP processing and Aβ production. All the evidence from human pathology, mouse and cellular models strongly suggest that deficits in autophagy induction occur early in disease but, lysosomal clearance deficits occur in more advanced stages of disease. However, it is not clear if the changes in the ALP are a cause, consequence or a modifying factor of the AD pathology.

Total Loss of Function in Human Lysosomal Genes and AD

The current understanding of the relation between lysosomal genes and AD is shaped by few studies looking at AD pathology in lysosome storage diseases (LSDs). These studies have not found Aβ plaques in mucopolysaccharidosis (MPS), Niemann-Pick disease type C (NPC) or neuronal ceroid lipofuscinosis (NCL) brains. However, MPS, NPC and NCL patients exhibit intense, diffuse Aβ signal in the cytoplasm of cells throughout the brains (see e.g., FIG. 13A and FIG. 13B). MPS patients exhibit a significant increase in the level of soluble Aβ compared to normal control brains. Increased CSF levels of Aβ38, Aβ40, and Aβ42 suggest an increased γ-secretase-dependent Aβ release in the brains of patients with NPC. Human patients with NCL exhibited significant reductions in the Aβ40 and Aβ42 levels compared to controls (see e.g., FIG. 13A and FIG. 13B). In addition, in absence of overexpression of FAD mutations, mice deficient in NPC1 (Niemann-Pick disease), CLN3 (Batten disease) and HEXB (Sandhoff disease) genes exhibit an increase in both intracellular APP fragments (α-CTF/β-CTF) and Aβ40/42 levels. An increase in intracellular APP/Aβ levels without Aβ plaques has been reported in mice deficient in IDUA (MPS-1), SGSH (Sanfilippo A), GBA (Gaucher disease) and TPP1 (Late infantile Batten disease) genes. A three-fold increase in Aβ40 levels compared to controls with no detectable Aβ42 was found in mice deficient in IDUA (MPS-1), SGSH (Sanfilippo disease type A) genes. In contrast, a significant reduction in the intracellular APP/Aβ levels was found in mice deficient in ASAH1 (Farber disease) or PPT1 (Infantile Batten disease) genes. These studies suggest that even in absence of Aβ plaque, APP trafficking or processing is affected in both human patients and mice models with total loss of function of lysosomal genes. Interestingly, cognitive decline in both humans and AD transgenic mice is not proportional to Aβ plaque load, but does correlate with soluble Aβ species. Data from transgenic AD mice indicate that intraneuronal Aβ is more neurotoxic than extracellular Aβ. The accumulation of intracellular Aβ has been shown to precede extracellular deposition in both human and mouse AD models. Thus, it is possible that the short lifespan of both human and mice with absence of lysosomal genes have prevented researchers from finding Aβ plaque besides the abnormal generation of Aβ40 or Aβ42.

Genetic Variation in Human ALP Genes

In the human genome there are at least 430 genes associated with the ALP (38 autophagy genes, 161 autophagy regulator genes, 64 lysosomal genes and 167 lysosome regulator genes). Mutations in 38% of all ALP genes (157 genes) cause a human Mendelian disease (OMIM). A recent analysis of the frequency and type of mutation present in 60,000 people found that most of the ALP genes are "intolerant to loss-of-function" mutations and carry less potential deleterious variants than predicted by a neutral model of evolution. This is consistent with lethality during embryogenesis or the neonatal period of most of the "core" ALP genes in knockout mice and their importance for cell maintenance and survival. The most studied and well-known ALP genes are lysosomal genes, that when mutated, cause LSDs. Interestingly, most of these LSD-causing genes (≈50) are not intolerant to LoF mutations and exhibit considerable genetic coding variation in humans. Accordingly, epidemiological studies have shown that there is a ten-fold range difference in the levels of the lysosomal enzyme activities in healthy humans. Individuals carrying genetic variants that cause haploinsufficiency in multiple lysosomal genes including GBA, NPC1, GALC, GAA, GLA and IDUA genes exhibit significantly lower levels of enzyme activity than controls. In addition, haploinsufficiency in the NPC1 gene results in significant additional metabolic abnormalities in human carriers. It has long been assumed that carrying one single normal copy of the ALP genes has no health consequences. However, substantial genetic evidence supports the role of functional variants in the GBA gene as the main genetic risk factor for developing Parkinson's and Lewy body diseases. The same variants that in a homozygous state cause a LSD in children (Gaucher disease), when present in a heterozygous manner affect the risk of adult onset neurodegenerative diseases. These studies suggest that haploinsufficiency in lysosomal genes predispose to common neurodegenerative disorders in adult humans. A systematic evaluation of the contribution of functional heterozygous variants in ALP genes affecting the risk for AD is lacking.

Innovation

The studies described herein are conceptually innovative in systematically and comprehensively evaluating the genetic variation associated with the well-known dysfunction in the ALP associated with AD (see e.g., section (I)), as well as to understand the effects of rare functional heterozygous variants in ALP genes associated with AD in vitro (see e.g., section (II)) and in vivo (see e.g., section (III)). Furthermore, these studies carefully examine the neuronal pathology to determine the consequence of genetically altering the ALP and its effects on amyloid pathology on clinically relevant endpoints. The current understanding of genetic variations in ALP genes in AD is dominated by limited studies reporting spurious associations in isolated populations with a very low rate of replication. The studies described herein can overcome that limitation because the design comprehensively evaluates the contribution of genetic variation in each gene of the ALP to the risk of developing AD in a very large sample that represents the general population. Therefore, data from two large publicly available databases of WES data, the Exome Aggregation Consortium (ExAC) (n≈61,000) and the Alzheimer's Disease Sequencing Project (ADSP) (n≈10,000) is used, in addition to in-house WES and Exome-chip data, for a total of AD cases (n≈4000) and controls (n≈5000). Using these multiple datasets, a set of analyses has been designed that would resolve the genetic architecture of the well-known dysfunction in the ALP associated with AD. The studies described herein incorporate an innovative integrative framework that couples computational methods and experimental data to validate the functional effects of selected ALP genes both in vitro and in vivo. Cell-based assays are complemented with biochemical data, live-cell assays, RNAseq data from brain cell type specific samples in mice, genome-wide gene expression data in human AD cases and controls, genome-wide gene expression data from human AD cases at different stages, genome-wide gene expression data from humans at different ages and, genome-wide gene expression data from AD mouse models correlated with Aβ plaque. Thus, as a result of these data mining efforts, experiments described in section (II) are performed not only in primary neurons but in microglial cells as well. Cell-type specific RNAseq data show that most of the ALP genes exhibit higher level of expression in microglial cell than in neurons. The approach described herein overcomes inconclusive previous studies about the role ALP genes in AD. The studies described in section (III) can address the question of whether age and the haploinsufficiency of ALP genes on vulnerable brain regions affect APP processing and trafficking, Aβ plaque burden and Aβ40/42 levels. These studies can overcome the limitations of previous studies using knockout mice of ALP genes, which exhibit rapid neurodegeneration and a short lifespan complicating the interpretation of the effect of the deficient gene on AD. These studies are possible with collaborative innovation involving investigators with expertise spanning neurogenetics, lysosomal biology, LSDs animal models, AD pathology in cellular and mouse models.

Approach

Here, state-of-the-art genomic tools and a large dataset are used to uncover the genetic architecture underlying the AD-associated decline in ALP function. In addition, the effect of selected variants and genes on APP metabolism, Aβ generation and Aβ degradation can be validated in vitro and in vivo.

Data and Results

Heterozygous Variants in Lysosomal Genes Affect the Risk of Developing AD.

A list of autophagy-lysosomal gene sets (~430 genes) derived by mining existing annotations in public databases and literature has been previously manually compiled. All the ALP genes in the AD cohorts can be analyzed. However, lysosome genes whose total loss-of-function (LoF) mutations cause LSDs are the best studied models of ALP dysfunction that result in neurodegeneration in humans and mouse models. In addition, small sample size studies on single lysosomal genes in isolated (geographically and genetically) populations support the role of genetic variants in lysosomal genes on the risk of AD. However, these studies have not been replicated. Therefore, analyses of the genetic contribution of ALP genes on AD have been started by focusing on forty-six lysosomal genes using a large dataset, which is a good representation of the population with European Ancestry. A drawback of the battery of bioinformatics tools currently available is that there is no perfect algorithm that predicts if a coding variant of unknown function has functional (biological) consequences. Therefore, the inclusion and exclusion criteria of potential functional variants was defined based on common features between coding variants of unknown function and known complete or nearly complete LoF variants that cause LSDs when they are homozygous or compound heterozygous.

The discovery sample consisted of WES data from 523 unrelated AD cases and 386 controls. TABLE 5 shows the top lysosomal genes associated with AD. As expected, the gene-specific cumulative allele frequency (cMAF) from the ExAC data set (European, non-Finnish ancestry) were highly concordant ($r^2=0.97$) with the cMAF from the in-house AD databases (of European ancestry). In the AD cohort, coding variants in each lysosomal gene that met the inclusion criteria were collated by gene: 82% are missense variants, 15% affect the alternative splicing and 3% are non-sense mutations. The burden of rare protein-altering variants (cMAF) was compared with the burden observed in controls and in ExAC. For most genes, there was an excess of variation in cases as compared with controls but only nominal associations were found with the SGSH gene ($p=4.2 \times 10^{-3}$, OR=3.7, 95% CI 1.4-9.6) and CLN8 gene ($p=1.0 \times 10^{-2}$; OR=8.9, 95% CI 1.1-68.1) (see e.g., TABLE 5).

When compared with the cMAF of the ExAc sample, fourteen genes passed a very stringent multiple test correction threshold $p<1.0 \times 10^{-4}$ (0.05/450) and thirteen LSD-causing genes passed the gene-level significant threshold $p<2.4 \times 10^{-6}$ (0.05/20,000) (see e.g., TABLE 5). Next, the ADSP cohort was used to replicate the findings listed in TABLE 5 including 5045 AD cases and 4500 controls (see e.g., TABLE 7).

TABLE 7

Rare variants found in LSD-causing genes in ADSP (replication sample)

| Gene | cMAF AD | cMAF NFE | OR | 95% CI | P value |
|---|---|---|---|---|---|
| GALNS | 0.0004 | 0.0002 | 1.7 | 1.5-2.0 | 2.35E−14 |
| CTNS | 0.0002 | 0.0001 | 1.9 | 1.6-2.3 | 1.04E−11 |
| MFSD8 | 0.0001 | 0.0001 | 2.7 | 1.9-3.7 | 1.97E−10 |
| GNPTAB | 0.0003 | 0.0002 | 1.5 | 1.3-1.8 | 2.12E−08 |
| TPP1 | 0.0002 | 0.0001 | 1.6 | 1.3-1.9 | 1.48E−06 |
| NAGLU | 0.0002 | 0.0001 | 1.5 | 1.1-1.9 | 3.40E−05 |
| SMPD1 | 0.0004 | 0.0003 | 1.3 | 1.1-1.4 | 2.79E−04 |
| NPC1 | 0.0002 | 0.0002 | 1.2 | 1.1-1.4 | 3.000E−04 |
| CLN8 | 0.0002 | 0.0001 | 1.9 | 1.3-2.6 | 3.35E−04 |
| DNAJC5 | 0.0005 | 0.0003 | 1.6 | 1.2-2.8 | 3.40E−04 |
| HEXB | 0.0005 | 0.0004 | 1.3 | 1.1-1.5 | 6.61E−04 |

Nine genes replicated the association with AD in this independent sample (see e.g., TABLE 7). Of note is the fact that the association found in the replication samples is in the same direction and the effect size is the same.

NPC1 Transcript Levels with Age and AD Status

Based on the criteria defined above, three lysosomal genes that were replicated in two samples were selected for functional analyses: the gene that encodes intracellular cholesterol transporter 1 (NPC1), the gene that encodes N-acetyl-alpha-glucosaminidase (NAGLU), and the DNAJC5 gene, which encodes Cysteine string protein alpha (CSPα). NPC1 transports low-density lipoproteins to late endosomal/lysosomal compartments where they are hydrolyzed and released as free cholesterol. LoF in this gene cause Niemann-Pick type C disease. NPC1 transcript exhibits higher levels of expression (~4.5 times) in microglia and astrocytes than in neurons. In neuropathologically normal human brain samples, there was a highly significant increase in NPC1 transcript levels with age ($p<0.0001$) (see e.g., FIG. 10A). NPC1 transcript levels were significantly higher in AD cases compared to age-matched controls ($p=0.01$, see e.g., FIG. 10B).

NAGLU Transcript Levels with Age, AD Status and in AD Mouse Models

NAGLU degrades heparan sulfate and total LoF of this gene causes mucopolysaccharidosis type IIIB (MPS-IIIB), also known as Sanfilippo syndrome B. RNAseq data from brain cell types in mice shows that NAGLU transcripts exhibit higher levels (~20 times) of expression in microglia than in neurons. In neuropathologically normal human brain samples, there was a significant increase in the NAGLU transcript levels with age ($p=0.02$) (see e.g., FIG. 1A). NAGLU transcript levels were significantly higher in AD cases compared to age-matched controls ($p=0.007$, see e.g., FIG. 1B). NAGLU transcript levels also exhibited a proportional age-dependent increase with the development of AD pathology (Right graph, see e.g., FIG. 10) in cortices of an AD mouse model (APP, p.K670N/p.M671L/PSEN1, p.M146V; hemizygous [HET] or homozygous [HO], see e.g., FIG. 10) compared to levels in wild-type mice (Black line, see e.g., FIG. 10).

DNAJC5 Transcript Levels with Age, AD Status and in AD Mouse Models

CSPα is a synaptic chaperone involved in exocytosis and maintenance of proteostasis at the synapse. Heterozygous mutations in CSPα cause autosomal dominant adult onset neuronal ceroid lipofuscinosis (ANCL). The DNAJC5 transcript is highly expressed in neurons and in regions of the brain that are most susceptible to AD pathology. A reduction in DNAJC5 transcript levels with age was found in neuropathologically normal brain samples from the frontal cortical regions (see e.g., FIG. 8A). DNAJC5 transcript levels were significantly lower in AD cases compared to age-matched controls in laser-capture micro-dissected non tangle-bearing neurons of AD and controls ($p=<0.0001$, see e.g., FIG. 8B, Left graph) (GEO database; Series GSE5281). This finding was replicated in a different study (GEO database; Series GSE15222) (see e.g., FIG. 8B, Right graph). It was also found that DNAJC5 transcript levels exhibited an age-dependent reduction and were inversely proportional to the development of AD pathology (see e.g., FIG. 8) in cortices of an AD mouse model (APP, p.K670N/p.M671L, FIG. 8) compared to the levels in wild-type mice (see e.g., FIG. 8). All these results suggest that NPC1, NAGLU and CSPα are involved in AD pathogenesis.

Endogenous CSPα Localize in Lysosome and Mutated CSPα Affects Autophagy Protein Levels (LC3-II an p62)

Figure 12B:
Figure 12C:
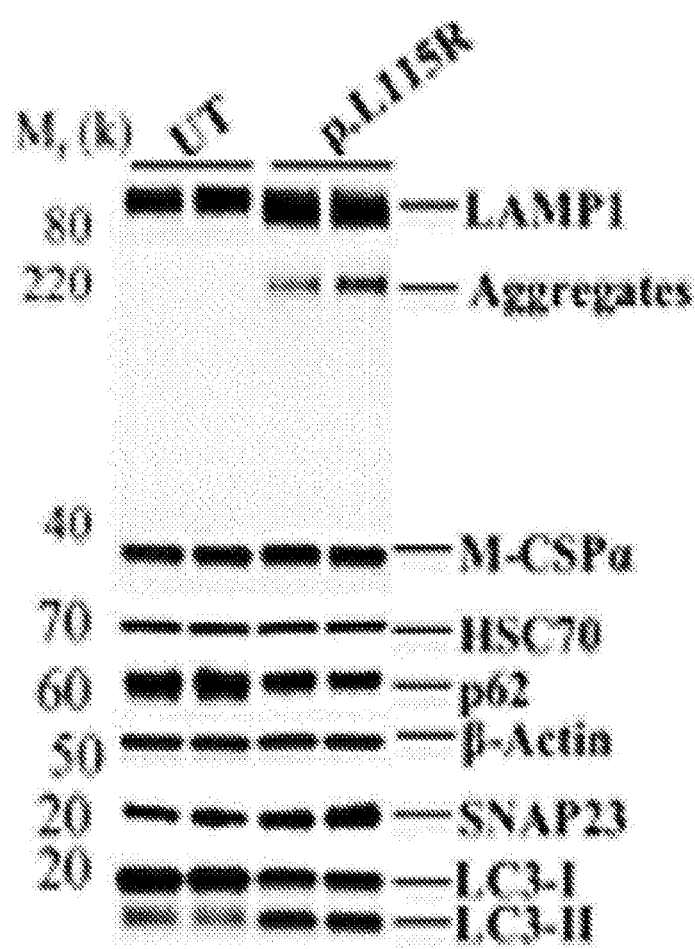
Figure 12D:
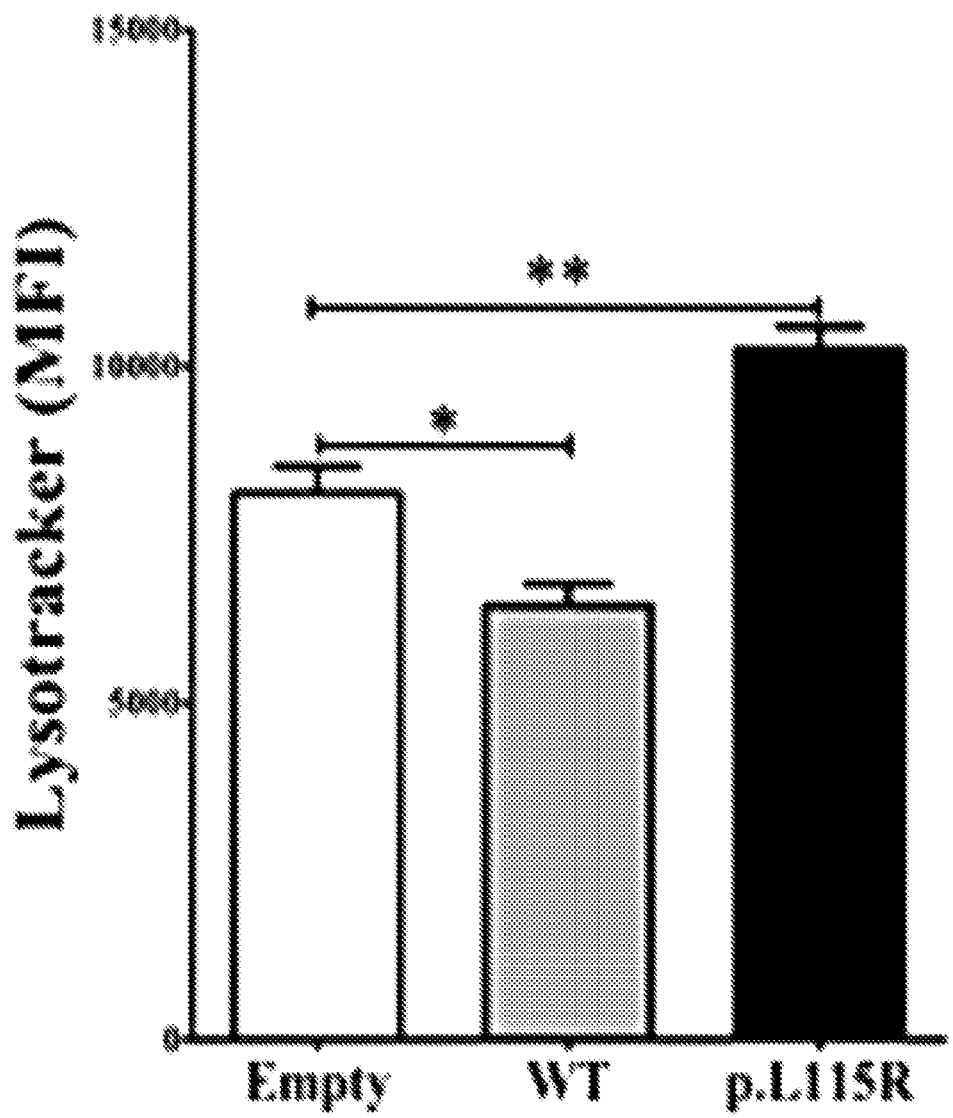

Endogenous CSPα co-localized with lysosome markers in the soma, neurites and synaptic boutons in both primary cortical neurons and in a neuron-like cell type (N2A) (see e.g., FIG. 12A). Subcellular fractionation showed that a significant proportion of CSPα co-sediments with another lysosome marker (LAMP1) (see e.g., FIG. 12B). These results suggest that endogenous CSPα is a lysosome-associated protein. Expression of the ANCL-causing mutation (p.L115R) resulted in high molecular weight CSPα aggregates and, increases in levels of lysosome protein LAMP1 and SNAP23. There was a reduction of p62 and persistent conversion from LC3-I to LC3-II, which suggest activation of autophagy and a block in the fusion of the autophagosome and lysosomes (see e.g., FIG. 12C). This ANCL-causing mutation significantly increased the level of LysoTracker signal compared to the empty vector. In contrast, overexpression of CSPα-WT significantly reduced LysoTracker signal (see e.g., FIG. 12D).

CSPα Affects APP Processing In Vivo

Brains of ANCL patients exhibited no Aβ plaques or neurofibrillary tangles. However, there was a remarkable intracellular accumulation of APP/Aβ in cortical neurons of ANCL patients (ANCL, see e.g., FIG. 13A). Quantification of Aβ in detergent-soluble and insoluble (guanidine) fractions of brain samples from ANCL, AD and healthy control samples revealed a significant reduction in the Aβ40 and Aβ42 levels in ANCL patients compared to both controls and AD samples (see e.g., FIG. 13B). These results suggest that CSPα plays a role in Aβ generation and in AD pathogenesis.

Research Design and Methods (I) Identifying ALP Genes Enriched with Rare Functional Variants in AD The hypothesis that haploinsufficiency caused by functional heterozygous variants in genes of the ALP affects the risk of developing AD can be tested. As described herein, an integrative approach combining the analyses of predicted rare functional variants in genes of the ALP in large datasets (both in-house databases and publicly available) is used to prioritize the candidate genes in the ALP with evidence of involvement in AD risk.

Methodology and Analysis for Section (I): Define an Allele Frequency Threshold for Rare Variation The initial analyses are focused on lysosomal genes. The same methodology is applied to all the ALP genes. However, in the absence of human diseases caused by LoF mutations in the rest of the ALP genes, the inclusion criteria is adjusted based on experience with lysosome genes. There are ~2740 LSD-causing variants reported in the NCBI ClinVAr database. Most of the AD samples are of European Ancestry. Therefore, to establish a baseline of genetic variation in lysosomal genes in a population with a similar genetic background, the non-Finnish sample (33,000 individuals) were selected from ExAc. 288 LoF variants were found in tested lysosomal genes annotated as heterozygous in the ExAc sample: 76% are missense variants, 10% affect the alternative splicing and 12% are non-sense mutations. Most LoF variants are predicted to be deleterious (87%) by SIFT and damaging (84%) by polyphen2. Most (73%) LoF variants are located in a highly conserved nucleotide (GREP score >4). Several LoF variants reported in ExAc are not classified as LSD-causing variants in the NCBI ClinVAr database. Heterozygous LoF variants were found in each tested lysosomal gene, but the number of heterozygous LoF variants differs from one found in the HYAL1 gene to twenty found in ARSA gene. The cMAF of these heterozygous LoF variants per gene ranges from 1.5-05 in the CSTD gene to 0.003 in the NPC2 gene. Therefore, a cMAF threshold of $1 \times 10^{-3}$ was applied as a conservative upper bound. Using the information obtained from the analyses of the LoF variants including highest MAF of LoF variants, SIFT, Polyphen2 or GERP scores, the following inclusion criteria was defined: 1) a call rate >98% in AD cases, 2) Maf <0.01% per variant, 3) only likely protein-altering variants in designated canonical transcripts annotated by ExAc or Ensemble as missense, 4) frame-shift, 5) nonsense, 6) variants affecting the splice donor and acceptor regions, and 7) if there is evidence of pathogenicity in the NCBI ClinVar database and is located in the 3' or 5' UTR region. Variants not found in ExAC, or synonymous, Intronic, 3' or 5' UTR variants not present in NCBI ClinVar database or with a Maf >0.01%, miscalling in ExAC and ClinVar were excluded. To ensure that population-specific variants did not have a confounding effect on this analysis, individuals were selected based on the principal component results.

TABLE 8 shows a summary of the available samples to perform the genetic analyses.

TABLE 8

Alzheimer's disease datasets.

| Dataset | # Samples |
|---|---|
| Knight ADRC | 3,000 |
| ADNI | 1,600 |
| NIA-LOAD | 1,512 |
| Spanish | 1,184 |
| ADSP-Discovery | 10,000 |
| ADSP-Replication* | 10,000 |
| Total | 27,296 |

*The ADSP replication dataset is currently being sequenced

There is access to phenotypic data, DNA and/or genetic data for more than 17,000 individuals from the Knight Alzheimer's Disease Research Center (Knight ADRC), the Alzheimer's Disease Neuroimaging Initiative (ADNI), the NIA-LOAD Study, a Spanish dataset and the Alzheimer's Disease Sequencing Project (ADSP). Additionally, 10,000 samples from ADSP are currently being sequenced (WGS). All the ALP genes in the in-house databases can be analyzed. A description of these datasets has been previously published. Each of the cases received a diagnosis of dementia of the Alzheimer's type using criteria equivalent to the National Institute of Neurological and Communication Disorders and Stroke-Alzheimers Disease and Related Disorders Association for probable AD. Controls received the same assessment as the cases but were cognitively normal. All individuals were of European descent, and written consent was obtained from all participants.

The Alzheimer's Disease Sequencing Project (ADSP)

WES data from AD cases and controls is used to perform all the genetic analyses described herein on the ALP genes. Data were downloaded from ADSP on December 2015. The Discovery Phase dataset contains WGS data on 584 subjects from 113 families, and pedigree data for more than 4000 subjects; WES data on 5096 cases and 4965 controls, and whole exome sequence data from an additional 853 subjects (682 Cases [510 Non-Hispanic, 172 Hispanic]) and 171 Hispanic Control subjects from families that are multiply affected with AD. The ADSP replication phase is already ongoing and includes WGS data for an additional 10,000 individuals.

Publicly Available WES Data

Allele frequencies from the Non-Finnish Europeans samples included in ExAc are used as allelic frequency reference for the analyses of all ALP genes. Data were downloaded from ExAC (version 0.3.1, March 2015). Only data from ALP genes with a high proportion of coding regions covered to a median sequence depth of >30× and only high-quality (PASS filter) variants are included in the analyses.

Technical Notes on Whole Exome Sequencing Data Collection

There is WES from 2,000 individuals. Exome-enrichment is performed using the SureSelect 52 Mb Target Enrichment System (Agilent). DNA was sequenced by paired-end reads (Illumina HiSeq2000). The alignment and the variant calls are performed using Novoalign and SAM tools. Once the data are processed and the sequence variants detected by exome sequencing are confirmed by genotyping, efficient and effective methods for data management, quality control, cleaning, annotation, and analysis are applied that have been developed and used for other exome-sequencing projects.

Statistical Tests

To accommodate the effect of rare variants with moderate effect size, validated statistical methods are used that have been developed to analyze association with rare variants. Briefly, gene-based methods collapse the rare variants within a region to a single value and then test the association between rare variants within a region and the trait of interest. The sequence kernel association test (SKAT) is used to test for association between status and rare variants within a gene-region. SKAT can account for variants with effects in different directions within the same gene and adjust for confounding covariates including population markers. An independent case-control sample is then used to replicate the findings from the discovery data set. Analysis for each different dataset is performed separately. Joint-analysis is performed to combine p-values and OR. This method has been used successfully in previous studies to identify novel genes for AD.

Population Structure

This analysis defines the European Ancestry of the in-house samples included in the analyses. Eigenstrat is used on the samples together with HapMap samples as anchors to confirm self-reported race/ethnicity.

Bioinformatic Analyses

The following publicly available databases are used for complementary analyses: Online Mendelian Inheritance in Man (OMIM); ExAC; GWAS catalogue; ClinVar database; Human Autophagy Database.

Power Analyses

To determine the power to detect genetic variants associated with AD, analyses were run using Proc Power in SAS. The analysis was run using minor allele frequencies ranging from 0.01 to 0.50, OR 1.2 to 3.6 and sample size between 4,000 and 7,000. Alpha was adjusted to $5 \times 10^{-8}$ for single variant analyses and $5 \times 10^{-6}$ for gene-based analyses. There is approximately 80% power to detect effects for OR >1.19 (or <0.84).

Anticipated Results

It is expected that novel associations of AD risk with ALP genes are uncovered by the studies described herein. The studies have demonstrated that novel genes in the ALP associated with AD risk can be identified (see e.g., TABLE 5) and that these can be replicated in independent samples with the proper depth in coverage (see e.g., TABLE 7). Consistent with the minimal genetic variation found in most of the "core" ALP genes in large datasets (ExAC) in addition to the absence of human diseases linked to them, an enrichment of functional variants in the "core" ALP genes in AD patients is not expected.

Alternative Approach

The results and power calculation suggest that there is sufficient power to detect an average odds ratio of >2.7 in gene-based analysis. If association of ALP genes fails to replicate with a case control design, an endophenotype design could be used. Thus, the effect of variants in ALP genes on CSF biomarker levels for AD could be determined by performing single-variant and gene-based analyses for ALP genes and each of the following CSF biomarkers: t-tau, p-tau and Aβ42. In order to evaluate if regulatory genomic regions of the ALP genes could be involved in the risk of developing AD, the association of ALP genes in data from GWAS previously published by the International Genomics of Alzheimer's Project (I-GAP) consisting of a total of 25,580 AD cases and 48,466 controls could be analyzed. A complementary approach would be to check if ALP genes affect the age at onset (AAO).

The analysis of the genetic variation of the remaining ~384 ALP genes and their potential association with AD risk has been completed. The sample size can be increased using the ADSP replication phase, which includes WGS data for an additional 10,000 individuals (both AD cases and controls). Proper collaborations are established with the organizers of the genome Aggregation Database (gnomAD). The gnomAD is an extension of ExAc containing exome sequence data from 123,136 individuals and whole genome sequencing from 15,496 individuals to replicate the findings in a larger dataset. ADSP data is included in gnomAD, which preclude the use of public version of gnomAD for current analyses.

(II) (a) Determine the Functional Effects of Selected Candidate Genes of the ALP on APP Metabolism, Aβ Generation, and Aβ Degradation In Vitro It is beyond the scope of the studies described herein to evaluate all the variants of each ALP gene associated with AD identified in section (I). Therefore, the top 3-5 variants identified in section (I) in the NAGLU, NPC1 and DNAJC5 genes are prioritized. Top variants are defined based on frequency in AD patients, predicted effect on the protein by SIFT and Polyphen2, and GERP conservation score. These genes are chosen based on the strength of the data from both the discovery and replication samples. It is hypothesized that novel ALP genes associated with AD risk affect APP metabolism, Aβ generation and Aβ degradation in vitro.

Assessing the Effect on Protein Products

Variants have been selected that share many of the in silico features of LoF variants. The experiments outlined herein can generate the experimental data to validate the functional impact on their respective protein. Selected variants are engineered using site-directed mutagenesis of the cDNA of the NAGLU, NPC1 and DNAJC5 genes. Wild-type and mutant cDNAs are subcloned into a lentiviral vector as previously described. Lentiviral vectors are produced, handled and disposed in BSL2 facilities in compliance with Section III-E-1 of the NIH Guidelines for Research Involving Recombinant or Synthetic Nucleic Acid Molecules. Primary neuron culture is performed as previously described. NAGLU, NPC1 and DNAJC5 genes are expressed in primary neurons from deficient mice and the effect on the protein stability is quantified by Western blot. Subcellular localization of mutated protein is assessed by confocal images of immunofluorescence to co-localize the selected protein within lysosomes (LAMP-1 or -2), early endosome (EEA1), late endosome (Rab7), ER (KDel) and Golgi (Giantin) markers. The effect on enzyme activity of NAGLU variants is tested using fluorometric assays as previously described. Effects of selected variants on NPC1 is performed as previously published. Functional effects of selected variants on DNAJC5 are tested by their ability to prevent the degradation of SNAP-25.

Assessing the Effect on APP Trafficking, Endocytosis and Subcellular Localization Multiple studies have demonstrated that endocytosis of APP is essential for its co-localization with β- and γ-secretases within endosomes and multivesicular bodies in the APP amyloidogenic pathway. Impairment in endosomal flux, secondary to lysosome dysfunction, results in increased transit time within this organelle, which increases the propensity for β- and γ-cleavage and, hence, Aβ generation. To determine whether the selected variants in NAGLU, NPC1 and DNAJC5 genes affect steady-state levels of APP, APP endocytosis or enhanced flux of APP into the lysosomes for degradation, the kinetics of intracellular APP appearance and the levels of APP in the cell surface can be determined using a cell surface biotinylation assay as previously published. The effects on full-length APP half-life are measured by Western blot at 0, 5, 10, 30 min under treatment with protein synthesis inhibitor cycloheximide. Immunohistochemical co-localization microscopy techniques are performed to study the effect on APP and SorL1 subcellular localization. Protein and transcript levels of APP-processing machinery including α-secretase (ADAM10 and ADAM17), β-secretase 1 (BACE1) and γ-secretase complex (PSEN1 and Nicastrin), are measured by Western blot and RT-qPCR, respectively.

Assessing the Effect on Aβ Generation

A significant proportion of APP is targeted to the lysosomes and APP levels rapidly build up in the cells in the presence of lysosomal acidification inhibitors, suggesting that lysosomal degradation drives APP proteolysis to preclude formation of Aβ peptides. In addition, human Sanfilippo patients (NAGLU deficient) exhibit a significant increase in the level of soluble Aβ compared to normal control brains. Increased CSF levels of Aβ40 and Aβ42 and no changes in the levels of β-cleaved soluble APP have been reported in the brains of patients with NPC (NPC1 deficient). Human patients with a mutation in DNAJC5 exhibit significant reductions in the Aβ40 and Aβ42 levels compared to controls. Therefore, it can be evaluated whether selected variants affect Aβ generation in cell cultures. Aβ species in cell lysates and media from cells are detected by sandwich ELISA as previously published. Briefly, Aβx-40 and Aβx-42 peptides are captured with mouse monoclonal-coating antibodies HJ2 (anti-Aβ35-40) and HJ7.4 (anti-Aβ37-42). HJ5.1 (anti-Aβ13-28), a biotinylated antibody targeting the central domain, or HJ3.5 (anti-Aβ1-13), which targets the N-terminal amino acids, are used as the detecting antibody, followed by streptavidin-poly-HRP-40 (Fitzgerald Industries). APP-derived proteolytic fragments, such as α- and β-CTFs, and sAPPα and sAPPβ are measured by Western blot. Levels of full-length APP are also monitored by Western blots.

Assessing the Effect on Aβ Degradation

Microglia proliferate around the amyloid plaques and phagocytose amyloid material but subsequent degradation is impaired, contributing to progressive amyloid accumulation in AD. It is not clear why microglia cells can take up fibrillar Aβ but cannot degrade it. However, microgial cells from AD patients exhibit a reduction in beclin-1 and subsequent ALP dysfunction. In addition, insoluble fibrillar Aβ affects the trafficking of chloride channel, ClC-7, to lysosomes in primary microglia, which impairs lysosomal degradation. However, restoring lysosome acidification enhances Aβ degradation. Together, this evidence suggests that ALP insufficiency in microglial cells may contribute to AD pathogenesis. The data mining efforts presented here revealed that NAGLU and NPC1 genes exhibit higher level of expression in microglial cell than in neurons. Thus, it can be evaluated whether primary microglial cells from NAGLU and NPC1 deficient and hemizygous mice transduced with selected variants can uptake and degrade exogenous Aβ. Aβ uptake and Aβ degradation are performed as previously published.

Assessing the Effect on ALP Function

It can be tested whether neurons from hemizygous mice exhibit ALP dysfunction and if these changes are increased by the selected variants. Western blots of LC3 and p62 are used as indirect indicators of macroautophagy activation. The autophagy flux is evaluated by the amount of LC3-II present in the cells in the absence or presence of activators of the autophagy system (Rapamycin and Torin1), autophagy inhibitors (Bafilomycin A1), lysosomotropic agents (Chloroquine, ammonium chloride), and E64/Leupeptin. This is complemented by live-cell imaging using the mCherry-GFP-LC3 marker. The autophagosome-lysosome fusion is further evaluated by co-localization of LC3 and LAMP1. Lysotracker is used to quantify the number of acidic compartments per cell.

Bioinformatic Analyses

The following publicly available databases are used for complementary analyses: Gene Expression Omnibus; Brain RNA-seq2; Gene expression data from the Mouse Dementia Network (Mouse DemNet); PolyPhen2; SIFT; Mouse Genome Informatics.

Anticipated Results

It is anticipated that ALP gene risk variants identified in section (I) cause a partial loss of function and alter ALP function. It is expected to detect 5-20% residual activity in the function of these proteins. It is also anticipated that overexpression or downregulation of the selected genes affects APP trafficking, APP metabolism, Aβ generation or Aβ degradation. In addition, it is expected that the experiments described herein also allow for evaluation of the effects of selected variants in ALP genes on neuron and microglia cell survival.

If a robust difference between WT and risk variants in NAGLU, NPC1 and DNAJC5 genesis is not observed, this may be due to overexpression masking subtle changes in function. AD risk variants that cause small changes that may manifest in disease over a lifetime could be a challenge to see an effect in the days of a cell culture. Alternatively, primary neurons from 5XFAD transgenic mice or N2A695 cells could be used and transduced with selected variants in the NAGLU, NPC1 and DNAJC5 genes and the effect on Aβ generation tested.

The following step after identifying variants in NAGLU, NPC1 and DNAJC5 genes that affect both the risk and the pathogenesis of AD in vitro is to take advantage of the progress in generation of iPSc directly from fibroblasts from humans and in genome-editing methods. iPSc-derived neurons or glial cells from AD patients carrying variants in NAGLU, NPC1 and DNAJC5 genes could be used to compare the effect of such variants on APP metabolism compared with isogenic CRISPr-corrected cells. Once these tools are in place, treatment strategies such as enzyme replacement (NAGLU), cyclodextrin (NPC1) or pharmacological modulation of the ALP could be utilized and their effect on Aβ generation or Aβ degradation tested in vitro.

(II)(b) Determine the Functional Effects of Haploinsufficiency in Selected Candidate ALP Genes on the Development of AD Pathology in Aged Mice While the neurodegenerative consequences of total loss-of-function of NAGLU and NPC1 genes in mice and humans has been characterized, very little is known about the long-term consequences of a single copy of these genes. It has always been assumed that hemizygous mice and humans are normal. However, recently it was demonstrated that haploinsufficiency in NPC1 gene results in significant metabolic abnormalities in humans and mice. It is hypothesized that AD pathology develops from milder forms of inherited ALP dysfunction and that their emergence may require additional age-related ALP impairments. Primary endpoints are soluble Aβ levels measured at 4 months of age (prior to plaque deposition) and plaque load at 8 months of age in presence of FAD-causing mutations in mice. Effects on soluble Aβ levels are the main endpoint in 24 old month NAGLU, NPC1 and DNAJC5 hemizygous mice. Hemizygous mice are generated from commercially available deficient mice.

Effects on a Mouse Model of AD Pathology

Total loss of function of the NAGLU protein in human patients with Sanfilippo disease results in a significant three-fold increase in the level of soluble Aβ compared with normal control brains. Increased CSF levels of Aβ40 and Aβ42 and no changes in the levels of β-cleaved soluble APP have been reported in patients with total loss of NPC1 function. NAGLU transcript levels exhibited a proportional age-dependent increase with the development of AD pathology in the cortex of an AD mouse model (see e.g., FIG. 10). DNAJC5 transcript levels exhibited an age-dependent reduction and were inversely proportional to the development of AD pathology in the cortex of an AD mouse model (see e.g., FIG. 8A). Human patients with a heterozygous mutation in DNAJC5 exhibited significant reductions in the Aβ40 and Aβ42 levels compared to controls (see e.g., FIG. 13). As in AD transgenic mice, cognitive decline in humans is not proportional to Aβ plaque load, but does correlate with soluble Aβ species. Given the data from human LSD patients and LoF mouse models supporting a role of these genes in intracellular Aβ generation it can determined whether mild lysosome impairment (hemizygosity in the NAGLU, NPC1, and DNAJC5) accelerates Aβ generation in a well-characterized mouse model of AD carrying FAD mutations that favor the Aβ generation. The 5XFAD model is a very aggressive amyloid deposition model that develops intraneuronal Aβ42 at 1.5 months, plaques at 2 months, loss of synaptic markers and memory deficits at 4 months, and neuron loss at 9 months of age. The development of plaques is accompanied by reactive gliosis. To further ascertain whether NAGLU, NPC1, and DNAJC5 haploinsufficiency exacerbates an existing amyloidogenic process, NAGLU, NPC1, and DNAJC5 mice are crossed with 5XFAD transgenic mice. 4 groups (30 mice/group) are generated for this experiment. The effect of gene-dosage on APP metabolism, Aβ plaque load and Aβ40/Aβ42 levels at 4 and 8 months is determined in 5XFAD/NAGLU (+/−), 5XFAD/NPC-1 (+/−) and 5XFAD/DNAJC5 (+/−) mice. Four months is an early time point for deposition of amyloid plaques in 5XFAD mice. 8 months represents an age when amyloid plaques are abundant Sample Size The sample size calculations indicate that at least n=15 mice/group are needed to detect a 20% increase in endpoints such as plaque load (SD=30%, α=5%) and detergent-soluble and insoluble Aβ40 and Aβ42 with 80% power while studying equal numbers of male and female mice. Fifteen (15) hemizygous mice from each gene crossed with 5XFAD [5XFAD/NAGLU (−/+); 15 5XFAD/NPC1 (−/+) and 5XFAD/DNAJC5 (−/+)] and 15 additional 5XFAD mice are anesthetized and sacrificed at 4 and 8 months of age to collect the brain for histological and biochemical studies.

Effects of Haploinsufficiency in Lysosomal Genes on Aged Mice

AD pathology (e.g., Aβ plaque) is typically age-dependent. However, published studies have not addressed the interaction between age and ALP dysfunction. Most of the studies evaluating the role of ALP in AD in vivo have used a pharmacological approach or total absence of ALP genes and short-term endpoints. A genetic approach is employed for reduction of the endogenous levels of the NAGLU, NPC1, and DNAJC5 genes and a quantitative pathological survey of the effect of inherited chronic inherited lysosome impairment on AD-relevant phenotypes involving Aβ is performed. Results have shown that there is a highly significant increase in the NPC1 and NAGLU transcript levels with age in normal human brain samples (see e.g., FIG. 10A and FIG. 1A). In addition, NPC1 and NAGLU transcript levels were significantly higher in AD cases compared to age-matched controls (see e.g., FIG. 10B and FIG. 1B). These results suggest that a compensatory response to aggregated proteins from the lysosomal genes NPC1 and NAGLU is part of the normal aging process. The abnormal elevation found in AD models suggests that they are trying to control the abnormal levels of Aβ. In contrast, there was a reduction in the DNAJC5 transcript levels with age in neuropathologically normal brain samples (see e.g., FIG. 8A) and DNAJC5 transcript levels were significantly lower in AD cases compared to age-matched controls (see e.g., FIG. 8B). DNAJC5 encodes a neuroprotective synaptic chaperone whose mutations impair the ALP function (see e.g., FIG. 13B). Therefore, haploinsufficiency in those genes could exacerbate the AD-related phenotypes in aged mice.

Sample Size

Fifteen (15) hemizygous mice from each gene [NAGLU (−/+); NPC1 (−/+) and DNAJC5 (−/+)] and 15 wild-type mice are anesthetized and sacrificed at 24 months of age to collect the brain for histological and biochemical studies.

Amyloid Plaque Quantification and Aβ Generation

Fixed frozen brain sections (50 μm) are stained in a sub-cohort of mice with X-34 and immunostained with HJ3.4 (anti-Aβ) antibodies to quantify plaque load (expressed as % area). Aβ levels in brain tissue homogenates from the contralateral hemisphere are fractionated into soluble (PBS) and insoluble (5M guanidine) fractions and quantified using ELISA. It is assessed whether haploinsufficiency of selected genes affects the APP processing machinery.

Synaptic Markers

Synaptic loss is a common finding in humans and AD mouse models. It is assessed whether a single copy of selected genes accelerates the synaptic loss in 5XFAD mice by Western Blot using antibodies against presynaptic markers: SNAP-25, vesicle-associated membrane protein 2, Syntaxin 1, and Synaptophysin, as previously published.

ALP Dysfunction

Using brain sections as described above, the sections are immunostained with anti-LAMP1, LC3 and p62 antibodies.

Effect on Neuritic Dystrophy and Reactive Gliosis

Fixed frozen brain sections from the above cohorts are immunostained with reticulon-3 (RTN-3) antibodies (RTN-3 selectively accumulates in dystrophic neurites) to quantify dystrophic neurites as published previously. The previous studies have demonstrated that NAGLU, NPC1 and DNAJC5 deficient mice exhibit increased astrogliosis. Therefore, in parallel studies, brain sections are stained with anti-CD11b and anti-GFAP antibodies to examine the impact of one single copy of the selected genes on reactive gliosis.

Anticipated Results

It is anticipated that hemizygous mice of the NAGLU, NPC1, and DNAJC5 genes would accelerate and worsen the load of Aβ plaque burden in 5XFAD mice. It is expected that haploinsufficiency of selected genes affects the APP metabolism and Aβ generation in aged mice increasing the synaptic loss and the reactive gliosis without the generation of Aβ plaque.

If changes in the APP metabolism and Aβ generation are not found in the brains of hemizygous mice, AAV2/9 vectors carrying the most significant variant validated in the experiments described in section (II) are generated and injected stereotaxically in the hippocampus of the newborn hemizygous mice and the presence of AD pathology is evaluated. Alternatively, the transcript of NAGLU, NPC1, and DNAJC5 genes is knocked down in newborn 5XFAD transgenic mice by injecting AAV2/9 vectors carrying validated shRNA/RNAi against them. CRISPr technology could be used to generate knock-in mice of the variants in selected genes with the strongest effect on in vitro assays.

Combining the results from the studies described herein and the availability of a fluorometric assay for NAGLU activity and mass spectrometry assays for NPC1 biomarkers, one could screen CSF, plasma, serum or dry blood spots of large cohorts of AD cases and controls to detect specific defects that can be use as biomarkers for AD.

Example 4: Determining the Effects of Genetic Variation in NAGLU on Alzheimer's Disease (AD) and Parkinson's Disease (PD) Pathogenesis This example describes the in vitro and in vivo effects of genetic variation in the NAGLU gene in Alzheimer's disease (AD) and Parkinson's disease (PD) pathogenesis.

Increasing evidence suggests clinical, pathological and genetic overlap between Alzheimer's disease (AD), dementia with Lewy bodies and frontotemporal dementia (FTD) with Parkinson's disease (PD). Aberrant heparan sulfate (HS) metabolism is emerging as a common pathogenic mechanism of AD and PD in various biochemical and cellular studies, however the underlying mechanisms are not well understood. There is no systematic evaluation of the role genetic variants in the enzymes involved in lysosomal degradation of HS play in the pathogenesis of AD or PD. Here, genetic analyses were performed in large case-control AD and PD cohorts and a significant enrichment of rare functional variants was discovered in lysosomal enzyme genes responsible for heparan sulfate (HS) degradation with a substantial effect size. Heparan sulfate proteoglycans (HSPGs) regulate the oligomerization, clearance, endocytosis and trafficking of a variety of pathogenic proteins including amyloid (Aβ) and alpha-synuclein (α-Syn). Pharmacological inhibition of HSPG binding of pathogenic proteins and genetic reduction of HSPG synthesis facilitate the clearance of pathogenic proteins and reduce their aggregation. To date, it is not clear if the reduction in N-acetyl-alpha-glucosaminidase (NAGLU) activity and the resulting HSPG accumulation affects APP metabolism, Aβ plaque burden or α-Syn aggregation and spreading. Studies described herein can determine the effect of hypomorphic missense variants in the NAGLU gene on Aβ precursor protein (APP) trafficking, Aβ generation in neurons and Aβ degradation by glial cells. An innovative approach is described to model genetic variants related to human neurodegenerative disease in mice. A neurotropic Adeno-associated virus (AAV) vector is used that enables non-invasive, widespread distribution and long-lasting global neural expression of hypomorphic NAGLU variants injected early in life in NAGLU hemizygous mice with long-term follow up. Thus, not only can the cellular effect of NAGLU variants be studied but also the effects of aging and heterozygosity, as found in AD and PD patients. It can also be determined whether reduction or overexpression of NAGLU affects the AD pathology present in a well-characterized mouse model of AD. It can be determined whether hypomorphic missense variants in the NAGLU gene affect binding, internalization and aggregation of α-Syn in primary neurons and if those changes are rescued by substrate reduction, recombinant enzyme replacement or gene therapy. Finally, a reliable and well established method of pathological α-Syn spreading can be used to determine if hypomorphic NAGLU variants affect the formation of aggregates of phosphorylated α-Syn, the connectivity-dependent spreading and their effect on disease progression and lifespan. The results of the studies described herein have important implications on the identification of PD and AD patients with genetically determined lysosomal dysfunction, in which the restoration of such dysfunction could provide an effective therapy.

The goal of the studies described herein is to determine in vitro and in vivo the effects of genetic variation in the NAGLU gene in Alzheimer's disease (AD) and Parkinson's disease (PD) pathogenesis. These studies incorporate an innovative approach to modeling genetic variants associated to human neurodegenerative disease in mice. The studies described herein can uncover novel lysosomal genes associated with AD and PD and provide greater insight into the mechanism of lysosomal dysfunction in AD and PD pathogenesis.

Increasing evidence suggests clinical, pathological and genetic overlap between Alzheimer's disease (AD), dementia with Lewy bodies and frontotemporal dementia (FTD) with Parkinson's disease (PD). Aberrant heparan sulfate (HS) metabolism is emerging as a common pathogenic mechanism of AD and PD in various biochemical and cellular studies, however the underlying mechanisms are not well understood. Heparan sulfate proteoglycans (HSPGs) regulate the oligomerization, clearance, endocytosis, and trafficking of amyloid (Aβ) and alpha-synuclein (α-Syn) in cell cultures. HSPGs bind to Aβ and accelerate its oligomerization and aggregation. HS independently stimulates the formation of α-Syn fibrils in vitro and mediates cellular Aβ uptake. HSPGs also mediate macropinocytotic uptake of α-Syn. Pharmacological inhibition of HSPG binding to pathogenic proteins and genetic reduction of HSPG synthesis facilitate the clearance of pathogenic proteins and reduce their aggregation. In addition, HSPGs are present in Aβ plaques and in Lewy bodies (LBs). These findings suggest that HS and HSPGs play important roles in Aβ and α-Syn metabolism and, subsequently, the pathogenesis of AD and PD. However, there has been no systematic evaluation of the role genetic variants in the enzymes involved in lysosomal degradation of HS play in the pathogenesis of AD or PD. Therefore, genetic analyses were performed in large case-control AD and PD cohorts and a significant enrichment of rare functional variants was identified in lysosomal enzyme genes responsible for heparan sulfate (HS) degradation with a substantial effect size. The most extensively studied lysosomal enzyme involved in the HS degradation is N-acetyl-alpha-glucosaminidase (NAGLU), whose deficiency in humans causes Mucopolysaccharidosis IIIB (MPS-IIIB). There is a well-characterized mouse model of NAGLU deficiency that recapitulates the features of human disease. The goal of the studies described herein is to determine if hypomorphic missense variants in the NAGLU gene found in AD (Odds Ratio=3.7) and PD (Odds Ratio=4.7) patients affect APP metabolism, Aβ generation and Aβ degradation in vitro and AD pathology in vivo as well as α-Syn aggregation in vitro and α-Syn spreading in vivo.

(I) Determine the Effects of Hypomorphic Missense Variants in the NAGLU Gene on Neuronal APP Metabolism and Aβ Generation, Aβ Glial Degradation In Vitro and AD Pathology In Vivo Both human MPS-IIIB patients and NAGLU-deficient mice exhibit increased cortical levels of intracellular full length-APP. MPS-IIIB patients also exhibit a significant three-fold increase in the level of soluble Aβ40 compared with control brains. It is hypothesized that changes in NAGLU activity affect APP metabolism and Aβ generation in neurons. The heterozygous status of AD patients carrying NAGLU variants is modeled in vitro. As described herein, the effects of hypomorphic NAGLU variants on APP trafficking, APP half-life, APP processing machinery and Aβ generation can be determined in primary neurons.

Increasing evidence suggests that microglial cells contribute to AD pathogenesis. Data mining efforts revealed that NAGLU exhibits a high level of expression in microglial cells. However, very little is known about the role of NAGLU in glial cells. Thus, as described herein, it can be determined whether primary microglial cells stably expressing hypomorphic NAGLU variants can uptake and degrade exogenous Aβ.

In the absence of familial AD mutations, the NAGLU-deficient mice exhibit intracellular accumulation of Aβ and HSPGs in the medial entorhinal cortex. The effects of NAGLU heterozygosity and aging on AD pathology are modeled in vivo. It can be determined whether the most deleterious NAGLU variant affects AD-relevant phenotypes in 24-month old NAGLU hemizygous mice after injecting them at birth using AAV2/9-PHP.B vector.

It can determined whether NAGLU reduction or overexpression affects Aβ generation, Aβ clearance, plaque deposition, synaptic loss and neuroinflammation in the 5XFAD mouse at 4 and 8 months.

(II) Determine the Effect of Hypomorphic Missense Variants in the NAGLU Gene on α-Syn Aggregation In Vitro and α-Syn Spreading In Vivo MPS-IIIB patients exhibit severe neuronal loss in the substantia nigra (SN) and accumulation of pathological phosphorylated α-Syn (pSyn) in neurons in the temporal cortex, hippocampus, and SN. It is hypothesized that a reduction in NAGLU activity affects α-Syn uptake, clearance, and aggregation in vitro and spreading in vivo.

As described herein, it can be determined whether binding, internalization and aggregation of α-Syn preformed fibrils (PFFs) are affected in primary neurons stably expressing hypomorphic NAGLU variants.

It can also be determined whether substrate reduction (Genistein), recombinant enzyme replacement or gene therapy rescues the effects on the internalization and aggregation of α-Syn PFFs.

Intrastriatal injection of α-Syn PFFs recapitulates the accumulation of intracellular LBs pathology, selective loss of SN neurons, and impaired motor coordination in wild-type and transgenic mice expressing mutant A53T human α-Syn. Intrastriatal inoculation of α-Syn PFFs is performed in hemizygous or NAGLU-deficient mice injected with the AAV2/9-PHP.B vector expressing the most deleterious NAGLU variant at birth. The formation of aggregates of phosphorylated α-Syn, the connectivity-dependent spreading and their effect on disease progression and lifespan is quantified.

Significance
Heparan Sulfate in AD and PD

Aberrant heparan sulfate (HS) metabolism is emerging as a common pathogenic mechanism of AD and PD in various biochemical and cellular studies, however the underlying mechanisms are not well understood. Heparan sulfate proteoglycans (HSPGs) consisting of HS chains covalently attached to a specific protein core are abundant cell surface and extracellular molecules that interact with a spectrum of ligands. Membrane HSPGs act as endocytic receptors and undergo constitutive as well as ligand-induced endocytosis. Most HSPGs and bound ligands are degraded by lysosomal proteases, exoglycosidases and sulfatases. HSPGs regulate the oligomerization, clearance, endocytosis and trafficking of a variety of pathogenic proteins including Aβ and α-Syn. HSPGs are present in Aβ plaques and in LBs and LNs. HSPGs have been shown to bind to Aβ and accelerate its oligomerization and aggregation. HS significantly stimulates the formation of α-Syn fibrils in vitro. HS also mediates cellular Aβ uptake. HSPGs mediate macropinocytotic uptake of α-Syn. Pharmacological inhibition of HSPG binding of pathogenic proteins and genetic reduction of HSPG synthesis facilitate the clearance of pathogenic proteins and reduce their aggregation. These findings suggest that HS and HSPGs play important roles in Aβ and α-Syn metabolism and the pathogenesis of AD and PD.

Lysosomal Dysfunction in AD

While familial forms of AD are pathogenically driven by increased amyloid-β (Aβ) production and subsequent aggregation of Aβ in the extracellular space (ISF, interstitial fluid) into soluble oligomers or insoluble Aβ plaques, recent studies in late-onset sporadic AD patients demonstrate impaired clearance of Aβ. Thus, the balance between production and clearance determines Aβ levels and the propensity to develop Aβ plaques. The lysosome plays a major role in the degradation of intracellular organelles and aggregate-prone proteins. Neuropathological studies have also found that lysosomal pathology in the AD brain contributes to AD pathogenesis, however the underlying mechanisms are not well understood. Changes in the lysosome have been found in multiple transgenic mouse AD models. These results altogether suggest that changes in lysosome proteins accelerate AD pathology. Cellular studies suggest that the endosomal-lysosomal system is a major site of Aβ production. Presenilin 2 (PSEN2) and Nicastrin (catalytically essential γ-secretase components) are located in the lysosome. In fact, PSEN1 regulates the lysosomal pH. Pharmacological impairment of lysosomal function in vitro results in changes in Aβ production. Changes in lysosomal pH reduces Aβ secretion. Lysosomal protease inhibitors reduce production of amyloidogenic APP fragments. All these studies suggest that global lysosome function plays an important role in normal and abnormal Aβ precursor protein (APP) processing and subsequent amyloidogenesis.

APP Metabolism in Humans and Mice Deficient in HS Metabolism Genes

There are at least four enzymes involved in the step-wise breakdown of HS in the lysosome. Loss-of-function (LoF) mutations in these genes result in accumulation of partially degraded HS inside the lysosomes and cause Mucopolysaccharidosis (MPS) type III A, B, C and D (Sanfilippo syndrome). MPS patients exhibit intense, diffuse Aβ signal in the cytoplasm of cells throughout the brains. MPS patients exhibit a significant increase in the level of soluble Aβ compared to normal control brains. In addition, in absence of overexpression of familial AD (FAD) mutations, an increase in intracellular APP/Aβ levels has been reported in MPS mouse models. A three-fold increase in Aβ40 levels compared to controls has been found in MPS III mouse models. Cognitive decline in both humans and AD transgenic mice correlates with soluble Aβ species. Data from transgenic AD mice indicate that intraneuronal Aβ is more neurotoxic than extracellular Aβ. The accumulation of intracellular Aβ has been shown to precede extracellular deposition in both human and mouse AD models. These studies suggest that APP trafficking or processing is affected in both human patients and mice models with total loss of function of lysosomal genes involved in the HS metabolism.

Lysosomal Dysfunction in PD

Human post-mortem studies and model systems suggest that defects in endocytic trafficking, lysosomal integrity and lysosomal hydrolase activity play an important role in synucleinopathies. Lysosomal markers are components of LBs in patients with sporadic PD. Thus, it has been suggested that LBs and Lewy neurites (LNs) may seed around impaired lysosomes and grow in size by the continuous deposition of lysosomal-derived un-degraded material as the disease progresses. Multiple cell-based models converge on the centrality of cell-to-cell transfer of proteopathic seeds in the progression of synucleinopathies, although mechanistic questions remain. It is still unclear whether specific α-Syn strains are internalized via distinct receptors or endocytic mechanisms.

Macropinocytotic uptake of α-Syn by immortalized cells and primary neurons is mediated by HSPGs. However, the role of HS in α-Syn spreading in vivo has not been evaluated. Lysosomal processing is the predominant fate of internalized α-Syn fibrils in primary neurons. Pharmacological perturbation of lysosomal function causes aberrations in intracellular processing of α-Syn fibrils, concomitantly with an increased rate of inclusion formation via recruitment of endogenous α-Syn. The processes governing this recruitment are still poorly understood and it suggests that pathogenic species must escape endo-lysosomal trafficking. Thus, it has been reported that exogenous α-Syn species results in endocytic vesicle and lysosomal membrane rupture, thus, escaping endocytic trafficking and lysosomal degradation. Once in the cytosol, these α-Syn fibrils or oligomers can interact with soluble species and initiate recruitment of endogenous α-Syn. These results further support the idea that defects in lysosomal activity and integrity may accelerate pathological α-Syn aggregation and transmission. HSPGs are present in LBs and LNs. HS significantly stimulates the formation of α-Syn fibrils in vitro. However, the role of lysosomal accumulation of HS in α-Syn aggregation and spreading has not been fully established yet.

Large Scale Analysis of Genetic Variation in Human Lysosomal Genes

A recent analysis of the frequency and type of mutation present in exomes of 60,000 people found that lysosomal genes are "intolerant to loss-of-function" mutations and carry less potential deleterious variants than predicted by a neutral model of evolution. This is consistent with lethality during embryogenesis or the neonatal period of most of the "core" lysosomal genes in knockout mice. The most studied and well-known lysosomal genes, are those that when mutated, cause a lysosomal storage disease (LSD). Interestingly, most of these LSD-causing genes are not intolerant to LoF mutations and exhibit considerable genetic coding variation in humans. Accordingly, there is a ten-fold range difference in the levels of the lysosomal enzyme activities in healthy humans. It has long been assumed that carrying one single normal copy of the lysosomal genes has no health consequences. However, recent studies in carriers of heterozygous missense pathogenic mutations in the NPC1 gene revealed significant systemic metabolic abnormalities. In addition, substantial genetic evidence supports the role of heterozygous missense variants in the GBA gene as the main genetic risk factor for developing synucleinopathies. The same pathogenic variants that in a homozygous state cause a LSD in children (Gaucher disease), when present in a heterozygous manner affect the risk of adult onset neurodegenerative diseases including PD and Lewy body dementia. These studies suggest that the combination of aging and haploinsufficiency in lysosomal genes predispose to common neurodegenerative disorders in adult humans. A systematic evaluation of the contribution of functional heterozygous variants in lysosomal genes affecting the risk for AD or PD is lacking.

Individuals carrying genetic variants that cause haploinsufficiency in NAGLU gene exhibit significantly lower levels of enzyme activity than controls. A recent study reported the enzymatic activity of 164 NAGLU missense "variants of unknown significance (VUS)" in the ExAC dataset and 35 pathogenic missense mutations reported in the HGMD, 17 of which were found in ExAC as well. It was demonstrated that approximately 90% of the pathogenic variants exhibited <15% enzyme activity compared to the wild-type levels. These data suggest that there are individuals in the general population carrying hypomorphic heterozygous variants in the NAGLU gene. However, the long-term consequences of NAGLU haploinsufficiency have not been fully studied. Genetic analyses were performed in large case-control AD and PD cohorts and identified a significant enrichment of rare functional variants in genes of lysosomal heparan sulfate (HS) metabolism enzymes with a substantial effect size. It was found that hypomorphic missense variants in NAGLU are associated with AD ($p=3\times10^{-3}$, OR=2.3, 95% CI 1.2-5.2) and PD ($p=3.6\times10^{-7}$, OR=3.6; CI=2.8-8.3).

Hypomorphic missense variants in the NAGLU gene found in AD or PD patients affect APP metabolism, Aβ generation and Aβ degradation in vitro and AD pathology in vivo as well as α-Syn aggregation in vitro and α-Syn spreading in vivo.

Innovation

Studies described herein are conceptually innovative by systematically and comprehensively evaluating the functional consequences of hypomorphic, heterozygous variants in the NAGLU gene associated with AD and PD risk. The results from these studies have important implications on the identification of PD and AD patients with genetically determined lysosomal dysfunction, in which the restoration of such dysfunction could provide an effective therapy. Rescue experiments utilizing substrate reduction, recombinant enzyme replacement or gene therapy are also described herein, which could have translational implications.

An innovative integrative framework that couples computational methods and experimental data is used to validate the functional effects of the NAGLU gene both in vitro and in vivo. This studies described herein combine state-of-the-art techniques and results from genetic analyses in large datasets, cell-based assays, biochemical data, RNAseq data from specific cell types in mice and human brains, RNA-seq data in human AD and PD cases and controls, and genome-wide gene expression data from AD mouse models correlated with Aβ plaque, biochemical, histopathological and behavioral data in mouse models with interventions such as gene therapy, substrate reduction and recombinant enzyme replacement.

Studies described in sections (I) and (II) address the question of whether age and haploinsufficiency of NAGLU on vulnerable brain regions affect APP processing and trafficking, Aβ plaque burden, Aβ levels and α-Syn aggregation in vitro and α-Syn spreading in vivo. The role of NAGLU and cell autonomy (neuron vs glial cells) is also assessed in AD and PD mechanisms.

An innovative approach to modeling genetic variants related to human neurodegenerative disease in mice is described herein. A neurotropic AAV vector that enables non-invasive (passes the brain blood barrier), widespread distribution and long-lasting global neural expression of a gene of interest carrying hypomorphic variants is injected early in life (postnatal day 2-4) in hemizygous mice with long-term follow up for up to 20-24 months. Thus, not only is the cellular effect of identified genetic variants studied, but also the effects of aging and heterozygosity, as found in AD and PD patients.

A highly productive and interdisciplinary research team has been assembled to execute this project. These studies are only possible with collaborative innovation involving investigators with expertise spanning neurogenetics, lysosomal biology, LSDs animal models and AD and PD pathophysiology in cellular and mouse models.

Approach

Here, state-of-the-art functional genomic tools are used to determine the effect both in vitro and in vivo of NAGLU genetic variation associated with AD and PD risk.

Studies

Heterozygous Variants in Lysosomal HS Degradation Genes Affect the Risk of Developing AD Single-variant and gene-based analyses of 45 lysosomal genes were performed in two case-controlled cohorts of AD. The discovery sample consisted of WES data from 667 unrelated AD cases and 511 controls. As expected, the gene-specific cumulative allele frequency (cMAF) from the ExAC data set (European, non-Finnish ancestry) were highly concordant ($r^2$=0.96) with the cMAF from the in-house AD databases. The burden of rare protein-altering variants (cMAF) was compared with the burden observed in controls and in ExAC. For most genes, there was an excess of variation in cases as compared with controls but only a nominal association was found with the SGSH gene (p=4.2×$10^{-3}$; OR=3.7, 95% CI 1.4-9.6). When compared with the cMAF of the ExAc sample, the SGSH gene (p=7.9×$10^{-5}$; OR=3.0, 95% CI 1.8-4.9) and NAGLU gene (p=4.8×$10^{-4}$, OR=3.7, 95% CI 1.4-9.6) passed a multiple test correction threshold p<1.0×$10^{-3}$. Next, the Alzheimer Disease Sequencing Project (ADSP) cohort (5045 AD cases and 4500 controls) was used to replicate these findings. NAGLU was replicated (p=3×$10^{-3}$; OR=2.3, 95% CI 1.2-5.2) in this independent sample. Of note is the fact that the association found in the replication samples is in the same direction and of similar effect size.

NAGLU Transcript Levels with Age, AD Status and in AD Mouse Models

Figure 1B:
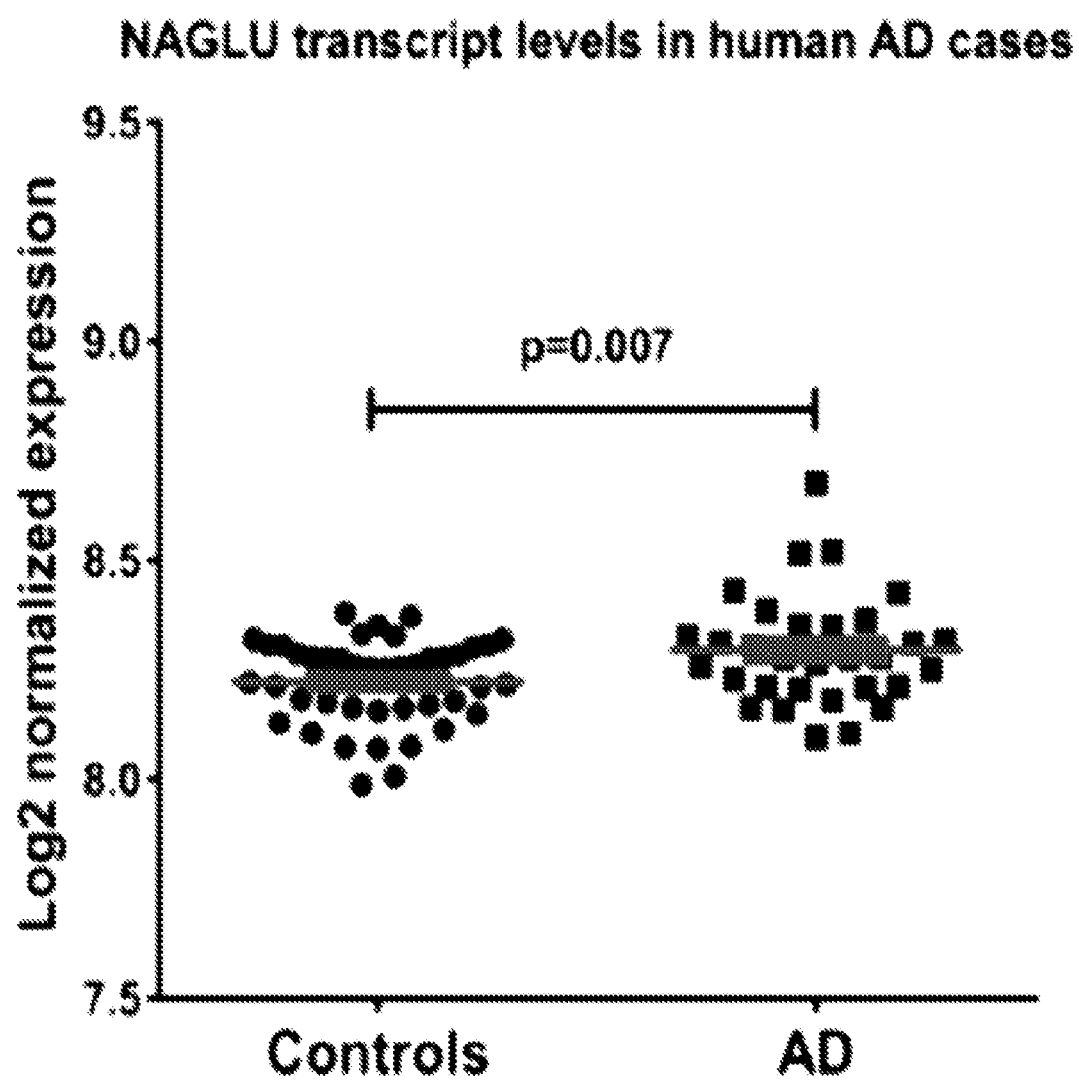
Figure 1C:
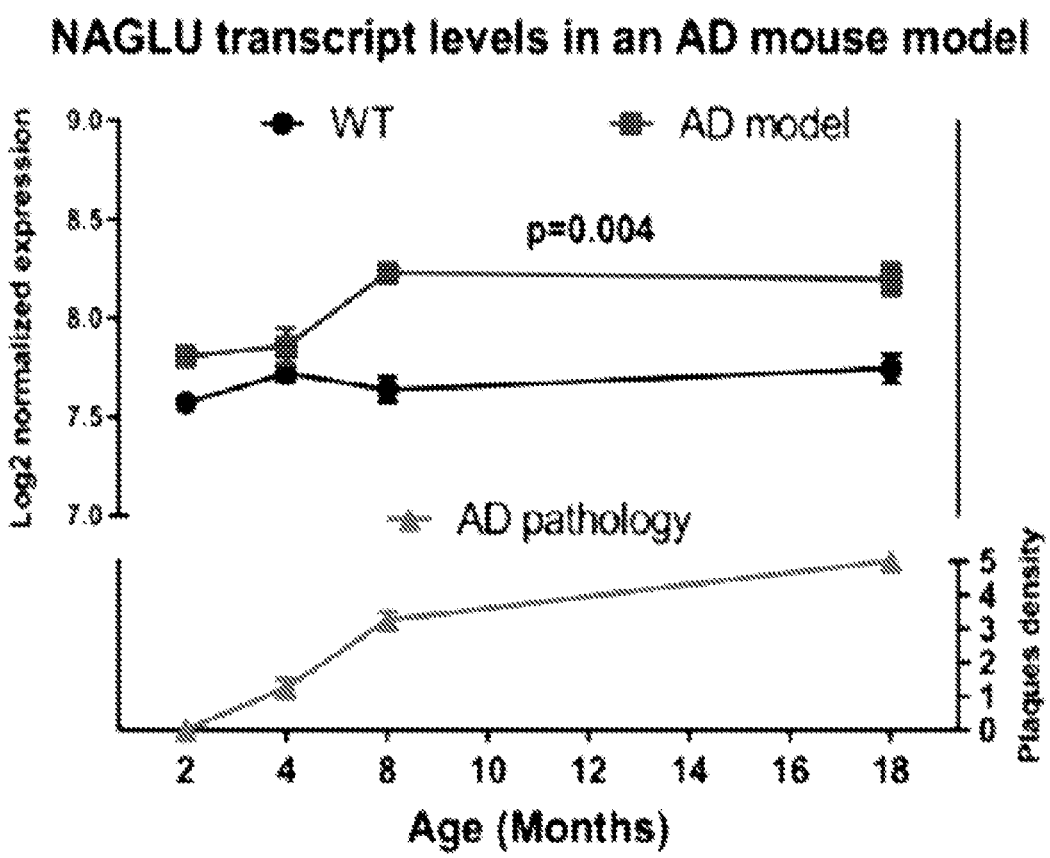

In neuropathologically normal human brain samples, there was a significant increase in the NAGLU transcript levels with age (p=0.02) (see e.g., FIG. 1A). NAGLU transcript levels were significantly higher in AD cases compared to age-matched controls (p=0.007, see e.g., FIG. 1B). A statistically significant (p=3.2×$10^{-8}$) increase (0.46 $\log_2$ fold) of NAGLU transcript levels in AD patients was replicated in two larger and independent AD databases (Mayo Clinic Brain Bank RNA-seq and Mount Sinai Brain Bank). NAGLU transcript levels also exhibited a proportional age-dependent increase with the development of AD pathology (Bottom graph, see e.g., FIG. 10) in cortices of an AD mouse model (Blue line top graph; see e.g., FIG. 10) compared to levels in wild-type mice (Black line in top graph, see e.g., FIG. 10). ANOVA analysis demonstrated a significant interaction (p=0.0042) of age and genotype. Age explains 11.4% of the variation (p=0.0003) whereas the genotype explains 42.3% (p<0.0001). These results suggest that a compensatory response to aggregated proteins from NAGLU may be part of the normal aging process. The abnormal elevation found in AD models suggests that they are trying to control the abnormal levels of Aβ.

Therefore, haploinsufficiency in NAGLU could exacerbate the AD-related phenotypes in aged mice.

Gene-Dosage Effect of NAGLU on Interstitial Fluid (ISF) Levels of Aβ Levels.

Figure 14A:
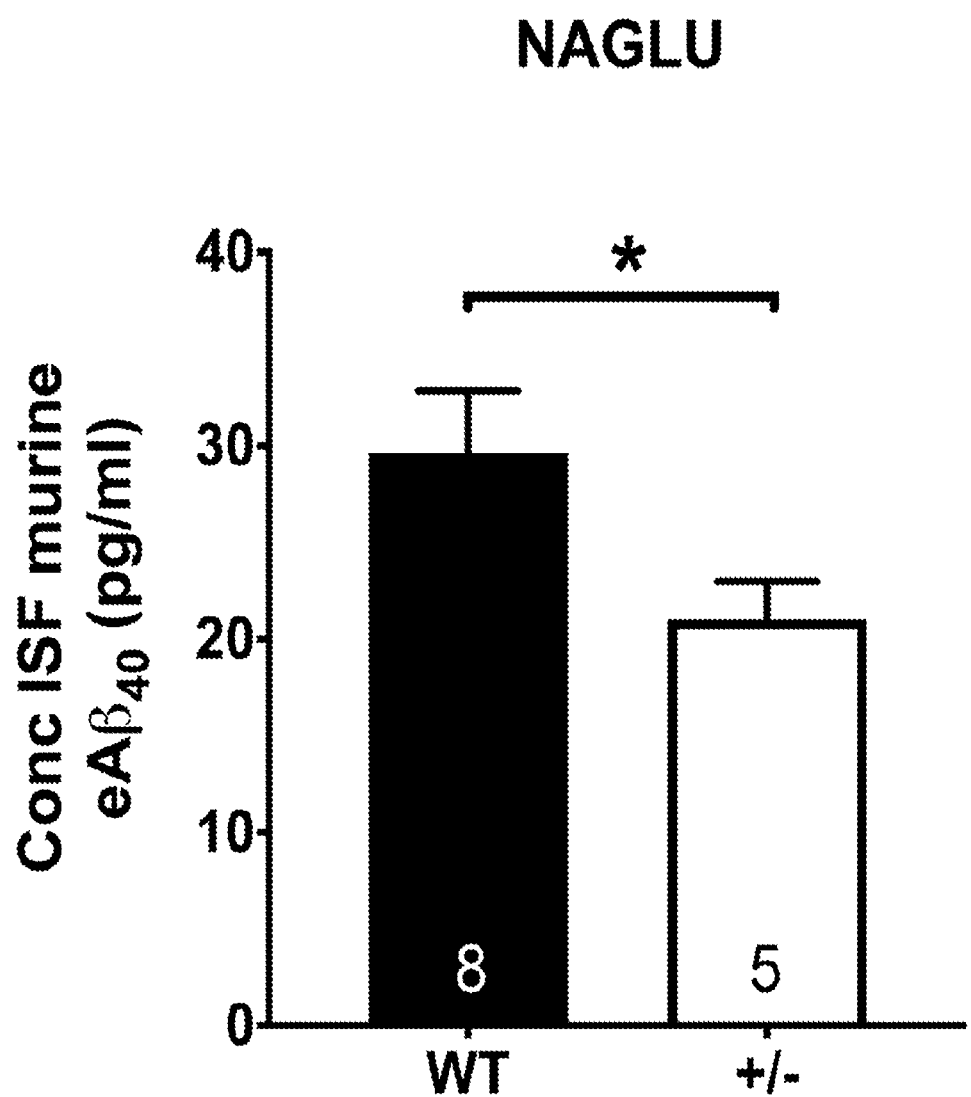
FIG. 14A-FIG. 14B is a series of bar graphs showing β-amyloid accumulation is exacerbated in mice hemizygous for PPT and NAGLU.
Figure 14B:
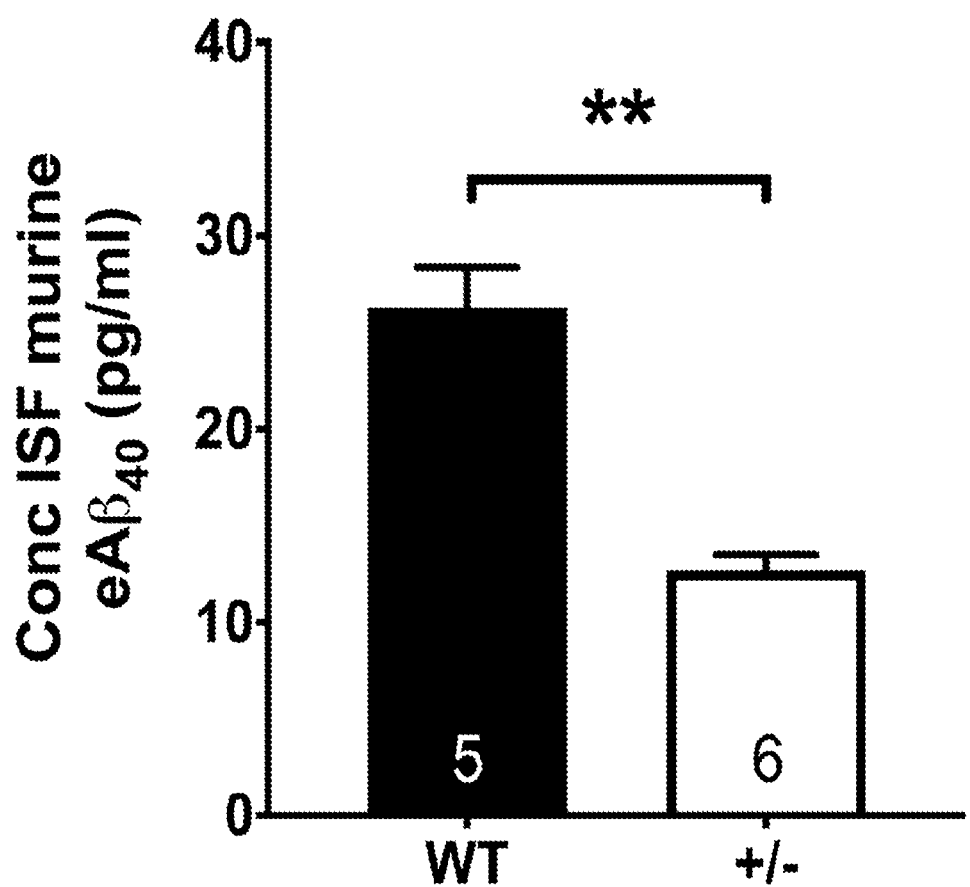

Microdialysis quantification of ISF levels of Aβ in littermates WT, hemizygous and NAGLU-deficient mice (see e.g., FIG. 14A) revealed a gene-dosage effect of NAGLU on baseline ISF levels of Aβ (see e.g., FIG. 14B). A 60% increase was also discovered in the ISF Aβ levels in hemizygous and NAGLU-deficient mice but not in wild-type mice in response to 200 µM Chloroquine (see e.g., FIG. 14C). This dose of chloroquine did not change the ISF levels of Aβ in young (3 months) or old (18 months) APP/PS1 mouse model (data not shown). These findings support the hypothesis that changes in the levels of NAGLU activity are associated with abnormal APP metabolism and Aβ generation.

Heterozygous Variants in Lysosomal HS Degradation Genes Affect the Risk of Developing PD The discovery sample consisted of WES data from 331 unrelated PD cases from the PPMI cohort. The gene-specific cMAF from the NFE ExAC data set was highly concordant with the cMAF from in-house PD databases (PPMI $r^2$=0.92; WUSTL $r^2$=0.96). The burden of rare protein-altering variants (cMAF) was compared with the burden observed in controls and in ExAC. When compared with the cMAF of the ExAc sample, seven genes passed multiple test correction threshold p<1.0×$10^{-3}$) including GBA (p=6.1×$10^{-6}$; OR=2.1; CI=1.3-3.3), GNS (p=2.5×$10^{-5}$; OR=2.4; CI=1.4-4.6) and NAGLU (p=1.0×$10^{-4}$; OR=4.7; CI=1.5-8.3). There was also a trend in HGSNAT (p=8.1×$10^{-3}$; OR=1.8; CI=1.1-2.8). Next, an additional PD cohort (WUSTL) was used to replicate these findings, including 490 PD cases where the data were obtained using the Human-Exome chip. Notably, the association found in the replication sample is in the same direction and the effect size is similar; NAGLU (p=3.6×$10^{-7}$, OR=3.6; CI=2.8-8.3) and HGSNAT (p=9.7×$10^{-4}$; OR=1.9; CI=1.4-3.2). SN pathology and LB accumulation has been reported in MPS IIIB patients with mutations in the NAGLU gene. In addition, it was found that there is a reduction in transcript levels of NAGLU gene in dopaminergic neurons from the substantia nigra of PD patients compared to controls (see e.g., FIG. 2).

In Vitro Model of Binding, Internalization and Aggregation of α-Syn

The preparation and use of α-Syn PFFs has been optimized in neuronal cultures. α-Syn PFFs were added to primary cortical neurons from wild-type mice at 7 days in vitro (DIV). 7 days post treatment; neurons were fixed and stained with pSyn-specific antibody. PFFs induced recruitment of endogenously expressed α-Syn into abnormal, phosphorylated, insoluble aggregates (see e.g., FIG. 3A and FIG. 3B). α-Syn aggregates initially appeared as small, punctate inclusions in presynaptic terminals and axons (see e.g., FIG. 3A). The aggregates grew and become more elongated and serpentine in appearance, resembling Lewy Neurites (see e.g., FIG. 3A). FIG. 3B shows that PBS-treated control neurons showed a band slightly above 15 kDa corresponding to monomeric α-Syn. Several bands with higher molecular weights appeared in neurons treated with PFFs. Those additional bands likely correspond to α-Syn oligomers. This is a tractable in vitro system to study the effects of lysosome dysfunction on α-Syn aggregation.

Spreading of pSyn Pathology In Vivo

Figure 15:
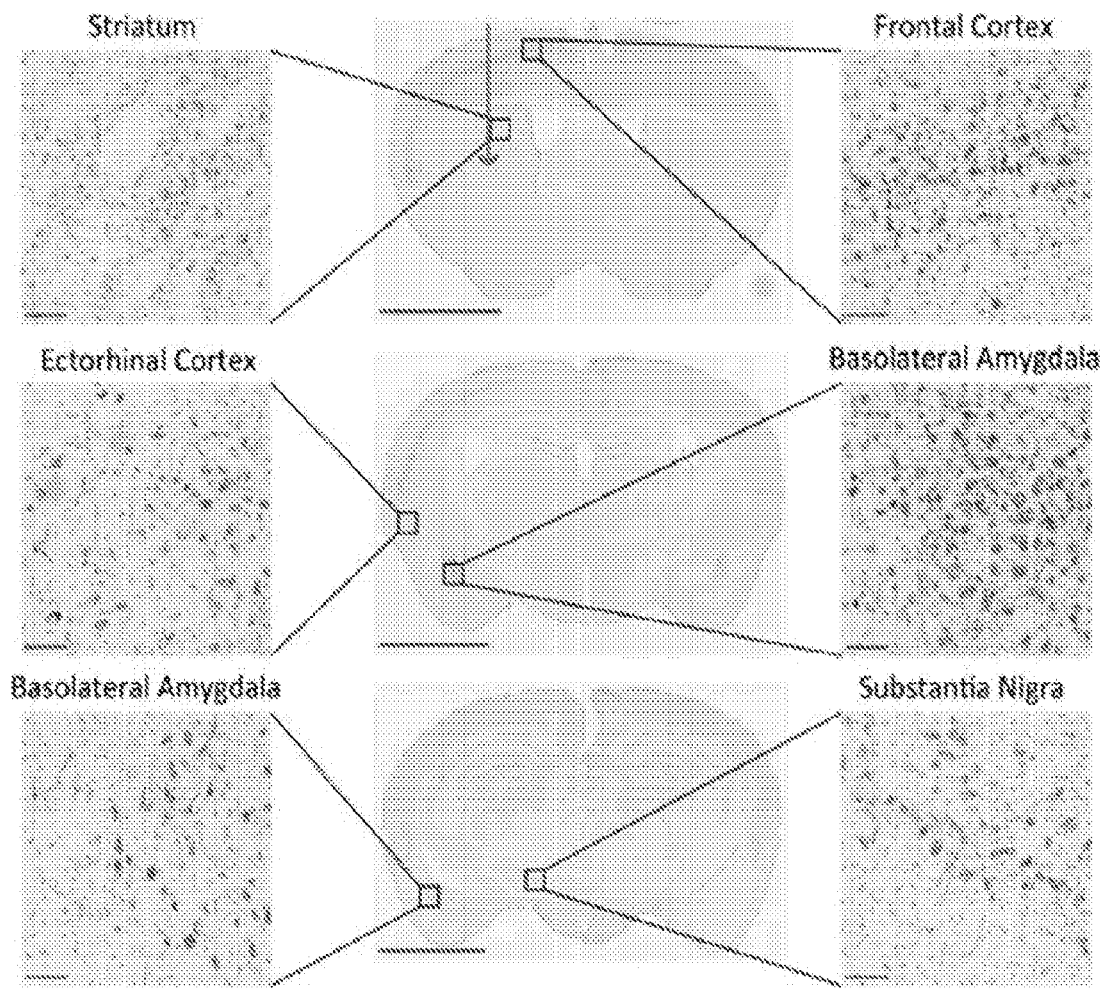
FIG. 15 is a series of images showing spreading of α-Syn pathology following injection of α-Syn pre-formed fibrils (PFFs). A single inoculum of α-Syn PFFs was injected in the striatum of a three-month old wild-type mouse (red arrow) and 90 days post-injection the brain was removed and stained with a phospho-specific α-Syn antibody. Insets show α-Syn pathology in multiple brain regions, visible as brown deposits (cresyl violet counterstain is shown in blue).
Figures 16A, 16B:
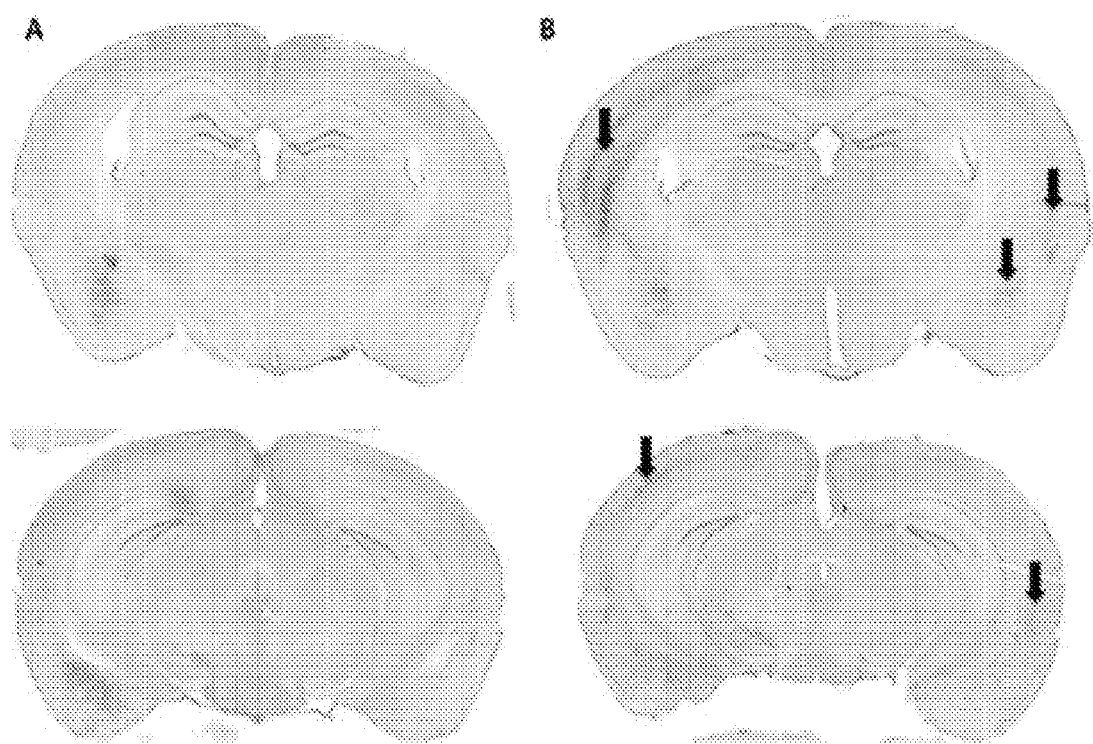
FIG. 16A-FIG. 16B is a series of images showing that pSyn aggregates are increased in NAGLU-deficient mice. (A) Coronal brain sections of pSyn staining (brown) and counterstained with cresyl violet of a young wild-type C57BL/6 mouse 90 days post-injection (dpi) with α-Syn PFFs at the hippocampus (top) and substantia nigra (bottom). (B) pSyn staining of a young NAGLU-deficient mouse 90 dpi with α-Syn PFFs at the hippocampus (top) and substantia nigra (bottom). Black arrows indicate the brain areas where the aggregates are more widespread in both the ipsilateral and contralateral hemispheres in the NAGLU-deficient mouse.

Intrastriatal inoculation of α-Syn PFFs was performed in six NAGLU-deficient mice and in six wild-type littermates. All mice survived the injections. In agreement with published data, 90 days post-injections (dpi) PFF-injected wild-type mice exhibited abundant ipsilateral pSyn pathology in multiple brain areas including striatum, frontal and entorhinal cortex, basolateral amygdala and SN. WT-treated mice exhibited little contralateral pSyn pathology in the entorhinal cortex (see e.g., FIG. 15). NAGLU-deficient mice treated with α-Syn PFFs exhibited more α-Syn pathology in the frontal and entorhinal cortex both ipsilateral and contralateral to the injection site (see e.g., FIG. 16B). NAGLU-deficient mice appeared to have more pathological pSyn pathology, which could indicate more spreading to both ipsi- and contralateral side than is observed in WT mice. More α-Syn PFFs-treated mice are currently being analyzed to further characterize the impact of NAGLU deficiency on regional and temporal spread of pSyn pathology especially in the SN (see e.g., FIG. 17A-FIG. 17C), and expand the initial results that suggest an increase in spreading of pSyn pathology in NAGLU-deficient mice.

Research Design and Methods (I)(a) Determine the Effects of Hypomorphic Missense Variants in the NAGLU Gene on Neuronal APP Metabolism and Aβ Generation, Aβ Glial Degradation In Vitro Hypomorphic Missense Variants in the NAGLU Gene The selected variants are engineered using site-directed mutagenesis and subcloned into a lentiviral vector as previously described. Lentiviral vectors are produced, handled and disposed in BSL2 facilities in compliance with Section III-E-1 of the NIH Guidelines for Research Involving Recombinant or Synthetic Nucleic Acid Molecules. To determine the effect of the variants on enzyme activity, a fluorometric assay is used as previously described for NAGLU activity. The levels of HSPGs are quantified by ELISA.

Assessing the Effect on APP Trafficking, Endocytosis and Subcellular Localization Multiple studies have demonstrated that endocytosis of APP is essential for its co-localization with β- and γ-secretases within endosomes and multivesicular bodies in the APP amyloidogenic pathway. Impairment in endosomal flux, secondary to lysosome dysfunction results in increased transit time within this organelle, which increases the propensity for β- and γ-cleavage and, hence, Aβ generation. Increased levels of intracellular full length-APP have been reported in brains of both NAGLU-deficient and Sanfilippo B patients in the absence of Aβ plaques. To determine whether the selected variants in the NAGLU gene affect steady-state levels of APP, APP endocytosis or enhanced flux of APP into the lysosomes for degradation, the kinetics of intracellular APP appearance and the levels of APP in the cell surface can be determined using a cell surface biotinylation assay as previously published. The effects on full-length APP half-life are measured by Western blot at 0, 5, 10, 30 min under treatment with protein synthesis inhibitor, cycloheximide. Co-localization techniques are also used to study the effect on APP and SorL1 subcellular localization. Protein and transcript levels of APP-processing machinery, including α-secretase (ADAM10 and ADAM17), β-secretase 1 (BACE1) and γ-secretase complex (PSEN1 and Nicastrin), are measured by western blot and RT-qPCR, respectively. To ensure the rigor and reproducibility, quantification is performed in at least 3 independent experiments with triplicates, by double-blinded observers.

Assessing the Effect on Aβ Generation

A significant proportion of APP is targeted to the lysosomes and APP levels rapidly build up in cells in the presence of lysosomal acidification inhibitors, suggesting that lysosomal degradation drives APP proteolysis to preclude formation of Aβ peptides. Sanfilippo B patients exhibit a significant increase (3-fold) in the level of soluble Aβ40 compared to normal control brains. A significant increase in Aβ oligomer levels has been reported in brains of NAGLU-deficient mice. These findings suggest that the accumulation of HS and lysosomal dysfunction in both mice and humans with NAGLU deficiency result in a γ-secretase-dependent abnormal APP processing. Therefore, it can be evaluated whether selected variants affect Aβ generation in cell cultures. Primary neuron culture is performed as previously described. Lentiviral vector carrying selected variants and wild-type under neuron-specific promoter (synapsin) is used to transduce primary neurons from both NAGLU-deficient and hemizygous mice. Different volumes of concentrated Lentivirus are used to determine the proper level of expression in neurons. NAGLU levels are measured by RT-qPCR and fluorometric assay. Aβ species in cell lysates and media from cells are detected by sandwich ELISA as previously published. Briefly, Aβx-40 and Aβx-42 peptides are captured with mouse monoclonal-coating antibodies HJ2 (anti-Aβ35-40) and HJ7.4 (anti-Aβ37-42). HJ5.1 (anti-Aβ13-28), a biotinylated antibody targeting the central domain, or HJ3.5, which targets the N-terminal amino acids, are used as the detecting antibody, followed by streptavidin-poly-HRP-40. APP-derived proteolytic fragments, such as α- and β-CTFs, and sAPPα and sAPPβ are measured by Western blot. Levels of full-length APP are also monitored by Western blots, as previously described.

Assessing the Effect on Aβ Degradation

Microglia proliferate around Aβ plaques and phagocytose Aβ material but subsequent degradation is impaired, contributing to progressive Aβ accumulation in AD. It is not clear why microglia cells can take up fibrillar Aβ but cannot degrade it. However, microgial cells from AD patients exhibit a reduction in beclin-1 and subsequent lysosomal dysfunction. In addition, insoluble fibrillar Aβ affects the trafficking of chloride channel, CIC-7, to lysosomes in primary microglia, which impairs lysosomal degradation. However, restoring lysosome acidification enhances Aβ degradation. Together, this evidence suggests that lysosomal insufficiency in microglial cells may contribute to AD pathogenesis. The data mining efforts described here revealed that NAGLU exhibits a high level of expression in microglial cells. Thus, it can be evaluated whether primary microglial cells from NAGLU deficient and hemizygous mice transduced with selected hypomorphic NAGLU variants can uptake and degrade exogenous Aβ. Aβ uptake and degradation assessment are performed as previously published.

Assessing the Effect on ALP Function

Increased Beclin1, p62 and LC3-II levels in the heart and brain tissue from NAGLU-deficient mice suggests an abnormal activity of the lysosomal autophagy system with an accumulation of autophagosomes. It can be tested whether neurons from hemizygous NAGLU mice exhibit ALP dysfunction and if these changes are increased by the selected variants. Western blots of LC3 and p62 are used as indirect indicators of macroautophagy activation. The autophagy flux is evaluated by the amount of LC3-II present in the cells in the absence or presence of activators of the autophagy system (Rapamycin and Torin1), autophagy inhibitors (Bafilomycin A1), lysosomotropic agents (chloroquine, ammonium chloride), and E64/Leupeptin as previously published. This is complemented by live-cell imaging using the mCherry-GFP-LC3 marker. Autophagosome-lysosome fusion is further evaluated by co-localization of LC3 and LAMP1. Lysotracker is used to quantify the number of acidic compartments per cell. Activation of TFEB is evaluated by its nuclear localization. RT-qPCR is used to measure the changes in the transcript levels of TFEB-regulated mRNA transcripts (SQSTM1/p62, MAP1LC3B, and LAMP2).

To ensure rigor and reproducibility, investigators are blind to the genotype during the quantification and analysis stages. For each experiment, data obtained is averaged within each of the groups described. Experiments are performed in triplicate with at least two independently generated preparations per genotype. Statistically significant differences are tested for using two-way ANOVA and appropriate post-hoc tests to determine whether each marker or functional analysis is associated with NAGLU versus control.

Anticipated Results

A gene dosage effect of NAGLU on APP trafficking, APP metabolism, Aβ generation or Aβ degradation is anticipated. In addition, it is expected that the experiments described herein allow for evaluation of the effects of selected variants in the NAGLU gene on neuron and microglia cell survival. Alternatively, primary neurons from 5XFAD transgenic mice or N2A695 cells could be transduced with selected variants in the NAGLU gene and the effect on Aβ generation could be tested. The next step after identifying variants in the NAGLU gene that affect both the risk and the pathogenesis of AD in vitro is to take advantage of the progress in the generation of iPSc and in genome-editing methods. iPSc-derived neurons or glial cells from AD patients carrying variants in the NAGLU gene could be used to compare the effect of such variants on APP metabolism compared to isogenic CRISPr-corrected cells. Combining the results from the experiments described here and the availability of a fluorometric assay for NAGLU activity one could screen CSF, plasma, serum or brain tissue of AD cases and controls to detect specific defects that can be used as biomarkers for AD.

(I)(b) Determine the Effects of the NAGLU Gene on AD Pathology In Vivo

While the neurodegenerative consequences of total loss-of-function of NAGLU in mice and humans have been characterized, very little is known about the long-term consequences of a single copy of this gene (haploinsufficiency) or its overexpression. It has always been assumed that hemizygous mice and humans are normal. However, recently it was demonstrated that haploinsufficiency in lysosomal genes results in significant metabolic abnormalities in humans and mice. One hypothesis is that AD pathology develops from milder forms of inherited lysosomal dysfunction and that their emergence may require additional age-related lysosomal impairments. Primary endpoints are Aβ levels measured at 4 months of age (prior to plaque deposition) and plaque load at 8 months of age in the presence of FAD-causing mutations in mice. Effects on Aβ levels are the primary endpoint in 24 old month NAGLU hemizygous mice expressing the most deleterious NAGLU variant AD-associated.

Effects of Hypomorphic Missense NAGLU Variant on AD-Phenotypes on Aged Mice

Figure 18:
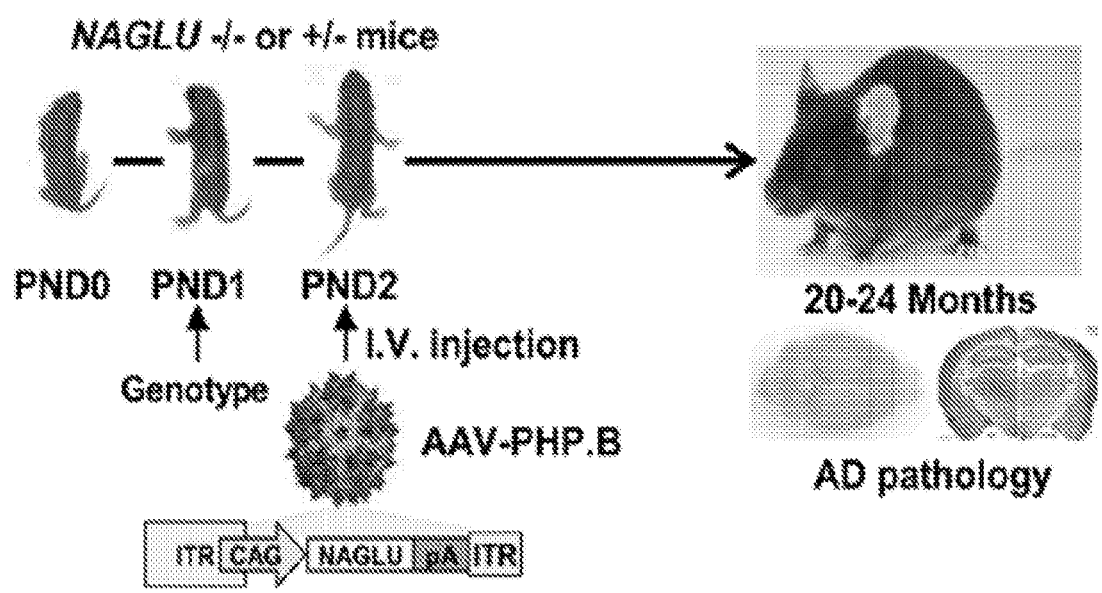
FIG. 18 is a schematic representation of the in vivo approach for treating AD pathology in a mouse model of AD (5XFAD+/−) harboring a heterozygous mutation in a lysosomal enzyme gene (5XFAD+/−, NAGLU+/− or 5XFAD+/−, PPT1+/−) using a recombinant adeno-associated viral (AAV) vector expressing the respective lysosomal enzyme cDNA.

Microdialysis quantification of ISF levels of Aβ in littermates WT, hemizygous and NAGLU-deficient mice (see e.g., FIG. 14A) revealed a gene-dosage effect of NAGLU on baseline ISF levels of Aβ (see e.g., FIG. 14B). A 60% increase in the ISF Aβ levels was also found in hemizygous and NAGLU-deficient mice but not in wild-type mice in response to Chloroquine (see e.g., FIG. 14C). AD pathology (e.g., Aβ plaque) is typically age-dependent. However, published studies have not addressed the interaction between age and lysosome dysfunction. Most of the studies evaluating the role in vivo have used a pharmacological approach or total absence of lysosome genes and short-term endpoints. An increase of Aβ oligomers has been previously reported in brains of 10 months old NAGLU-deficient mice. Here, hemizygous NAGLU mice are injected via I.V at postnatal day 1-2 with AAV2/9-PHP.B carrying the most deleterious NAGLU variant. AAV2/9-PHP.B vector passes the blood brain barrier and transfers genes throughout the CNS with an efficiency that is at least 40-fold greater than AAV9 and transduces the majority of neurons across multiple CNS regions. Mice are allowed to recover and live to at least 20 months of age. Moribund mice are anesthetized and sacrificed to collect the brain biochemical studies such as detergent-soluble and insoluble Aβ40 and Aβ42 levels. A quantitative pathological survey on AD-relevant phenotypes involving Aβ is also performed (see e.g., FIG. 18).

Sample size calculations indicate that at least n=15 mice/group are needed to detect a 20% increase in detergent-soluble and insoluble Aβ40 and Aβ42 with 80% power. Fifteen (15) NAGLU hemizygous mice and 15 wild-type mice are injected with the most deleterious NAGLU variant using AAV2/9-PHP.B at postnatal day 1-2.

Effects of NAGLU Reduction or Overexpression on Mouse Model of AD Pathology

Total loss of function of the NAGLU protein in human patients with Sanfilippo B disease results in a significant three-fold increase in the level of soluble Aβ40 compared with normal control brains. However, NAGLU transcript levels were significantly higher in human AD cases and in AD mouse models than in controls (see e.g., FIG. 1B and FIG. 10). Given the data from human Sanfilippo B patients and NAGLU-deficient mice supporting a role of these genes in intracellular Aβ generation, it can be determined whether NAGLU_reduction or overexpression affects Aβ generation in a well-characterized mouse model of AD carrying FAD mutations that favor intracellular Aβ generation. The 5XFAD model is an Aβ deposition model that develops intraneuronal Aβ42 at 1.5 months, plaques at 2 months, loss of synaptic markers and memory deficits at 4 months, and neuron loss at 9 months of age. The development of plaques is accompanied by reactive gliosis. NAGLU-deficient mice exhibit highly sulphated HS brain accumulation, neuroinflammation, enlarged lysosomes in both neurons and microglia, and reduction of synaptic proteins at ~4 mo followed by altered circadian rhythm, hearing and vision deficits and, in older mice (>8 mo), a loss of Purkinje cells and impaired motor coordination. The NAGLU-deficient mice median lifespan is ~12 months of age. NAGLU and 5XFAD mice are congenic on the C57Bl/6 background. To further ascertain whether NAGLU haploinsufficiency exacerbates an existing amyloidogenic process, NAGLU mice are crossed with 5XFAD transgenic mice. It can be determined whether overexpression of NAGLU affects AD pathology in the 5XFAD mice. Unilateral single intracranial injection is performed with AAV2/9 carrying wild-type NAGLU in 5XFAD mice at birth. The Aβ plaque load is then compared in each AAV2/9-WT-NAGLU injected and non-injected hemi-brain of 5XFAD mice by measuring the Aβ plaque load by histology and Aβ40/Aβ42 levels by sandwich ELISA at 4 and 8 months, as previously described. APP metabolism is assessed by measuring APP-CTFs by Western blot. Four months is an early time point for deposition of Aβ plaques in 5XFAD mice in order to detect if Aβ accumulation begins earlier, whereas eight months represents late stage when Aβ plaques are abundant.

Generation of AAV2/9 Vectors

NAGLU wild-type and the most deleterious variant are subcloned into the AAV2/9-PHP.B or AAV2/9 vector. High titer AAV2/9 vector stocks have been obtained from the UNC Viral Vector Core facility. The AAV vector stocks are diluted to $10^{12}$ vg/ml in lactated Ringer's solution for all the experiments outlined in this study.

Aβ Plaque Quantification and Aβ Generation

Fixed frozen brain sections (50 μm) are stained in a sub-cohort of mice with X-34 and immunostained with HJ3.4 (anti-Aβ) antibodies to quantify plaque load (expressed as % area). Aβ levels in brain tissue homogenates from the contralateral hemisphere are fractionated into soluble (PBS) and insoluble (5M guanidine) fractions and quantified using ELISAs. The effects on APP processing machinery are assessed.

Synaptic Markers

Synaptic loss is a common finding in humans and AD mouse models. It can be assessed whether NAGLU reduction or overexpression affect the synaptic loss in 5XFAD mice by Western blot using antibodies against presynaptic markers: SNAP-25, vesicle-associated membrane protein 2, Syntaxin 1, and Synaptophysin, as previously published.

In Vivo Aβ Microdialysis

Aβ has a relatively short half-life in the brain, with ~1-2 hours in mouse interstitial fluid (ISF) and ~8 hours in human cerebrospinal fluid (CSF). To investigate the effect of NAGLU on Aβ generation and clearance, in vivo microdialysis is used to dynamically assess ISF Aβ metabolism in the hippocampus of 5XFAD/NAGLU (+/−); 5XFAD/NAGLU (−/−) mice and 5XFAD littermates injected with AVV2/9 or PBS at 3-4 months of age. To assess ISF Aβ levels over time in the hippocampus of awake, freely moving mice in vivo microdialysis is performed as previously described (see e.g., FIG. 14A-FIG. 14C). Briefly, under isoflurane anesthesia, a guide cannula is stereotaxically implanted above the hippocampus (3.1 mm behind bregma, 2.5 mm lateral to midline, and 1.2 mm below dura at a 12° angle). A microdialysis probe is inserted through the guide cannula into the brain. Artificial CSF is used as microdialysis perfusion buffer. Microdialysis samples are collected every 60-90 min and are assessed for Aβ40 or Aβ42 by ELISAs. The mean concentration of Aβ over 6 hr is defined as basal concentration of ISF Aβ. For each animal, all Aβ concentrations are normalized to the basal Aβ concentration for that mouse.

Aβ Elimination Half-Life

After basal concentration is determined, mice are administered a blood-brain permeable γ-secretase inhibitor (LY411575, 3 mg/kg subcutaneously) to rapidly block the production of Aβ. Microdialysis samples are collected every 60 min for 6 hr and then assayed for Aβ40 by ELISA. The half-life of ISF Aβ is calculated on the basis of the slope of the semi-log plot of % change in Aβ versus time. Only Aβ values that are continually decreasing are included in half-life analysis.

Sample Size

Based on power analysis, n=10 mice/group are needed to detect a 30% reduction in ISF Aβ levels and clearance rate. (5 groups×10=50 mice; equal number of males and females).

ALP Dysfunction

Brain sections from all tested genotypes are immunostained with anti-LAMP1, LC3 and p62 antibodies, as described above.

Effect on Neuritic Dystrophy and Reactive Gliosis

Previous studies have demonstrated that NAGLU deficient mice exhibit increased astrogliosis. Therefore, in parallel studies, staining with anti-CD11b and anti-GFAP antibodies is performed to examine the impact of one single copy of the selected genes on reactive gliosis. Fixed frozen brain sections are immunostained with reticulon-3 (RTN-3) antibodies (RTN-3 selectively accumulates in dystrophic neurites) to quantify dystrophic neurites as has been done previously.

Consideration of Relevant Biological Variables

Sex is taken into consideration as a variable in the studies described here. Female mice generally have greater Aβ accumulation than males, therefore each group in the study consists of 10 males and 10 littermate females (n=20). Sample size calculations indicate that at least n=10 mice/group are needed to detect a 40% increase in plaque load (SD=20%, α=5%) and detergent-soluble and insoluble Aβ40 and Aβ42 with 80% power. Twenty (20) NAGLU-deficient mice and 20 NAGLU hemizygous mice crossed with 5XFAD are injected with the most deleterious NAGLU variant using AAV2/9-PHP.B at birth. In addition, 20 NAGLU-deficient mice, 20 NAGLU hemizygous mice crossed with 5XFAD and 20 additional 5XFAD mice (to control for genetic background) at 4 and 8 months of age are collected for histological and biochemical studies. Once the experimental animals are generated for each experiment, an independent member of the laboratory randomly assigns a number to each animal. Therefore, the researcher most closely associated with the study is blinded to the genotype and treatment regimen ensuring an unbiased experiment. Samples for biochemical and histological analyses retain the same randomly assigned numbers. Biological variables are kept to a minimum by using congenic animals and the same batch of reagents within one experiment.

Anticipated Results

It is anticipated that mice hemizygous for the NAGLU gene accelerate and worsen the Aβ plaque burden in 5XFAD mice. It is expected that NAGLU haploinsufficiency affects APP metabolism and Aβ generation in aged mice, subsequently increasing synaptic loss and reactive gliosis without the generation of Aβ plaque. If changes in APP metabolism and Aβ generation are not found in the brains of hemizygous mice, the transcript of NAGLU could be knocked down in newborn 5XFAD transgenic mice by injecting AAV2/9 vectors carrying validated shRNA/RNAi against them. CRISPr technology could be used to generate knock-in mice of the variants in selected genes with the strongest effect on in vitro assays. To extend the findings in the NAGLU mice, the same approach could be applied to the other lysosomal enzymes that degrade HS for which there are mouse models available (such as N-sulfoglucosaminesulfohydrolase, [SGSH (Jax 003780)]).

(II) Determine the Effect of Hypomorphic Missense Variants in the NAGLU Gene on α-Syn Aggregation In Vitro and α-Syn Spreading In Vivo As described here, the functional effect of NAGLU on uptake, trafficking, aggregation and clearance of α-Synuclein can be determined in vitro. Macropinocytotic uptake of α-Syn by immortalized cells and primary neurons seems to be mediated by HSPGs. In addition, HS significantly stimulates the formation of α-Syn fibrils in vitro. A well-characterized model of α-Syn aggregation has been developed previously in cultured neurons. In this model, PFFs generated from recombinant α-Syn are added directly to primary neurons and are endocytosed by the neuron. These PFFs induce recruitment of endogenously expressed α-Syn into abnormal, phosphorylated, insoluble and ubiquitinated aggregates. The formation of these aggregates from endogenous α-Syn in primary neurons derived from wild-type, nontransgenic mice in vitro follows a lag phase of 2-3 days, followed by formation in axons by days 4-7, spread to somatodendritic compartments by days 7-10 and neuron death ~14 d after PFF addition (see e.g., FIG. 3A-FIG. 3B). As described here, the effects of NAGLU on uptake, trafficking, aggregation and clearance of α-Syn fibrils can be determined using this well-characterized model. It can also be determined whether there are changes in the clearance of endogenous α-Syn in primary hippocampal neurons from NAGLU-deficient and hemizygous mice transduced with the most deleterious NAGLU variant. The rate and level of α-Syn aggregates (inclusions) in primary neurons from the NAGLU-deficient mice can be determined following the treatment with α-Syn PFFs (see e.g., FIG. 3A-FIG. 3B). It can also be determined whether substrate reduction (Genistein), recombinant enzyme replacement or gene therapy replacement can rescue α-Syn PFFs in neurons from NAGLU-deficient mice.

Generation of α-Syn PFFs

Recombinant monomeric α-Syn is prepared from bacteria and sequentially purified by size exclusion and ion exchange chromatography according to established protocols. Fibrillar forms of α-Syn are prepared by agitating the recombinant monomer at 37° C. for ~72-120 hours followed by size selection using centrifugal filter devices with specified molecular weight cutoff parameters. The conditions for the generation of PFFs have been optimized previously. PFFs are diluted in Tris-buffered NaCl and added to cultured primary neurons after 5-10 DIV. PFF transductions and seeding are confirmed by immunofluorescence or sequential extraction and immunoblotting 4-7 days after exposure. Abnormal α-Syn aggregates derived from endogenous α-Syn are detected via immunofluorescence with anti pSyn (Ser129) antibody, clone 81A (Biolegend, MMS-5091) and by Western blot. α-Syn PFFs are produced, handled and disposed in BSL2 facilities.

α-Syn PFFs Trafficking, Endocytosis and Subcellular Localization

Lysosomal processing is the predominant fate of endocytosed α-Syn fibrils in primary neurons. PFF-treated neurons are co-stained with presynaptic (CSPα), endocytic (EEA1), autophagosome (Rab7) and lysosome (LAMP1) markers to determine if there are changes in the trafficking of α-Syn aggregates in the endo-lysosomal pathway.

Assessing the Effect on ALP Function

α-Syn aggregates impair overall macroautophagy by reducing autophagosome clearance. Therefore, it can be determined whether pharmacological modulation (as described above) of the autophagy pathway improves α-Syn clearance.

Assessing the Effect on Chaperone-Mediated Autophagy (CMA)

α-Syn is degraded by the chaperone-mediated autophagy (CMA) and aggregation-prone α-Syn mutants block CMA. Therefore, it can be determined whether LAMP2A and HSP70 protein levels are affected in PFF-treated cells. PFF-treated neurons are treated with a CMA activator; AR7 (retinoic acid receptor alpha specific antagonist) and α-Syn levels are determined in cell lysates and conditioned medium.

Effect on Endocytic and Lysosomal Membrane Integrity

α-Syn PFFs induce vesicle and lysosomal rupture following endocytosis. These ruptured vesicles are positive for the EEA1, LC3 and galactin-3. It is determined whether α-Syn PFFs affect lysosomal membrane integrity by Gal-3 and LC3 staining.

Rescue Experiments

Recombinant NAGLU is added before, during and after exposure to αSyn in the presence or absence of an uptake/binding inhibitor (Mannose-6-phosphate: M3655, Sigma) and the effect on α-Syn PFFs aggregation is tested. Sufficient recombinant NAGLU is already available for adding to the deficient neurons in vitro. Genistein (4',5,7-trihydroxy-isoflavone or 5,7-dihydroxy-3-(4-hydroxyphenyl)-4H-1-benzopyran-4-one) inhibits synthesis of glycosaminoglycans (GAGs) in cultured fibroblasts of MPS patients and reduces lysosomal storage material in NAGLU-deficient mice. Genistein is used as a substrate reduction agent for in vitro experiments.

Anticipated Results

It is anticipated that there is a gene dosage effect of NAGLU on uptake, trafficking and aggregation of α-Syn PFFs in vitro and that a recombinant enzyme will rescue those effects. NAGLU-deficient cells accumulate HS and HSPG in the cell membrane and in the endo-lysosomal system. Thus, an increase in the uptake of α-Syn PFFs followed by disruption of the endocytic vesicles and lysosome membranes is anticipated, which will increase the cytosolic levels and recruitment of endogenous α-Syn. Lentiviral vectors could be generated and aggregation-prone α-Syn mutants could be overexpressed in primary neurons from NAGLU-deficient and hemizygous mice. Rates of aggregation and degradation could then be evaluated. Alternatively, primary neurons from overexpressing human A53T α-Syn transgenic mice could be used, and they could be transduced with selected variants in the NAGLU gene and effect on α-Syn tested. iPSc-derived neurons from PD patients carrying variants in the NAGLU gene could be used to compare the effect of such variants on α-Syn processing compared with isogenic CRISPr-corrected cells.

Determine the Effects of NAGLU on α-Syn Spreading In Vivo

Accumulating experimental data indicate that cell-to-cell transmission of α-Syn follows a seeding principle similar to that observed for the prion protein. Intracerebral injection of brain extracts (autopsy-derived brain extracts from cases of Lewy body disease) containing aggregated α-Syn into young mice (~3-4 months of age) overexpressing human A53T α-Syn stimulates the formation of pSyn lesions in the host, observed as early as 30 days post injections (dpi); by ~90 dpi pSyn is widespread and abundant in anatomically linked regions of the brain, suggesting a parallel with the apparent spread of α-Syn deposits observed in human PD cases (see e.g., FIG. 15, FIG. 16A-FIG. 16B, and FIG. 17A-FIG. 17C). Around 100 dpi, the mice develop motor dysfunction, and premature death (~126 dpi) compared to uninjected mice. Intracerebral injections of synthetic (human or mouse) α-Syn PFFs also induced LB-like pathology and neuronal degeneration in non-transgenic (wild-type) host mice (see e.g., FIG. 15, FIG. 16A-FIG. 16B, and FIG. 17A-FIG. 17C). Approximately, 50% of wild-type mice injected with insoluble pSyn of dementia with LB brains developed pSyn pathology. In contrast, the efficiency of the induction of pSyn pathology by human and mouse α-Syn PFFs is 90% and 100%, respectively. At 30 dpi, pSyn-positive LB-like accumulations were exclusively ipsilateral to the injection site (see e.g., FIG. 15, FIG. 16A-FIG. 16B, and FIG. 17A-FIG. 17C). LB/LN pathology within affected ipsilateral regions, but also in contralateral neocortex, showed markedly increased pSyn immunoreactivity in mice examined 90 and 180 dpi. SN pars compacta (SNpc) α-Syn pathology developed progressively after PFFs injection, evolving from pale cytoplasmic accumulations at 30 dpi to dense perinuclear LB-like inclusions by 90 and 180 dpi, particularly among ventromedial SNpc populations. There is a concomitant decrease of SNpc dopaminergic (DA) neurons by 15 and 35% at 90 and 180 dpi, respectively, suggesting that LBs/LNs form before SNpc DA neuron loss. Thus, propagation of LBs/LNs is connectivity-dependent and accumulation of pathologic α-Syn appears to be upstream of and directly linked to SNpc DA neuron loss. This in vivo model of intrastriatal injections of α-Syn PFFs recapitulates the accumulation of intracellular LB/LN pathology, selective loss of SNpc DA neurons, and impaired motor coordination. LBs and LNs both contain HSPGs. However, the role of HS in α-Syn spreading in vivo has not been evaluated. To date, it is not clear if reduction in NAGLU activity and the resulting HSPG accumulation affects α-Syn aggregation and spreading. As described herein, NAGLU-deficient and hemizygous mice expressing the most deleterious NAGLU variant associated with PD can be used to test if HS and HSPG accumulation affects α-Syn aggregation, spreading and accelerates disease in vivo.

Figure 19:
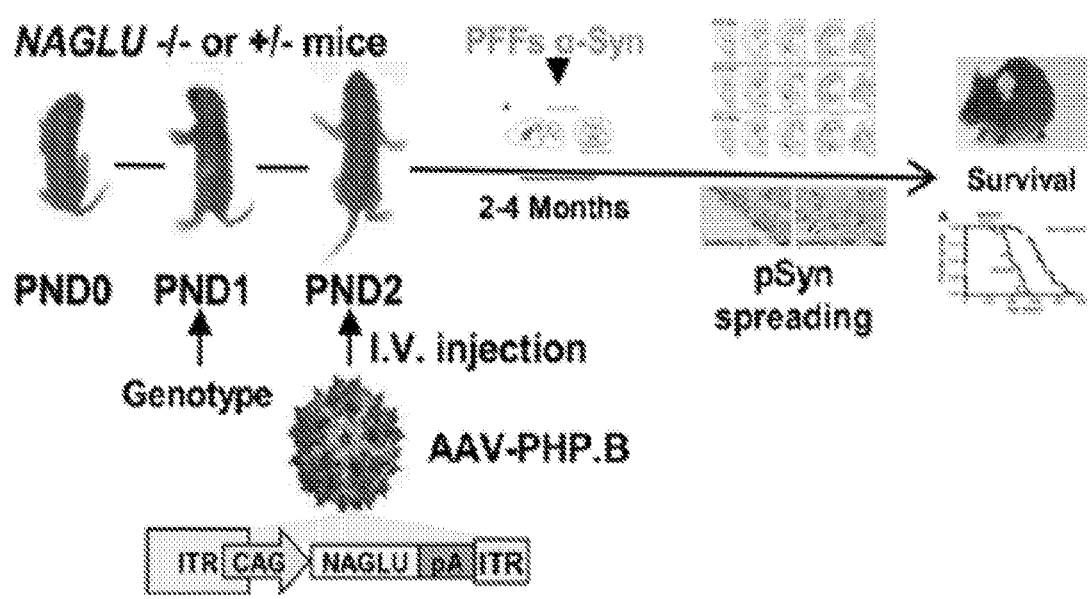
FIG. 19 is a schematic representation of the in vivo approach for treating PD pathology in a mouse model of PD (injection with α-syn pre-formed fibrils) harboring a heterozygous mutation in a lysosomal enzyme gene (NAGLU+/− or PPT1+/−) using a recombinant AAV vector expressing the respective lysosomal enzyme cDNA.

Intrastriatal Inoculation of α-Syn PFFs

α-Syn PFFs are prepared as described above. Intrastriatal inoculation of α-Syn PFFs is performed in NAGLU-deficient and hemizygous mice injected with the most deleterious NAGLU variant using AAV2/9-PHP.B at birth (see e.g., FIG. 19) and NAGLU-deficient mice, hemizygous mice and twelve wild-type mice. The spreading of aggregates of pSyn is quantified and whether α-Syn PFFs affect the lifespan of NAGLU mice is determined. 3-4 month old wild-type, NAGLU-deficient or hemizygous mice are injected unilaterally in the dorsal striatum (0.2 mm A/P, 2.0 mm M/L relative to Bregma, 3.2 mm below the skull surface) with a single inoculation of mouse αSyn PFFs (or PBS or αSyn monomer as control). Mice are allowed to recover and age to 30, 90, or 180 days post-injection at which times the brains are harvested and processed for immunohistochemistry with an anti-pSyn (Ser129) antibody. pSyn co-localization staining is performed using anti-ubiquitin and HSP90. Based on power analysis, n=12 mice/group are needed to detect a 30% increase in pSyn levels. (5 groups× 12=60 mice).

αSyn and pSyn Quantification

Cortex, hippocampus, striatum, and brainstem are dissected from the hemibrain of each animal and insoluble αSyn is isolated by sequential detergent extraction followed by ELISA and Western blot as previously published, using anti-Synuclein-1/Clone 42 (BD Biosciences) and anti-pSyn 81A (biolegend) as capture antibodies.

Figures 17A, 17B, 17C:
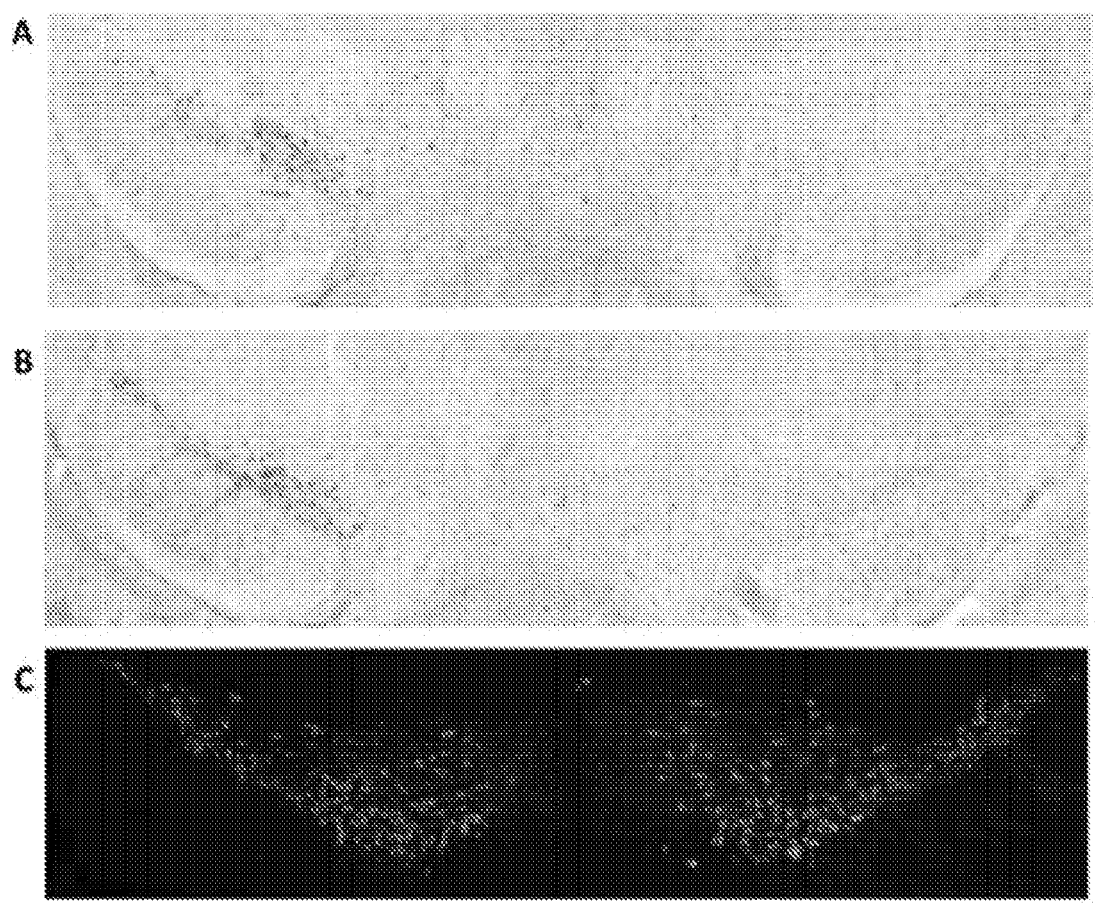
FIG. 17A-FIG. 17C is a series of images showing (A) coronal brain sections at the substantia nigra (SN) of pSyn staining (brown) and counterstained with cresyl violet of a young wild-type C57BL/6 mouse 90 dpi with α-Syn PFFs in the striatum. (B) pSyn staining of the SN of a young NAGLU-deficient mouse 90 dpi with α-Syn PFFs in the striatum. (C) Tyrosine hydroxylase (TH, green) and pSyn (red) co-staining at the SN of a young wild-type mouse 90 dpi with α-Syn PFFs in the striatum.

Immunoblot analysis of ipsi- and contralateral striata from PFF- and PBS-treated animals is performed using antibodies against tyrosine hydroxylase (TH) and dopamine transporter (DAT) as previously published (see e.g., FIG. 17C). Brain atrophy and neuron loss in the SN are also assessed, and immunohistochemistry for markers of injury and inflammation (e.g., GFAP, Iba-1) is performed as described above.

Lifespan is compared between PFF- and PBS-treated animals. Rotarod and wire hang test are known to be most sensitive to detect motor impairment in wild-type mice 6 months after α-Syn PFFs injections. The use of rotarod and wire hang behavioral tests in LSDs mouse models has been previously published and the appropriate experimental designs and statistical tools (ANOVA with post-hoc analyses for multiple group comparisons, and Student's t-test for pair-wise comparisons) are known. A gait analysis is performed in PFF- and PBS-treated animals. It has been previously shown that gait analysis is very sensitive to capture "parkinsonian-like" signs in a mouse model of LSD.

Sample Size

With respect to performance on the rotarod and wire-hang assays, for comparisons between five groups at a time, when normal animals perform at 60 s and NAGLU-deficient animals perform at 0 s (40 weeks), and a standard deviation of 30 s, the effect size is 0.89. With an effect size of 0.89, α=0.05, and power=0.95, 6 animals are needed to be able to detect a significant difference between groups. With respect to lifespan, for comparisons between five groups with normal animals and hemizygous having a median life span of ~730 days and NAGLU-deficient ~322 days and the standard deviation being 20 d, the effect size is 5.51. With an effect size of 5.51, α=0.05, and power=0.95, only 2-3 animals are needed to be able to detect a significant difference between the groups. The behavior and lifespan studies should be sufficiently powered since 10-12 mice/group are used.

Anticipated Results

It is expected that α-Syn PFFs injections will accelerate the phenotype of NAGLU-deficient mice increasing the gliosis, neurodegeneration, worsening the motor impairment and shortening the lifespan. Hemizygous NAGLU mice will worsen the propagation of pSyn pathology. Alternatively, AAV2/9 vectors could be generated carrying the α-Syn mutations and injected stereotaxically in the striatum of young NAGLU-deficient mice or the overexpressing human A53T α-Syn mice could be crossed into the NAGLU-deficient mice and observed for changes in the pSyn pathology, disease progression and lifespan. The same approach could be applied to the SGSH-deficient mice.

Example 5: Identifying Genetic Variation Underlying Dysfunction of the Autophagy-Lysosomal Pathway (ALP) Involved in Parkinson's Disease Pathogenesis This example describes identifying ALP genes enriched with rare functional variants in PD and determining the functional effect of specific ALP genes on α-synuclein aggregates and mitophagy in vitro.

Emerging evidence highlights the overlapping clinical, pathological and genetic features between Parkinson's disease (PD) and certain lysosomal storage disorders (LSDs), indicating common pathogenic mechanisms. Homozygous loss-of-function mutations in the GBA, SMPD1 and NPC1 genes cause LSDs. Heterozygous low frequency coding variants in GBA, SMPD1 and NPC1 increase the risk for PD. These results suggest that complete loss-of-function variants in ALP genes cause LSDs and partial loss-of-function low frequency variants increase the risk for PD. However, a systematic and comprehensive evaluation of the contribution of genetic variation of each gene in the ALP to the risk of developing PD and its role in PD pathogenesis has not been performed. To address this gap in the current knowledge, described herein is a powerful approach to identify and prioritize rare functional variants in genes of the ALP (other than GBA) that are associated with risk of developing PD. First, the burden of rare functional variants in each gene of the ALP from 33,350 Non-Finnish European is compared with 2,700 PD cases and 2,000 controls. The results presented here suggest an enrichment of predicted functional variants in at least six LSD-causing genes in PD patients including GBA, NAGLU and PPT1. Second, cell-based assays are used to examine the effect of the selected variants in the NAGLU and PPT1 genes, associated with PD risk, on enzyme activity, protein stability and/or mRNA levels and its impact on overall lysosome function. The effect of validated functional variants on α-synuclein (α-Syn) aggregate clearance and mitophagy is assessed in vitro. The effect of gene-dosage of the NAGLU and PPT1 genes on endogenous α-Syn aggregates is also measured following exposure to α-Syn pre-formed fibrils (PFFs). It can then be determined whether recombinant enzyme replacement can attenuate the PFF-induced toxicity of α-Syn pre-formed fibrils in neurons from NAGLU and PPT1-deficient mice. Finally, it can be determined whether there are changes in mitophagy in primary dopaminergic neurons from NAGLU and PPT1-deficient mice. Here, the described studies can provide greater insight into the mechanism of ALP dysfunction in PD pathogenesis and can establish the basis for repurposing treatment strategies that are currently in place for LSDs for the potential treatment of PD.

The goals of the studies described herein are to identify the genetic variation that underlies the dysfunction of the autophagy-lysosomal pathway (ALP) involved in Parkinson's disease (PD) pathogenesis. The studies presented here incorporate an integrative framework that couples human genetic studies with functional validation of selected ALP genes on α-synuclein aggregates and mitophagy in vitro. The experiments described here can uncover novel ALP genes associated with PD. They can provide greater insight into the mechanism of ALP dysfunction in PD pathogenesis and can establish the basis for repurposing treatment strategies that are currently in place for Lysosomal Storage Disorders for the potential treatment of PD.

Emerging evidence highlights the overlapping clinical and genetic features between PD and certain lysosomal storage disorders (LSD), indicating possible common pathogenic mechanisms. Multiple Mendelian and PD risk-associated genes including GBA, LRRK2, VPS35, SNCA, GAK, ATP13A2 and RAB7L1 are involved in the autophagy-lysosome pathway (ALP) and their variants promote ALP dysfunction. Homozygous loss-of-function mutations in the GBA, SMPD1 and NPC1 genes cause LSDs. Interestingly, heterozygous low frequency coding variants in GBA, SMPD1 and NPC1 increase the risk for PD. These results suggest that complete loss-of-function variants in ALP genes cause LSD and partial loss-of-function low frequency variants increase the risk for PD. Studies of single ALP genes in isolated populations support the genetic overlap between PD and LSD. However, a systematic and comprehensive evaluation of the contribution of genetic variation in each gene of the ALP to the risk of developing PD and its role in PD pathogenesis within the general population has not been performed.

(I) Identify ALP Genes Enriched with Rare Functional Variants in PD

It is hypothesized that untested rare functional variants in ALP genes (other than GBA) increase the risk of PD. As described here, whole exome sequencing (WES) data from 33,350 controls (ExAc database, Non-Finnish Europeans) is analyzed to establish the baseline genetic variation in each gene of the ALP (≈430) for individuals of European ancestry (EA). Next, gene-based analyses of ALP genes are performed in case-control cohorts of PD (2,700 cases/2,000 controls) combining exome-chip, genome-wide (GWA) and WES data. An enrichment of predicted rare functional variants in six LSD-causing genes has been previously identified in these PD cohorts.

(II) Determine the Functional Effect of Specific ALP Genes on α-Synuclein Aggregates and Mitophagy In Vitro Patients with infantile neuronal ceroid lipofuscinosis or Mucopolysaccharidosis IIIB exhibit parkinsonism, substantia nigra degeneration or Lewy body accumulation. There is also a reduction in transcript levels of N-acetyl-alpha-glucosaminidase (NAGLU) and palmitoyl-protein thioesterase 1 (PPT1) genes in DA neurons of PD patients. Together, with the data presented in (I), the NAGLU and PPT1 genes were selected to further validate involvement in PD pathogenesis in vitro.

Multiple stringent criteria suggest that the rare variants identified in (I) are potentially functional. In order to validate their functional effects, primary neurons from NAGLU and PPT1-deficient mice are transduced with lentiviral vectors carrying the 3 variants predicted to be the most deleterious variants per gene identified in (I), including two variants previously identified as pathogenic. The effect of the selected variants in NAGLU and PPT1 genes on enzyme activity, protein and RNA levels is measured. The effect on overall lysosome function is also determined.

Multiple pharmacological in vitro and in vivo studies suggest that ALP dysfunction causes defective clearance of aggregated α-synuclein (α-Syn). However, it is unclear whether the absence of a specific ALP gene (other than GBA) affects the lysosomal clearance of aggregated α-Syn and increases its toxicity. Here, studies are described which can determine whether the absence of the NAGLU and PPT1 genes affects clearance of endogenous α-Syn. α-Syn is overexpressed in primary neurons from NAGLU and PPT1-deficient mice and the effects on lysosomal clearance and neurotoxicity are tested. It can also be determined whether exogenous α-Syn pre-formed fibrils (PFFs) added to primary neurons from the NAGLU and PPT1-deficient mice exacerbate PFF-induced neurotoxicity. Finally, it can be determined whether recombinant enzyme replacement can attenuate the toxicity of α-Syn pre-formed fibrils in neurons from NAGLU and PPT1-deficient mice. The conditions for the generation and purification of α-Syn PFFs have been previously optimized. Wild-type hippocampal neurons have also been transduced with α-Syn and phospho-α-Syn inclusions were detected using both fluorescent and western blotting methods.

Dysfunctional mitochondria contribute to the pathogenesis of PD. Lysosomal dysfunction in LSDs is associated with dysregulation of mitochondrial quality control pathways, and the accumulation of damaged mitochondria. Mitophagy is mediated by PD-causing genes Parkin and Pink1. However, it is unclear if mitophagy is affected by the absence of NAGLU or PPT1 genes and if there is a relation with the Parkin/Pink1 pathway. Here, studies are described that can determine whether there are changes in mitophagy in primary dopaminergic neurons from NAGLU and PPT1-deficient mice.

Significance

In the human genome, there are at least 430 genes associated with the autophagy-lysosomal pathway (ALP) (38 autophagy genes, 161 autophagy regulator genes, 64 lysosomal genes and 167 lysosome regulator genes). Mutations in 38% of all ALP genes (157 genes) cause a Mendelian disease (OMIM), of which the most studied are the classic lysosomal storage disorders (LSD). There are at least 50 distinct LSDs that, as a group, occur with a frequency of ~1 in 5,000 live births. LSDs are generally considered pediatric disorders and are typically caused by complete loss-of-function (LoF) mutations. However, adult-onset forms of LSDs carrying hypomorphic variants have been reported. LSDs are monogenic disorders but exhibit complex clinical features. In fact, approximately 75% of LSDs have a clinically significant neurological component.

Emerging evidence reveals overlapping clinical and genetic features between PD and certain lysosomal storage disorders (LSD), indicating common pathogenic mechanisms. Homozygous loss-of-function mutations in GBA, SMPD1 and NPC1 genes cause LSDs. Interestingly, heterozygous low frequency coding variants in GBA, SMPD1 and NPC1 increase the risk for PD. These results suggest that total loss-of-function variants in ALP genes cause LSD and partial loss-of-function low frequency variants increase the risk for PD. Studies on single ALP genes in isolated populations support the genetic overlap between PD and LSD. However, a systematic and comprehensive evaluation of the contribution of genetic variation in each gene of the ALP to the risk of developing PD and its role in PD pathogenesis within the general population has not been performed.

Newborn screening studies have shown that the levels of lysosomal enzyme activity ranges over a factor of ten in healthy humans. Heterozygous carriers of disease-causing variants in GBA, NPC1, GALC, GAA, GLA and IDUA genes exhibit significantly lower levels of enzyme activity than controls. In addition, heterozygous carriers of disease-causing variants in NPC1 exhibit significant metabolic abnormalities downstream of the primary pathway affected in Niemann-Pick. To date, there are no systematic studies of the long-term consequences of such metabolic alterations and ALP dysfunction. However, several studies suggest that heterozygous carriers of disease-causing variants have higher risk of neurodegenerative diseases. The studies described here address multiple gaps in the current knowledge. First, whole exome sequencing (WES) data from a large database is used to determine the baseline genetic variation in each gene of the ALP for individuals of European Ancestry (EA). Second, the cumulative allele frequency of rare functional variants is analyzed in each gene of the ALP in PD cases to identify novel genes that affect the risk of developing PD. Finally, the role of these candidate genes in the pathogenesis of PD is validated in vitro. By identifying specific defects in ALP genes in PD, multiple therapeutic strategies currently in place for the treatment of the LSDs can be taken advantage of, including gene therapy, enzyme replacement, oral small molecule substrate reduction therapy, small molecule chaperones and pharmacological remediation of autophagy pathways for the potential treatment of PD. These data will form the foundation for more thorough experiments designed to determine the role of these ALP genes in vivo.

Innovation

The current state of knowledge about the genetic variations in ALP genes in PD is dominated by studies of the GBA gene. The studies described here systematically and comprehensively evaluate the contribution of genetic variation in each gene of the ALP to the risk of developing PD in a large publicly available database of WES data from the Exome Aggregation Consortium (ExAC) (n≈61,000), in addition to in-house WES and Exome-chip data for PD cases (n≈2700) and controls (n≈2000). Using these multiple data sets, a set of analyses has been designed that would uncover the genetic architecture of ALP dysfunction associated with PD.

There is no consensus about the role of specific ALP genes in PD pathogenesis. This in part is due to the fact that most genetic studies have focused on a small number of genes (e.g., GBA, SMPD1 and NPC1), and cell-based studies use classic expression systems and pharmacological approaches. In addition, many of these studies do not assess the proper PD pathway (α-Syn aggregation vs mitophagy). The studies described here incorporate an integrative framework that couples computational methods and experimental data to validate the functional effects of selected ALP genes in vitro. Cell-based assays are complemented with biochemical data, live-cell assays, genome-wide gene expression data in human PD cases and controls, genome-wide gene expression data from human PD cases at different stages, and genome-wide gene expression data from PD mouse models. To accomplish the goals of this study, a collaborative team has been assembled with a proven record of productivity in LSD and PD.

Experimental Approach

ALP Genes Enriched with Rare Functional Variants in PD

A list of autophagy-lysosomal gene sets (~430 genes) has been manually compiled by mining existing annotations in public databases (See bioinformatics analyses) and literature. The best studied models of ALP dysfunction are the LSDs. LSDs are a genetically heterogeneous group of Mendelian diseases caused by homozygous LoF, compound heterozygous mutations or copy number variations (CNVs). The ExAC database was used, which contains >60,000 sequenced exomes, to estimate the frequency of LSD-causing variants in a broad sampling of ethnicities. LSD-causing genes exhibit a wide range of protein-altering variants from thirty-two in the NPC2 gene to 423 in the GAA gene. Many of these variants are predicted LoF, possibly behaving as hypomorphic variants in a heterozygous state. Most of the PD samples are from European Ancestry. Therefore, the analysis presented here is focused on LSD-causing genes (n=46) in the non-Finnish sample (NFE, ~33,000 individuals). There are ~2740 LSD-causing variants reported in the NCBI ClinVAr database. There are 288 LSD-causing variants annotated in the ExAc sample: 76% are missense variants, 10% affect alternative splicing and 12% are non-sense mutations. Most of LSD-causing variants are predicted to be deleterious (87%) by SIFT and damaging (84%) by polyphen2. Most (73%) of LSD-causing variants are located in a highly conserved nucleotide (GREP score >4). The cumulative minor allele frequency (cMAF) of these variants (number of heterozygous carriers) per gene ranges from $1.50E^{-05}$ in the CSTD gene to 0.003 in the NPC2 gene. Therefore, a cMAF threshold of $1 \times 10^{-3}$ was applied as a conservative upper bound because variants more frequent than this in the general population would not be expected to be highly penetrant variants.

The discovery sample consisted of WES data from 331 unrelated PD cases from the PPMI cohort. TABLE 9 shows the top LSD-causing genes associated with PD.

TABLE 9

Rare variants found in LSD-causing genes in PPMI PD compared with NFE (ExAC)

| Gene | cMAF cases | Maf ExAC | OR | 95% CI | P value |
|---|---|---|---|---|---|
| GLB1 | 0.0013 | 0.00037 | 3.5 | 2.8-4.8 | 1.1E−33 |
| PPT1 | 0.00091 | 0.00069 | 2.3 | 1.9-3.8 | 4.8E−08 |
| NEU1 | 0.00151 | 0.001 | 1.5 | 1.4-6.9 | 1.8E−06 |
| GBA | 0.00432 | 0.00203 | 2.1 | 1.3-3.3 | 6.19E−06 |
| GNS | 0.00076 | 0.00031 | 2.4 | 1.3-21.5 | 2.57E−05 |
| NAGLU | 0.0091 | 0.00019 | 4.7 | 1.5-14.9 | 1.05E−04 |

These were analyzed using the inclusion and exclusion criteria based on the features that define a LSD-causing variant in the ExAc sample. As expected, the gene-specific cMAF from the NFE ExAC data set was highly concordant with the cMAF from the in-house PD databases (PPMI $r^2$=0.92, WUSTL $r^2$=0.96). Variants in each LSD-causing gene (n=46) that met the inclusion criteria were collated by gene: 82% are missense variants, 15% affect alternative splicing and 3% are non-sense mutations. The burden of rare protein-altering variants (cMAF) was compared with the burden observed in controls and in ExAC. For most of these genes, there is an excess of variation in cases as compared with controls, but no associations were found with in-house controls. When compared with the cMAF of the ExAc sample, seven genes passed a stringent multiple test correction threshold $p<1.0\times10^{-3}$ (0.05/50) and three LSD-causing genes passed the gene-level significant threshold $p<2.4\times10^{-6}$ (0.05/20,000) (see e.g., TABLE 9). Next, an additional PD cohort (WUSTL) was used to replicate the findings listed in TABLE 9, including 490 PD cases where the data were obtained using the Human-Exome chip (see e.g., TABLE 10).

TABLE 10

Rare variants found in LSD-causing genes in WUSTL PD compared with ExAC (non-Finnish Europeans)

| Gene | cMaf PD cases | cMaf ExAC | OR | 95% CI | P value |
|---|---|---|---|---|---|
| NEU1 | 0.0003 | 0.0001 | 2.80 | 1.9-8.7 | 1.23E-19 |
| NAGLU | 0.0015 | 0.0004 | 3.60 | 2.8-20.9 | 3.67E-07 |
| GBA | 0.0069 | 0.0032 | 2.16 | 1.6-3.0 | 1.52E-06 |
| GLB1 | 0.0015 | 0.0003 | 4.47 | 2.7-10.2 | 5.93E-06 |
| MANBA | 0.0014 | 0.0003 | 4.78 | 1.9-11.7 | 1.63E-04 |
| PPT1 | 0.0023 | 0.0009 | 2.69 | 1.4-5.6 | 3.00E-04 |
| MAN2B1 | 0.0018 | 0.0009 | 2.16 | 1.4-3.8 | 3.03E-04 |

Figure 20:
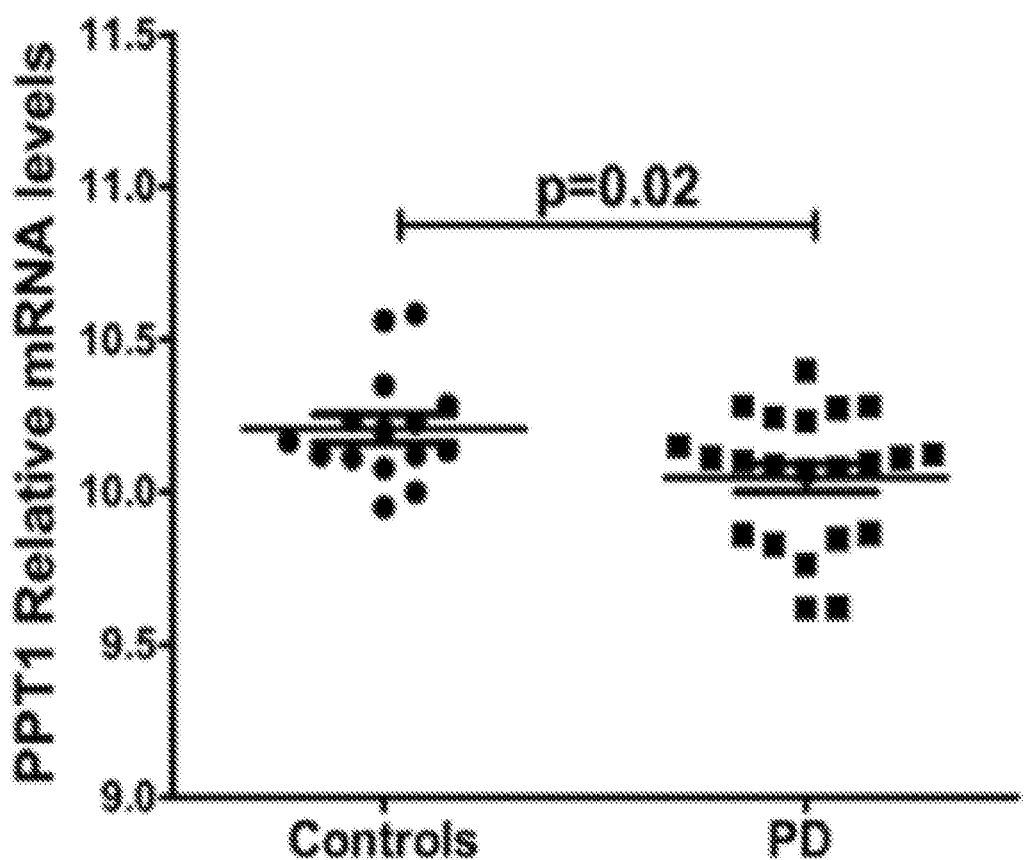
FIG. 20 shows PPT1 transcript levels in neurons from the substantia nigra of Parkinson's disease cases compared to controls, similar to FIG. 2 for NAGLU transcript levels.

As expected, seven genes were replicated in the sample with Exome-chip data (see e.g., TABLE 10). Notably, the association found in the replication sample is in the same direction and the effect size is the same. Supporting these genetic findings, PD and depigmentation of the substantia nigra (SN) has been reported in patients with mutations in PPT1. SN pathology and Lewy body accumulation has been reported in MPS IIIB patients with mutations in the NAGLU gene. In addition, a reduction in transcript levels of NAGLU and PPT1 genes was found in DA neurons from the substantia nigra of PD patients compared to controls (see e.g., FIG. 2, FIG. 20) (GEO database; Series GDS2821). Thus, based on previously published data on the pathogenicity of the variant (ClinVar database), frequency in the general population (ExAc) and in PD cases and in silico prediction of effect on the protein, three variants in each of the NAGLU and PPT1 genes have been selected to perform the functional analyses (see e.g., TABLE 11).

The preparation and use of αSyn PFFs has been previously optimized in neuronal cultures. αSyn PFFs were added to primary cortical neurons from wild-type mice at 7 days in vitro (DIV). 7 days post-treatment, neurons were fixed and stained with p-α-syn specific antibody. PFFs induced recruitment of endogenously expressed α-syn into abnormal, phosphorylated, insoluble aggregates (see e.g., FIG. 3A and FIG. 3B). α-syn aggregates initially appeared as small, punctate inclusions in presynaptic terminals and axons (see e.g., lower right panel, FIG. 3A). The aggregates grew and become more elongated and serpentine in appearance, resembling Lewy Neurites (see e.g., lower left panel, FIG. 3A). FIG. 3B shows that PBS-treated control neurons showed a band slightly above 15 kDa corresponding to monomeric α-syn. Several bands with higher molecular weights appeared in neurons treated with PFFs. Those additional bands likely correspond to α-syn oligomers. This is a tractable in vitro system to study the effects of lysosome dysfunction on α-syn aggregation.

Research Design and Methods (I) Identify ALP Genes Enriched with Rare Functional Variants in PD It is hypothesized that untested, rare functional variants in genes of the ALP affect the risk of developing PD. Here, an integrative approach is described combining the analyses of predicted rare functional variants in genes of the ALP in large datasets (both in-house and publicly available databases) to prioritize the candidate genes in the ALP with evidence of involvement in PD risk. The methodology and experiment designs for (I) are described below.

Samples and Data Acquisition

As shown here, the LSD-causing genes have been analyzed in PD. The following data sets are also used to determine the role of 380 additional ALP genes in PD.

The Parkinson's Progression Markers Initiative (PPMI): Genetic, phenotypic and epidemiological data for the PPMI dataset is available on the PPMI website. GWAS, exome-chip and WES data have been obtained for all the PPMI samples (see e.g., TABLE 12).

TABLE 12

Samples available for PD.

| Study | Controls | Cases |
|---|---|---|
| MDC | 2000 | 1000 |
| PPMI | 200 | 400 |
| UN | 550 | 654 |
| Total | 2750 | 2054 |

TABLE 11

Selected rare variants in LSD-causing genes for functional validation.

| Gene | CHR | Location (bp) | Clinical significance | Annotation | Protein Consequence | Maf Cases | Maf Controls | Maf NFE | OR |
|---|---|---|---|---|---|---|---|---|---|
| PPT1 | 1 | 40539852 | — | Missense | p.Arg268Cys | 0.0015 | 0 | 2E-04 | 7.5 |
|  |  | 40544324 | Missense | Missense | p.Asn212Asp | 0.0014 | 0 | 6E-04 | 24.2 |
|  |  | 40555167 | Pathogenic | missense | p.Arg151Gly | 0.0015 | 0 | 0 | — |
| NAGLU | 17 | 40689453 | — | Missense | p.Ser141Thr | 0.0014 | 0.003 | 9E-05 | 16.1 |
|  |  | 40690394 | — | Missense | p.Asn190Ser | 0.0014 | 0 | 3E-05 | 48.3 |
|  |  | 40695459 | Pathogenic | Missense | p.Ala479Thr | 0.0015 | 0 | 1E-04 | 12.0 |

This dataset has been previously used in multiple studies before. CSF Aβ, tau, and α-synuclein levels are available for all participants.

Movement Disorder Clinic (MDC) at Washington University: Samples can be accessed from the MDC, which includes clinical, genetic, and DNA data from more than 3000 samples. GWAS and exome-chip data have already been obtained (but not WES) for these samples (see e.g., TABLE 12). CSF Aβ, tau, and α-synuclein levels are available for 300 participants, currently. Additional PD cases and controls can be recruited through the MDC clinic. The MDC clinic assesses on average 10 newly diagnosed PD patients per week. It is estimated that around 500 new PD cases and controls can be recruited per year. DNA and GWAS and exome-chip data are obtained for all the newly recruited individuals.

Movement Disorders Unit at the University of Navarra (UN): Clinical data and genetic material can be accessed for a total of 654 cases and 550 controls for PD that are then used to replicate the findings in the American Europeans cohorts presented here. GWAS and exome-chip data are generated for all these samples. WES/WGS are generated for selected participants based on their genotypes. PD clinical diagnosis is based on UK Brain Bank criteria. Written informed consent is obtained from all participants prior to their enrollment. Demographic characteristics of these three populations were published previously.

Defining an Allele Frequency Threshold for Rare Variation

Using the information obtained from the analyses of the LSD-causing variants including highest MAF of LSD-causing variants, SIFT, Polyphen2 or GERP scores, following inclusion criteria was defined: 1) a call rate >98% in PD cases, 2) MAF <0.01% per variant, 3) only likely protein-altering variants in designated canonical transcripts annotated by ExAc or Ensemble as missense, 4) frame-shift, 5) nonsense, 6) variants affecting the splice donor and acceptor regions, and 7) if there is evidence of pathogenicity in the NCBI ClinVar database and is located in the 3' or 5' UTR region. Variants not found in ExAC, or synonymous, intronic 3' or 5' UTR variants not present in NCBI ClinVar database or with a MAF >0.01%, or miscalling in ExAC and ClinVar were excluded. To ensure that population-specific variants did not have a confounding effect on this analysis, individuals were selected based on the principal component results (see population structure analysis).

Data were Downloaded from ExAC (Version 0.3.1, June 2016)

Only genes with a high proportion of coding regions covered to a median sequence depth of >30x and only high-quality (PASS filter) variants were included in the analyses.

GWAS, QC and Imputation

WUSTL and PPMI samples were genotyped with the Illumina 610, Omniexpress chip or HumanCoreExome. Stringent QC was applied to the genotype data. SNPs were dropped if (1) genotyping success rate <98% per SNP or per individual, (2) Hardy-Weinberg equilibrium (HWE) ($p<1\times 10^{-6}$) or (3) MAF or missingness <0.05. QC was carried out separately based on genotyping chips. After removing low quality SNPs and individuals, genotype imputation was performed using the SHAPEIT-Impute2 pipeline with reference haplotypes of the 1,000 Genomes Project (released Phase 3). Genotype imputation was performed separately based on the genotype platform used. SNPs with an info-score quality of less than 0.3, posterior probability <0.9 reported by Impute2 or out of HWE were removed. Additional samples are genotyped with the Illumina NeuroX2 array. This is a custom Illumina HumanCore Exome array. Illumina HumanCore Exome contains around 226,000 common SNPs selected for imputation as well as another 225,000 coding markers. The NeuroX2 array also contains additional custom content that includes all the known reported pathogenic variants for PD as well as tagged SNPs for all signals with a p value $<10^{-3}$ from GWAS for PD. The QC and imputation for additional genotyped samples follows the same pipeline. Additionally, all samples may be re-imputed using the HRC pipeline.

Exome-Chip QC

Genotyping calls were made using the best practices for calling Illumina Exome-chip data, described previously. The QC for the exome-chip is similar to the QC steps used for GWAS, but variants were not removed because of low MAF. Since raw data has been obtained for the exome-chip, the clusters can be checked for any significant association at the single variant or gene level.

Whole Exome Sequencing Data

Methods that have been used for QC and calling variants can be used for the studies described here. Briefly, exome libraries are prepared using Agilent's SureSelect. Sequence data is generated on a HiSeq4000 with 150×2 paired ends reads, with a mean depth of coverage of at least 30×. Alignment is conducted against GRCh37.p13 genome reference, although this could be changed to GRCh38 depending on GATK support for this version of the genome. Variant calling is performed following GATK's 3.6 Best Practices. WES sequences are aligned and variants called separately following GATK's recommendations. Only those variants and indels that fall within the above 99.9 tranche are considered for analysis; variant thresholds are established for allele-balance (AB=0.3-0.7), quality (QUAL ≥30), read depth (DP ≥10), and missingness (geno=0.02). Variants out of Hardy Weinberg equilibrium ($P<1\times 10^{-6}$) or with differential missingness between cases and controls, are removed from analysis. In addition, individuals with more than 2% missing variants and whose genotype data indicated a sex discordance from the clinical database are removed from dataset. Finally, individual and familial relatedness are confirmed using PLINK1.9 and an existing GWAS dataset for these individuals. Functional impact and population frequencies of variants are annotated with SnpEff.

Population Stratification

A principal components analysis was performed using Eigenstrat together with HapMap samples as anchors to confirm self-reported race/ethnicity. Only individuals of European descent were included to avoid spurious associations due to population stratification.

Annotation

SNP annotation is carried out using SeattleSeq, Exome Variant Server, SNP Function Annotation Portal, and PharmGKB.

Burden Tests

Validated statistical methods are used that have been previously developed to analyze association with rare variants. Briefly, gene-based methods collapse the rare variants within a region to a single value and then test the association between rare variants within a region and the trait of interest. The sequence kernel association test (SKAT) is used to test for an association between status and rare variants within a gene-region. This method has been used successfully in previous studies.

The results presented here and power calculation suggests that there is sufficient power to detect an average odds ratio of >2.7 in gene-based analysis. If the association of ALP genes is not replicated with a case control design, an endophenotype design could be used. Thus, it could be tested whether common or rare variants in ALP genes affect the cerebrospinal fluid (CSF) levels of α-synuclein (800 individuals). The Genome Aggregation Database (126K exomes) is used to complement the screening of ALP genes in the general population.

(II) Determine the Functional Effect of Specific ALP Genes in α-Synuclein Aggregates and Mitophagy In Vitro It is hypothesized that a specific defect in multiple ALP genes contributes to PD pathogenesis.

The methodology and experimental designs for (II)(a) are described below. Using this methodology, the effects of selected variants in NAGLU and PPT1 genes on enzyme activity, protein and RNA levels, and lysosome function can be determined.

(II)(a) Overview

It is beyond the scope of the studies described here to evaluate all variants of each ALP gene associated with PD identified in (I). Therefore, the 3 variants identified in Aim 1 are focused on (see e.g., TABLE 11). Stringent criteria has been used to select the potential functional variants in NAGLU and PPT1 genes (two previously identified as pathogenic variants). However, it is important to characterize their effects on mRNA stability, protein levels and enzyme activity. To do so, primary cells from NAGLU and PPT1 knockout-mice are generated and transduced with variants in TABLE 11 and their effects on enzyme activity, protein and RNA levels are determined. The effect on lysosome function is also determined. The cDNA of NAGLU and PPT1 genes has already been obtained in plasmids for expression in both bacteria and mammalian cells. Selected variants are engineered using a site-directed mutagenesis kit (QuikChange II (Agilent Technology, Santa Clara, CA, USA).

Lentivirus Generation

Wild-type and mutant cDNAs are subcloned into a pLenti-III-PGK Vector (Applied Biological Materials Inc, Richmond, Canada), which carries a puromycin-resistance gene. The resultant lenti vectors along with plasmids coding for VSV-G, Gag-Pol, and Rev are co-transfected into HEK-293T packaging cells as previously described. Viral supernatant is collected according to previously published protocols. Cells are exposed to unconcentrated viral supernatants for 24 hours and cells are selected with 5 μg/ml of puromycin for four weeks. Primary neuron culture is performed as previously described.

Effects of mRNA and Protein Levels

Quantitative real-time PCR is performed using specific primers to test the effect of the selected variants on mRNA levels and splicing. Western blot is done with the following antibodies: anti-PPT1 (GeneTex) and Anti-NAGLU (ab137685, Abcam).

Cell Lysate-Based Lysosomal Enzyme Activity

To determine the effect of the variants in enzyme activity, a fluorometric assay is performed as previously described for the NAGLU and PPT1 activity. Briefly, 4-methylumbelliferyl-N-acetyl-α-glucosaminide (NAGLU) and 4-methylumbelliferyl-6-thiopalmitoyl-β-d-glucoside (PPT1) cleavage is measured at 448 nm emission and 365 nm excitation in a Hitachi F-2000 fluorescence spectrophotometer (Hitachi, Pleasanton, CA) using a standard curve ranging from 0.02 to 5 mM of 4-methylumbelliferone (Sigma, St. Louis, MO).

Lysosome Function

It is determined whether the variants are affecting the global lysosome function by using Lysotracker to quantify the number of acidic compartments per cell using flow cytometry. Lysosomal membrane integrity is monitored by LLOMe 1 mM follow by Galactein-3 staining (sc-23938).

The methodology and experimental designs for (II)(b) are described below. Using this methodology, the effects of NAGLU and PPT1 genes on α-Syn aggregation can be determined.

(II)(b) Overview

It can be determined whether there are changes in clearance of endogenous α-Syn in primary cortical and hippocampal neurons from NAGLU and PPT1-deficient and hemizygous mice. Lentiviral vectors are used to overexpress α-Syn in primary neurons from NAGLU and PPT1-deficient mice and test its effects on clearance and neurotoxicity. The rate and level of α-Syn aggregates (inclusions) in primary neurons is then determined from the NAGLU and PPT1-deficient mice following the treatment with exogenous α-Syn pre-formed fibrils (PFFs) (see e.g., FIG. 3A and FIG. 3B). Finally, it is determined if recombinant enzyme replacement can attenuate the toxicity of α-Syn pre-formed fibrils in neurons from NAGLU and PPT1-deficient mice.

Generation of Alpha-Synuclein (αSyn) Pre-Formed Fibrils (PFFs)

The conditions for the generation of PFFs have been previously optimized. Mouse and human wild-type αSyn monomer protein is produced in *Escherichia coli* as previously described. Briefly, BL21 DE3 RIL competent *E. coli* are transformed with αSyn cloned into the pRK172 bacterial expression vector. Bacterial pellets are resuspended in a high-salt buffer, homogenized using a Kontes homogenizer, sonicated, and boiled to precipitate unwanted proteins. The resulting lysate is centrifuged and the supernatant dialyzed and purified by size exclusion and anion-exchange chromatography. To generate αSyn PFFs, monomeric protein is incubated at a concentration of 5 mg/mL in Tris-buffered NaCl in a Thermomixer shaking at 1000 rpm at 37° C. for 72 hours. To determine final PFF concentration, a small aliquot of the resulting PFF suspension is centrifuged at 17,000×g for 15 minutes and the total protein concentration of the supernatant is determined by BCA assay and subtracted from the concentration of an aliquot taken prior to shaking. PFFs are diluted in Tris-buffered NaCl and added to cultured primary neurons after 5-10 DIV. PFF transductions and seeding are confirmed by immunofluorescence or sequential extraction and immunoblotting 4-7 days after exposure. Abnormal α-syn aggregates derived from endogenous α-syn are detected via immunofluorescence with anti-phospho-α-Synuclein (Ser129) antibody, clone 81A (Biolegend, MMS-5091). PFF-treated neurons are co-stained with presynaptic (CSPα or SNAP-25), endocytic (EEA1), autophagosome (Rab7) and lysosome (LAMP1) markers. It is determined whether there is an enrichment of αSyn aggregates in lysosomes. Subcellular fractionation is performed using the Lysosome Enrichment Kit for Tissue and Cultured Cells (Thermo Scientific), LAMP1, Rab7 and EEA1 is used as control for lysosome, late and early endosome markers.

Pharmacological Modulation of Macroautophagy

As described here, it can be determined whether pharmacological modulation of the autophagy pathway improves α-Syn clearance. Transduced and PFF-treated cells are treated with activators and inhibitors of the autophagy system (Torin1, 3-methylamine, brefeldin A and Spautin-1), and chaperone-mediated autophagy (AR7). Western blot of LC3 and p62 is used as indirect indicators of macroautophagy activation. Lysosomotropic agents such as Chloroquine, ammonium chloride ($NH_4Cl$), and Leupeptin are used as positive controls.

Recombinant Enzymes

Sufficient recombinant NAGLU and PPT1 have already been obtained for adding to the deficient neurons in vitro. Enzyme is added before, during and after exposure to αSyn PFFs in the presence or absence of an uptake/binding inhibitor (Mannose-6-phosphate: M3655, Sigma).

The methodology and experimental designs for (II)(c) are described below. As described here, this methodology can determine the effects of NAGLU and PPT1 genes on mitophagy.

(II)(c) Overview

As described here, it can be determined whether there are changes in mitophagy in primary dopaminergic neurons from NAGLU and PPT1-deficient mice. Primary dopaminergic neuron culture is performed as previously described.

Mitophagy Assays

Cells are incubated in the presence or absence of 20 µM carbonyl cyanide m-chlorophenylhydrazone (CCCP) (SIGMA, C2759) and/or bafilomycin A1 (Sigma, B1793) for 12-24 hours. MitoTracker and JC-1 dyes and co-localization with LC-3, SQSTM1 and LAMP-1 proteins are used to assess mitophagy. Mitochondrial protein (TOM20, cytochrome c, complex III (C-III) core 1, TIM44) degradation is detected by Western blotting. Parkin and Pink1 levels are checked by qPCR and by Western blotting in primary dopaminergic neurons from NAGLU and PPT1-deficient mice.

Alternatively, genome-editing methods such a CRISPr technology could be used to introduce the selected variants in NAGLU and PPT1 genes and perform the functional assays described above. The overall lysosome activity could be increased by over-expressing TFEB in the presence of α-Syn PFF. Electron microscopy could be used to measure the effects on mitophagy. The data generated with this project will form the foundation for more thorough experiments designed to determine the role of NAGLU and PPT1 genes in PD pathogenesis in vivo.

Example 6: Identification of Novel Therapeutic Molecular Targets for Alzheimer's Disease (AD) and Parkinson's Disease (PD)

This example describes the identification of novel therapeutic targets for the treatment of Alzheimer's disease (AD) and Parkinson's disease (PD).

As disclosed herein, an enrichment of predicted functional variants with a large effect size (OR>2.5) in at least 12 lysosomal genes in a sample of patients with Alzheimer's disease were identified.

TABLE 13

Summary of the rare variants found in LSD-causing genes in AD compared with controls.

| Gene Symbol | Protein | Number of AD patients in the US carrying mutations in these genes | Individuals in the US carrying mutations in these genes | Fold increase of carriers among AD patients | p value | Current therapies available in clinical trial and pre-clinical studies |
| --- | --- | --- | --- | --- | --- | --- |
| CTNS | Cystinosin | 13767 | 4022 | 3.4 | 6.24E−13 | Cysteamine |
| MAN2B1 | Mannosidase, Alpha, Class 2b, Member 1 | 11472 | 3902 | 2.9 | 2.88E−12 | Gene therapy, ERT |
| MFSD8 | Major Facilitator Superfamily Domain Containing 8 | 5162 | 611 | 8.5 | 9.97E−12 | |
| GLB1 | Galactosidase, Beta-1 | 6120 | 1095 | 5.6 | 2.01E−11 | Gene therapy, ERT |
| GALNS | Galactose-6-Sulfate Sulfatase | 7915 | 2428 | 3.3 | 5.21E−10 | ERT |
| NAGLU | N-Acetylglucosaminidase | 6711 | 1367 | 4.9 | 1.2E−09 | ERT, Gene therapy |
| CLN3 | Battenin | 3574 | 651 | 5.5 | 1.6E−09 | Gene therapy |
| GNPTAB | N-Acetylglucosamine-1-Phosphotransferase | 8339 | 3340 | 2.5 | 2.32E−08 | |
| SGSH | Heparan Sulfamidase | 9931 | 3337 | 3.0 | 2.45E−08 | |
| CLN8 | Protein CLN8 | 8850 | 2036 | 4.3 | 7.58E−08 | |
| NPC1 | Npc1 | 6509 | 2558 | 2.5 | 3.26E−07 | Cyclodextrin, Miglustat |
| TPP1 | Tripeptidyl-Peptidase 1 | 6195 | 1989 | 3.1 | 7.00E−07 | ERT |
| DNAJC5 | Cysteine String Protein | 3442 | 272 | 12.6 | 2.36E−06 | |
| MANBA | Beta-Mannosidase | 4693 | 1308 | 3.6 | 2.66E−05 | Gene therapy |
| PPT1 | Palmitoyl-Protein Thioesterase 1 | 11357 | 3787 | 3.0 | 1.87E−04 | ERT, Gene therapy, HA |
| SMPD1 | Sphingomyelin Phosphodiesterase 1 | 8424 | 4352 | 1.9 | 2.28E−04 | ERT |
| GAA | Lysosomal Alpha-Glucosidase | 6596 | 3172 | 2.1 | 4.26E−04 | |
| HGSNAT | Heparan-A-Glucosaminide N-Acetyltransferase | 12172 | 6617 | 1.8 | 4.73E−04 | |
| GNS | N-Acetylglucosamine 6-Sulfatase | 3097 | 502 | 6.2 | 5.79E−04 | Gene therapy |
| CTSA | Cathepsin A | 11185 | 4572 | 2.4 | 1.12E−03 | |
| | | 155512 | 51918 | | | |

TABLE 14

Summary of the rare variants found in LSD-causing genes in PD compared with controls.

| Gene Symbol | Protein | Number of AD patients in the US carrying mutations in these genes | Individuals in the US carrying mutations in these genes | Fold increase of carriers among AD patients | p value | Current therapies available in clinical trial and pre-clinical studies |
| --- | --- | --- | --- | --- | --- | --- |
| NEU1 | Neuraminidase 1 | 2898 | 100 | 28.91 | 1.23E−19 | Gene therapy |
| NAGLU | N-Acetylglucosaminidase | 1454 | 194 | 7.48 | 3.67E−07 | ERT, Gene therapy |
| GBA | Acid Beta-Glucocerebrosidase | 6888 | 3183 | 2.16 | 1.52E−06 | Previously associated with PD, ERT |
| GLB1 | Galactosidase, Beta-1 | 1452 | 325 | 4.47 | 5.93E−06 | Gene therapy, ERT |

TABLE 14-continued

Summary of the rare variants found in LSD-causing genes in PD compared with controls.

| Gene Symbol | Protein | Number of AD patients in the US carrying mutations in these genes | Individuals in the US carrying mutations in these genes | Fold increase of carriers among AD patients | p value | Current therapies available in clinical trial and pre-clinical studies |
|---|---|---|---|---|---|---|
| MANBA | Beta-Mannosidase | 1449 | 303 | 4.78 | 1.63E−04 | Gene therapy |
| MAN2B1 | Mannosidase, Alpha, Class 2b, Member 1 | 1846 | 854 | 2.16 | 0.000303 | Gene therapy, ERT |
| HGSNAT | Heparan-A-Glucosaminide N-Acetyltransferase | 3333 | 1683 | 1.98 | 0.0010 | |
| IDS | Iduronate Sulfatase | 537 | 130 | 4.12 | 0.001 | ERT, Gene therapy |
| | | 19857 | 6772 | | | |

Approximately 1 in 10 people will suffer from dementia at some point in their life. There are currently over 8 million Americans with some form of dementia. This number is expected to increase dramatically as the population ages. Sixty to eighty percent of patients with dementia (~5 million) will have a clinical diagnosis of Alzheimer's disease (AD). However, only half of the patients diagnosed with AD will actually have AD-like pathology. Therefore, ~2.5 million Americans have a form of dementia that does not fit into any known classification. Parkinson's disease (PD) is the second most common neurodegenerative disease after AD, as many as one million Americans currently live with PD.

There is growing evidence that severe lysosome dysfunction can play a role in several neurodegenerative diseases, most notably AD and PD. It is currently believed that lysosomal gene complete or nearly complete loss-of-function variants will be associated with the cases of dementia of unknown etiology. At this point a few single lysosomal genes have been associated with AD or PD in isolated populations. The frequency of lysosomal gene deleterious variants was directly compared between AD (n=1,394) and PD patients (n=821) and a representative sample of controls individuals of European origin (n>33,000). Using very rigorous statistical methods, rare functional variants in 20 and 8 lysosomal genes were identified that are significantly overrepresented in the AD and PD cases, respectively (see e.g., TABLE 13 and TABLE 14). Given the calculated carrier frequency of just the rare variants identified in the genetic analysis, it is estimated that at least 3% out of the 5.4 million AD patients and 2% out of 1 million PD patients could have defects in those genes. The actual number of AD and PD patients with defects in lysosomal genes could be even greater.

Lysosomal storage diseases (LSDs) are a relatively large class of inherited metabolic disease that encompass at least 50 distinct diseases. These diseases result from complete or nearly complete loss-of-function mutations in single lysosomal genes and are typically inherited in an autosomal recessive fashion. Significant progress has been made towards effective therapies for LSDs. Therapeutic approaches include, small molecule chaperones, stop codon read through drugs, substrate reduction, gene therapy, enzyme replacement, stem cell-mediated therapy, etc. Although LSDs are typically considered neurodegenerative pediatric diseases, the data would suggest that lysosomal gene defects are involved in cases of adult onset neurodegenerative diseases.

The data presented here implicating lysosomal gene defects in a significant proportion of dementia cases coupled with the development of therapies for LSDs has the following implications:

1) The genetic data can form the basis of a diagnostic screening tool for patients with AD or PD.
2) Patients with variants in lysosomal genes that are associated with AD and PD could potentially be treated with one of the therapies listed above to stop or reverse the disease.
3) Pre-symptomatic family members harboring neurodegenerative-associated variants in lysosomal genes can be treated prior to disease onset or at the earliest stages of disease.
4) Repurposing LSD effective therapies could be considered disease-modifying for adult onset neurodegenerative disorders.

Example 7: Lysosome/Autophagy Gene Variants Associated with Adult-Onset Neurological Diseases This example describes genetic variants in lysosomal/autophagy genes associated with adult-onset neurological diseases, and experiments and strategies to test the effect of these variants in vivo.

Background

Age is the largest risk factor for the development and progression of Alzheimer's disease (AD) and Parkinson's disease (PD). Aging also decreases the degradative capacity of the autophagy-lysosome pathway (ALP). Although multiple in vitro and in vivo studies suggest that ALP dysfunction contributes to the pathogenesis of AD and PD, the genetic variation underlying the age-dependent and AD-associated decline in ALP function is not well understood.

Hypotheses

The main hypothesis is that individuals carrying heterozygous genetic variants in lysosomal/autophagy genes are at risk of developing common adult-onset neurological diseases (e.g., Alzheimer's, Parkinson's disease, Frontotemporal dementia, etc.). Further, supplementation of exogenous lysosomal protein by enzyme replacement therapy (ERT), gene therapy (GT), stem cell therapy, etc. will slow the progression of these diseases.

Genetic Association

Alzheimer's Disease

Single-variant and gene-based analyses of all ALP genes (n=430) was performed in 4,000 AD cases and 5,000 controls in-house. The results were replicated in independent samples (5,000 AD cases and 4,500 controls) from the Alzheimer's disease sequencing project (ADSP). All ALP genes were analyzed using WES data from Non-Finnish Europeans (n=33,350) from the Exome Aggregation Consortium (ExAC) database to determine baseline genetic variation in each gene of the ALP from individuals of European ancestry Parkinson's Disease Single-variant and gene-based analyses of all ALP genes (n=430) was performed in 1,000 PD cases and 1,000 controls in-house. The results were replicated in independent samples (5,500 PD cases and 6,000 controls) from the International Parkinson's Disease Genetics Consortium (IP-GDC).

Results

For most genes, there was an excess of variation in cases as compared with in house controls but only a nominal association was found with a couple of genes. When the cMAF of AD or PD cases was compared with the ExAc sample, several independent genes passed a multiple test correction threshold. Next, the ADSP or the IPGDC cohort was used to replicate these findings. Several genes were replicated in these two independent samples.

Supporting Data

A) mRNA Levels
  1. Humans
  2. Mouse models
B) Interstitial Fluid

In Vivo Proof-of-Concept

A) Alzheimer's Disease:
  1. NAGLU+/−; 5XFAD
  2. PPT1+/−; 5XFAD
  3. DNAJC5+/+, 5XFAD
B) Parkinson's Disease:
  1. NAGLU −/− injected with preformed fibrils of alpha-synuclein (PFF-αSyn)
  2. PPT1−/− injected with PFF-αSyn
  3. GALC −/− and +/− injected with PFF-αSyn
  4. ACD −/− and +/− injected with PFF-αSyn Rescue Experiments Gene therapy can rescue lysosome dysfunction due to heterozygous mutations in lysosomal enzyme genes. A single intervention will result in persistent, widespread effects in the CNS.

A) Alzheimer's Disease:
  1. NAGLU+/−; 5XFAD
    a) plus GT
  2. PPT1+/−; 5XFAD
    a) plus ERT
    b) plus GT
  3. DNAJC5+/−; 5XFAD
    a) plus GT
B) Parkinson's Disease:
  1. NAGLU −/− injected with preformed fibrils of alpha-synuclein (PFF-αSyn)
    a) plus GT
  2. PPT1−/− injected with PFF-αSyn
    a) plus ERT
    b) plus GT
  3. GALC −/− injected with PFF-αSyn
    a) plus ERT
    b) plus GT Amyloid Accumulation Results It was shown herein that β-amyloid accumulation is exacerbated in mice hemizygous for PPT and NAGLU (see e.g., FIG. 14A, FIG. 14B).

Hemizygous naive NAGLU mice exhibit lower Aβ levels in brain interstitial fluid (ISF). Microdialysis quantification of ISF levels of Aβ in littermates WT and hemizygous mice revealed a significant reduction of baseline ISF levels of Aβ. Hemizygous naive PPT1 mice exhibit lower Aβ levels in brain interstitial fluid (ISF). Microdialysis quantification of ISF levels of Aβ in littermates WT and hemizygous mice revealed a significant reduction of baseline ISF levels of Aβ.

Aβ Plaque Load Results

It was shown that NAGLU, PPT1, and DNAJC5 hemizygosity in a model of AD (5XFAD+/−) exacerbates β-amyloid accumulation. Representative pictures of β-amyloid staining in (A) 5XFAD+/−, (B) 5XFAD+/−/Naglu+/−, (C) 5XFAD+/−/PPT+/− and (D) 5XFAD+/−/DNAJC5+/− hippocampal regions at 7 months of age (see e.g., FIG. 21A-FIG. 21D).

Figures 21A, 21B, 21C, 21D:
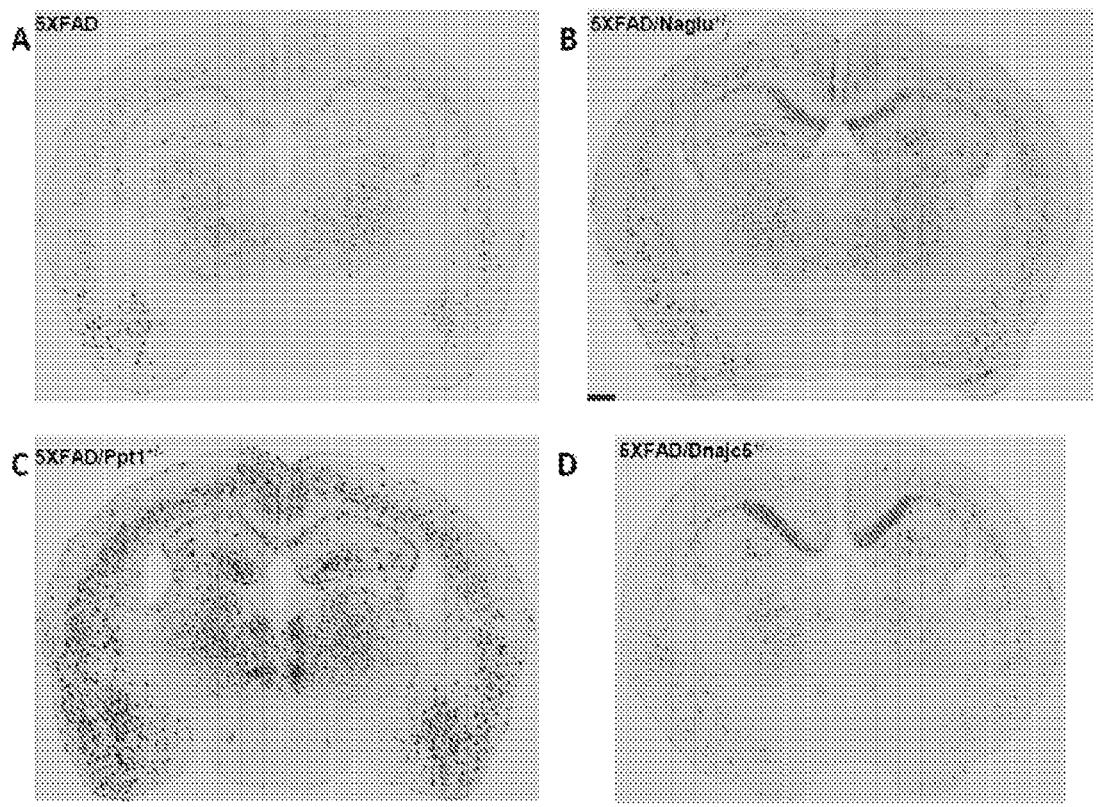
FIG. 21A-FIG. 21F is a series of images and plots showing that NAGLU, PPT1, and DNAJC5 hemizygosity in a model of AD (5XFAD+/−) exacerbates β-amyloid accumulation. Representative pictures of β-amyloid staining in (A) 5XFAD+/−, (B) 5XFAD+/−/Naglu+/−, (C) 5XFAD+/−/PPT+/− and (D) 5XFAD+/−/DNAJC5+/− hippocampal regions at 7 months of age.
Figure 21E:
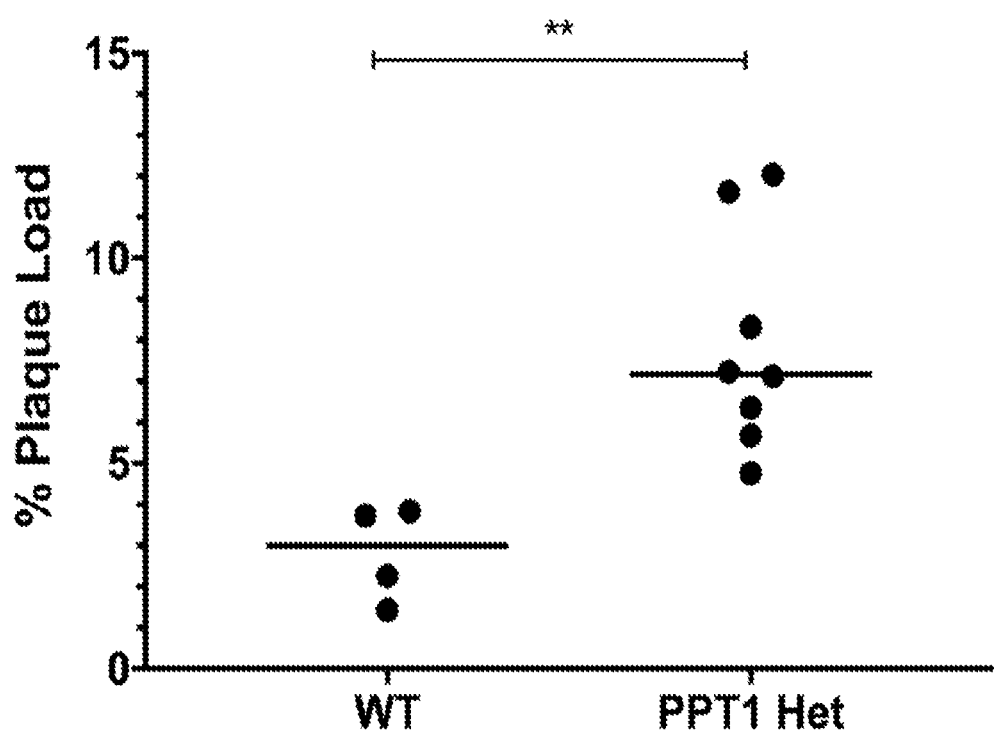
Figure 21F:
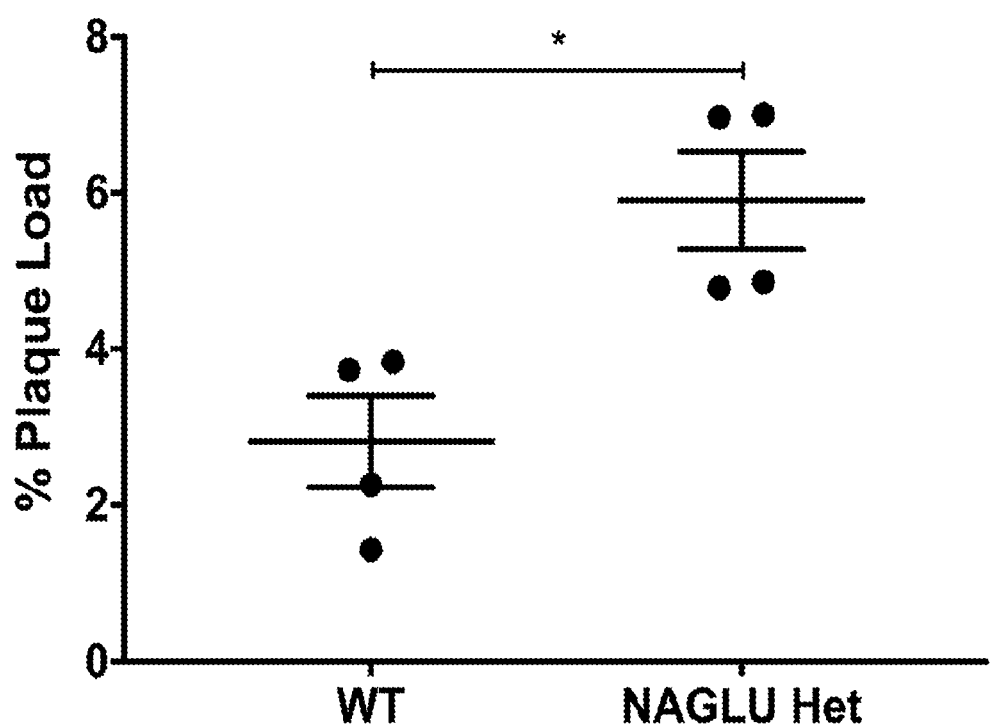
Figure 22:
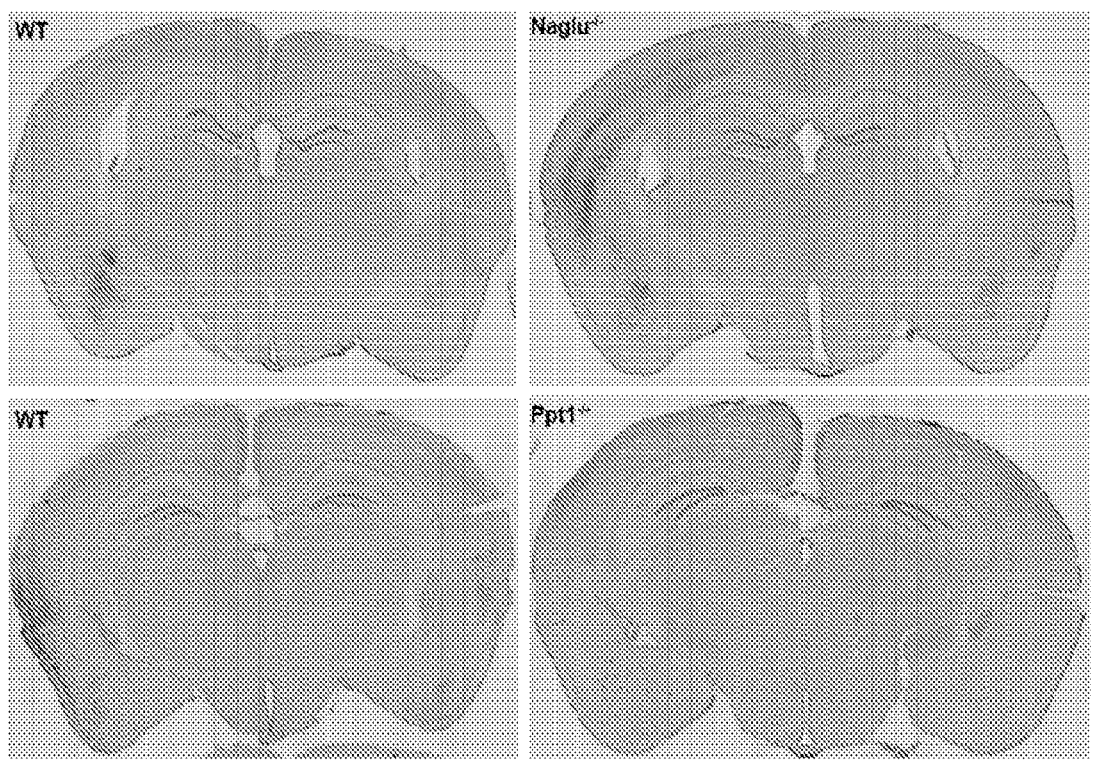
FIG. 22 is a series of images showing loss of function (LoF) in lysosomal genes modulates α-Synuclein aggregation. NAGLU-deficiency exacerbates the pathological aggregation of endogenous mouse α-Syn. PPT1-deficiency "reduces" pathological aggregation of endogenous mouse α-Syn. 90 days post-injection of intrastriatal inoculation of α-Syn pre-formed fibrils.
Figure 23:
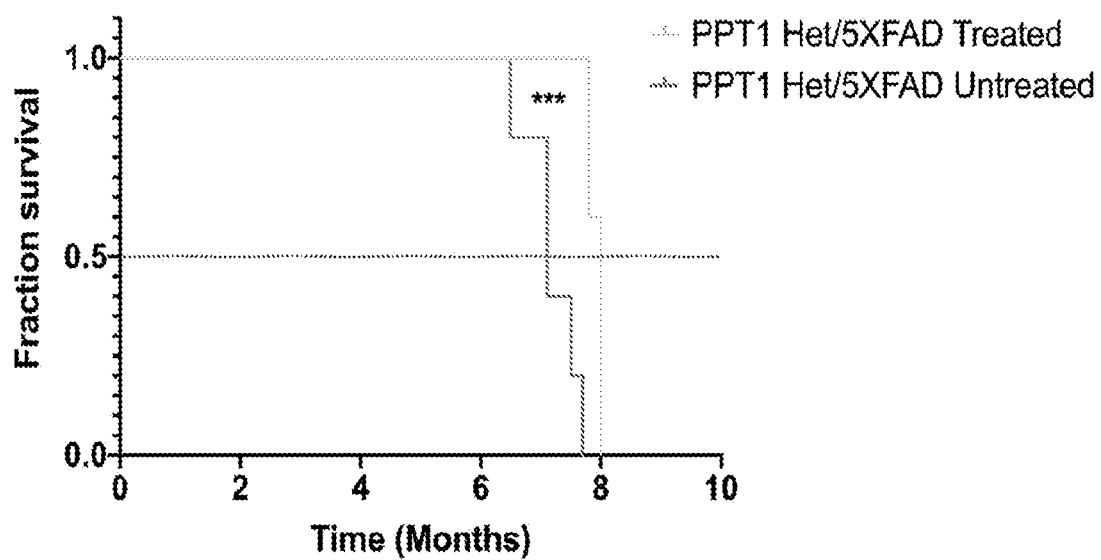
FIG. 23 is a survival curve showing targeted AAV2/9-PPT1 gene therapy delays disease progression in PPT1 Hemizygous/5XFAD mice. Kaplan-Meier survival curve showing that the median life span for PPT1 Hemizygous/5XFAD untreated (red, n=8) is significantly shorter than Hemizygous/5XFAD treated intracranially with AAV9-PPT1 (green, n=5). Analysis by log-rank test for trend was significant for overall survival (P<0.0001). Mice treated with AAV2/9-PPT1 were purposely taking down at 7.8 months for histological analyses.

It was also shown that hemizygosity in the PPT1 and NAGLU gene exacerbates β-amyloid accumulation (see e.g., FIG. 21E). Surface area covered by plaques was increased in PPT1 Hemizygous/5XFAD mice compared to 5XFAD mice. Quantification of plaque load in the hippocampus was performed blinded. **p<0.01 by unpaired t test. 7-months-old 5XFAD (n=4) and PPT1 Hemizygous/5XFAD (n=8). Surface area covered by plaques was increased in NAGLU Hemizygous/5XFAD mice compared to 5XFAD mice. Quantification of plaque load in the hippocampus was performed blinded. *p<0.05 by unpaired t test. 7-months-old 5XFAD (n=4) and NAGLU Hemizygous/5XFAD (n=4).

Survival Results

It has been demonstrated herein that targeted AAV2/9-PPT1 gene therapy delays disease progression in PPT1 Hemizygous/5XFAD mice. Kaplan-Meier survival curve showing that the median life span for PPT1 Hemizygous/5XFAD untreated (red, n=8) is significantly shorter than Hemizygous/5XFAD treated intracranially with AAV9-PPT1 (green, n=5). Analysis by log-rank test for trend was significant for overall survival (P<0.0001). Mice treated with AAV2/9-PPT1 were by all accounts healthy, but purposely sacrificed at 7.8 months for histological analyses.

Example 6: Case Study of a Family of Carriers of LSD Genes

Figure 24:
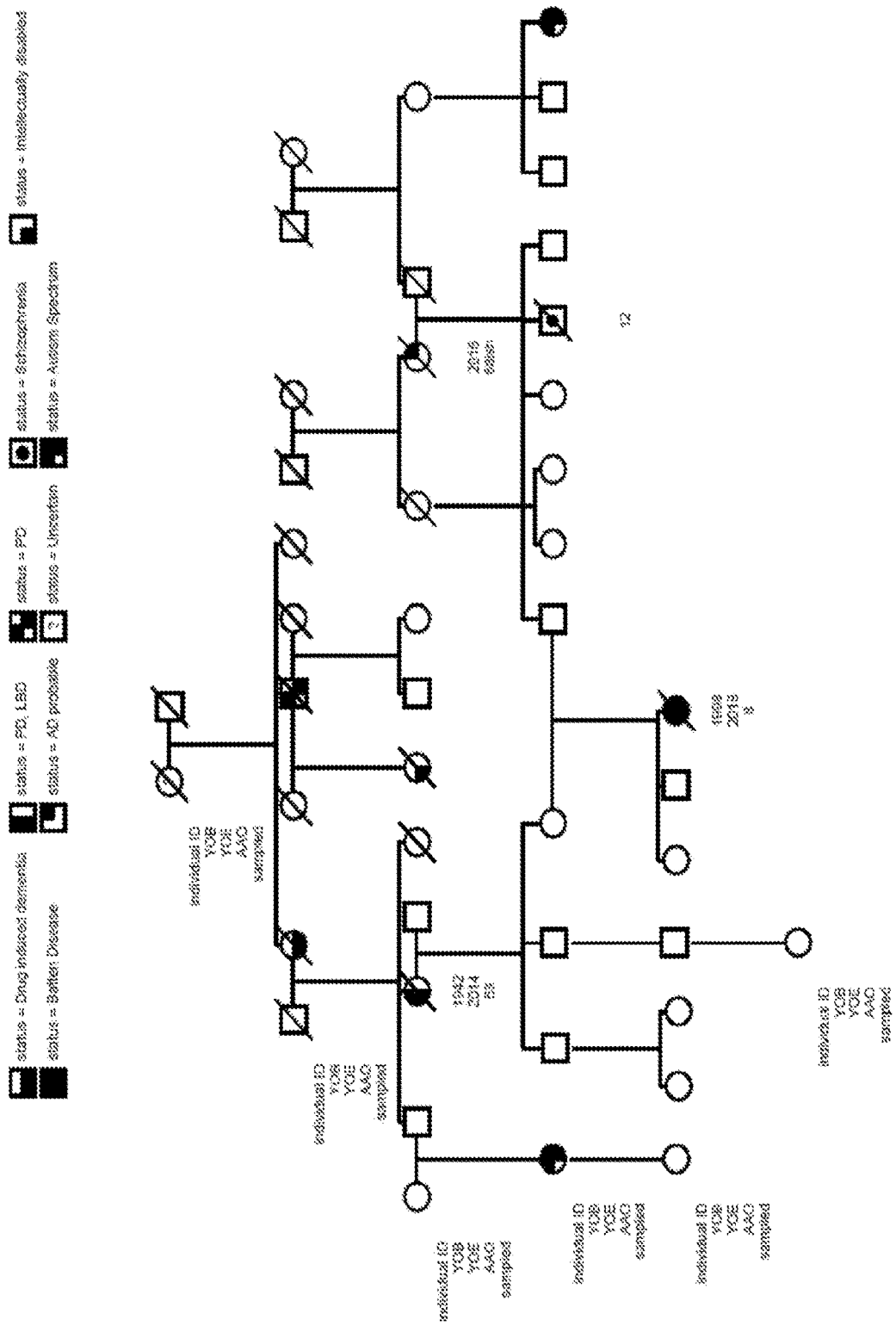
FIG. 24 is a diagram describing the pedigree of a mother and father, both carriers, of a child with infantile neuronal ceroid lipofuscinosis, CLN1 disease.

This example describes the study of a family that had a child with a LSD (infantile neuronal ceroid lipofuscinosis, CLN1 disease). CLN1 disease is caused by the homozygous deficiency of the lysosomal enzyme PPT1 (palmitoyl protein thioesterase 1). By definition, the parents are heterozygous (carriers) for complete or nearly complete loss-of-function mutations in the PPT1 gene. Therefore, we obtained written consent to create a pedigree (see e.g., FIG. 24) of the mother's and father's family. The family history showed an increase in AD and other related forms of adult neurological diseases and/or dementia. It is important to note that the formal diagnosis of AD can only be made following an autopsy. Clinically, AD can present with manifestations that resemble other forms of adult-onset neurological diseases. Many of the affected family members in this pedigree have not had a formal diagnosis (i.e., no autopsy). However, the heterozygous complete or nearly complete loss-of-function mutations in the PPT1 gene have been passed down through this family through multiple generations. The striking increase in neurological disease and/or dementia in this family is in perfect concordance with the genetic and biological data presented above.

What is claimed is:

1. A method of preventing, treating, reversing, or delaying Alzheimer's disease dementia of the Alzheimer's type in a subject in need thereof, comprising:
   administering a therapeutically effective amount of an autophagy-lysosomal pathway agent comprising a gene for gene therapy (GT) to the subject,
   wherein the subject has been determined to have or be at risk for Alzheimer's disease or dementia of the Alzheimer's type by virtue of detecting that the subject is heterozygous for a loss-of-function variant in lysosomal gene PPT1, and wherein the gene for gene therapy is a wild-type copy of the lysosomal gene.

2. The method of claim 1, wherein the GT increases or enhances enzyme activity associated with the lysosomal gene.

3. The method of claim 1, wherein the loss-of-function variant is one or more variants selected from the group consisting of an insertion, a substitution, or a deletion of the lysosomal gene.

4. The method of claim 1, wherein Aβ, apoE, tau, or a-Syn aggregation is reduced in the subject or Aβ, apoE, tau, or α-Syn clearance is enhanced compared to a subject not treated.

5. A method of preventing, treating, reversing, or delaying onset of Alzheimer's disease or dementia of the Alzheimer's type in a subject in need thereof, comprising:

detecting, or having been detected, in a biological sample obtained from the subject, the presence of a lysosomal gene comprising a heterozygous loss-of-function variant in lysosomal gene PPT1; and administering a therapeutically effective amount of an autophagy-lysosomal pathway agent comprising a gene for gene therapy (GT) to the subject, wherein the subject is has been determined to have or be at risk for Alzheimer's disease or dementia of the Alzheimer's type by detecting or having detected that the subject is heterozygous for a loss-of-function variant in lysosomal gene PPT1, and wherein the gene for gene therapy is a wild-type copy of PPT1.

6. The method of claim 5, wherein the GT increases or enhances enzyme activity associated with the lysosomal gene.

7. The method of claim 5, wherein the loss-of-function variant is one or more variants selected from the group consisting of an insertion, a substitution, or a deletion of the lysosomal gene.

8. The method of claim 5, wherein Aβ, apoE, tau, or α-Syn aggregation is reduced in the subject or Aβ, apoE, tau, or α-Syn clearance is enhanced compared to a subject not treated.

* * * * *